United States Patent [19]

Hansen et al.

[11] 4,231,096
[45] Oct. 28, 1980

[54] DIGITAL TYPESETTER

[75] Inventors: Walter I. Hansen, Cold Spring Harbor; Wiley E. Galbraith, East Northport; Louis C. Vella, Selden; Martin M. Cohen, Scarsdale, all of N.Y.

[73] Assignee: Eltra Corporation, Toledo, Ohio

[21] Appl. No.: 950,242

[22] Filed: Oct. 10, 1978

[51] Int. Cl.³ ............................................. G06F 3/14
[52] U.S. Cl. .................................. 364/523; 340/730; 340/748; 354/7; 364/900
[58] Field of Search ..................... 364/200, 523, 900; 340/730, 748; 354/7

[56] References Cited

U.S. PATENT DOCUMENTS

| | | | |
|---|---|---|---|
| 2,736,770 | 2/1956 | McNaney | 178/15 |
| 3,132,206 | 5/1964 | King | 178/15 |
| 3,226,706 | 12/1965 | Artzt | 340/324 |
| 3,389,403 | 6/1968 | Cottingham et al. | 346/108 |
| 3,422,420 | 1/1969 | Clark | 340/324 |
| 3,448,458 | 6/1969 | Carlson et al. | 346/17 |
| 3,546,681 | 12/1970 | Korn et al. | 364/900 |
| 3,573,847 | 4/1971 | Sacerdoti | 346/76 |
| 3,573,849 | 4/1971 | Herriot et al. | 346/108 |
| 3,582,905 | 6/1971 | Kraatz | 364/900 |
| 3,701,999 | 10/1972 | Congleton et al. | 346/76 L |
| 3,739,088 | 6/1973 | Landsman | 178/6.6 TP |
| 3,740,743 | 6/1973 | Baron | 340/324 A |
| 3,820,123 | 6/1974 | Ammann | 354/7 |
| 3,836,709 | 9/1974 | Hutchison | 178/6.7 R |
| 3,851,951 | 12/1974 | Eveleth | 350/161 |
| 3,893,079 | 7/1975 | Shepard et al. | 340/146.3 F |
| 3,897,132 | 7/1975 | Meeussen et al. | 350/7 |
| 3,898,627 | 8/1975 | Hooker et al. | 364/900 |
| 3,945,318 | 3/1976 | Landsman | 101/467 |
| 3,946,150 | 3/1976 | Grafton | 178/6.7 R |
| 3,970,359 | 7/1976 | Starkweather | 350/7 |
| 3,984,171 | 10/1976 | Hotchkiss | 350/7 |
| 4,029,947 | 6/1977 | Evans et al. | 364/523 X |
| 4,031,519 | 6/1977 | Findley | 364/900 |
| 4,044,363 | 8/1977 | Morgan | 354/5 |
| 4,068,224 | 1/1978 | Bechtle et al. | 340/324 AD |
| 4,071,909 | 1/1978 | Geller | 364/900 |
| 4,090,187 | 5/1978 | Kreinik | 364/324 AD |

OTHER PUBLICATIONS

The Seybold Report, vol. 7, No. 9, Jan. 9, 1978, pp. 9-1 to 9-28.

*Primary Examiner*—Jerry Smith
*Attorney, Agent, or Firm*—Joel I. Rosenblatt

[57] ABSTRACT

A digital typesetter for imaging graphics quality characters of a specified font. The typesetter includes an electronic data processing system which receives first digital data defining the identity, form, size and placement of characters to be typeset; receives second digital data defining the contour of each character to be typeset with respect to a normalized encoding set of first and second coordinates; and produces third digital data defining the character boundaries intersecting a raster (scan) line. This third digital data, for at least a portion of the raster line extending the width of several characters, is temporarily stored in a raster line storage buffer. A character imaging device, connected to the line storage buffer, is provided to image successive raster lines on a print medium. Drive means are also provided for moving the print medium in a direction transverse to the direction of the raster (scan) line.

44 Claims, 26 Drawing Figures

FONT FILE STRUCTURE

| Word | 15 | 0 | |
|---|---|---|---|
| 0 | No. of Characters | No. of Sectors | |
| 1 | No. of Characters in 16K | No. of Characters in 32K | |
| 2 | No. of Characters in 48K | Last RAM No. of Sectors | |
| 3 | Y MIN || |
| 4 | Y MAX || |
| 5 | BJ for UC Accents | Italic Accent Shift #0 | |
| 6 | BJ/Display Superiors | BJ/Auto Frac. Numerator | |
| 7 | BJ/ Inf. on Sup. | BJ/ Inf. on Inf. | |
| 8 | BJ/ 1st Order Sup. | BJ/ 1st Order Inf. | |
| 9 | BJ/ Sup. on Sup. | BJ/ Sup. on Inf. | |
| 10 | Thin Space Width | En Space Width | |
| 11 | Em Space Width | BJ/Auto Frac. Denom. | |
| 12 | Serial Number (binary) || |
| 13 | Italic Accent Shift #1 | Italic Accent Shift #2 | |
| 14 | Italic Accent Shift #3 | Italic Accent Shift #4 | |
| 15 | Small Cap % | Spare | |
| 16 17 | Spare ( Zero Fill ) || |
| 18 | Alpha or Thousands | Hundreds | Font |
| 19 | Tens | Units | Layout # |
| 20 | Thousands | Hundreds | Master |
| 21 | Tens | Units | Font # |
| 22 ⋮ 29 | Short Font Title 16 ASCII Characters || |
| 30 ⋮ 77 | Extended Font Title 96 ASCII Characters || |
| 78 ⋮ 124 | Random Fill || |
| 125 | Track | Sector | Chain Addr. |

FONT CONTROL FILE STRUCTURE

*FIG. 7*

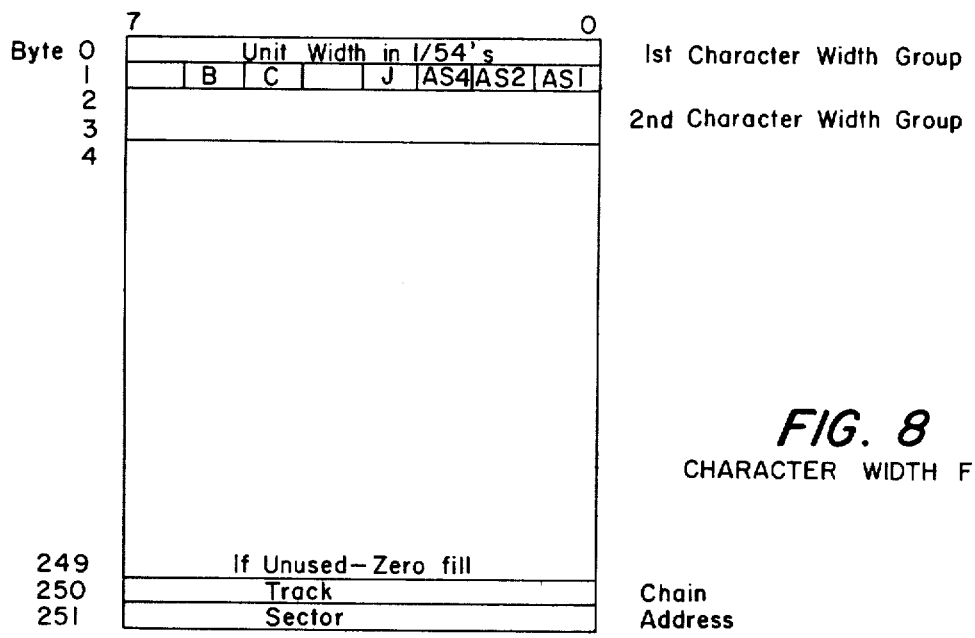
FIG. 8
CHARACTER WIDTH FILE
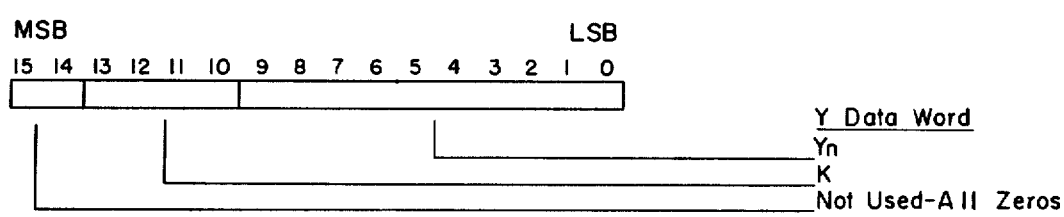
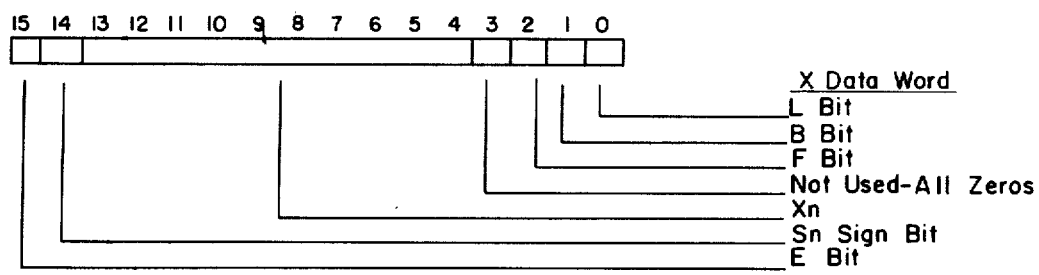
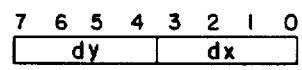
FIG. 10   OUTLINE DATA WORDS

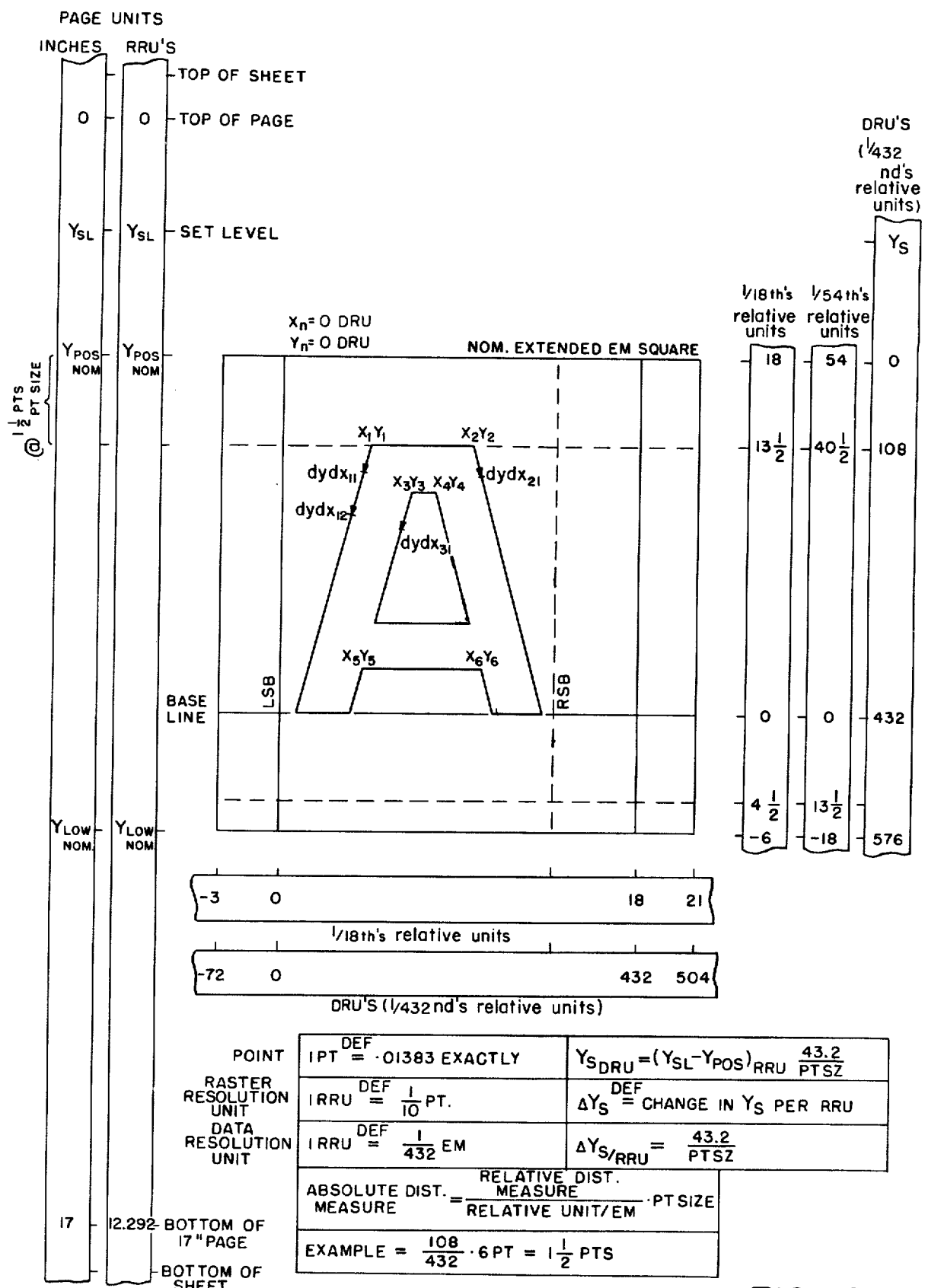
CHARACTER DATA SCALING  FIG. 9

OUTLINE DATA FILE
DISK STRUCTURE

HEADER AND OUTLINE DATA STRUCTURE

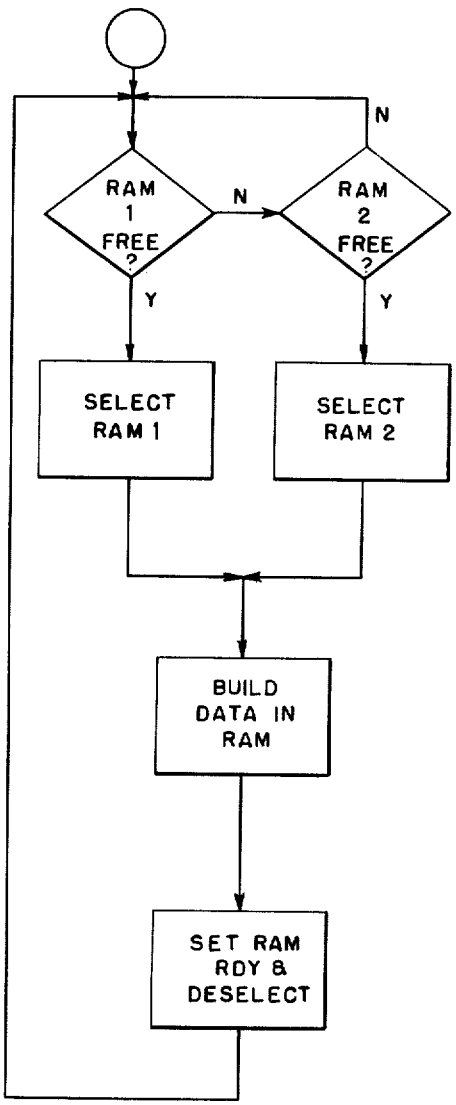
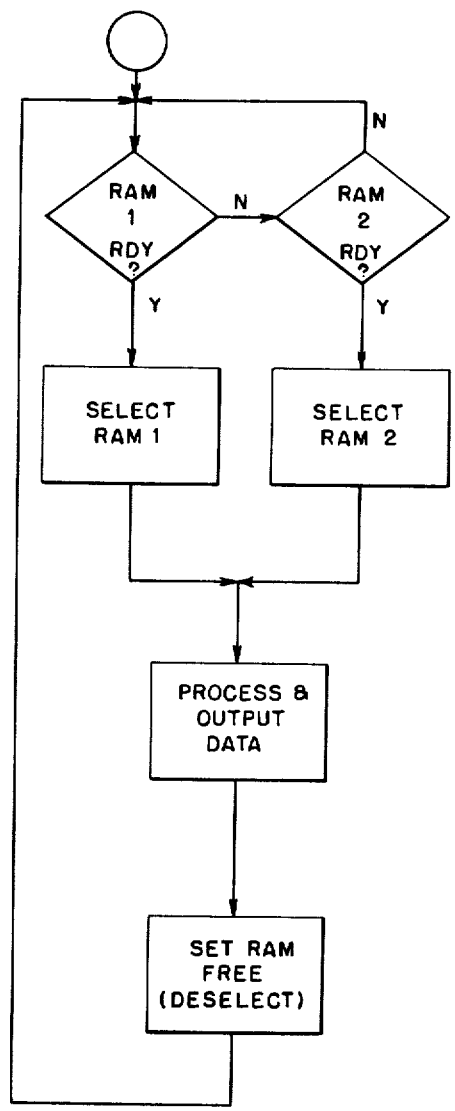
DATA RAM DOUBLE BUFFERING DESIGN
FIG. 14

DATA MANAGEMENT
RAM BUILDING FLOW

DATA RAM LAYOUT

OUTLINE DATA IN DATA RAM

DATA AND CONTROL INPUTS

| Control | Variable(s) Loaded MNE | Description | FORMAT |
|---|---|---|---|
| 81 | SCALE | Scaling Constant | Data High IV: [7...4 3...0] Integer / Data Low IV: [7...0] Decimal |
| 82 | XPOS | X Coordinate | [7 6 5...0] X X / [7...0] Integer |
| 83 | Yn | Y Curve Coordinate | [7 6 5...2 1 0] X X, K / [7...0] Yn Integer |
| 84 | Xn | X Curve Coordinate | [7 6 5...0] E, Xn Sign, Xn Integer / [7...4 3 2 1 0] X, F B L — L=dx direction, F=flare bit, B=on/off bit, E=extrapolation bit |
| 85 | SLC | Slant Constant | [7 6...0] Sign, Integer / [7...0] Decimal |
| 86 | Ys | Set Level | [7...0] Integer / [7 6 5...0] Decimal |
| 87 | dydx | Slope Data & Compute XREG | [7...4 3...0] dy / dx |
| | | | |
| 88 | RVX | | |
| 90 | | New Page Load | |
| A0 | | End of Page | |
| C0 | | Output Raster | |

*FIG. 19B*

HARDWIRED PROCESSOR

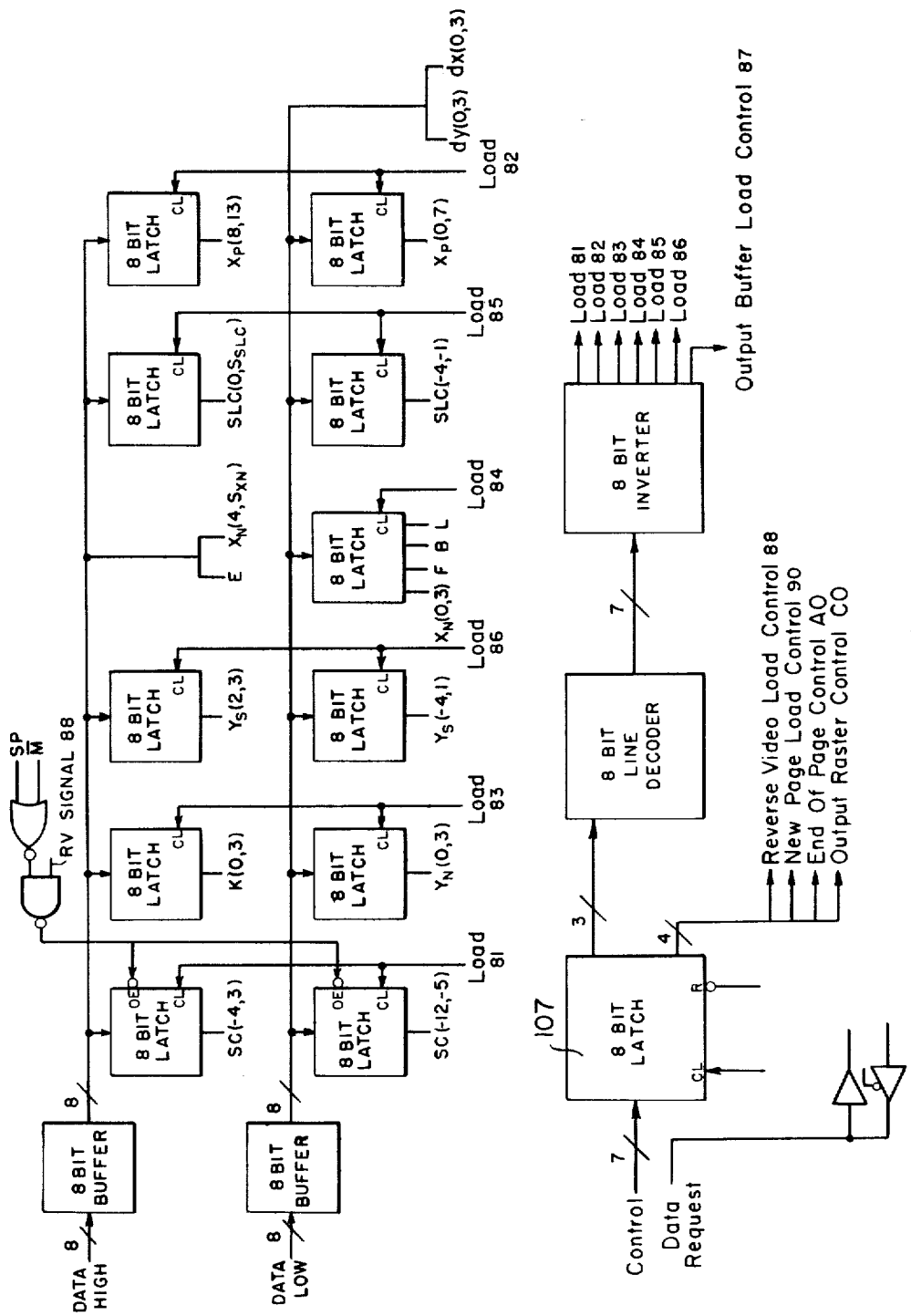
FIG. 22 DATA AND CONTROL BUFFERS AND STORAGE

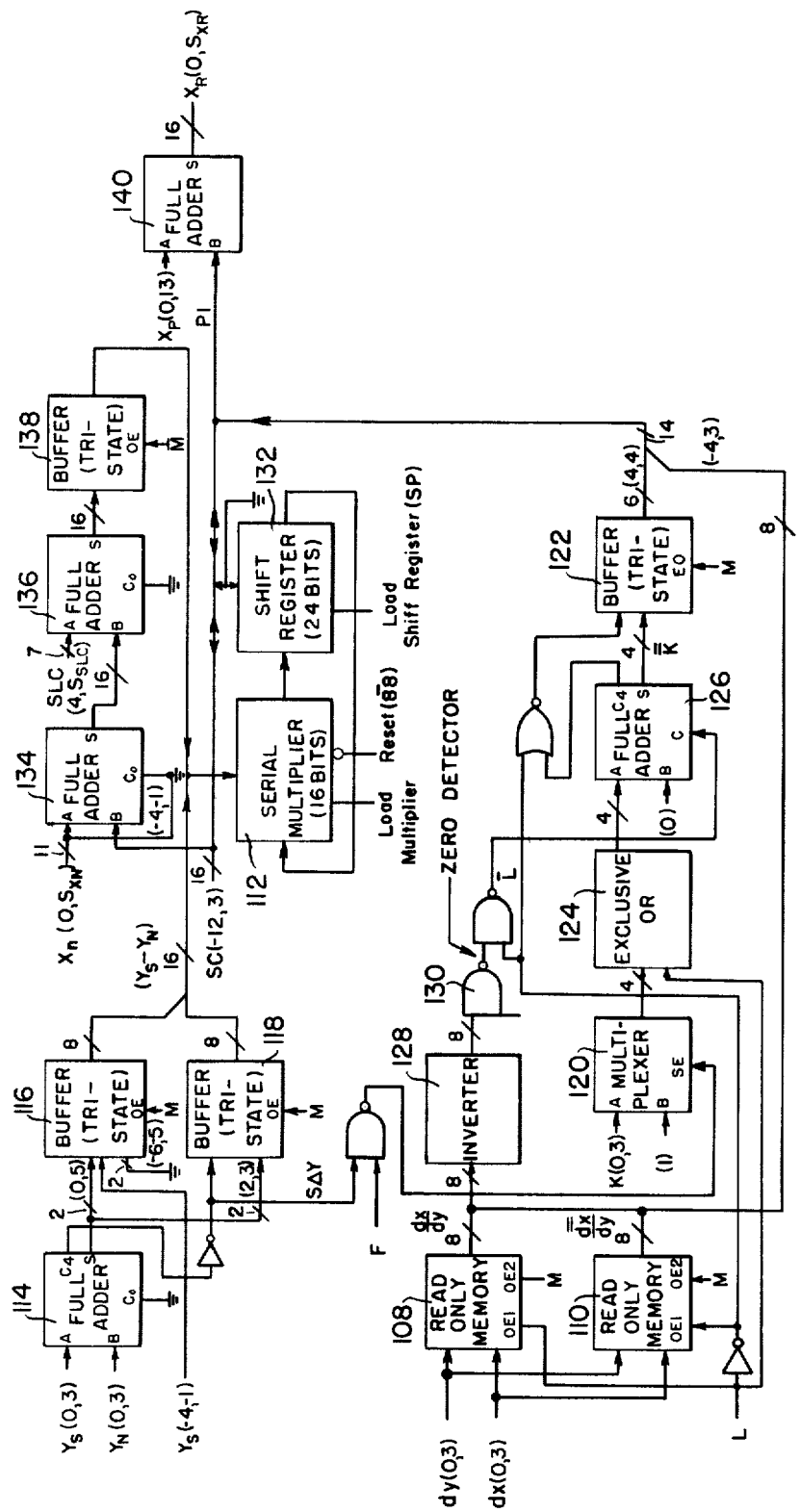
FIG. 23 OUTPUT DATA BUFFER ADDRESS COMPUTATION

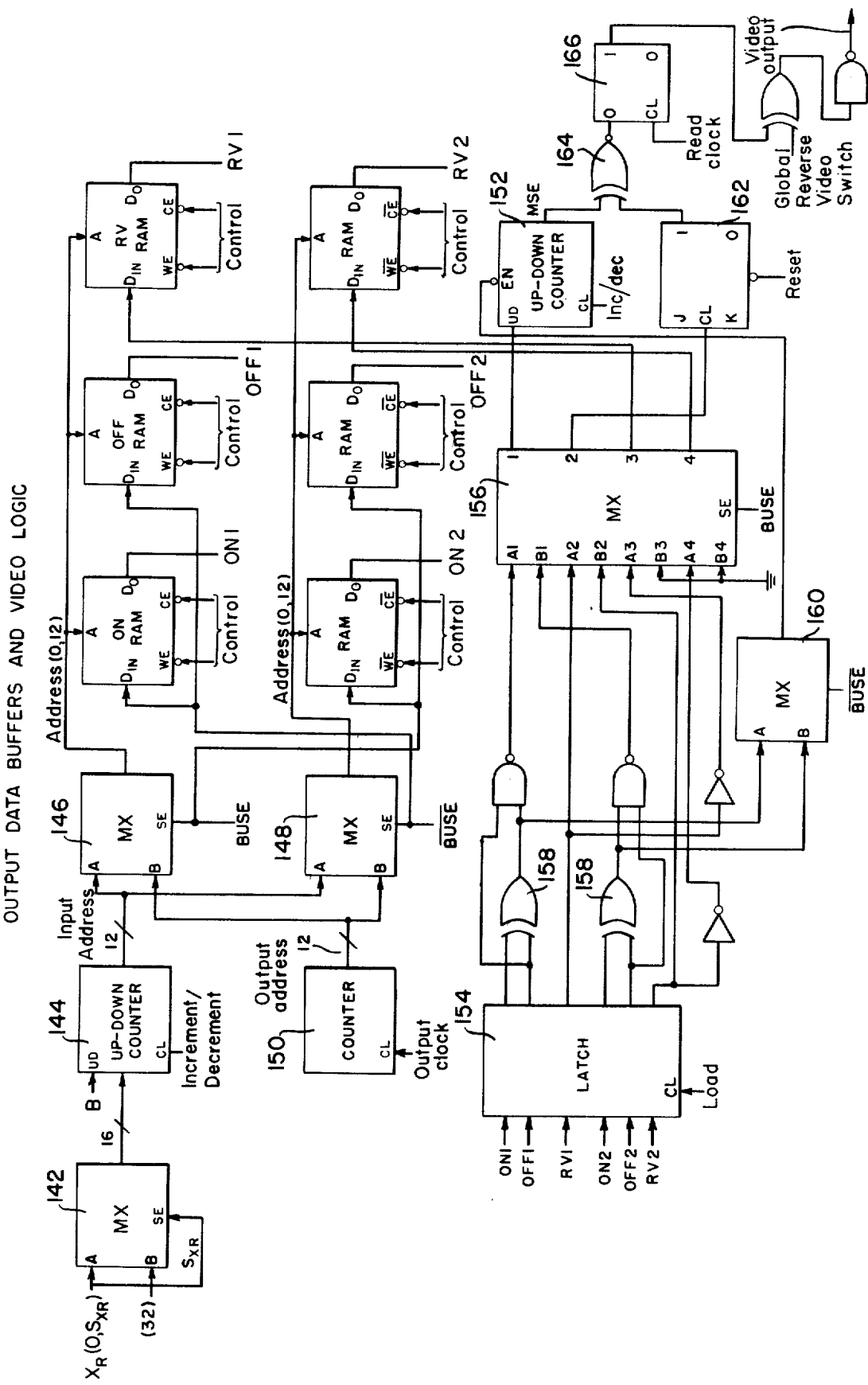
FIG. 24 OUTPUT DATA BUFFERS AND VIDEO LOGIC

DIGITAL TYPESETTER

CROSS-REFERENCE TO RELATED APPLICATION

The subject matter of this application is related to that of the commonly-owned U.S. patent application Ser. No. 905,451, filed May 12, 1978 of Derek Kyte et al. and entitled "Character Generating Method and Apparatus".

BACKGROUND OF THE INVENTION

The present invention relates to a "digital" typesetter for imaging graphics quality characters of a specified font which is stored in the machine in digital form.

Digital typesetters image typographical characters which have been coded in digital form and stored on some kind of digital storage medium such as a magnetic tape, drum or rigid or floppy disk. Such digital typesetters are normally provided with a cathode ray tube (CRT) or laser beam imaging system for writing characters onto photographic film or paper. In the case of digital CRT typesetters, successive characters are each completely imaged, one at a time, by the CRT beam which is position-controlled in two dimensions by the CRT X-Y deflection voltages. Normally, each character is built up from a series of vertical strokes which commence from the left side bearing of the character and proceed successively to the right side bearing. Once a character has been completely stroked, the CRT beam is moved to the left side bearing position of the next successive character, and so on.

When a laser beam rather than a CRT imaging system is used to image typographical characters on film or paper, a modulated one dimensional scan has generally been used. In this case, the character-writing beam is swept across the entire width of the output film or paper in a single line and this print medium is moved in a direction transverse to the direction of the scan line. While such a laser-based imaging system is substantially less expensive than a cathode ray tube system, such a system requires computation of the beam switch points to turn the scanning beam on and off with sufficient speed to keep up with the scanner on a real time basis. In order to overcome this problem, the characters of each font have been digitized as a separate digital master for each type-size to be set. In this way, the encoded character information may be used directly without scaling, for example, which requires extensive computation. The disadvantage of this arrangement is that an entire font of characters must be stored in the machine for each of the desired type sizes. This results in excessive use of storage space within the machine or requires that the machine be repeatedly "dressed" with a different digitally-encoded font each time a different type size, or a different font are to be used.

SUMMARY OF THE INVENTION

It is a general object of the present invention to provide a digital typesetter which combines the advantages of the CRT and laser typesetters described above.

It is a more specific object of the present invention to provide a digital typesetter having an imaging system of the type producing a one-dimensional scan line across the entire width of the output print medium.

It is a further specific object of the present invention to provide a digital typesetter which is capable of imaging typographical characters of virtually any size from a single digitized master font.

These objects, as well as further objects which will become apparent from the discussion that follows, are achieved, according to the present invention, by providing an electronic data processing system which receives first digital data defining the identity, form, size and placement of characters to be typeset; receives second digital data defining the contour of each character to be typeset with respect to a normalized encoding set of first and second coordinates; and produces third digital data defining the character boundaries intersecting a raster (scan) line. This third digital data, for at least a portion of the raster line extending the width of several characters, is temporarily stored in a raster line storage buffer. A character imaging device, connected to the line storage buffer, is provided to image the successive raster lines on a print medium. Drive means are also provided for moving the print medium in a direction transverse to the direction of the raster (scan) line.

In a preferred embodiment of the invention, the raster line extends substantially the width of the print medium which may be at least the size of a conventional typewritten page. The print medium may comprise paper which can be used in a conventional way for paste-up or to make office copies, or the print medium may comprise a printing plate so that printed copies may be made directly from the typesetter output.

Preferably, the raster line extends horizontally on the print medium; i.e., parallel to the lines of type. An image of this raster line may be created by a scanning device, such as a laser recorder, having means (e.g., a laser) for generating a scanning beam and a means (e.g., a mirror) for moving the scanning beam across the print medium in a scan line. Suitably, the scanning beam is switched on and off in response to the line storage buffer, as the beam is scanned across the print medium, thus forming the raster line image.

The line storage buffer preferably includes two line buffers, each of which may be formed of a plurality of memory elements each storing a single binary digit corresponding to a respective, unique raster point along the raster line. The binary digits in the first line buffer may thus represent positions on the scan line at which the scanning beam is to be switched on and the binary digits in the second line buffer may represent the positions on the scan line in which the scanning beam is to be switched off. The line storage buffer may also include a third line buffer, which may be identical to the other two. The binary digits in this third line buffer may thus represent the positions of the scan line at which the beam on/off switching is to be reversed, thus effecting a color reversal for either an entire page or a rectilinear section thereof.

The first digital data defining the identity, form, size and placement of the characters to be typeset may originate from a computer system (with the typesetter on line) or from a storage medium such as a floppy disk. The second digital data is preferably stored on a magnetic record, such as a floppy disk.

The manner in which the second digital data defines the contour of each character of a font will be described in detail hereinbelow. Essentially, this second digital data comprises digital numbers defining and X and Y coordinates of the start points of character outlines and digital numbers defining the length and direction of a plurality of straight line vectors extending successively along the character outlines from the start points. The length and direction of each vector is represented by the first coordinate distance ΔX and the second coordinate distance ΔY from one end of the vector to the other.

In accordance with a preferred feature of the present invention, the digital numbers defining the vectors are arranged such that the vectors of an entire string are successively defined before defining the vectors of another string. In addition, the second digital data includes further digital numbers, associated with the digital numbers defining the coordinates of each start point, which constitute the starting address of the digital numbers defining the vectors of the associated string. In this way, a single vector string may be addressed from a plurality of start points within a font. Finally, it is preferable if the digital numbers defining the coordinates of a start point further specify the quadrant (either right or left) of at least the first vector of the associated, addressed vector string.

In general, character designers (persons who design character fonts) tend to create a few basic character shapes which are repeated throughout the font, either directly or in mirror image. Consistency dictates that a few shapes be repeated throughout the font while symmetry dictates that mirror images be used. The vector strings utilized in the digital definition of characters permit the quantity of data required to define an entire font to be substantially reduced because a single vector string may be addressed from the start points of various characters and may be directed to extend either toward the left or toward the right, thus forming mirror images.

The electronic data processing system used in the typesetter preferably includes a random access memory for storing fourth digital data, a data management subsystem for receiving and storing the first and second digital data and producing and storing the fourth digital data in the random access memory, and an outline converter subsystem for receiving the fourth digital data from the random access memory and computing from this fourth digital data the third digital data defining the character boundaries intersecting the raster line. The manner in which the fourth digital data is processed and stored and thereafter converted into the third digital data will be described in detail hereinbelow.

For a better understanding of the invention, together with other and further objects, reference is made to the following description, taken in conjunction with the accompanying drawings.

BRIEF DESCRIPTION OF THE DRAWINGS

FIG. 7 is a diagram showing the structure of the Font Control File in the Font File of FIG. 6.

FIG. 8 is a diagram showing the structure of the Character Width File in the Font File of FIG. 6.

FIG. 9 is a diagram showing how the character data contained in the Font File is scaled.

FIG. 10 is a diagram showing the structure of the outline data words contained in the Outline Data File in the Font File of FIG. 6.

FIG. 14 contains flow diagrams showing the basic operation of the Data Management Subsystem and the Outline Converter Subsystem.

FIG. 19A and 19B are diagrams showing the data and control inputs for the hardwired processor in the Outline Converter Subsystem.

FIG. 22 is a block diagram of the data and control buffers and storage section of the hardwired processor of FIG. 21.

FIG. 23 is a block diagram of the output data buffer address computation section of the hardwired processor of FIG. 21.

FIG. 24 is a block diagram of the output data buffers and video logic section of the hardwired processor of FIG. 21.

DESCRIPTION OF THE PREFERRED EMBODIMENT

Figure 1:
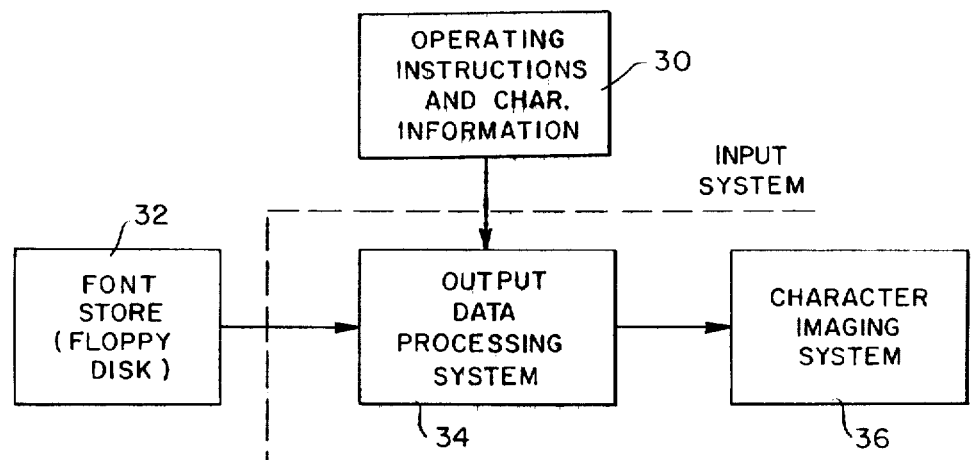
FIG. 1 is a block diagram of the overall typesetting system according to the present invention.

The preferred embodiment of the present invention will now be described with reference to FIGS. 1-24 of the drawings. Identical elements shown in the various figures are labeled with the same reference numerals.

The overall system according to the present invention is shown, in block form, in FIG. 1. This general system is divided into an Input System which supplies instructions, character information and font data from separate sources 30 and 32, and an Output Data Processing System 34 which drives a Character Imaging System 36.

The input device 30 may be a paper tape or magnetic tape reader, a separate computer, an input terminal with a keyboard and CRT screen, or a data transmission channel such as a telephone line. This input device 30 supplies to the processing system 34 digital data defining the identity, form, size and placement of characters to be typeset. As used herein, the term "identity" of characters is intended to mean the name of each particular character chosen, such as upper case "A", lower case "a", upper case "B", numeral "5"; semi-colon ";"

and the like. This identity is given by an ASCII or TTS code. As used herein, the term "form" is intended to designate the shape of each character; i.e., the particular font and the amount and direction of slant. The term "size", as used herein, is intended to designate the size in both the X direction ("set width") and in the Y direction ("point size") of each character. Finally, the term "placement", as used herein, is intended to mean the coordinate (X,Y) position of the character on the page to be typeset. In this particular embodiment, the input device 30 designates the X position and Y position of the upper left corner of the "em" square of at least the first character on the page. Subsequent characters are positioned in relation to the immediately preceding character if no placement information is given.

In addition to the identity, form, size and placement of characters, the input device 30 may also supply page variant information; that is, "global commands" which apply to all or a group of characters on a page. Examples of such commands are "wrong reading", which effects a left-right mirror image on the page by flipping the X positions of all characters, and "reverse video" which effects a color reversal for an entire page. For example, with reverse video a page may be imaged as white on black, rather than black on white.

Commands from the input device 30 may also effect a color reversal for a section of a page, such that only a rectilinear portion of the page is white on black rather than black on white.

The font storage unit 32 is essentially a floppy disk reader which may be a part of the input device 30. This font storage unit supplies to the Output Data Processing System 34 digital data defining the font of characters previously selected by the input device 30. This "second" digital data (as distinguished from the "first" digital data supplied by the input device 30) defines the contour of each character of a font with respect to a normalized encoding set of first and second coordinates. In particular, this second digital data defines the profiles or black-white boundaries of each character. If a "profile" is considered to be simply one boundary of a character, it will be seen that any "dark" portion of a character (if the character is dark on a light background) must lie between two profiles (outer boundaries or edges) of the character. By defining all the profiles of the character, with respect to a coordinate set, the "contour", outline or shape of the character is completely defined.

One aspect of this second digital data which defines the contour of each character of a font is that the character contours are defined in terms of a normalized set of coordinates, such as the X-Y coordinates of a Cartesian coordinate set. The term "normalized", as used herein, is intended to mean that the definition of a character in terms of the coordinate set is only related to any given absolute size or to the final size of the character when it is imaged. Thus, the digital values defining a character in this normalized set of coordinates are the values from which the character is scaled, up or down, to the final output resolution. Unless the scale factor just happens to equal 1 (a unique situation), the character will be defined with a different resolution than the final output.

As an example, the output data processing system 34 which will be described in detail hereinbelow is capable of scaling characters with point sizes in the range of 3-130, an expansion factor of 43 to 1. Notwithstanding this range of point sizes, the contour of each character is defined only once with respect to the normalized encoding set of coordinates.

The Output Data Processing System 34 receives the first digital data defining the identity, form, size and placement of characters to be typeset and the second digital data defining the contour of each character of the chosen font and produces third digital data defining the character boundaries intersecting a raster line. This third digital data is stored in one or more raster line buffers, also located within the Output Data Processing system, in readiness for the Character Imaging System 36. The raster line storage buffer(s) are preferably formed of a plurality of binary memory elements, each storing a single binary digit corresponding to a respective, unique raster point along the raster line. The line buffer(s) store sufficient raster (third digital data) for a portion of the raster line extending the width of at least several characters. In fact, the line buffer(s) preferably store sufficient data to define an entire raster line extending the complete width of the output print medium which may, for example, be at least the size of a conventional type-written page.

The information stored in the raster line storage buffer(s) is translated into a raster line image by a Character Imaging System 36 connected to the Output Data Processing System 34. This Character Imaging System creates an image on a print medium for the particular raster line defined by the information stored in the raster line storage buffer(s). A drive mechanism is also provided in the Character Imaging System for moving the print medium in a direction transverse to the direction of the imaged raster line.

The Character Imaging System may comprise some means for creating an image for an entire raster line at once. However, the Character Imaging System preferably includes a device, such as a CRT or laser source, for generating a scanning beam and some means, such as beam deflection circuits or a movable mirror, for moving the scanning beam across the print medium in a scan line. One such one-dimensional scanner is illustrated in FIG. 2.

Figure 2:
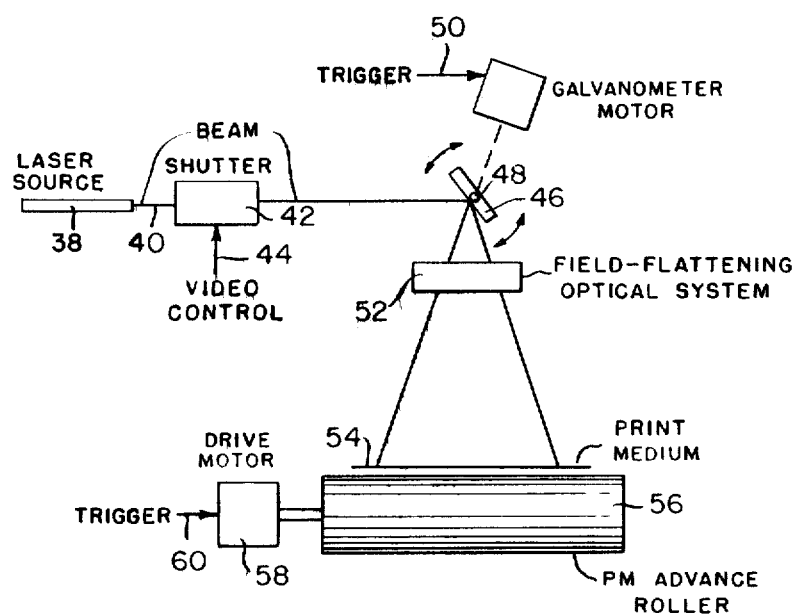
FIG. 2 is a schematic diagram of a one-dimensional scanner (laser recorder) which may be used in the system of FIG. 1.

FIG. 2 shows a laser source 38 which produces an optical beam 40. The beam passed through a light modulator 42, such as an acousto-optic modulator, which switches the beam on and off by a video control signal 44. This signal is generated in the Output Data Processing System 34 as a time function of the third digital data stored in the raster line storage buffer(s). The intermittent beam 40 which emerges from the shutter is passed to a movable mirror 46 which repetitively tilts back and forth about an axis 48 parallel to the plane of the mirror and perpendicular to the plane of the drawing. The mirror 46 is driven by a galvanometer motor which moves the mirror at an essentially constant angular speed in one direction, rapidly returns the mirror to its initial position, and repeats this scanning operation upon receipt of the next trigger pulse on line 50.

The beam is reflected from the mirror 46 and passes through a field-flattening optical system 52 which focuses it on a suitable recording or print medium 54. The purpose of the field-flattening optical system, and a specific system which may be used with the laser recorder shown in FIG. 2, is described in the U.S. Pat. No. 3,881,801 issued May 6, 1975 to Edwin W. Bechtold and entitled "Optical Scanning System". The print medium 54 used with the laser recorder of FIG. 2 may be a photographic or electrophotographic film or paper which is sensitive to the particular light frequency of the laser beam. This print medium is moved in a direction transverse to the direction of the beam scan line, preferably during the retrace movement of the mirror 46. The print medium is moved by an advance roller 56 and drive motor 58 in response to a trigger pulse on line 60. This trigger pulse is similarly generated by the output data processing system 34 as a time-shifted version of the trigger pulse on line 50.

Generally, then, it may be seen that the function of the Output Processing System is to convert the first and second digital data received from the input device 30 and the font storage unit 32 into third digital data which may be conveniently used to control the Character Imaging System 36. The format of the first and second digital data received by the Output Data Processing System, as well as the structure of the Output Data Processing System will now be described in detail with reference to FIGS. 3-23 of the drawings. This description has been organized into separate sections for convenience of the reader as set forth in the Index below.

INDEX

1. OUTPUT DATA PROCESSING SYSTEM
   - 1.1 General
   - 1.2 Data Management Subsystem
   - 1.3 Outline Converter Subsystem
2. FONT DATA DESCRIPTION
   - 2.1 General
   - 2.2 Font Control File
     - 2.2.1 Number of Characters
     - 2.2.2 Number of Sectors
     - 2.2.3 Number of Characters in 16K
     - 2.2.4 Number of Characters in 32K
     - 2.2.5 Number of Characters in 48K
     - 2.2.6 Last RAM Number of Sectors
     - 2.2.7 Y MIN
     - 2.2.8 Y MAX
     - 2.2.9 BJ for UC Accents
     - 2.2.10 Italic Accent Shift #0
     - 2.2.11 BJ/Display Superior
     - 2.2.12 BY/Autofraction Numerator
     - 2.2.13 BJ/Inferior (Inf.) on Superior (Sup.)
     - 2.2.14 BJ/Inf. on Inf.
     - 2.2.15 BJ/1st Order Sup.
     - 2.2.16 BJ/1st Order Inf.
     - 2.2.17 BJ/Sup. on Sup.
     - 2.2.18 BJ/Sup. On Inf.
     - 2.2.19 Thin Space Width
     - 2.2.20 En Space Width
     - 2.2.21 Em Space Width
     - 2.2.22 BJ/Autofraction Denominator
     - 2.2.23 Serial Number
     - 2.2.24 Italic Accent Shift #1
     - 2.2.25 Italic Accent Shift #2
     - 2.2.26 Italic Accent Shift #3
     - 2.2.27 Italic Accent Shift #4
     - 2.2.28 Small Cap %
     - 2.2.29 Spares
     - 2.2.30 Font Layout Number
     - 2.2.31 Master Font Number
     - 2.2.32 Font Description
     - 2.2.33 Extended Font Description
     - 2.2.34 Random Fill
     - 2.2.35 Chain Address
   - 2.3 Character Width File
     - 2.3.1 Unit Width
     - 2.3.2 Flag Bits
     - 2.3.3 Chain Address
   - 2.4 Character Digitization
     - 2.4.1 Character Definitions
     - 2.4.2 Scale
     - 2.4.3 Outline Data Words
     - 2.4.4 Outline Data File Structure
       - 2.4.4.1 FSIZE
       - 2.4.4.2 CINDEX
       - 2.4.4.3 ENDFNT

INDEX -continued

- 2.4.4.4 Sector Filler
- 2.4.4.5 Header and Outline Data
- 2.4.4.6 Header File
- 2.4.4.7 Outline File
- 2.4.4.8 CHKSUM
- 2.4.5 Profile Strings
- 2.4.5 Miscellaneous
- 2.5 Font RAM Format
  - 2.5.1 In-RAM Table
  - 2.5.2 In-Seg Table
3. PAGE DATA DESCRIPTION
   - 3.1 Page Definition
   - 3.2 Page Variants
     - 3.2.1 High Resolution
     - 3.2.2 Proof Page
     - 3.2.3 Page Width
     - 3.2.4 Wrong Reading
     - 3.2.5 Reverse Video
     - 3.2.6 Line Rule
4. INPUT SYSTEM INTERFACE SPECIFICATION
   - 4.1 General
     - 4.1.1 Page Data
     - 4.1.2 Font Data
     - 4.1.3 Other Data
     - 4.1.4 Notation
       - 4.1.4.1 " " Terminal
       - 4.1.4.2 ( ) Non-Terminal
       - 4.1.4.3 { } Optical Repeats
       - 4.1.4.4 / Either-Or
       - 4.1.4.5 * Once only
   - 4.2 Page Data
     - 4.2.1 Page Data Structure
       - 4.2.1.1 Character Sets
       - 4.2.1.2 Reverse Video Sets
       - 4.2.1.3 Line Rule Sets
     - 4.2.2 Input Codes/Terminal Elements
       - 4.2.2.1 (SEG#) = "SEG#"
       - 4.2.2.2 (YPOS) = "YPOS"
       - 4.2.2.3 (XPOS) = "XPOS"
       - 4.2.2.4 (YLOW) = "YLOW"
       - 4.2.2.5 (FONT) = "FONT"
       - 4.2.2.6 (CHAR) = "CHAR"
       - 4.2.2.7 (PT SIZE) = "PT SIZE"
       - 4.2.2.8 (SET WIDTH) = "SET WIDTH"
       - 4.2.2.9 (LR CODE) = "LR CODE"
       - 4.2.2.10 (SLANT) = "SLANT"
       - 4.2.2.11 (RV CODE) = "CODE"
       - 4.2.2.12 (YEND) = "YEND" (XEND) = "XEND"
       - 4.2.2.13 "END SEG"
       - 4.2.2.14 "END PAGE"
   - 4.3 Font Data
     - 4.3.1 Font Data Structure
     - 4.3.2 Input Codes/Terminal Elements
       - 4.3.2.1 (CHAR) = "CHAR"
       - 4.3.2.2 (#OUTLINES)
       - 4.3.2.3 "END FONT"
5. DATA RAM
   - 5.1 General
   - 5.2 Data RAM Building
   - 5.3 Data RAM Format
     - 5.3.1 Page Structure
     - 5.3.2 Line Segment File
       - 5.3.2.1 Character Set
       - 5.3.2.2 Reverse Video Set
     - 5.3.3 Outline File
   - 5.4 Terminal Elements
     - 5.4.1 [OUTLINE ADDRESS] = "Outline Address"
     - 5.4.2 [YPOS] = "YPOS"
       - 5.4.2.1 [ZERO DATA WORD] = "ZERO DATA WORD"
     - 5.4.3 [YACC HIGH] = "YACC HIGH"
       - 5.4.3.1 [YACC LOW] = "YACC LOW"
     - 5.4.4 [XPOS] = "YPOS"
     - 5.4.5 [NULL] = "NULL"
     - 5.4.6 [ΔYs HIGH] = "ΔYs HIGH"
     - 5.4.7 [ΔYs LOW] = "ΔYs LOW"
     - 5.4.8 [SCALE HIGH] – "Scale High"
     - 5.4.9 [SCALE LOW] – "Scale Low"
     - 5.4.10 [BLJ] = "BLJ"

-continued

| | INDEX | |
|---|---|---|
| 5.4.11 | [LINK HIGH] | = "Link High" |
| 5.4.12 | [LINK LOW] | = "Link Low" |
| 5.4.13 | [RVY HIGH] | = "RVY High" |
| | [RVY LOW] | = "RVY Low" |
| | [RVX HIGH] | = "RVX High" |
| | [RVX LOW] | = "RVX Low" |
| 5.4.14 | [NEW PAGE] | = "New Page" |
| 5.4.15 | [SLANT Off] | = "Slant Off" |
| | [SLANT +7] | = "Slant +7" |
| | [SLANT −7] | = "Slant −7" |
| | [SLANT +14] | = "Slant +14" |
| | [SLANT −14] | = "Slant −14" |
| 5.4.16 | [END Data] | = "End Data" |
| 5.4.17 | [END Page] | = "End Page" |
| 5.4.18 | [YLMT] | = "Y limit" |
| 5.4.19 | "Font Call" | |
| 6. | OUTLINE ALGORITHM | |
| 6.1 | Basic Outline Intersections | |
| 6.2 | Boundry Bit And On/Off Buffer Storage | |
| 6.3 | Long Verticals | |
| 6.4 | Steep Slopes | |
| 6.5 | Shallow Slope | |
| 6.6 | Squared Outline Shapes | |
| 6.7 | Extrapolation | |
| 6.8 | Flare Bit | |
| 6.9 | Extrapolation Cancel Bit | |
| 6.10 | Slant | |
| 6.11 | Reverse Video | |
| 6.12 | Line Rule | |
| 6.13 | Wrong Reading | |
| 7. | HARDWIRED PROCESSOR | |
| 7.1 | General | |
| 7.2 | Input | |
| 7.3 | On/Off Solving | |
| 7.4 | Reverse Video Input | |
| 7.5 | Raster Line Data Storage Buffers | |
| | 7.5.1 | ON/OFF Buffer Input |
| | 7.5.2 | Reverse Video Buffer Input |
| | 7.5.3 | Buffer Output |
| 7.6 | The HWP Structure | |
| | 7.6.1 | Basic Sections |
| | 7.6.2 | Data and Control Buffers and Storage |
| | 7.6.3 | Output Data Buffer Address Computation |
| | 7.6.4 | Output Data Buffers and Video Logic |
| 8. | COMPUTER PROGRAMS | |
| 8.1 | General | |

1. OUTPUT DATA PROCESSING SYTEM 1.1 General: The Output Data Processing System is responsible for computing the horizontal coordinates, on the page to be typeset, at which the laser scanning beam must be turned on or off for each and every raster line on the page. Its computation is based upon the particular raster line which is required (depth down the page); on the particular characters (i.e., identity) which are to be set at that point on the page; and on the form and size as well as the shape of these characters as defined by the Input System.

Since the conversion from the "second" digital data, defining the contour of the characters to be set, into raster data is complex, and since the raster output form requires repeated, multiple character data access, the time required for computation of each raster line becomes a significant factor in the system architecture. In an effort to minimize the computation time, the Output Data Processing System has been divided into two major subsystems:

(1) The Data Management Subsystem (DMS) and,
(2) The Outline Converter Subsystem (OCS). A Z80A microprocessor is used in the former and an 8×300 (or "SMS 300") microcontroller with a hardwired processor is used in the latter.

Figure 3:
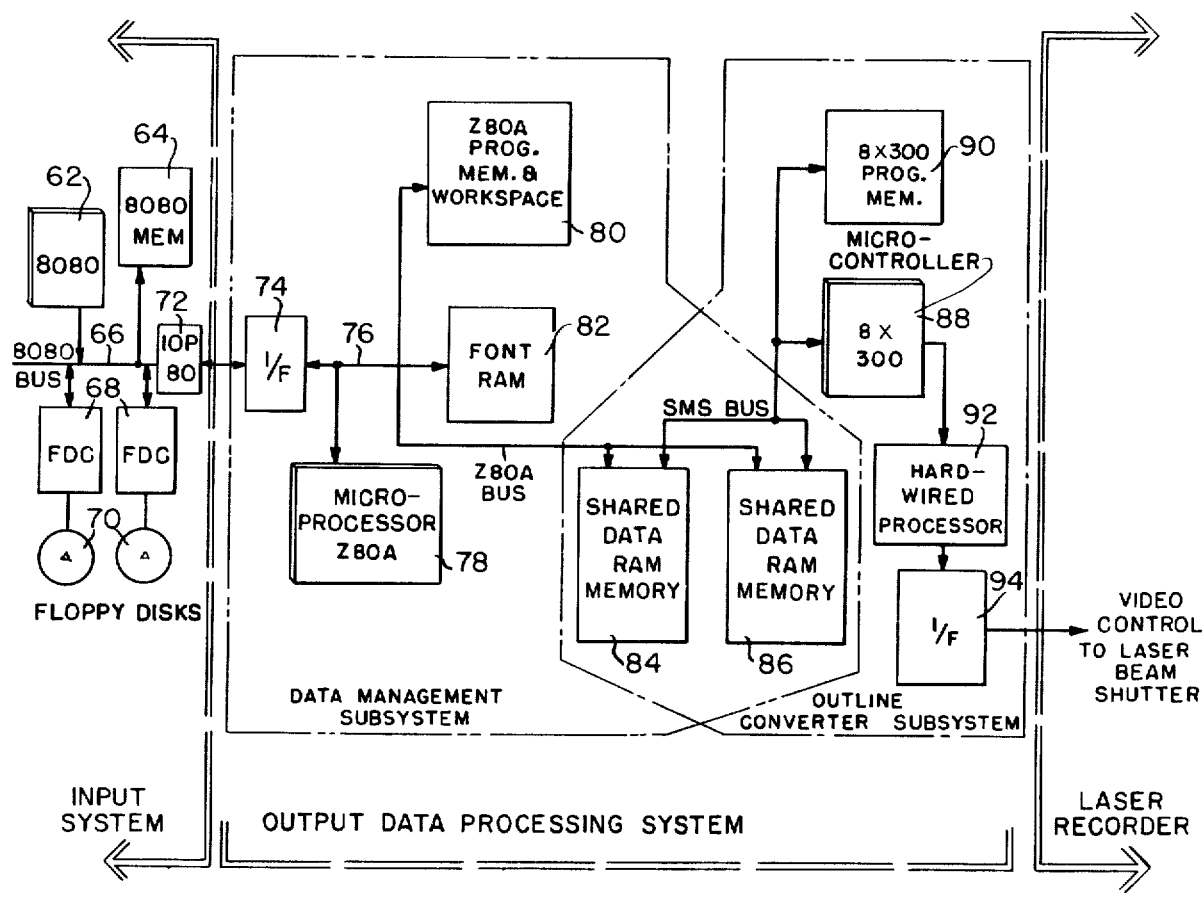
FIG. 3 is a block diagram of the Output Data Processing System in the system of FIG. 1.

FIG. 3 shows the Output Data Processing System in block form. This system receives the first digital data defining the identity, form, size and placement of the characters to be typeset as well as the second digital data defining the contour of each character from a common Input System. The Input System operates with a programmed 8080 microcomputer 62 supported by a RAM 64 of suitable size. The microcomputer and memory are arranged on a 8080 bus 66 as are two floppy disk read/write units comprising floppy disk controllers 68 and the disks 70 themselves. One disk 70 contains the text information or "first" digital data, while the other disk contains the font information or "second" digital data. The bus terminates in an IOP80 interface 72 which communicates with an interface 74 in the Output Data Processing System. This latter interface is arranged on a Z80A bus 76 as are the Z80A microprocessor 78 and four memory units 80, 82, 84 and 86 of the Data Management Subsystem.

The memory unit 80 serves to store the program for the Z80A microprocessor 78 and is a workspace for the microprocessor computations. The memory 82, called a "font RAM", stores the second digital data defining the characters of the chosen font. This data is processed and supplied in a convenient form, which will be described in detail below, to two memories 84 and 86 called "Data RAM's".

The Data RAM's 84 and 86 are "shared" by the Data Management Subsystem and the Outline Converter Subsystem. Basically, the Z80A microprocessor supplies data to these RAM's and the 8×300 microcontroller 88 receives and analyzes this data, under control of a program stored in another memory 90, and supplies pertinent data to a hardwired processor 92. This hardwired processor converts the data into the so-called "third" digital data which is stored in three raster line buffers. The information contained in these buffers is then converted into a video control signal by an interface 94 and supplied to the laser recorder in synchronism with the movement of the scanning beam.

Figure 4:
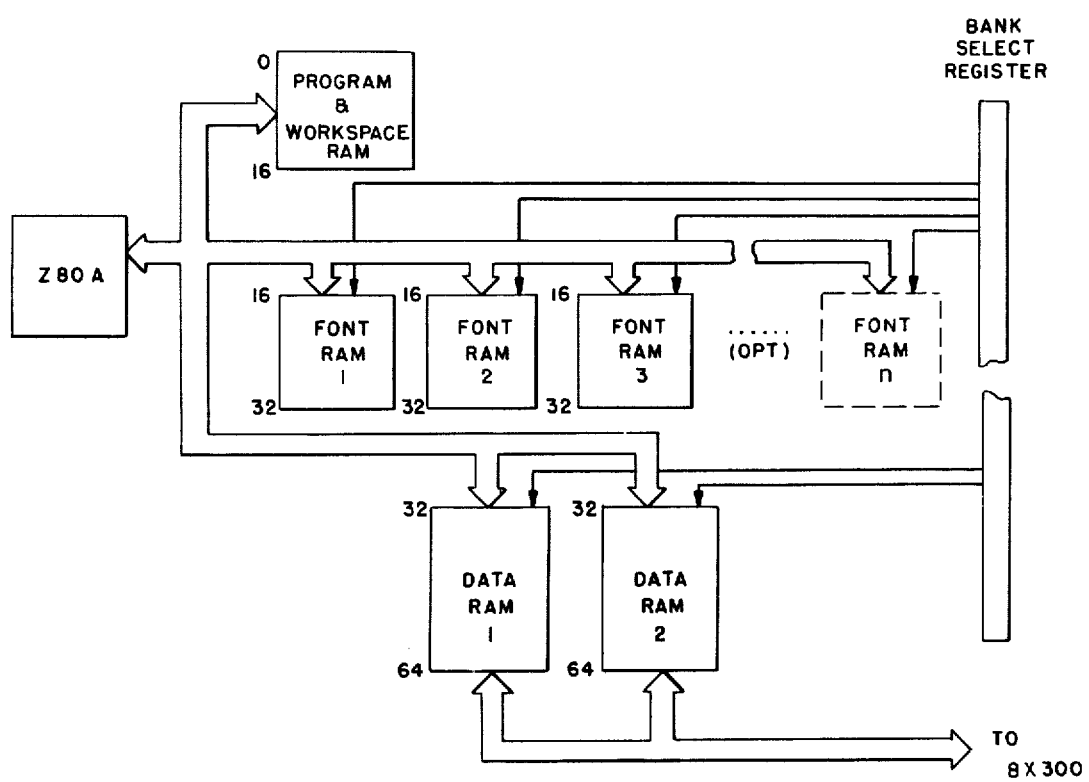
FIG. 4 is a block diagram of the Data Management Subsystem in the Output Data Processing System of FIG. 3.

1.2 Data Management Subsystem: The circuit blocks and their interconnections employed in the Data Management Subsystem are shown in FIG. 4. In general, the responsibility of the Data Management Subsystem is to organize and supply data to the memory shared with the Outline Converter Subsystem so as to facilitate rapid processing by the Outline Converter Subsystem. More specifically, the Data Management Subsystem executes the following process steps:

(a) When ready, read the next required typographical "line segments" into a Data RAM memory file from the text floppy disk.
(b) Transfer the font data from the font floppy disk to one of the font RAM memories for a "font data file".
(c) Set-up an "outline file" in the Data RAM for the Outline Converter Subsystem. This file contains the X and Y start points of each outline of each character required, as well as "vector" data defining the contour of each character.
(d) Revise the "line segments file" by replacing the character number with the location of the outline file.

(e) Repeat the above steps until no memory storage area is available for the line segments file or the outllline file.

(f) Pass control to the Outline Converter Subsystem. Restart on the other Data RAM.

Figure 5:
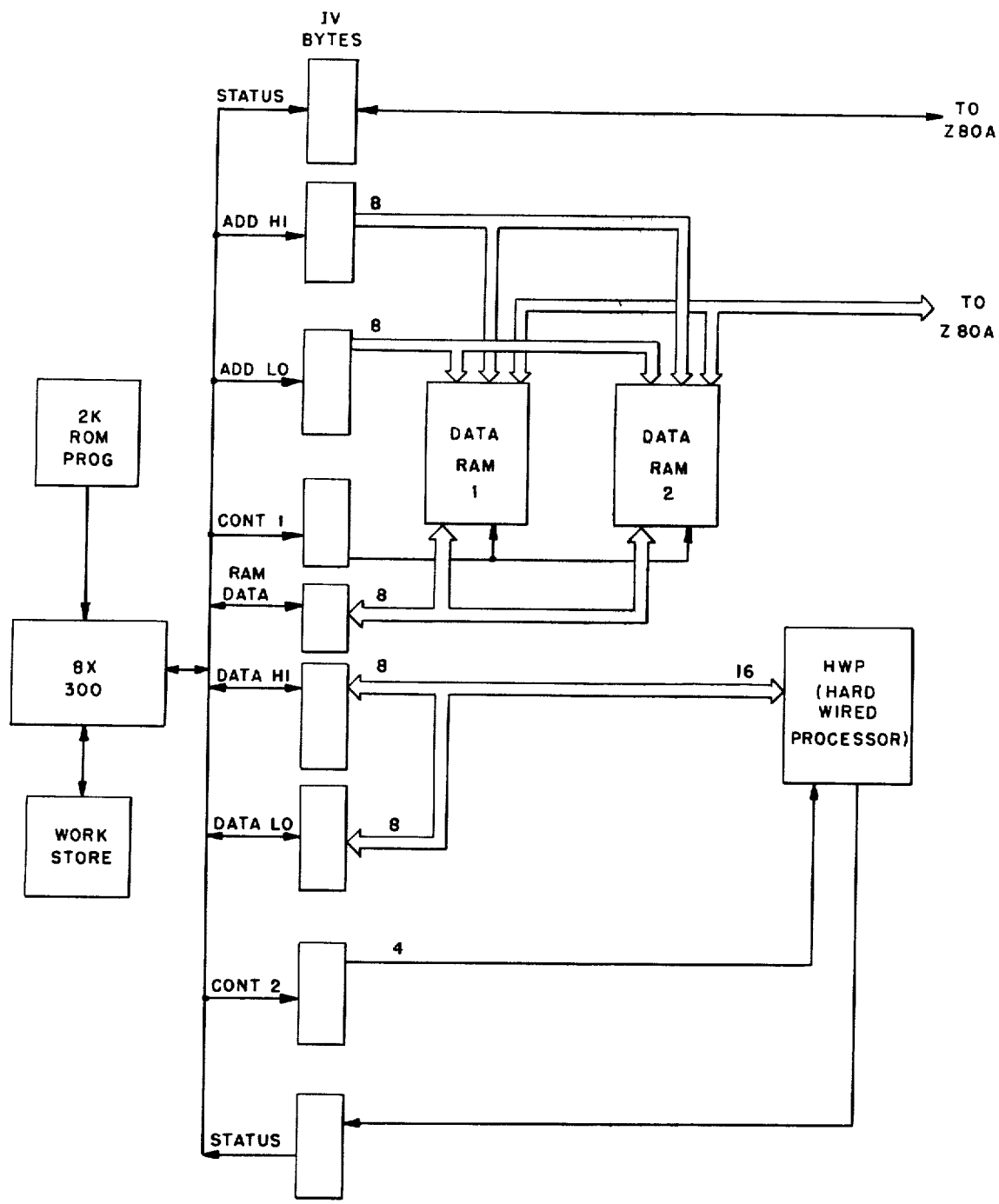
FIG. 5 is a block diagram of the Outline Converter Subsystem in the Output Data Processing System of FIG. 3.

1.3 Outline Converter Subsystem: The integrated circuits and interconnections forming the Outline Converter Subsystem are shown in FIG. 5. Basically, the responsibility of the Outline Converter Subsystem is to convert the outline or contour data stored in the shared Data RAM into horizontal stroke data for the laser recorder. More specifically, the Outline Converter Subsystem executes the following process steps:

(a) Read the identifying data and size data for the first line segment.

(b) Read the distance from the margin to the left side bearing (LSB). Store in an X register.

(c) Read the outline start data for the next character, compute the distance from the LSB of the character to the outline. When necessary, fetch new outline vector data to update the X,Y start data.

(d) Output the sum of this value and the current X value (located in a "X" register") to the appropriate raster line buffer.

(e) Read the next outline(s); repeat step (c) until all outlines have been computed at the level on the page being set.

(f) Read distance to the LSB of the next character; add this to the X register.

(g) Repeat steps (c) through (f) until all characters in the line segment have been computed and output. Then repeat steps (a) through (f) for all other line segments on this level.

(h) When all line segments on this level have been computed, transfer control of the raster line buffer(s) to the laser driver system, and start storing data in an alternate (next) raster buffer for the raster line 1/10th point down the page.

2. FONT DATA DESCRIPTION 2.1 General: The second digital data defining the characters of each desired font is stored on the font floppy disk. This data is of the "outline" type; that is, it defines the contour of each character with respect to a normalized encoding set of coordinates. In order to compress data, not all the character edge points on the resolution matrix are encoded. The general nature of the encoding scheme is described in the above-referenced, commonly-owned U.S. patent application Ser. No. 905,451, filed May 12, 1978, of Derek Kyte, et al. and entitled "Character Generating Method and Apparatus".

Figure 6:
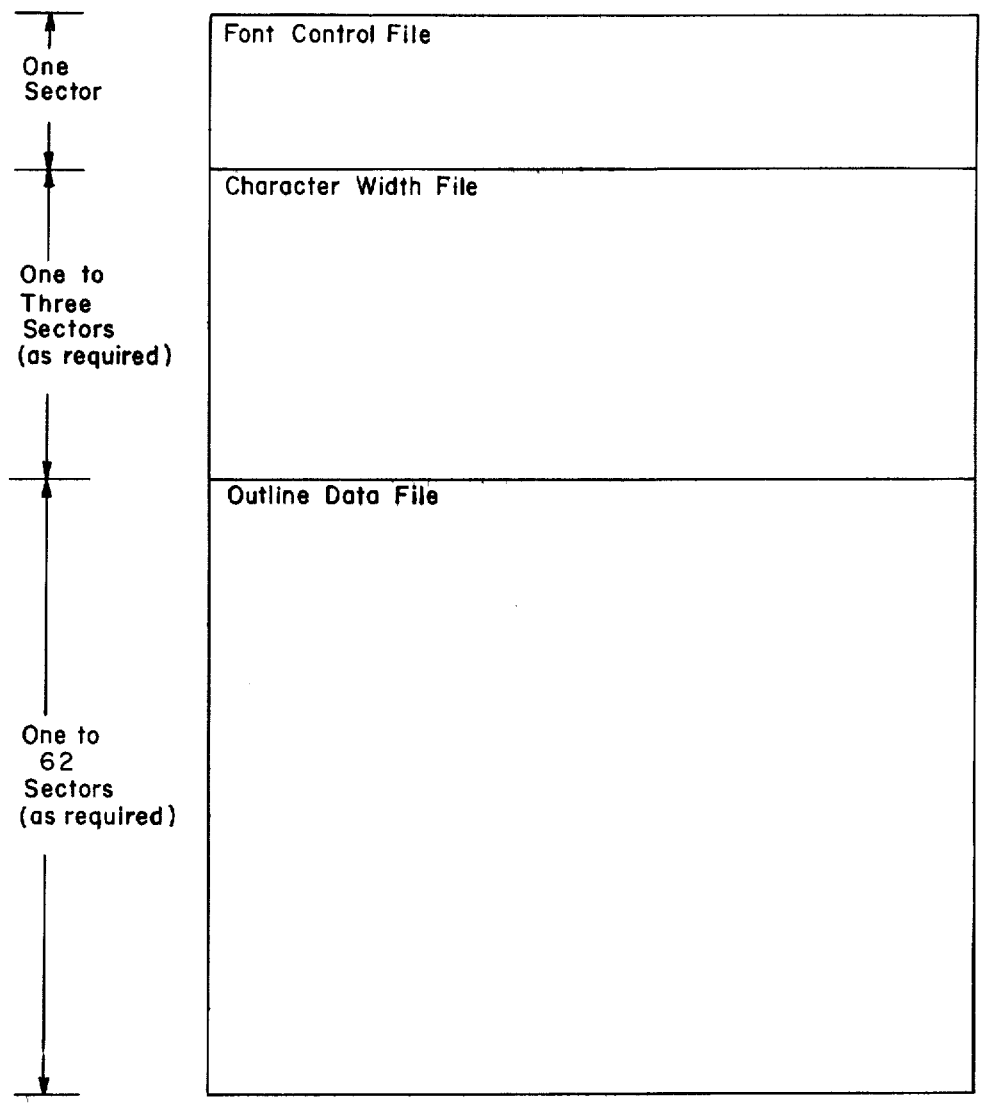
FIG. 6 is a diagram showing the structure of the Font File contained in the font storage unit in the system of FIG. 1.

Because the floppy disk is the principal storage medium for fonts, the font data has been structured to correspond to the size of the sectors of the disk. Three separate subfiles comprise a font file as illustrated in FIG. 6:

1. Font Control File;
2. Character Width File; and
3. Outline Data File.

The Font Control File contains all the data which describes the font as an entity, such as a font description, serial number, number of characters, base jump and fixed space data, etc. This file is totally contained in one floppy disk section (125 words). Section 2.2 of this specification describes the Font Control File in detail.

The Character Width File contains the width of each character and other character-related data required by the Input System. This file is contained on one or more full sectors, depending upon the number of characters per font. Section 2.3 of this specification describes the Character Width File in detail.

The Outline Data File contains the starting coordinates of character outlines, the vectors that define the shape of the outlines, character control words and file size controls. This file is contained on one or more full sectors, depending upon the number of characters and the shape complexity of the characters. Section 2.4 of this specification describes this file in detail.

When the Data Management Subsystem (DMS) requires font data, the appropriate font data is read from the floppy disk by the Input System and transferred to Font RAM 82 by the DMS. Section 2.5 of this specification describes the structure and contents of data that has been transferred to the Font RAM.

2.2 Font Control File: The Font Control File contains all the data which describes the entire font or which is applicable to multiple characters in the font. This file is contained on one floppy disk sector, and therefore it is 125 words long. The structure of this file is shown in FIG. 7. The elements on this file, indicated in FIG. 7, are described below:

2.2.1 Number of Characters: The most significant byte (MSB) of word 0 defines in binary the number of characters in the font.

2.2.2 Number of Sectors: The least significant byte (LSB) of word 0 defines in binary the number of floppy disk sectors required by the Outline Data File. This can be utilized by the Input System to allocate disk space if additional fonts are added.

2.2.3 Number of Characters in 16K: The MSB of word 1 defines in binary the number of characters contained in the first 16,384 bytes of the Outline Data File.

2.2.4 Number of Characters in 32K: The LSB of word 1 defines in binary the number of characters contained in the first 32,768 bytes of the Outline Data File.

2.2.5 Number of Characters in 48K: The MSB of word 2 defines in binary the number of characters contained in the first 49,152 bytes of the Outline Data File.

2.2.6 Last RAM Number of Sectors: The LSB word 2 defines in binary the number of Outline Data File floppy disk sectors that must be transferred for the RAM that would contain the last character in the font. The will be a number between 3 and 68, and can be utilized by the Input System to control font data transfer to the ODS.

2.2.7 Y MIN: Word 3 defines in binary the minimum Yn value in data resolution units (DRU's) in the entire Outline Data File. This will be utilized by the Input System to set the Y position (YPOS) for each line segment.

2.2.8 Y MAX: Word 4 defines in binary the maximum Yn value in DRU's that will result from adding each outline dy's to its correlated Yn. This is the lowest point on all characters in the font, and will be utilized by the input system to set the lowest point (YLOW) for each line segment.

2.2.9 BJ for UC Accents: The MSB of word 5 defines the vertical displacement that will move a centered piece accent from its nominal lower case position to the proper location for use with upper case characters. This is an unsigned binary number in 1/432nd's of an em.

2.2.10 Italic Accent Shift #0: The LSB of word 5 defines the horizontal displacement to be made when a lower case piece accent is used on upper case characters. This is nominally only required on italic fonts, and the shift is nominally to the right. This is the default value if an alternate Italic Accent Shift is not specified. The shift value is expressed as a 7 bit unsigned value in DRU's. The eighth, most significant bit is a sign bit, set to 0 for a right shift and set to 1 for a left shift.

2.2.11 BJ/Display Superior: The MSB of word 6 defines the base jump (BJ) to align display superior numerals, in accordance with the bit definition of paragraph 2.2.9. It is nominally equal to half the height of the numerals in the font, and is nominally utilized with 50% point size reduction to achieve top aligning superiors for prices, etc.

2.2.12 BY/Autofraction Numerator: The LSB of word 6 defines the base jump (BJ) to align the numerators of autofraction numerals, in accordance with the bit definition of paragraph 2.2.9 It is nominally equal to 40% of the height of the numerals in the font, and is nominally utilized with 60% point size reduction to achieve top alignment.

2.2.13 BJ/Inferior (Inf.) on Superior (Sup.): The MSB of word 7 defines the base jump to align an inferior onto a first order superior. The base jump (BJ) value is expressed as a 7 bit unsigned value in units of 1/54 of an em (eight DRU's). The eighth, most significant bit is a sign bit, set to 0 if an upward displacement is required and set to 1for downward displacement. It is nominally equal to half the height of the numerals in the font, and is nominally utilized with 4/9th's point size reduction.

2.2.14 BJ/Inf. on Inf.: The LSB of word 7 defines the base jump to align an inferior onto a first order inferior, in accordance with the bit definition of paragraph 2.2.13. It is nominally equal to downward half the height of the numerals.

2.2.15 BJ/1st Order Sup.: The MSB of word 8 defines the base jump to align a first order superior, in accordance with the bit definition of paragraph 2.2.13. It is nominally equal to the 7/12th's of the numeral height, and it is nominally utilized with ⅔rd's point size reduction.

2.2.16 BJ/1st Order Inf.: The LSB of word 8 defines the base jump to align a first order inferior, in accordance with the bit definition of paragraph 2.2.13. It is nominally equal to downward 3/12th's of the numeral height.

2.2.17 BJ/Sup. On Sup.: The MSB of word 9 defines the base jump to align a superior onto a first order superior, in accordance with the bit definition of paragraph 2.2.13. It is nominally equal to the numeral height.

2.2.18 BJ/Sup. On Inf.: The LSB of word 9 defines the base jump to align a superior onto a first order inferior, in accordance with the bit definition of paragraph 2.2.13. It is nominally zero.

2.2.19 Thin Space Width: The MSB of word 10 defines the width assigned to thin spaces for this font. It is expressed in 1/54th's em, and is nominally the same as the period width.

2.2.20 En Space Width: The LSB of word 10 defines the width assigned to "en" spaces for this font. It is expressed in 1/54th's em, and is nominally the same as the width of numerals.

2.2.21 Em space Width: The MSB of word 11 defines the width assigned to em spaces for this font. It is expressed in 1/54th's em, and is nominally 54 units.

2.2.22 BJ/Autofraction Denominator: The LSB of word 11 defines the base jump to align the denominator for autofraction numerals. The jump value is expressed as a 7 bit unsigned value in DRU's. The eighth bit is a sign bit, set to 0 if an upward displacement is required and set to 1 for a downward displacement.

2.2.23 Serial Number: Word 12 defines in binary a number that identifies the number of times that this Master Font Number has been reproduced.

2.2.24 Italic Accent Shift #1: The MSB of word 13 defines the first alternate italic shift, in accordance with the bit definition of 2.2.10. The value is additive to the default values (zero or 2.2.10).

2.2.25 Italic Accent Shift #2: The LSB of word 13 defines the second alternate italic shift, in accordance with the bit definition of 2.2.10. The value is additive.

2.2.26 Italic Accent Shift #3: The MSB of word 14 defines the third alternate italic accent shift, in accordance with the bit definition of 2.2.10. The value is additive.

2.2.27 Italic Accent Shift #4: The LSB of word 14 defines the fourth alternate italic accent shift, in accordance with the bit definition of 2.2.10. The value is additive.

2.2.28 Small Cap %: The MSB of word 15 defines the % reduction in point point size to derive a small cap from a drawn upper case letter. It is expressed as an 8 bit binary fraction.

2.2.29 Spares: Words 15 through 17 inclusive are spare words with zero fill.

2.2.30 Font Layout Number: Words 18 and 19 define in ASCII code a font layout number that correlates the specific characterform in the font with their sequential position in the Character Width File and the Outline Data File Index. Each unique font layout number identifies a unique set of characterforms in a unique sequence.

2.2.31 Master Font Number: Words 20 and 21 define in ASCII code the font master number that uniquely defines the fonts:

| Face Name | e.g. | Times, Helvetica |
|---|---|---|
| Style | e.g. | Roman, Italic, Bold |
| Design Size | e.g. | 8 pt., 12 pt., 18 pt. |
| Layout | | Which specific characterforms (See 2.2.30) |

2.2.32 Font Description: Words 22 through 29 inclusive are an ASCII coded sequence that forms a 16 character title describing the font face name, style, design size, etc., in an abbreviated fashion that enables ready identification of the font. Spaces are used for fill if required.

2.2.33 Extended Font Description: Words 30 through 77 inclusive are an ASCII coded sequence that forms a 96 character title describing fully the font. Spaces are used for fill if required.

2.2.34 Random Fill: Words 78 through 124 inclusive are filled from a random number generator.

2.2.35 Chain Address: Word 125 contains the chain address (track and section) of the first sector of the Character Width File.

2.3 Character Width File: The Character Width File contains data applicable to individual characters which are needed by a composition system. The Output Data Processing System makes no use of this file. FIG. 8 illustrates the structure of this file. Two bytes are required to define the data for each character; up to 125 characters may be described in each sector. Any unrequired bytes are filled with zeros. All character width groups must be sequenced to correspond with the sequence of characters in the outline index.

2.3.1 Unit Width: The first byte of each character width group defines in binary the unit width in 1/54's of the normalized em.

2.3.2 Flag Bits: Designated bits in the second byte of each character width group define specific characteristics of the character. For example, flag bit 6 is the B bit, which defines that the character is a piece accent that shall not be jumped.

2.3.3 Chain Address: Word 125 (Bytes 250 and 251) contain the chain address (track and sector, respectively) of the next Character Width File sector or the first sector of the Outline Data File.

2.4 Character Digitization 2.4.1 Character Definitions: All characters are digitally encoded or "digitized" for an outline, relative vector decoding system, where all character outlines are assumed to be closely approximated by straight line elements. Such a system is disclosed in the commonly-owned U.S. patent application Ser. No. 905,451, referred to above.

All characters are defined as a multiple series of "curves". Each curve describes a vertical outline edge with the following components:

(a) An X, Y coordinate defining the highest point of the curve within an em square;

(b) A white-to-black or black-to-white bound;

(c) A series of straight line segments, defined by a series of data bytes which define the slope and length of each segment of the curve; and (d) Vector direction (downward and left-to-right or right-to-left) of the segments.

Defining the character consists of listing all the curves which outline the character. They are listed in descending order; that is, the curves that start at the top of the character are listed first and the bottom last.

2.4.2 Scale: The principal unit of measurement is the Data Resolution Unit (DRU) which is defined as 1/432 of the traditional em. An extended em square is 576×576 DRU's.

Position 0,0 is located at the intersection of the left side bearing (LSB) and the top of the extended em square as illustrated in FIG. 9. Therefore, X (left-right) values can be positive (positive is right) or negative (if a character bound extends to the left of the left side bearing (LSB), but Y (up-down) values will always be positive (positive is down).

2.4.3 Outline Data Words: Each outline will be defined by 3 or more data words: a Y word, an X word, and one or more outline (vector/control) bytes. The format of these data words is shown in FIG. 10. The various parts of the coding shown in FIG. 10 are specified below:

Y Data Word Components:

Yn—This data defines the vertical position of a start point from the upper edge of the extended em.

K—Undefined.

X Data Word Components:

Xn—This data defines the horizontal position of a start point. The left side bearing (LSB) is defined as 0.

X Sign—The sign bit defines the displacement direction of Xn with respect to the LSB.

L Bit—The L Bit defines the direction of the dx of the first vector. A one defines a left pointing vector, a zero defines right pointing.

F Bit—The F Bit or "Flare Bit" defines which vector slope will be used by the decoder in extrapolating the character outline in the region of the grid immediately above the line Yn.

E Bit—The E Bit or "Extrapolation Bit" defines whether extrapolation is or is not used above the start point grid line Yn.

B Bit—The B Bit is the "Boundary On/Off Bit" and defines whether the outline is a left-side (on) boundary or a right-side (off) boundary.

Vectors/Controls Data Byte Components:

Vectors:

dydx—For all values of dy greater than 0, this byte defines the slope of the vector outline of the character from the start point (Xn Yn), or from the last vector end point. All vectors are sequenced serially in the same sequence that they occur on the character outline.

Controls:

For all values of dy=0, this byte defines a control code. The specific control is dependent upon the value of dx (in hexadecimal notation) as indicated below:

0—End of outline.

1—Reverse the dx direction for the next vector.

2—Defines that there are no displacement vectors applicable to the start point defined by the preceding Y and X Data Words. This control is always followed by a zero byte to produce an "End of Outline" control code.

3—Defines the vector with a horizontal displacement of 0 DRU's (a vertical vector) and a vertical displacement greater than 30 DRU's. The next data byte defines the binary value of the vertical displacement. The data byte has a resultant range of vertical displacements of 0 to 255 inclusive, but it is not utilized between 0 and 30 inclusive. (Example: The two bytes 0/3, 2/6 describe a composite vector that goes vertically down 38 DRU's.)

4—Defines a vector with a horizontal displacement of 1 DRU and a vertical displacement of 30 DRU's.

5—Defines a vector with a horizontal displacement of 1 DRU and a vertical displacement of 120 DRU's.

7 through

C—Undefined

D—Defines a rectilinear outline change with a vertical displacement of 1 DRU and a horizontal displacement of up to 255 DRU's. The next data byte defines the binary value of the horizontal displacement. (Example: The two bytes o/D, 2/6 describe an outline made up of 1 DRU vertical and a 38 DRU horizontal displacement.)

E—Defines a rectilinear outline change with a vertical displacement of 1 DRU and a horizontal displacement greater than 255 DRU's. The next data byte defines the binary value of the horizontal displacement in excess of 256. (Example: The two bytes o/E, 2/6 describe an outline made up of a 1 DRU vertical and a 294 DRU horizontal displacement.)

F—Defines a shallow slope vector with a vertical displacement of 1 DRU and a horizontal displacement greater than 15 DRU's. The next data byte defines the binary value of the horizontal displacement. (Example: The two bytes O/F, 2/6 describe a composite vector that goes over 38 horizontal DRU's and down one DRU.)

Figure 11:
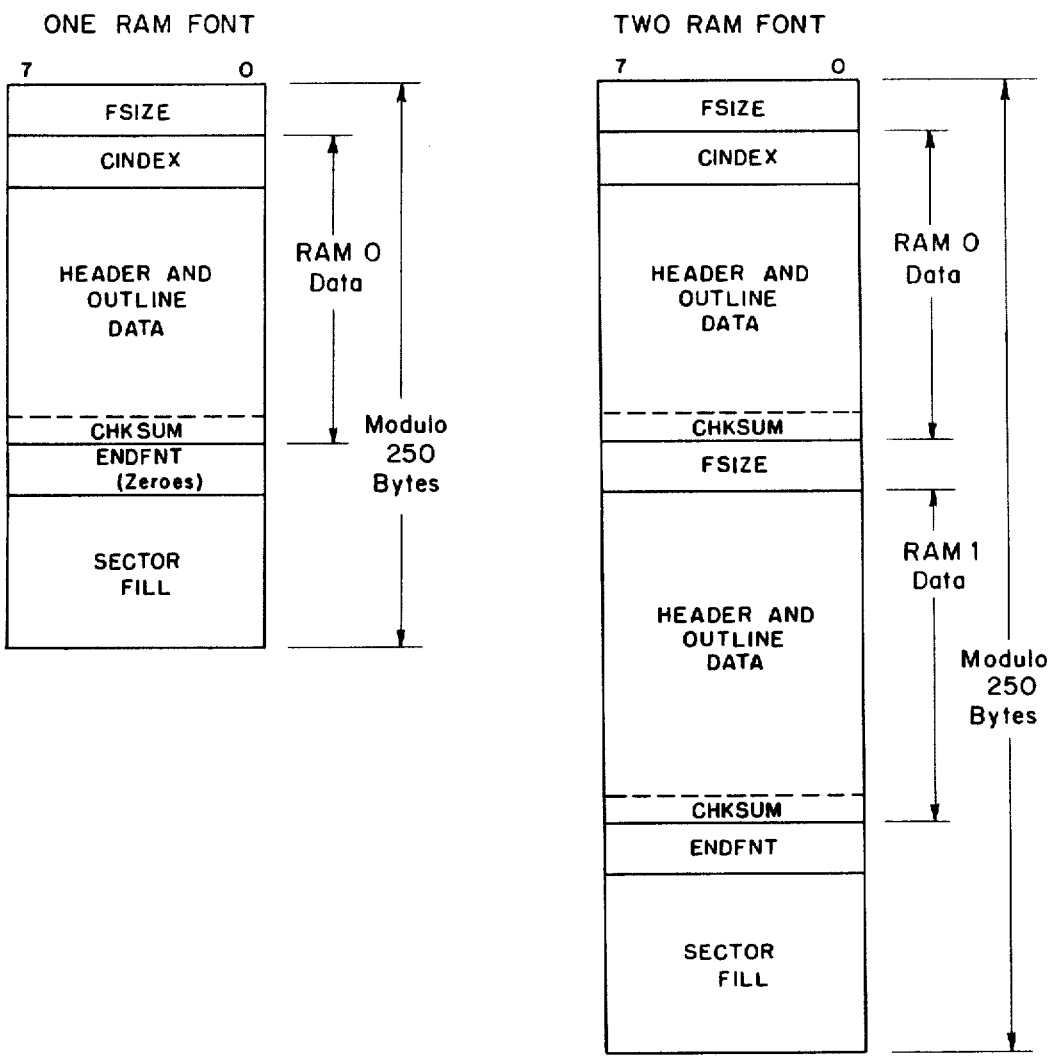
FIG. 11 is a diagram showing how the Outline Data File is arranged on a floppy disk.

2.4.4 Outline Data File Structure: The Outline Data File resides on the font floppy disk, and stores a memory image of the data that will be loaded into one or more Font RAMs. The file occupies one or more sectors on the disk, and accordingly it is modulo 125 words long. FIG. 11 illustrates the file structure.

If the total font outline data is less than 16,384 bytes, then the Outline Data File will contain:
1. FSIZE word (No. of bytes in RAM)
2a. CINDEX (Character Index)
2b. Header and Outline Data
3. ENDFNT (Zero word)
4. Sector filler Items 2a and 2b comprise the RAM memory image, and may not exceed 16,384 bytes.

If the total font outline data exceeds 16K bytes, the File will contain:
1. FSIZE word
2ab. CINDEX, Header and Outline Data (16,384 bytes max.)
3. FSIZE word (No. of Bytes in next RAM)
4. Header and Outline Data (16,384 bytes max.)
5. ENDFNT
6. Sector filler Items 3 and 4 may be repeated as required if the total font outline data exceeds 32,768 or 49,152 bytes. The data will occupy the Font RAM beginning at address "4000 and may fill through to address "7FFF (where the initial quotation mark (") indicates a hexadecimal number. Addresses in the headers will be absolute; addresses in the CINDEX will be offset absolute ("0000 through "3FFF) with the two MSB's flagging multi-RAM locations.

The specific contents of the Outline Data File are as follows:

2.4.4.1 FSIZE: This word defines in binary the number of bytes to be loaded into a Font RAM. The count does not include the FSIZE word or the ENDFNT word. The count for the first Font RAM includes the entire CINDEX and all header and outline data.

2.4.4.2 CINDEX: The character index is variable length and consists of a character count (CCOUNT) and a relative addressed index.

The CCOUNT is one byte defining in binary the number of characters in the font, and therefore it also defines the word length of the index. It will be a number between 1 and 225 inclusive. The RAM address location of CCOUNT is "4000.

The index contains a one word entry for each character in the font. Each entry is the offset absolute address of the YCOUNT byte for the character (see section 2.4.4.6 below). The two most significant bits of word indicate in binary the RAM that contains the character, where 00 is the RAM that contains the index. The 14 least significant bits contain the offset RAM address (the absolute RAM address less "4000) of the YCOUNT byte of the character.

The first entry in the index is by definition character number 1 and must correspond with the first character width group in the Character Width File. Character numbers proceed sequentially by implication (there are no expressed character numbers or library numbers at any location in the font).

2.4.4.3 ENDFNT: This word defines the end of all font data and consists of 2 bytes of zeros.

2.4.4.4 Sector Filler: Zero data is used to fill through to the end of the floppy disk sector that contains the ENDFNT word.

Figure 12:
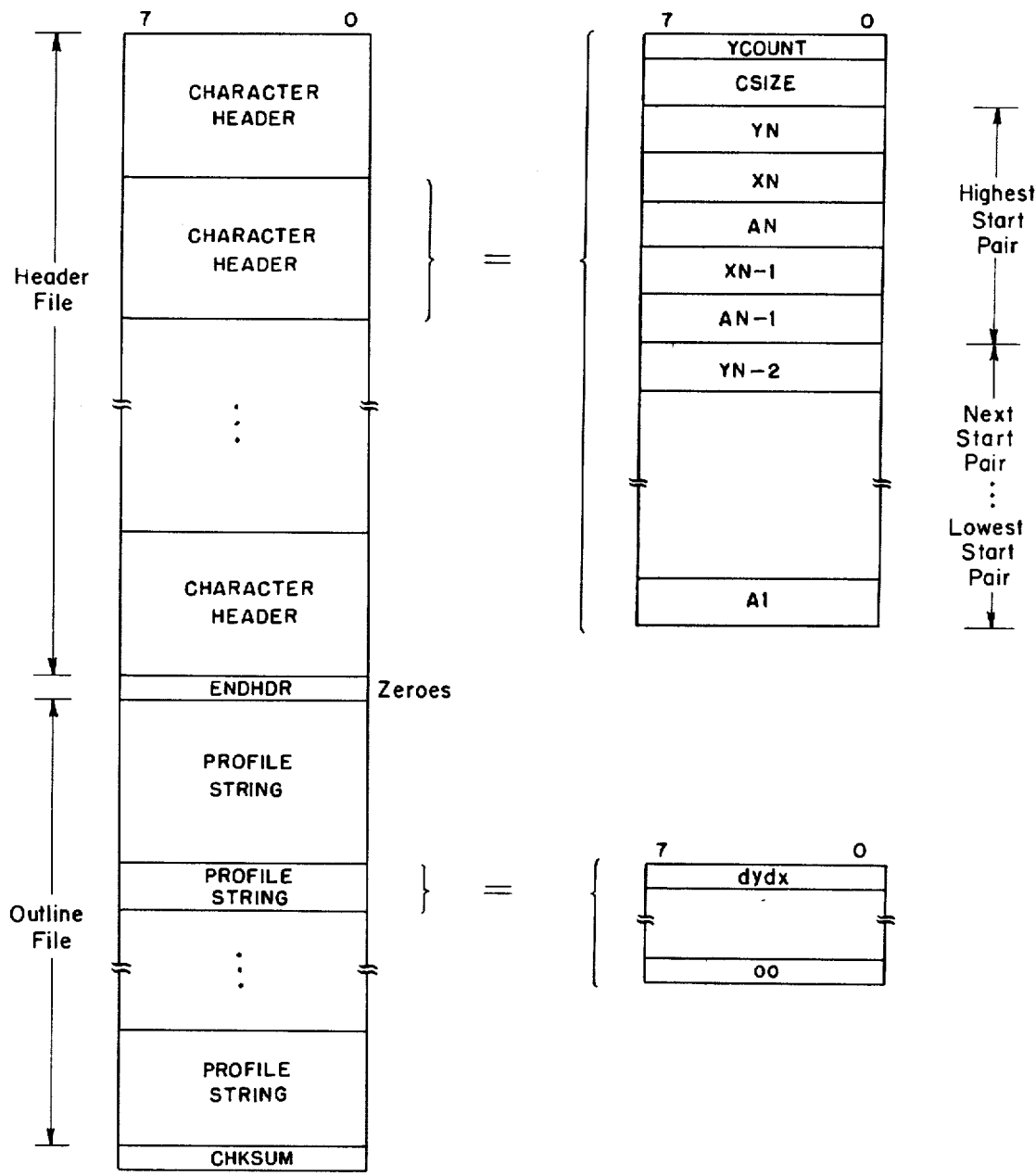
FIG. 12 is a diagram showing the structure of the header and outline data contained in the Outline Data File of FIG. 11.

2.4.4.5 Header and Outline Data: The header and outline data in each RAM contains all of the character digitization data pertaining to each of the characters located within that RAM. The X and Y start locations for characters are listed in the Header File; the vectors and control bytes that define the profiles of characters are listed in the Outline File. The two files are separated by a zero data byte (ENDHDR). FIG. 12 illustrates the file structure of the Header and Outline Data.

A checksum byte follows the Outline File and immediately precedes the ENDFNT word or the FSIZE word that separates RAMs.

2.4.4.6 Header File: The Header File consists of a series of character headers, one for each character in the font. There is no space between headers. Each character header contains (in sequence and without space) a YCOUNT byte, a CSIZE word, and one or more start-pair sets of data words (one set for each pair of starts).

YCOUNT: The YCOUNT byte defines in binary the number of YN entries in the header, which is the same as the number of start pairs. The length in each character header is ten times the YCOUNT plus 3 bytes.

CSIZE: The CSIZE word defines in binary the total amount of data space in bytes that the character fills when loaded once into the Data RAM. Accordingly, it is equal to twelve times the YCOUNT plus the length of all the profile strings addressed within the start-pair data sets.

START-PAIR DATA: YN is the Y Data Word and XN is the X Data Word as defined in 2.4.3. N must be even, since outlines always start in pairs. AN is the absolute address of the initial byte of the profile string of vectors and controls that define each outline shape. Each address will be a number between "4000" and "7FFF. Addresses may be duplicated within the header file in the event that a profile string is shared (the character outline shape is common) for more than one start point. An address may not point to a profile string located in another RAM. The YN, XN, and AN Data Words are sequenced as shown in FIG. 12 and listed without space. Each successive YN value is equal to or larger than the preceding YN value.

2.4.4.7 Outline File: The Outline File consists of a series of profile strings. Each profile string is a sequential series of two or more Vectors/Controls Data Bytes, as defined in 2.4.3. Each string defines a unique vertical character outline and begins at the header start point. A string is terminated by control 0 (end of outline), which is a zero data byte. Filler bytes may not be used within a string; they are permissible before or after any string. The digitization program(s) avoids duplication of identical profile strings, and minimizes the number of RAMS a font used by sharing profile strings for character outlines that closely approximate each other.

2.4.4.8 CHKSUM: A one byte checksum verifies each complete RAM; it is formed with all of the data in the Font-RAM except the CHKSUM byte itself. The checksum shall be formed by initializing to zero; then, for each byte, the checksum is rotated right one bit (LSB becomes MSB) and the data byte is added to form the new checksum. Overflow on the addition is ignored. The final 8 bit checksum is defined as CHKSUM and is entered after the last data byte.

2.4.5 Profile Strings: In general, the profile strings in the Outline Data File are separated from the start points (YN and XN) to permit several start points to reference (address) the same profile string. In this way, different characters within the same font having, as a part thereof, the same basic shape may be defined by the same data, thus achieving data compression.

For example, the following letters may have the identical contour on their left-hand side: "o", "c", and "e". The Outline Data File will thus contain two profile strings defining the inner and outer boundaries on the left-hand sides of these characters. The highest pair of start points in the character header for the "o", "c" and "e", respectively, may therefore address these two profile strings.

Because the dx values in the profile strings may be either positive or negative, depending upon the "L bit" in the X data word (XN), a single profile string can serve for various characters which are symmetrical. For example, portions of the character "b" may be symmetrical with the character "d" and portions of the character "p" may be symmetrical with the character "q". Such characters may be defined with the same profile strings which are directed by the "L bit" to move in opposite directions.

In general, character designers (persons who design character fonts) tend to create a few basic character shapes which are repeated throughout the font, either directly or in mirror image. Consistency dictates that a few shapes be repeated throughout the font; symmetry dictates that mirror images be used. The profile strings utilized in the digital definition of characters in the present system are a useful tool in recreating these basic character shapes. Because the encoding scheme permits the addressing of a single profile string from the start points of various characters, and permits the dx increments in a profile string to have positive or negative values, the quantity of data required to define an entire font is substantially reduced.

2.4.6 Miscellaneous: Within the definition of a single character, there is no restriction on starting two outlines (profile strings) from the same point. There is also no restriction on ending two outlines at the same point. Two outlines may touch, but they may not cross over each other if they change from "on" outlines to "off" outlines.

Broken characters are also permissible in the Outline Data File. There is no restriction on broken (divided, separated) characters.

2.5 Font RAM Format

The DMS utilizes RAM memory to contain the font data for the font(s) to be typeset on the page in order to have high-speed access to this data. The data for the font is supplied to the DMS by the Input System where it is stored on the System Floppy Disk (SFD).

A complete font is stored on one or more Font RAMs, each Font RAM storing no more than one font at a time.

The DMS can contain one to eight Font RAMS. The system will function with only one Font RAM, provided that one Font RAM size fonts are used. Multiple Font RAMs ensure against degradation in throughput speed on pages with font mixing.

Each Font RAM is 16K bytes; each Font RAM card can contain up to 64K bytes of memory: the equivalent of 4 Font RAMS. Units of less than four fonts can be accomplished by depopulating the Font RAM cards in 16K byte increments.

At system reset, the DMS determines which Font RAMs are available for loading by writing a pattern into each RAM location and reading back the results. Any mis-match is recorded as an inactive font position in a font table. After testing each of the eight locations, a message is sent to the Input System defining the number of active Font RAMs; this can be utilized to detect defective RAMs. The font table is used later to record the font numbers stored in each RAM.

In the process of developing a Data RAM, the DMS copies specific character outline data from the Font RAM into the outline file in the Data RAM. If a font change occurs, the DMS will search the table of font numbers loaded. If the font is not already loaded, the DMS will load the new font into the first empty Font RAM(s). If all Font RAMs are in use, the RAM or RAMs least recently used are overwritten with the new font needed.

The data stored in the font RAM is identical in content and structure to the Outline Data File font data on the Input System floppy disk, as defined in Section 2.4.4.

In addition to the font data stored on the Font RAM card(s), the DMS maintains two additional tables per font in the program workspace that are used to regulate data transfer from Font RAM to Data RAM: an In-Seg Table and an In-RAM Table. These are described below.

2.5.1 In-RAM Table: This 512 byte table contains the address within the Data RAM where a character header has been stored. The table is ordered in accordance with the character numbers. Each entry is two bytes. A zero entry indicates that the character data has not been loaded.

Whenever a new character is put into the Data RAM, the corresponding 2 bytes in this table are loaded with the Data RAM address. This table is cleared at the start of building each new Data RAM.

2.5.2 In-Seg Table: This 32 byte table is used to indicate which characters of the font have already been encountered within the line segment currently being developed in the Data RAM. Whenever an address is loaded into the In-RAM Table, a bit is correspondingly set in this table. This table is cleared at the start of each new set level (YSL).

In structure, each bit corresponds to a character number between 0 and 255 inclusive. The address of the bit is computed by:

$$\frac{\text{Char. Number}}{8} = Q + R \text{ (Quotient integer and Remainder integer)}$$

where Q is the byte in the table and R is the bit within the byte.

3. PAGE DATA DESCRIPTION 3.1 Page Definition: A page position is defined by X, Y coordinates in 1/10 pts. This is called a raster resolution unit (RRU). The top left hand corner is position 0,0. The maximum page size is 11"×17". That is 7954×12,292 RRU. Movement in a page can only be from top to bottom.

The raster position being solved for at any time is called the Y set level (YSL). This value initially starts at 0 and is incremented by one until it reaches the maximum page depth.

3.2. Page Variants: In addition to the normal standard page form defined by section 3.1, five full page variants have been incorporated in the ODS design. All variants are mutually exclusive.

3.2.1 High Resolution: A high resolution laser recorder can have its drum drive gear ratio altered so that each step of the stepper motor 58 drives the drum 56 by 1/20th pt., a high resolution RRU (HRRRU). Horizontal (x) resolution is not increased.

The ODS has a chip switch on the DMS (Z80A) microprocessor which is set for this laser recorder. The DMS halves the ΔYs, and the OCS increments the set level on every other raster output.

3.2.2 Proof Page: A laser recorder with proof page capability would make 2 stepper motor steps between each raster line, effectively doubling the speed of page setting with proof quality.

The command for proof page will be entered from the Input System. The DMS will set the Ys level depending upon whether the laser recorder is a normal or a high resolution unit, and the OCS will accordingly increment the set level by one or two on each raster output.

3.2.3 Page Width: The laser recorder will have either an 8½" or a 11" wide drum 56.

The ODS has a chip switch on the DMS (Z80A) microprocessor which is set for 8½" or 11". The DMS uses an appropriate page width when page complementing the XPOS value for wrong reading output.

3.2.4 Wrong Reading: Any page can be output from any type of laser recorder in right reading or wrong reading (mirror image).

Selection of wrong reading is made by a toggle switch on the DMS (Z80A) microprocessor. The DMS page complements the XPOS location of every character, and complements the X position of every outline on each character and the direction that each outline moves.

3.2.5 Reverse Video: Any page can be output white-on-black or black-on-white (reversed normal).

Selection of reverse video is made by toggle switch on the hardwired processor (HWP). The HWP inverts the polarity of the raster.

3.2.6 Line Rule: Line rule is similar to reverse video, except that an entire line (white-on-black or black-on-white) of defined length becomes a single solid color. This command permits generation of line rules on the page.

4. INPUT SYSTEM INTERFACE SPECIFICATION 4.1 General: This specification sets forth the required data and data format to be transmitted between the Input System and the Output Data Processing System. The transmissions are made through the Input System IOP-80 on a handshake basis of a byte serial transfer. Table 1 summarizes all the interface transmissions to the ODP System.

TABLE 1
SUMMARY OF INTERFACE TRANSMISSIONS

| | INPUTS TO ODP SYSTEM FROM INPUT SYSTEM |
|---|---|
| CONTROL TRANSMISSIONS 8 BIT BYTE & CTL = 1 | NEW PAGE READY RESTART REQUEST RESET REQUEST PROOF PAGE START PROG STORE PROG STORE FAULT |
| DATA TRANSMISSIONS 16 BITS (TWO BYTES) & CTL = 0 | PROGRAM DATA PAGE DATA FONT DATA |

4.1.1 Page Data: The Output Data Processing System is a page output machine, principally because the laser recorder must expend the time required to expose a full raster even if it only had data for part of a raster. Therefore the throughput of the machine is enhanced significantly by supplying the laser recorder with all of the graphic data needed in each full raster prior to exposing the raster. This requires storing and regrouping random sequence input data into a top down sequence. Due to memory size limitations in the Output Data Processing System, the data must be further packeted into groups defined as "line segments", which is the standard unit of page data to be transmitted by the Input System. Section 4.2 will detail the page data requirements.

4.1.2 Font Data: The Input System stores digital outline fonts on floppy disks in the manner described above. The outline data is required in the solution of the raster on-off points, and this data is transmitted by the Input System on a whole font basis (excluding width data, BLJ dat, etc.). Section 4.3 will detail the font data requirements.

4.1.3 Other Data: In addition to the above job related data, periodic data transfers may be made by the Input System, if desired. These include programs, error messages, restart and program reset. The power-on reset signal may also originate in the Input System.

4.1.4 Notation: Meta-Language notation will be used to describe the syntax of the data requirements. The following notation will be used:

4.1.4.1 " " Terminal—a fixed bit length symbol element (e.g.: all page data elements are 16 bit words).

4.1.4.2 ( ) Non-Terminal—A higher order language element which is composed of one or more terminals and/or one or more non-terminals.

4.1.4.3 { } Optional Repeats—The braces indicate that the enclosed non-terminal(s) may be not used or used as often as desired.

4.1.4.4 / Either-Or—A slash indicates that the non-terminals on either side of the slash are possible alternative elements.

4.1.4.5 * Once only—An asterisk is used to indicate that the non-terminal may not be used more than once within the complex non-terminal being defined.

4.2. Page Data:

4.2.1 Page Data Structure: As outlined in section 4.1.1 above, coded data which describes a page must be packeted into groups defined as "line segments":

(PAGE)={(LINE SEG)} "END PAGE"

Each page can consist of one or more line segments followed by an end page code. A blank page has no line segments. The end page code is a terminating code, and no data relating to the page can be accepted after the code. All functional data received prior to the end page code is not carried over into the next page, and must be repeated as needed.

Each line segment defines a character set, a reverse video set, and/or a line rule set:

(LINE SEG)=(SEG#)*(YPOS)*{(CHAR SET)/(RVSET)/(LR SET)}"END SEG"

The first element in each line segment is the segment number. Separate line segments with unique segment numbers must be defined for each character set with a unique YPOS and point size combination. Separate line segments should preferably be defined for each reverse video or line rule set, and also preferably for a set that is not contained within the Y limits of the extended em square of a character set. All reverse video or line rule sets within a single line segment must have the same YPOS value.

The segment number is followed by YPOS, which nominally is the Y coordinate on the page of the top of the extended em square of the characters in the line segment and/or the upper coordinate of the reverse video or line rule set(s) in the line segment. All the line segments on the page must be sequenced in the order of the YPOS coordinate; there is no sequence requirement between line segments with the same YPOS coordinate.

The line segment can contain one or more character sets, and/or one or more reverse video and/or line rule sets.

The end segment code is a terminating code, and no data relating to the segment can be accepted after the code. All functional data received prior to the end segment code is not carried over to the next segment, and must be repeated as needed.

4.2.1.1 Character Sets: All character sets within a line segment must follow the structure:

(CHAR SET)=(INITIAL CHAR) {(CHAR PAIR)} with one initial character followed by one or more character pairs. The initial character must follow the structure:

(INITIAL CHAR)=(PT SIZE)*(FONT)(XPOS)(CHAR PAIR)

The initial character in a line segment must contain a size, a font number, the x coordinate of the character's left side bearing (XPOS), and the character pair data which is structured:

(CHAR PAIR)={(FUNCTION)}"CHAR"

and where permissible functions are:

(FUNCTION)=(XLOS)/(FONT)/(SET WIDTH)/(SLANT)/(BLJ)/(YLOW)

The character code is partially a terminating code, that is, although no functions relating to a particular character can be accepted after the code, all functional data received prior to the code is carried over and remains valid until altered by a new function code or a line segment terminating code (END SEG).

All latest function codes are valid in this manner until altered except YLOW, which can only be altered by the issuance of a numerically higher valued YLOW.

Within a character set, an initial character must precede any follow-on character pairs. All other functional codes may be sequenced randomly, subject only to the restrictions described above.

4.2.1.2 Reverse Video Sets: All reverse video sets within a line segment must follow the structure:

(RV SET)=(XPOS) (RV CODE) (YEND) (XEND)

The elements of the reverse video set must be sequenced in the above order with no intervening elements.

4.2.1.3 Line Rule Sets: All line rule sets within a line segment must follow the structure:

(LR SET)=(XPOS) (LR CODE) (YEND) (XEND)

The elements of the line rule set must be sequenced in the above order with no intervening elements.

Table 2 summarizes the syntax of the page data structure:

TABLE 2

| PAGE DATA SYNTAX | |
|---|---|
| (PAGE) | = {(LINE SEQ)} "END PAGE" |
| (LINE SEG) | = (SEG#)* (YPOS)* {(CHAR SET)/(RV SET)/(LR SET)} "END SEG" |
| (CHAR SET) | = (INITIAL CHAR) {(CHAR PAIR)} |
| (INITIAL CHAR) | = (PT SIZE)* (FONT) (XPOS) (CHAR PAIR) |
| (CHAR PAIR) | = {(FUNCTION)} "CHAR" |
| (FUNCTION) | = (XPOS)/(FONT)/(SET WIDTH)/(SLANT)/(BLJ)/(YLOW) |
| (RV SET) | = (XPOS) (RV CODE) (YEND) (XEND) |
| (LR SET) | = (XPOS) (LR CODE) (YEND) (XEND) |

4.2.2 Input Codes/Terminal Elements: Table 3 summarizes the input code structure for those terminal elements which are to be sent from the Input System to the Output Data Processing System, with references to the following descriptions of the terminal elements used in the syntax in section 4.2.1.

4.2.2.1 (SEG#)="SEG#"

This is a 13 bit number (the LSB's of the 16 bit field, the 3 MSB's shall be 0's) unique to each line sement in the page. It is the number used to identify each line segment, and will be used by the Output Data Processing System when it needs to call for a specific line segment. It must be the first code of every line segment, and may not be issued more than once in any line segment.

Segment numbers may be any number between 1 and 8191 inclusive (not zero), and it is not required that the segment numbers be sequenced with increasing YPOS values.

4.2.2.2 (YPOS)—"YPOS"

This is the Y coordinate on the page in RRU's of the top of the extended em square of the characters in the line segment and/or the upper coordinate of the reverse video set in the line segment. The top of the page (which is nominally below the top of the sheet of paper) is defined as 0 RRU's. Up to 14 bits are available to describe YPOS values between 0 and 12,292 RRU's (17 inches).

The LSB of the YPOS corresponds with the LSB of the input word. This code nominally follows the segment number, and is only issued once within a line segment.

4.2.2.3 (XPOS)="XPOS"

This is the X coordinate on the page in RRU's of the left side bearing of the character or of the reverse video coordinate that pairs with the YPOS RV coordinate.

The left hand edge of the sheet of paper and the page is defined as 0. Normal margin offsets are controlled by Input System programs. Up to 14 bits are available to describe XPOS values between 0 and 7 and 7,954 RRU's (11 inches). The LSB of XPOS corresponds with the LSB of the input word.

TABLE 3

16 BIT INPUT CODE FORMAT

| 15 | 14 | 13 | 12 | 11 | 10 | 9 | 8 | 7 | 6 | 5 | 4 | 3 | 2 | 1 | | |
|---|---|---|---|---|---|---|---|---|---|---|---|---|---|---|---|---|
| SEG# | | | | | | | | | | | | | | | | (Ref: 4.2.2.1) |
| 0 | 0 | YLOW data in RRU's | | | | | | | | | | | | | | (Ref: 4.2.2.4) |
| 0 | 1 | YPOS data in RRU's | | | | | | | | | | | | | | (Ref: 4.2.2.2) |
| 1 | 0 | XPOS data in RRU's | | | | | | | | | | | | | | (Ref: 4.2.2.3) |
| 1 | 1 | 0 | 0 | 0 | 0 | | | | CHAR number | | | | | | | (Ref: 4.2.2.6) |
| 1 | 1 | 0 | 0 | 0 | 1 | | | | FONT number | | | | | | | (Ref: 4.2.2.5) |
| 1 | 1 | 0 | 0 | 1 | 0 | | | | PT SIZE in ½ pts | | | | | | | (Ref: 4.2.2.7) |
| 1 | 1 | 0 | 0 | 1 | 1 | | | | SETWIDTH in ±¼ pts | | | | | | | (Ref: 4.2.2.8) |
| 1 | 1 | 0 | 1 | 0 | 0 | | | | LR CODE | | | | | | | (Ref: 4.2.2.9) |
| 1 | 1 | 0 | 1 | 0 | 1 | | | | SLANT | | | | | | | (Ref: 4.2.2.10) |
| 1 | 1 | 0 | 1 | 1 | 0 | | | | RV CODE | | | | | | | (Ref: 4.2.2.11) |
| 1 | 1 | 0 | 1 | 1 | 1 | | | | END SEG | | | | | | | (Ref: 4.2.2.13) |
| 1 | 1 | 1 | 0 | 0 | 0 | | | | END PAGE | | | | | | | (Ref: 4.2.2.14) |

4.2.2.4 (YLOW)="YLOW"

This is the Y coordinate on the page in RRU's of the bottom of the extended em square of the characters in the line segment. It is not necessary that this value be supplied for line segments with average characters; i.e., characters that fall within the extended em square. It must be supplied for logo's that do extend lower than the extended em.

The Input System derives the value from the font data and the point size that the logo is being set at. If this code is issued more than once, the highest value (lowest point on page) is retained by the Output Data Processing System. Scaling, zero placement, and data placement are identical to YPOS.

4.2.2.5 (FONT)="FONT"

This terminal code defines the font number to be used for all characters following until a new font is input. Up to 10 bits are available to input font numbers between 1 to 254 inclusive. The font number LSB corresponds to the word LSB.

4.2.2.6 (CHAR)="CHAR"

This terminal code defines the character number to be output and is a semi-terminating code (see the description in section 4.2.1.1). Up to 10 bits are available to input character numbers between 0 and 255 inclusive. The character number LSB corresponds to the work LSB.

4.2.2.7 (PT SIZE)="PT SIZE"

This terminal code defines the point size to be used for all characters in the line segment. It may only be issued once within a line segment. Up to 10 bits are available to input all half point sizes between ½ and 130 inclusive. The word LSB corresponds to ½ point, and bits 1 thru 8 define the binary value of the point size directly.

4.2.2.8 (SET WIDTH)="SET WIDTH"

This terminal code defines the set width to be used for all characters following until a new set width is input. If this code is not issued, the set width has a default value equal to the point size of the line segment being set. The set width command(s) must follow the point size commands.

4.2.2.9 (LR CODE)="LR CODE"

This terminal code defines that the immediately following 2 words represent the YEND and XEND respectively in a line rule set in which YPOS and XPOS preceding are the beginning coordinates. The 10 LSB's of the input code are zero.

4.2.2.10 (SLANT)="SLANT"

This terminal code defines the slant amount to be used for all characters following in the line segment until a new slant is input. Up to 10 bits are available to define 5 possible slant conditions; value 0 corresponds to SLANT OFF, value 1 to SLANT+7, value 2 to SLANT+14, value 3 to SLANT−7, and value 4 to SLANT−14.

4.2.2.11 (RV CODE)="RV CODE"

This terminal code defines that the immediately following 2 words represent the YEND and XEND respectively in a reverse video set in which YPOS and XPOS preceding are the beginning coordinates. The 10 LSB's of the input code are zero.

4.2.2.12 (YEND)="YEND" (XEND)="XEND"

These terminal codes define the bottom coordinates on the page of a reverse video set in the same scale as YPOS and XPOS. The two MSB are set to zero. If the YEND input has a value higher than the current YLOW, this value is used to redefine YLOW.

4.2.2.13 "END SEG"

This terminal code defines the end of a line segment, and sets all variable functions contained within that segment to the default value. The 10 LSB's are all zero.

4.2.2.14 "END PAGE"

This terminal code defines the end of a page, and sets all variable functions to the default value. The 10 LSB's are all zero.

This code must be preceded by a line segment which contains a YLOW value equal to the depth of the page. This may be done by either:

(1) Defining a YLOW equal to the page depth within the last line segment of the page; or
(2) Defining an additional line segment with the content: (SEG#) (YPOS) (YLOW) "END SEG",
   where YPOS and YLOW equal the page depth, or with the content: (SEG#) (YPOS) "END SEG", where YPOS equals the page depth.

4.3 FONT DATA 4.3.1 Font Data Structure: Coded data which describes the outlines of characters in a font will be transmitted from the Input System to the Output Data Processing System on a whole font basis:

(FONT)={(CHAR OUTLINE DATA)} "END FONT"

Each font consists of one set of character outline data for each character contained in the font. Up to 256 characters may be contained in the font, provided that the total contained in one font is less than 15,328 bytes by twice the total number of outlines in the font. The end font code is a terminating code, and no data relating to the font can be accepted after this code.

Each character's outline data is:

(CHAR OUTLINE DATA)=(CHAR) (#OUTLINES) {(OUTLINE)}.

where the outline non-terminal is used once for each outline defined by the #OUTLINES terminal.

The character number is identical to the CHAR terminal described in section 4.2.2.6 and is a number between 0 and 255 inclusive. The number of outlines per character is limited to 255.

Each outline consists of start coordinates, vectors and controls as required to describe one edge of the character:

(OUTLINE)=(YN) (XN) {(VECTORS)/(CONTROLS)}.

where the permissible controls are:

(CONTROLS)=(END OUTLINE)/(CHANGE DIRECTION) (NO VECTORS)/(LONG VERTICAL)/(SHALLOW HORIZONTAL)

Section 2.4.3 describes in specific detail the outline data structure syntactically covered in the two statements above. Reference should be made to this section; it is this data that should be transferred exactly from the floppy disk storage medium to the Ouptut Data Processing System by the Input System for these two statements.

Table 4 summarizes the syntax of the font data structure:

TABLE 4

| FONT DATA SYNTAX | |
|---|---|
| (FONT) | = {(CHAR OUTLINE DATA)} "END FONT" |
| (CHAR OUTLINE DATA) | = (CHAR) (#OUTLINES) {(OUTLINE)} |
| (OUTLINE | = (YN) (XN) {(VECTORS)/(CONTROLS)} |
| (CONTROLS) | = (END OUTLINE)/(CHANGE DIR)/ (NO VECTORS)/(LONG VERTICAL)/ (SHALLOW HORTIZONTAL) |

Figure 13:
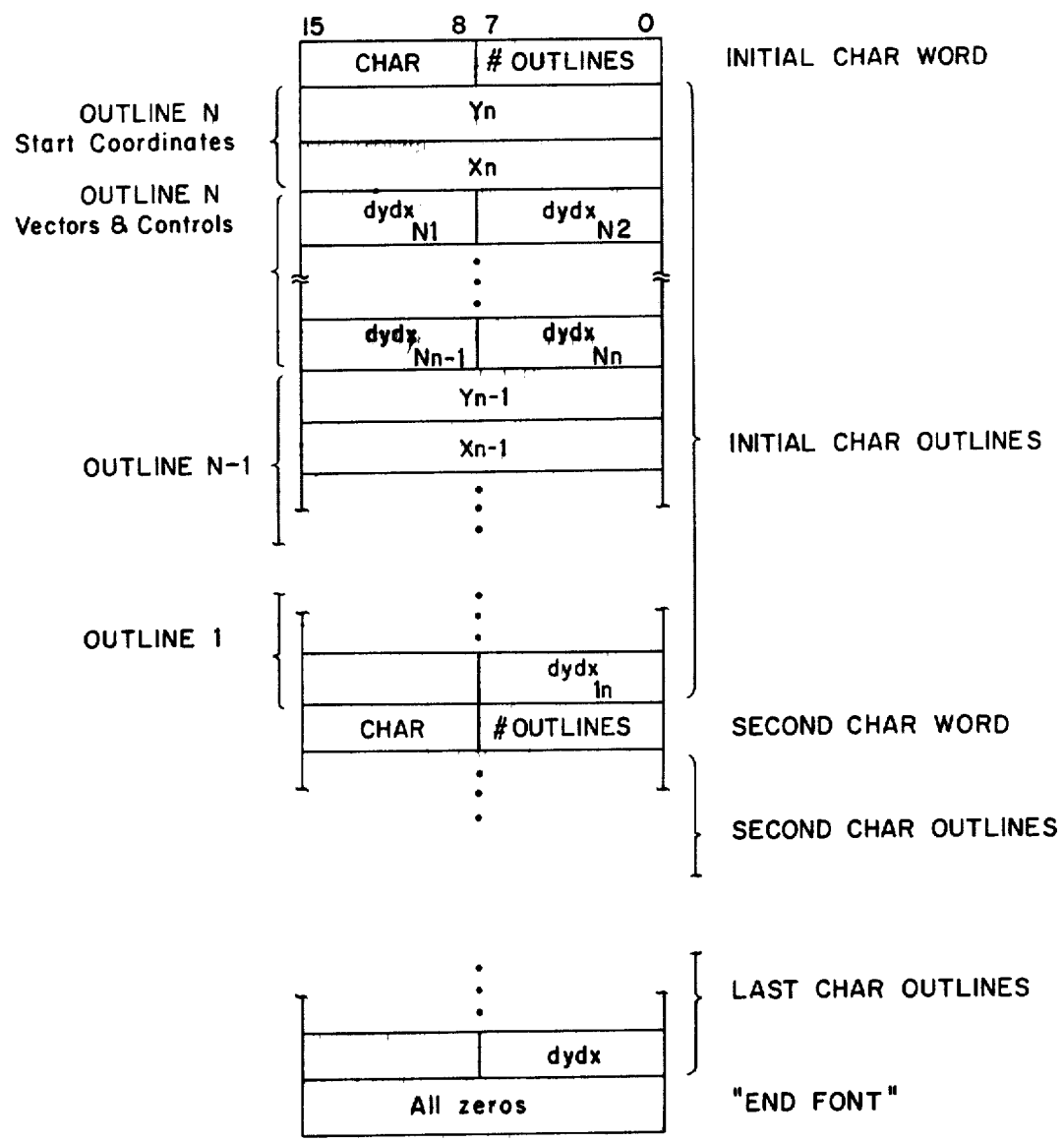
FIG. 13 is a diagram showing the input code structure for those terminal elements which are to be sent from the Input System for a font data transfer.

4.3.2 Input Codes/Terminal Elements: FIG. 13 summarizes the input code structure for those terminal elements which are to be sent from the Input System for a font data transfer.

4.3.2.1 (CHAR)="CHAR"

This terminal code defines the character number assigned by the Input System. Up to 8 bits are available to describe character numbers between 0 and 255 inclusive. Bit 15 corresponds to the MSB and bit 8 is the LSB.

4.3.2.2 (#OUTLINES)="#OUTLINES"

This terminal code defines the number of outlines in this character and originates on the font floppy disk. Up to 8 bits are available to describe between 1 and 255 outlines.

4.3.2.3 "END FONT"

This terminal code is the font transfer terminating code. All 16 bits in the word are zeros.

5. DATA RAM 5.1 General: The data RAM serves as an output buffer for the DMS, and an input buffer for the OCS. As line segment data is input to the DMS, it is reformatted and stored into the data RAM. Two such data RAMs are used within the system, each one is 32 K bytes long. Both data RAMs are accessible by the DMS and the OCS with the following limitations:

(1) A processor may select and operate on only one data RAM at a time.

(2) A processor may not select a data RAM which is selected by the alternate processor.

(3) Once a processor deselects a data RAM (or releases control of it), any data within that RAM is no longer valid to that processor.

5.2 Data Ram Building: The data RAMs are developed by the DMS and passed onto the OCS for processing. Double buffering is used in building up the data and therefore two such RAMS exist. This permits the DMS to develop the next buffer of data while the OCS is processing the other. The basic design is shown in FIG. 14. In developing this data RAM, and DMS attempts to fill it with as much data as possible. By so doing, it should provide the OCS with enough data to word with to avoid the possibility to phototype setting unit (PTU) slow down.

Figure 15:
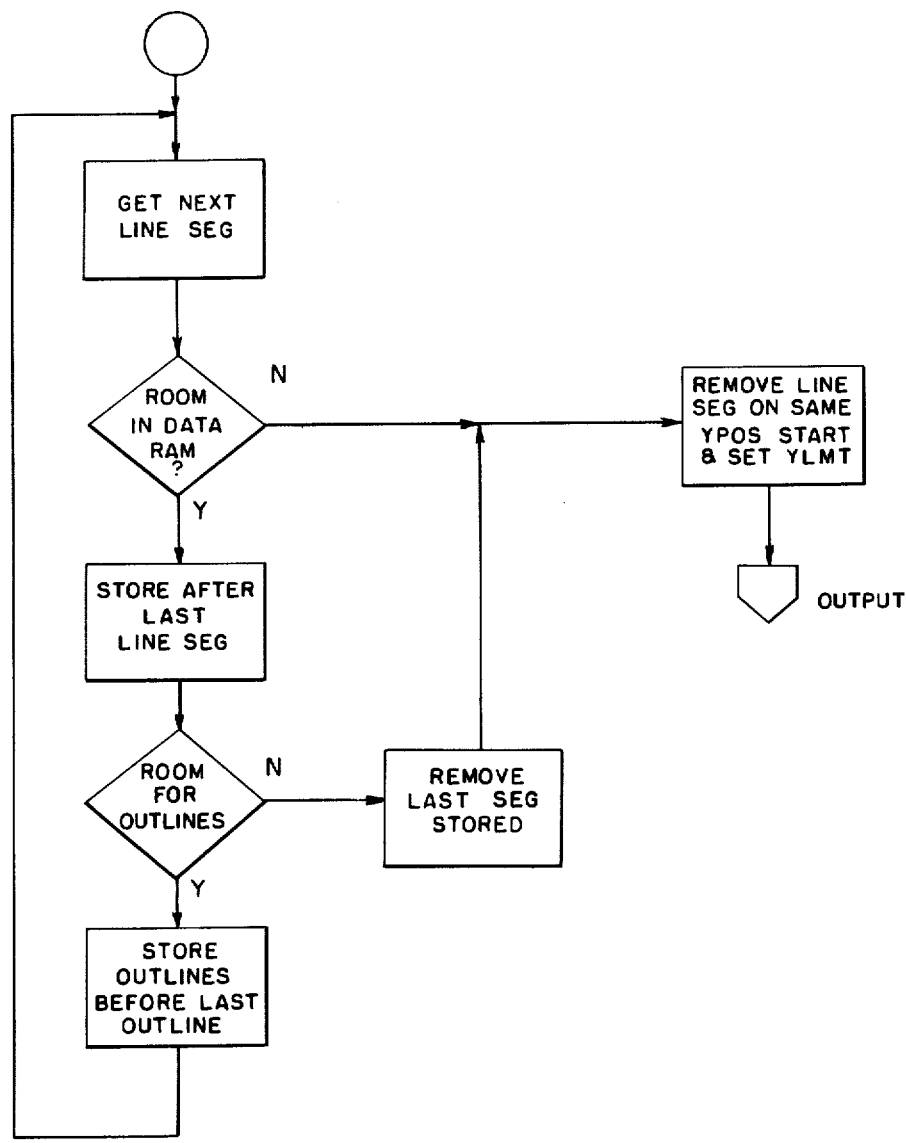
FIG. 15 is a flow diagram for the building of data in the Data RAM in the Data Management Subsystem.

The buffer space is optimized by sharing outline data that has been put into the buffer for other line segments. In order to achieve this, the DMS develops the RAM from two directions. Line segment data, as it is read in and reformatted, is put at the low end of memory, and related character outline data is put at the high end. When these two data sets interfere with each other, the data is backed up to the last complete line segment and the output limit is defined. This process is shown in FIG. 15.

Figure 16:
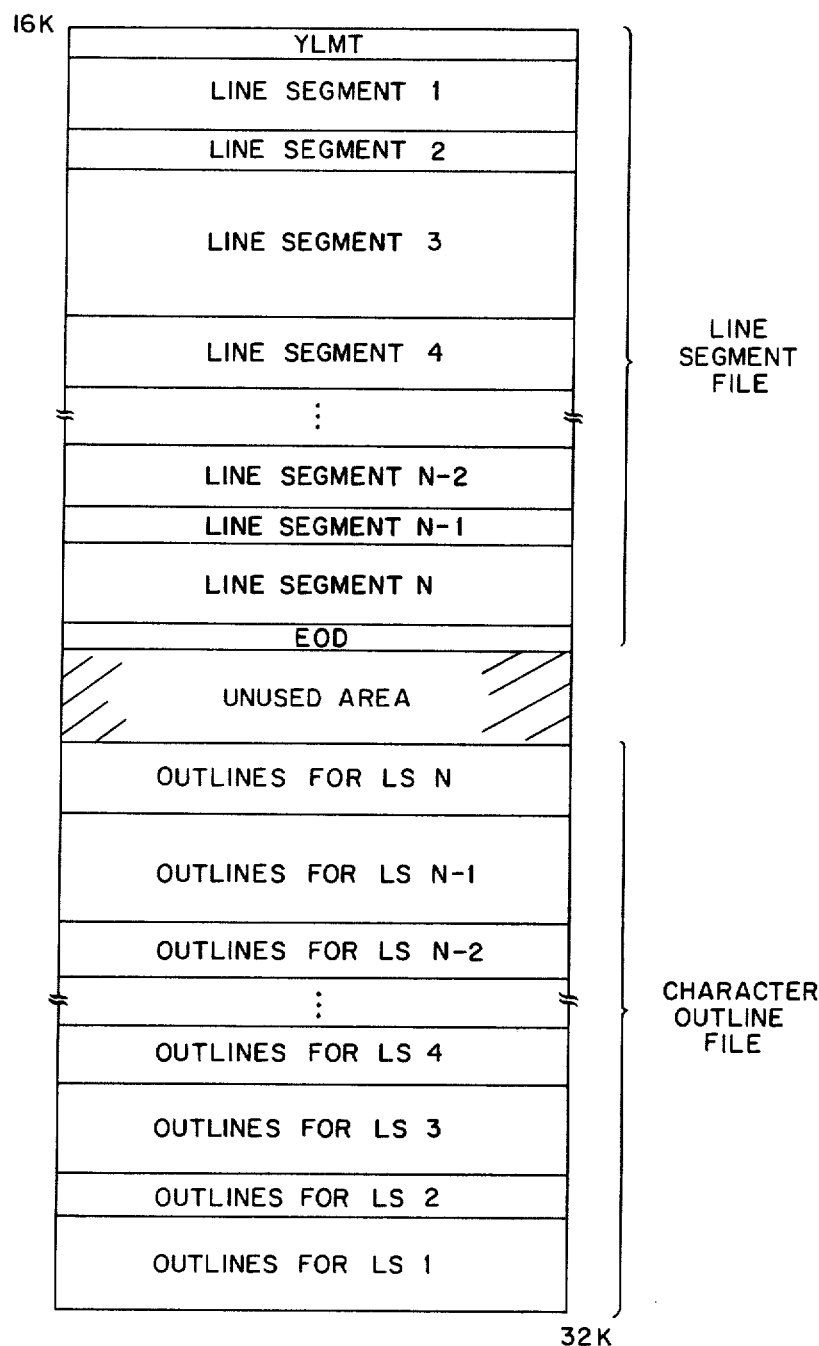
FIG. 16 is a diagram of the layout of data in the Data RAM.
Figure 17:
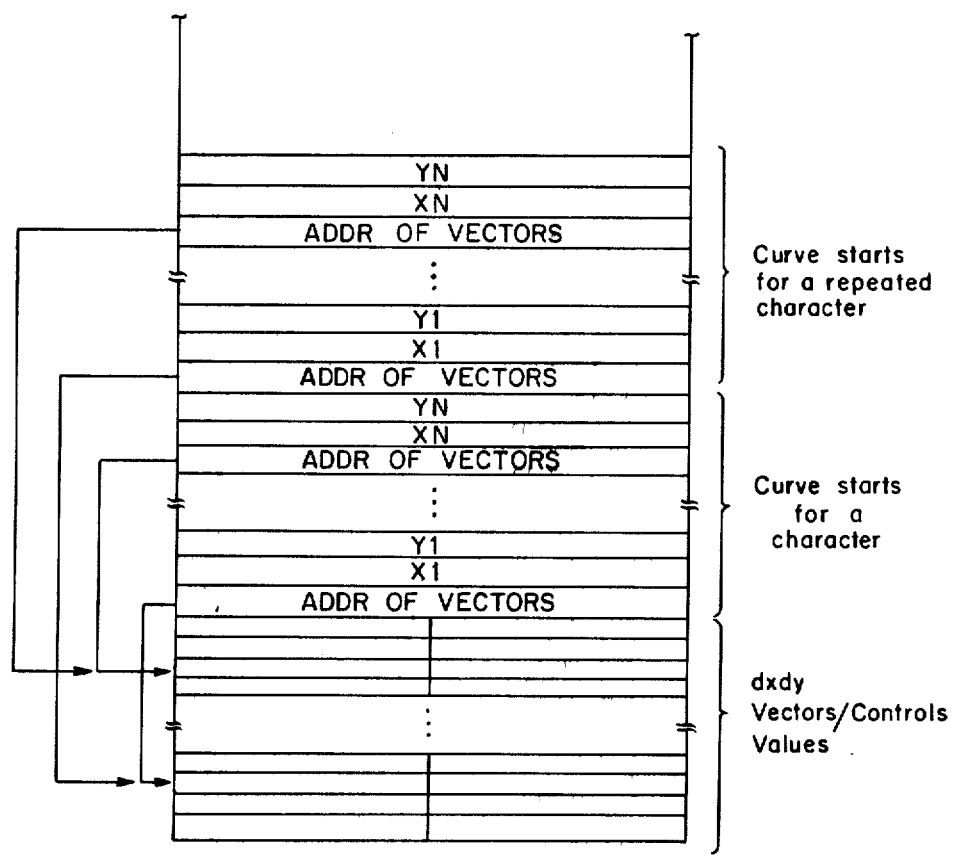
FIG. 17 is a diagram showing the structure of the outline data in the Data RAM.

5.3 Data RAM Format: The data RAM layout is illustrated in FIG. 16. The Character Outline section of the data RAM is shown in FIG. 17. In defining the format of the data RAM, the Meta-Language notation, as outlined in section 4.1.4, will be used. The Page, Line Segment File and Outline File structure are indicated in Tables 5, 6 and 7, respectively.

5.3.1 Page Structure: The OCS defines a page as one or more data RAMS:

[PAGE]=[INITIAL DATA RAM]{[DATA RAM]}

All pages must begin with a initial data RAM whose format is:

[INITIAL DATA RAM]=[YLMT] [NEW PAGE] [PAGE SECTION]

All subsequent data RAMS for the same page have the format:

[DATA RAM]=[YLMT] [PAGE SECTION]

The difference between the two being the new page element which is itself a terminal element:

[NEW PAGE]="new page"

All data RAMS must have as its first code, the output limit value:

[YLMT]="Y limit"

The data file can be divided into a separate files, the line segment file and the character outline file:

[PAGE SECTION]=[LINE SEG FILE] [OUTlINE FILE]

5.3.2 Line Segment File: The Line Segment File consists of all the line segments input and reformatted by the DMS. This has the form of:

[LINE SEG FILE]={[LINE SEG]}[END RAM]

As many line segments as there is room for may be put into this file. The last line "segment" must be followed by the end RAM code:

[END RAM]=[END DATA]/[END PAGE]

If more data exists for the page, the end data element is used. If this is the last RAM for the page, the end page element is used.

The line segment may be defined as follows:

[LINE SEG]=[START SEG]{[CHAR SET]/[REV SET]}

The structure is very similar to the input format, however, the code structure does vary.

All line segments must start with a start segment element. This is defined as:

[START SET]=[Y SET]/[SEG LINK PAIR]/[YACC PAIR]

YSET can be defined as:

[YSET]=[YPOS] [ZERO DATA WORD]

and is always inserted at the start of every line segment by the DMS. This defines the Y coordinate of the page where the line segment is to be processed. The ZERO DATA WORD serves as a two byte pad for use when the line segment becomes active (i.e. processing of outlines begin) or deleted.

Once processing of a line segment starts, YSET is replaced by the YACC PAIR, where:

[YACC PAIR]=[YACC HIGH] [YACC LOW]

The YACC PAIR is the next set level in DRU's for the line segment. After the OCS has completely processed a line segment, it replaced it with the link pair.

[SEG LINK PAIR]=[LINK HIGH] [LINK LOW]

This link pair is two elements which combined provide an absolute of the next line segment.

5.3.2.1 Character Set: All character sets within a line segment must follow the structure:

[CHAR SET]=[INITIAL CHAR]{[CHAR PAIR]} with one initial character followed by one or more character pairs. The initial character must follow the structure:

[INITIAL CHAR]=[ΔYS PAIR] [SCALE PAIR] [XPOS] [CHAR PAIR]

The ΔYS pair defines the change in DRU's per raster resolution unit. It is dependent on the point size.
[ΔYS PAIR]=[ΔYS HIGH] [ΔYS LOW]

The scale pair defines the number of raster resolution units for each DRU. It is dependent on the set width.

[SCALE PAIR]=[SCALE HIGH] [SCALE LOW]

A character pair is defined as:

[CHAR PAIR]={[FUNCTION]}[OUTLINE ADD]

and where permissible functions are:

[FUNCTION]=[XPOS]/[SCALE PAIR]/[SLANT OFF]/[SLANT+7]/[SLANT−7]/[-SLANT+14]/[SLANT−14]/[BLJ]/[NULL]

All functions received prior to the outline address are carried over and remain valid until altered by a new function code or a new line segment.

5.3.2.2 Reverse Video Set: The reverse video structure is:

[RV SET]=[XPOS] [RVY PAIR] [RVX PAIR]

and:

[RVY PAIR]=[RVY HIGH] [RVY LOW]

[RVX PAIR]=[RVX HIGH] [RVX LOW]

5.3.3 Outline File: The Outline File has the basic structure:

[OUTLINE FILE]={[CURVE UPDATE FILE]/[CHAR OUTLINE]}

The character outline file is the font RAM data for the particular character reformatted by the DMS into the following format:

[CHAR OUTLINE]=[CURVE UPDATE FILE] [SLOPE FILE]

The curve update file is the start for every curve in the character

[CURVE UPDATE FILE]={[OUTLINE STARTS]}

[OUTLINE STARTS]=[YN] [XN] [SLOPE ADD]

The signs in XN word in the outline file have been complemented by the DMS if wrong reading is in effect.

As the OCS processes outlines, the OUTLINE STARTS data are updated to reflect the current processing point within each outline.

The slope file is:

[SLOPE FILE]={[VECTORS]/[CONTROLS]}

The controls are defined in sections 4.3.1 and 2.4.3.

TABLE 5

| PAGE STRUCTURE | |
|---|---|
| [PAGE] | = [INITIAL DATA RAM] {[DATA RAM]} |
| [INITIAL DATA RAM] | = [YLMT] [NEW PAGE] [PAGE SECTION] |
| [DATA RAM] | = [YLMT] [PAGE SECTION] |
| [PAGE SECTION] | = [LINE SEG FILE] [OUTLINE FILE] |
| [LINE SEG FILE] | = {[LINE SEG] [END RAM]} |
| [END RAM] | = [END DATA]/ [END PAGE] |

TABLE 6

| LINE SEGMENT FILE STRUCTURE | |
|---|---|
| [LINE SEG] | = [SEG START] {[CHAR SET]/[RV SET]} |
| [SEG START] | = [YSET PAIR]/ [LINK PAIR]/ [YACC PAIR] |
| [YSET PAIR] | = [YPOS] [ZERO DATA WORD] |
| [LINK PAIR] | = [LINK HIGH] [LINK LOW] |
| [YACC PAIR] | = [YACC HIGH] [YACC LOW] |
| [CHAR SET] | = [INITIAL CHAR] {[CHAR PAIR]} |

TABLE 6-continued
LINE SEGMENT FILE STRUCTURE

| | |
|---|---|
| [INITIAL CHAR] | = [ΔYS PAIR] [SCALE PAIR] [XPOS] [CHAR PAIR] |
| [ΔYS PAIR] | = [ΔYS HIGH] [ΔYS LOW] |
| [SCALE PAIR] | = [SCALE HIGH] [SCALE LOW] |
| [CHAR PAIR] | = {[FUNCTION]} [OUTLINE ADDRESS] |
| [FUNCTION] | = [XPOS]/[SCALE PAIR]/[SLANT OFF]/[SLANT +7]/ [SLANT −7]/[SLANT +14]/[SLANT −14]/[BLJ]/[NULL] |
| [RV SET] | = [XPOS] [RVY PAIR] [RVX PAIR] |
| [RVY PAIR] | = [RVY HIGH] [RVY LOW] |
| [RVX PAIR] | = [RVX HIGH] [RVX LOW] |

TABLE 7
OUTLINE FILE STRUCTURE

| | |
|---|---|
| [OUTLINE FILE] | = {[CURVE UPDATE FILE]/ [CHAR OUTLINE]} |
| [CHAR OUTLINE] | = [CURVE UPDATE FILE] [SLOPE FILE] |
| [CURVE UPDATE FILE] | = {[OUTLINE STARTS]} |
| [OUTLINE STARTS] | = [YN] [XN] [SLOPE ADD] |
| [SLOPE FILE] | = {[VECTORS]/[CONTROLS]} |

5.4 Terminal Elements: Table 8 summarizes all the coded entries in the data RAM entries. The uncoded elements, YLMT, YSACC, and outline elements, within a data RAM are not in the table: they are 16 bit binary values whose position defines the code type. The uncoded data RAM outline elements are as defined in section 2.4.3; the previously defined syntax must be followed.

5.4.1 [OUTLINE ADDRESS]="outline address"

This is a 14 bit number which specifies the address in the outline file of the character outline to process. The address always points to the first curve of the outline in the update file. This is a word address and must therefore be doubled to get the byte address within the 32 K RAM. [Since all data in the data RAM is 16 bit codes, codes will always start on an even byte address).

5.4.2 [YPOS]="YPOS"

This is the same code an entered into the DMS. See section 4.2.2.2 for format and definition. In OCS, it shows an additional function. It not only marks the start of a new line segment, but also terminates the previous line segment.

5.4.2.1 [ZERO DATA WORD]="ZERO DATA WORD"

This uncoded 16 bit field always follows YPOS. It serves as a pad for use when a line segment becomes active.

5.4.3 [YACC HIGH]="YACC HIGH"

This code defines the most significant 8 bits of the set level in DRU's. It contains the 8 most significant integer bits of the value.

5.4.3.1 [YACC LOW]="YACC LOW"

This is a 16 bit field which always follows YACC HIGH. It contains the remaining 2 integer bits and the 11 decimal bits of the set level; the 3 least significant bits are always 0.

5.4.4 [XPOS]="XPOS"

This is the same code as entered into the DMS. (See section 4.2.2.3 for format and definition), except when the wrong reading switch is set, when the page width complement of XPOS (PG WDTH-XPOS) is entered.

5.4.5 [NULL]="NULL"

The null code is used to delete elements within a line segment. The DMS inserts this code to remove font calls within a segment as they are acted on. The OCS inserts this code to remove "outline address" as they are completed.

TABLE 8

| 15 | 14 | 13 | 12 | 11 | 10 | 9 | 8 | 7 | 6 | 5 | 4 | 3 | 2 | 1 | | |
|---|---|---|---|---|---|---|---|---|---|---|---|---|---|---|---|---|
| 0 | 0 | Character Outline Address | | | | | | | | | Section 5.4.1 | | | | | |
| 0 | 1 | YPOS data in RRU's | | | | | | | | | Section 5.4.2 | | | | | |
| 1 | 0 | XPOS data in RRU's | | | | | | | | | Section 5.4.4 | | | | | |
| 1 | 1 | 0 | 0 | 0 | 0 | 0 | 0 | Null | | | Section 5.4.5 | | | | | |
| 1 | 1 | 0 | 0 | 0 | 0 | 0 | 1 | ΔYs High | | | Section 5.4.6 | | | | | |
| 1 | 1 | 0 | 0 | 0 | 0 | 1 | 0 | ΔYs Low | | | Section 5.4.7 | | | | | |
| 1 | 1 | 0 | 0 | 0 | 0 | 1 | 1 | Scale High | | | Section 5.4.8 | | | | | |
| 1 | 1 | 0 | 0 | 0 | 1 | 0 | 0 | Scale Low | | | Section 5.4.9 | | | | | |
| 1 | 1 | 0 | 0 | 0 | 1 | 0 | 1 | BLJ | | | 5.4.10 | | | | | |
| 1 | 1 | 0 | 0 | 0 | 1 | 1 | 0 | Link High | | | 5.4.11 | | | | | |
| 1 | 1 | 0 | 0 | 0 | 1 | 1 | 1 | Link Low | | | 5.4.12 | | | | | |
| 1 | 1 | 0 | 0 | 1 | 0 | 0 | 0 | RVY High | | | 5.4.13 | | | | | |
| 1 | 1 | 0 | 0 | 1 | 0 | 0 | 1 | RVY Low | | | 5.4.13 | | | | | |
| 1 | 1 | 0 | 0 | 1 | 0 | 1 | 0 | RVX High | | | 5.4.13 | | | | | |
| 1 | 1 | 0 | 0 | 1 | 0 | 1 | 1 | RVX Low | | | 5.4.13 | | | | | |
| 1 | 1 | 0 | 0 | 1 | 1 | 0 | 0 | New Page | | | 5.4.14 | | | | | |
| 1 | 1 | 0 | 0 | 1 | 1 | 0 | 1 | Slant Off | | | 5.4.15 | | | | | |
| 1 | 1 | 0 | 0 | 1 | 1 | 1 | 0 | Slant +7 | | | 5.4.15 | | | | | |
| 1 | 1 | 0 | 0 | 1 | 1 | 1 | 1 | Slant −7 | | | 5.4.15 | | | | | |
| 1 | 1 | 0 | 1 | 0 | 0 | 0 | 0 | Slant +14 | | | 5.4.15 | | | | | |
| 1 | 1 | 0 | 1 | 0 | 0 | 0 | 1 | Slant −14 | | | 5.4.15 | | | | | |
| 1 | 1 | 0 | 1 | 0 | 0 | 1 | 0 | End of Data | | | 5.4.16 | | | | | |
| 1 | 1 | 0 | 1 | 0 | 0 | 1 | 1 | End of Page | | | 5.4.17 | | | | | |
| 1 | 1 | 0 | 1 | 0 | 1 | 0 | 0 | YACC High | | | 5.4.3 | | | | | |
| 1 | 1 | 0 | 1 | 0 | 1 | 0 | 1 | Font Call | | | | | | | | |

5.4.6 [ΔYs HIGH]="ΔYs HIGH"

This contains the most significant 8 bit of the computation 43.2/POINT SIZE. It consists of a 5 bit integer number and 3 bit decimal.

5.4.7 [ΔYs LOW]="ΔYs LOW"

This contains the remaining 8 bit decimal value of the computation 43.2/POINT SIZE. This code will always follow Ys high.

5.4.8 [SCALE HIGHL]="scale high"

This contains the most significant 8 bits of the computation set width/43.2. It consists of a 4 bit integer number and 4 bit decimal.

5.4.9 [SCALE LOW]="scale low"

This contains the remaining 8 bit decimal value of the computation set width/43.2. This code will always follow "scale high".

5.4.10 [BLJ]="BLJ"

The code defines the baseline adjustment in 154ths. See 4.2.2.9 for format.

5.4.11 [LINK HIGH]="link high"

This code supplies the most significant 8 bits of a link address used to skip over line segment(s) that have been completed.

5.4.12 [LINK LOW]="link low"

This code supplies the least significant 8 bits of a link address used to skip over line segment(s). This code will always follow the "link high" code.

5.4.13
    [RVY HIGH]="RVY high"
    [RVY LOW]="RVY low"

[RVX HIGH]="RVX high"
[RVX LOW]="RVX low"

These codes must be in the above sequence. The lower order 8 bits defines the reverse video limits.

5.4.14 [NEW PAGE]="New Page"

This control defines a data RAM as the first of a new page. It must be issued before the first line segment of a page.

Bit 0 is a 0 for normal, standard operating mode and is a 1 for proof page mode. Bit 1 is a 0 for normal resolution units (1/10 pt. per raster) and is a 1 for high resolution units (1/20 pt. per raster). The other 6 LSB's have no meaning.

5.4.15
[SLANT OFF]="Slant off"
[SLANT +7]="Slant +7"
[SLANT −7]="Slant −7"
[SLANT +14]="Slant +14"
[SLANT −14]="Slant −14"

These codes define which slant constant is to be used for the following outline computation. The LSBs have no meaning.

5.4.16 [END DATA]="End data"

This code follows the last line segment within the data RAM. It informs the OCS that more data for this page will follow in the next data RAM. The LSBs have no meaning.

5.4.17 [END PAGE]="End page"

This code follows the last line segment of the page. It informs the OCS that no more data RAMs for the page follow. The LSBs have no meaning.

5.4.18 [YLMT]="Y limit"

This terminal is the first code in the data RAM. It is a 14 bit number defining the last raster in RRUS that shall be output by the OCS with the data in the data RAM.

5.4.19 "Font Call"

This code is generated by the Z80A to simplify font call processing. It is a temporary code which is replaced with a NULL Code prior to releasing the DATA RAM to the OCS for output processing.

6. OUTLINE ALGORITHM

The outline algorithm is the formulae and processes that solve and store the intersections of rasters with the outlines of the characters to be set at any particular vertical level on the page. These intersections are the horizontal locations where the laser beam shall be turned on and off as it strokes out the raster lines.

Figure 18:
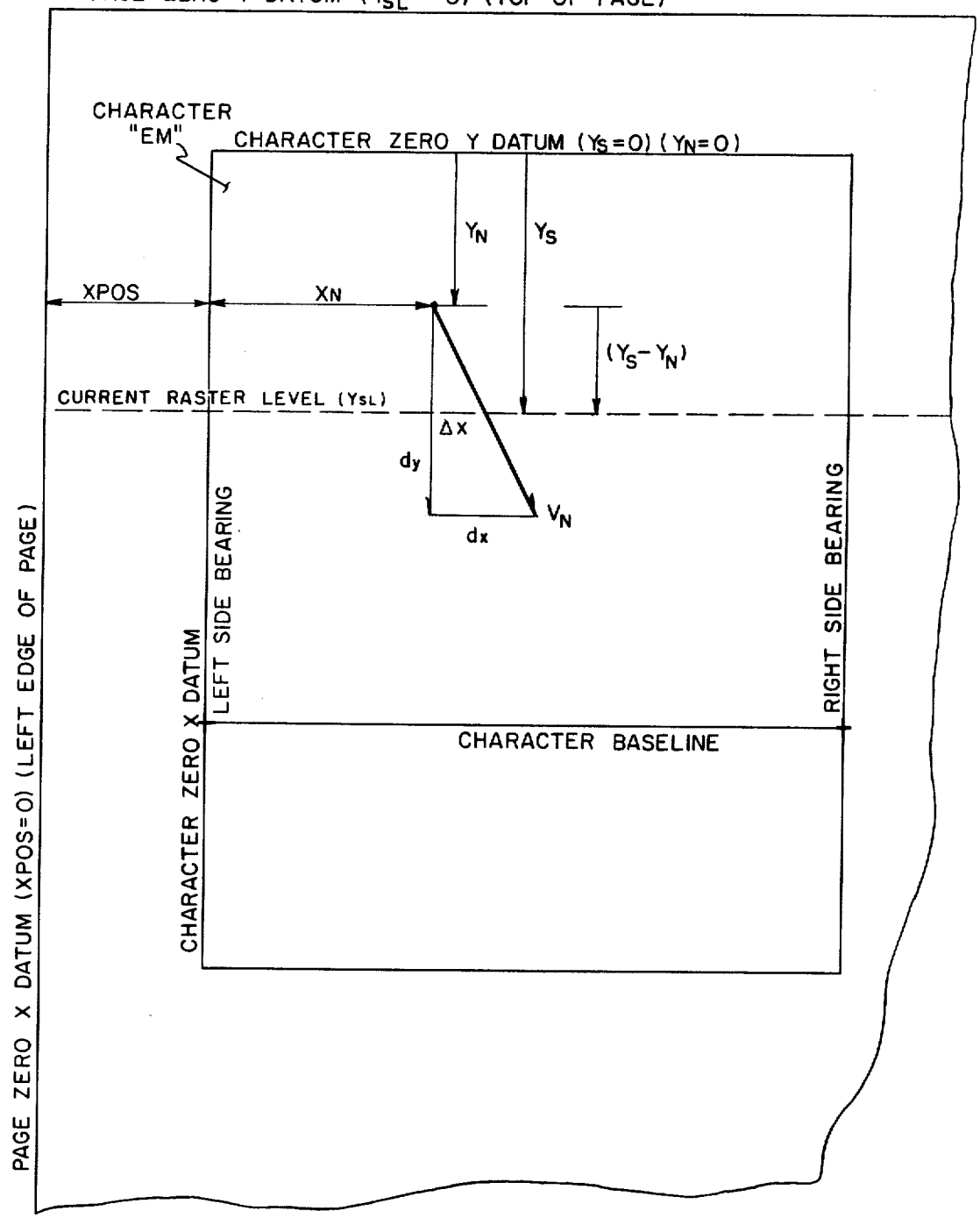
FIG. 18 is a diagram showing the parameters used in the basic calculation carried out by the Output Data Processing System.

6.1 Basic Outline Intersections: All characters in the data set are described by a series of initial locations and vectors that trace the outlines of the characters. FIG. 18 illustrates the factors to be used in solving one outline. (Refer to FIG. 9 for correlation).

Vector VN represents one edge of one character. The distance from the left edge of the page to the point on this vector where it is intersected by the current raster level is to be solved. It can be seen that this distance, which is defined here as XREG, is:

$$XREG = XPOS + XN + \Delta X$$

The general expression must also provide for the possibility that XN may be left on the left side bearing (XN sign bit is negative) and that the vector may point down and to the left (the data L bit is one) resulting in a negative $\Delta X$:

$$XREG = XPOS \pm XN \pm \Delta X$$

Since XREG is desired in raster resolution units (RRU's) for ultimate output to the laser, the proper scale factors must be applied. XPOS is input from the Input Systm in RRU's and is maintained in those units throughout the Output Data Processing System. XN and the $\Delta X$ factors are all stored in relative character units, to enable setting all size characters from one set of data. The horizontal scaling of characters is based on the set width command to enable character expansion and compression for appearance purposes and/or for copy fit purposes. The expression becomes:

$$XREG = XPOS + [\pm XN \pm \Delta X][SW/43.2]$$

Similar triangles are used to solve geometrically for $\Delta X$:

$$\frac{\Delta X}{(Y_s - YN)} = \frac{dx}{dy}$$

Substituting:

$$XREG = XPOS + [\pm XN \pm (Y_s - YN)(dx/dy)][SW/43.2] \quad (1)$$

In the general form of the equation above, XN and YN are the starting locations of the vector VN, whose slope is dx/dy. Ys is the distance in character units, defined as data resolution units (DRU's), from the zero datum on the character extended "em" area to the raster level. Ys is thus a function of the point size to be set and the raster distance in RRU's from the top of the em:

$$Y_s = (YSL - YHI)(43.2/Pt. S_z)$$

In actuality, the algorithm looks up the incremental $\Delta Y_s$ in a table, where:

$$\Delta Y_s = (43.2/Pt\ S_z)$$

and adds this value to the prior Ys for each new raster line.

6.2. Boundary Bit And On/Off Buffer Storage: Equation (1) is solved for all character outline vectors that intersect the current raster. Within the character data, a boundary bit (B bit) is embedded with each outline series that records whether the outline should turn the laser beam on or turn it off.

The final solutions of each intersection are stored in either an ON RAM or an OFF RAM dependent upon the state of the B bit. These RAMs, which are the so-called "raster line buffers", are 8 K long each and each contain one bit for each horizontal resolution element (Ref: Section 7.5). Each XREG computation results in the setting of the particular RAM bit that corresponds to the value of the XREG solution. Incrementing techniques cause an adjacent bit to be set if a solution is identical to a prior solution on the same raster line which can result when characters are overlayed or kerned.

6.3 Long Verticals: To enhance data compression, a pair of data control bytes are available for use in the vector data stream to define vertical vectors longer than the nominal longest allowable sloping vector, VN (whose maximum length is limited by the 15 DRU limit on dy and dx).

A control byte is used to define this condition, where dx (and therefore ΔX) are zero, and the following byte defines the dy length of the vector in binary code (Ref. Section 2.4.3 "Controls", where dx=3). This data byte pair should define any vertical vector with a length between 1 and 255 DRU's. However, its use has been restricted to vectors with lengths between 31 and 255 DRU's because (a) lengths between 1 and 15 DRU's can be expressed with less data using the non-control dydx definite vector coding available and (b), lengths between 16 and 30 DRU's can be processed faster in the 8×300 microprocessor if they are expressed as two definite vertical vectors.

6.4 Steep Slopes: There exist character outlines that have such a steep, almost vertical, slope that they cannot be adequately defined by using the steepest non-vertical dxdy pair due to the 15 DRU limitation. If these outlines were defined by the combination of a long vertical and a 1/15 vector, (which pair would accurately define the end points of the steep vector desired), the output that is being used would accurately output each component part of the pair; however, this would give a bumpy appearance to a character edge at large point sizes, particularly if the vertical component of the pair is longer than the sloping component.

A series of control bytes have been defined that enable all steep vectors to be defined by the combination of a vertical component and a longer sloping component. The control bytes (Ref. section 2.4.3 "Controls", where dx=4, 5 and 6) define vectors with slopes of 1/30, 1/60, and 1/120; they are used with vertical vectors or long verticals as required to complete the exact steep vector.

Since the hardwired processor (HWP) (Ref. section 7) does not accept 1/30 etc. slopes, the solution of these control vectors is accomplished by having the SMS300 microprocessor input compensated values to the HWP. The SMS300 inputs a 1/15 vector value to the HWP, but reduces the Ys and YN values so that a halved (or quartered or eighthed) ΔX solution results.

6.5 Shallow Slope: There exist character outlines that have such a shallow slope that they cannot be defined by one dxdy pair due to the 15 DRU limitation. In this case dy is one DRU and dx needs to be greater than 15 DRU's. A control byte is used to define this condition, and the following byte defines a multiple (1 thru 15) of 16 DRU's displacements, plus a 0 thru 15 additional DRU displacement. (Ref. Section 2.4.3: "Controls", where dx=F). Any vector with a dx between 16 DRU's and 255 DRU's in combination with a dy of 1 can be defined by this byte.

The multiple above is defined as K, and this alters the basic equation to:

$$XREG = XPOS + [\pm XN \pm (Ys - Yn)(dx/dy + 16K)]$$
$$[SW/43.2] \quad (2)$$

6.6 Squared Outline Shapes: Character outlines such as the right side of an upper case Helvetica "E" have a squared shape. These shapes could be treated as a series of individual vertical outlines, but this would require a significant data load to record the start locations of each outline. Rather, two control bytes have been provided to define the condition of an outline that displaces horizontally in a rectilinear fashion during one vertical DRU (as contrasted with the shallow slope, which displaces horizontally during one vertical DRU in a sloping fashion). One control byte (Ref. section 2.4.3: "Controls", where dx=D) defines horizontal displacement up to 255 DRU's; the second control byte (Ref. Section 2.4.3: "Controls", where dx=E) defines displacements between 256 and 511 DRU's inclusive.

The 8×300 microprocessor outputs dx and K as zero within this vertical DRU zone in order to accomplish a squared off outline shape.

6.7 Extrapolation: When the current raster level approaches within 1 DRU of the initial YN (start) of an outline, a solution is made. This is an extrapolated solution, because the raster level has not yet reached the vector. In this case, Ys is less than YN which makes the term (Ys−YN) negative, which in turn reverses the polarity of the sign that precedes the term in equation (2) above (Δx is reversed in sign).

The slope of the next following vector is used while Ys is greater than YN−1 and is equal to or less than YN, provided that the flare bit (Ref. section 6.8) is not on. True extrapolation results in this zone.

6.8 Flare Bit: In two cases, extrapolation with the next following slope is insufficiently shallow for quality character reproduction. In case 1, a character editor, based on a visual review of real or simulated character output, desires a shallower entry slope in the extrapolation zone. A flare bit (F bit) is provided in the XN data word, which he may set on. In case 2, a very fine vertically reentrant feature of the character produces start points without any following vectors; in this case, the character digitization program automatically sets the flare bit to a one. The digitization program also sets the flare bit to a one when the initial vector has a slope that is less than 30°.

When the flare bit is on, the K value in equation (2) is set to a value of one for the extrapolation zone only, thereby decreasing the slope in this zone. This is controlled by the OCS.

6.9 Extrapolation Cancel Bit: The E bit in the XN data word will cancel extrapolation. This bit can be set to a one by the character editor.

6.10 Slant: Electronic slanting of a character consists of taking character features within the em square and parallelogramming them a specified number of degrees in either a right or left direction depending upon the slant request. This is done about a central neutral axis which remains in place; Ys of 344 DRU's is the level of the neutral axis.

The change in the x position oulines caused by this slanting is therefore:

$$SLC = (344 - Ys)(\tan \text{slant angle})$$

The allowable slant angles have been selected as 7.1 degrees and 14 degrees because their tangents are ⅛ and ¼ respectively, and therefore allow scaling the SLC by bit shifting.

Incorporating this final factor into equation (2) results in:

$$XREG = XPOS + [\pm XN \pm (Ys - Yn)$$
$$(dx/dy + 16K) \pm SLC][SW/43.2] \quad (3)$$

which is the equation solved by the OCS and the HWP 6.11 Reverse Video: Reverse video does not follow the outline algorithm equation; rather it simply reverses the resultant output from the ON/OFF buffers (Ref. section 6.2) between two horizontal resolution locations. These locations are specified from the Input System, which also specifies the vertical limits over which the reversing shall be effective. The points are stored in a RAM similar in data structure to the ON/OFF RAMS.

This capability can easily accomplish horizontal rules, vertical rules, or reverse video blocks. Overlapping reverse video areas will re-reverse where they overlap.

Borders can be made by defining one area just within a second one. Underlining can similarly be defined by two RV areas. However, care must be used in specifying overlapping RV's. For example, horizontal rules that cross vertical rules will have white intersections, and RV underlining that intersects characters will be white in that intersection.

6.12 Line Rule: Line ruling commands, defined in a similar manner as reverse video commands, have been provided so that rules can be accomplished that do not reverse in video when they cross characters or other rules.

Bits are set in the appropriate ON/OFF buffers, but no special hardware has been incorporated in the HWP for this facility. The 8+300 outputs on XPOS value to the HWP that corresponds to the appropriate end of the rule (LRX HIGH, LRX LOW), and output a zero dx and a zero XN with proper boundary bits set to accomplish the function.

6.13 Wrong Reading: To accomplish wrong reading, XPOS is obtained by subtracting the input XPOS from the page width, in order to obtain the distance from the right edge of the page. The sign of each XN and its L and B bits are also complemented to effectively wrong read each character. These tasks are all done during Data RAM building by the DMS (Z80A) and are transparent to the OCS, which will output the data in the usual way for the normal left-to-right laser beam stroking.

7. HARDWIRED PROCESSOR 7.1 General: The hardwired processor (HWP) receives data and controls from the Outline Converter Subsystem (OCS) and from the Laser Recorder or "Phototypesetting Unit" (PTU) and sends a "video signal" as well as other control signals to the PTU. These functions are carried out by executing the following general operations:

(1) Using input data and control information from the OCS, the on/off points and reverse video points are computed, and "one" bits are placed into an "ON" register, an "OFF" register or a "Reverse Video" register, all of which are referred to herein as "output raster line buffers".

(2) Using an input clock and controls from the PTU, a video NRZ control signal is generated which has transitions dependent on the "ones" stored in the output raster line buffers.

(3) Using internally generated flags, the input and output average data rates are adjusted to compensate for the wide variability in duration (or quantity) of input data.

(4) Using input controls from the OCS and PTU, the raster line buffers are cleared and required control (or reply) signals are sent to the PTU, for example to trigger the PTU advance roller drive motor (element 58 in FIG. 2).

The video control signal is the beam modulation signal for the Laser Recorder. On-off transitions occur at character boundaries. Input data is based upon the characters in each "line segment" that is to be printed. Since line segments are allowed to overlap, characters may overlap. To accommodate this, a technique using an "ON" buffer and an "OFF" buffer is used. Each buffer is a memory of sufficient size to store a bit representing each element of a single scan line. The "ON" buffer stores a one bit in those elements that represent a black to white transition of a character and the "OFF" buffer does the same for the white to black transition. For cases where two characters have a transition at the same element, the next higher address element is set to one for the "ON" transition and the next lower address element is set to one for the "OFF" transition. To generate the output video signal the successive ones in the buffers are detected and those from the "ON" buffer decrement an up-down counter and those from the "OFF" buffer increment the counter. If the counter is decremented to a negative number, the video output level (low to the PTU) is such as to turn the laser beam on.

To provide for reversal of the usual black on white output a "Reverse Video" (RV) buffer of the same size as the ON/OFF buffers is used. A one bit in the RV buffer inverts the outputs video signal polarity for that element and all subsequent elements until the next one bit in the RV buffer. A switch called "Global RV" provides for reversing the video polarity for a whole page.

To facilitate rapid throughput, the output raster line buffers are duplicated so that read-in (loading) and read-out (unloading) can be performed simultaneously. The buffers are either in a mode receiving the patterns of ones representing a line or outputting to generate the video signal. Both modes are read-write operations on the memory since, for the output mode, zeros are written in to replace the ones. The buffers then can be initiated to an all zero condition by parallel ports from the OCS that perform two unload operations.

Figure 19A:
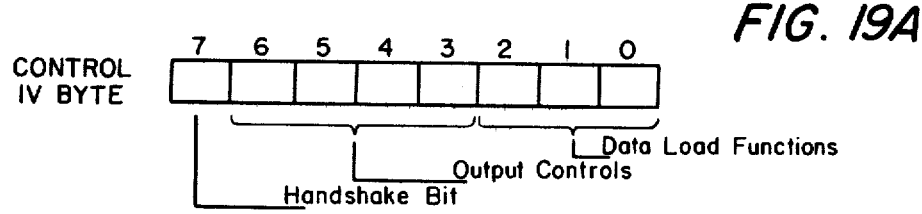

7.2 Input: The hardwired processor receives its input from three "IV" bytes. Each IV byte is 8 bits. Two of these bytes are "data bytes" (DATA HIGH, DATA LOW), and the third is a "control byte" which directs the HWP on what function to execute next. The control byte format is shown in FIG. 19A.

When the handshake bit is zero, it indicates that nothing is to be done. When the OCS wants the HWP to perform a function, it loads the data byte(s) with any required data, and then sets the control byte with the proper control, which includes the handshake bit. After the HWP accepts the requested function, it resets the handshake bit back to zero.

The control information is one of three basic types:
(a) Load Variables;
(b) Solve; and
(c) Output.

The Data Load controls are listed in Table 9. The Output controls listed in Table 10 all communicate with the PTU, except for the RVX (Control 88), which commands a reverse video limit store.

The Solve Control (87) is duplexed with the dydx data loading, and is the one which requires the HWP to solve the equation. Prior to solving, the data IV Byte must be input.

TABLE 9

| CONTROL | DATA LOAD FUNCTIONS VARIABLE LOADED |
|---|---|
| 81 | SCALE |
| 82 | XPOS |
| 83 | Yn, K |

TABLE 9-continued

| DATA LOAD FUNCTIONS | |
|---|---|
| CONTROL | VARIABLE LOADED |
| 84 | Xn, SIGN, DIR, FLARE, ON/OFF, EXTRAPOLATE |
| 85 | SLANT |
| 86 | Ys |
| 87 | dydx |

TABLE 10

| OUTPUT CONTROLS | |
|---|---|
| CONTROL | OUTPUT |
| 88 | RVX STORE |
| 90 | NEW PAGE LOAD |
| A0 | END OF PAGE |
| C0 | OUTPUT RASTER |

TABLE 11

| FLARE | K | dx/dy |
|---|---|---|
| 0 | as supplied | as supplied |
| 1 | 1 | as supplied |

7.3 On/off Solving: The equation to be solved is:

$$XREG = XPOS + [\pm X_n \pm \Delta X \pm SLC]SCALE$$

where:

$$\Delta X = (Ys - Y_n)(dx/dy) + 16K.$$

The sign of the $\Delta x$ result is dependent on the result of the (Ys−Yn) subtraction and on the direction of the curve (this is loaded under control 84 in Bit 0 Data Low). The parameters used in this equation are handled by the HWP as follows:

XREG—This result is the address of the bit on the on or off buffer to be set. The buffer (on or off) is selected depending on Bit 1 Data Low under control 84, (if this B bit is on, the buffer shall be selected).

XPOS—This value is input under control 82 and is 14 bits.

Xn—This is a 10 bit integer input under control 84. Bit 6 Data High defines whether this is a + or −. The value will be expressed as a two's complement if the sign is negative.

Ys—This variable is input under control 86. In dealing with the decimal, only bits 5 to 2 in Data Low will be needed for this computation.

Yn—This is a 10 bit negative integer input under control 83 in 2's complement form. NOTE: (Ys−Yn) will always yield a number >−1 and <15 (see dydx & K descriptions).

dydx—This variable is input under control 87. This value is always used as supplied when (Ys−Yn) is positive. If the results of the subtraction are negative, dydx is used or effectually replaced by dx/dy of 16 in accordance with the flare bit status. See Table 11.

K—This value is input under control 83 and defines in Bits 5 to 2 of Data High. When (Ys−Yn) is less than zero, K is employed according to Table 11.

SLC—The slant constant is input under control 85. Only the 4 MSB of Data Low are needed. The sign in Bit 7 of Data High defines ±. The value will be expressed as a two's complement if the sign is negative.

SCALE—This value is loaded under control 81. The 2 LSB of Data Low are not required for accuracy. The scaling constant is equal to the set width divided by 43.2.

E—Bit 7 of Data High under control 84 will cancel the solve requirement if the result of the (YS−Yn) subtraction is negative. (E bit on cancels).

Figure 20A:
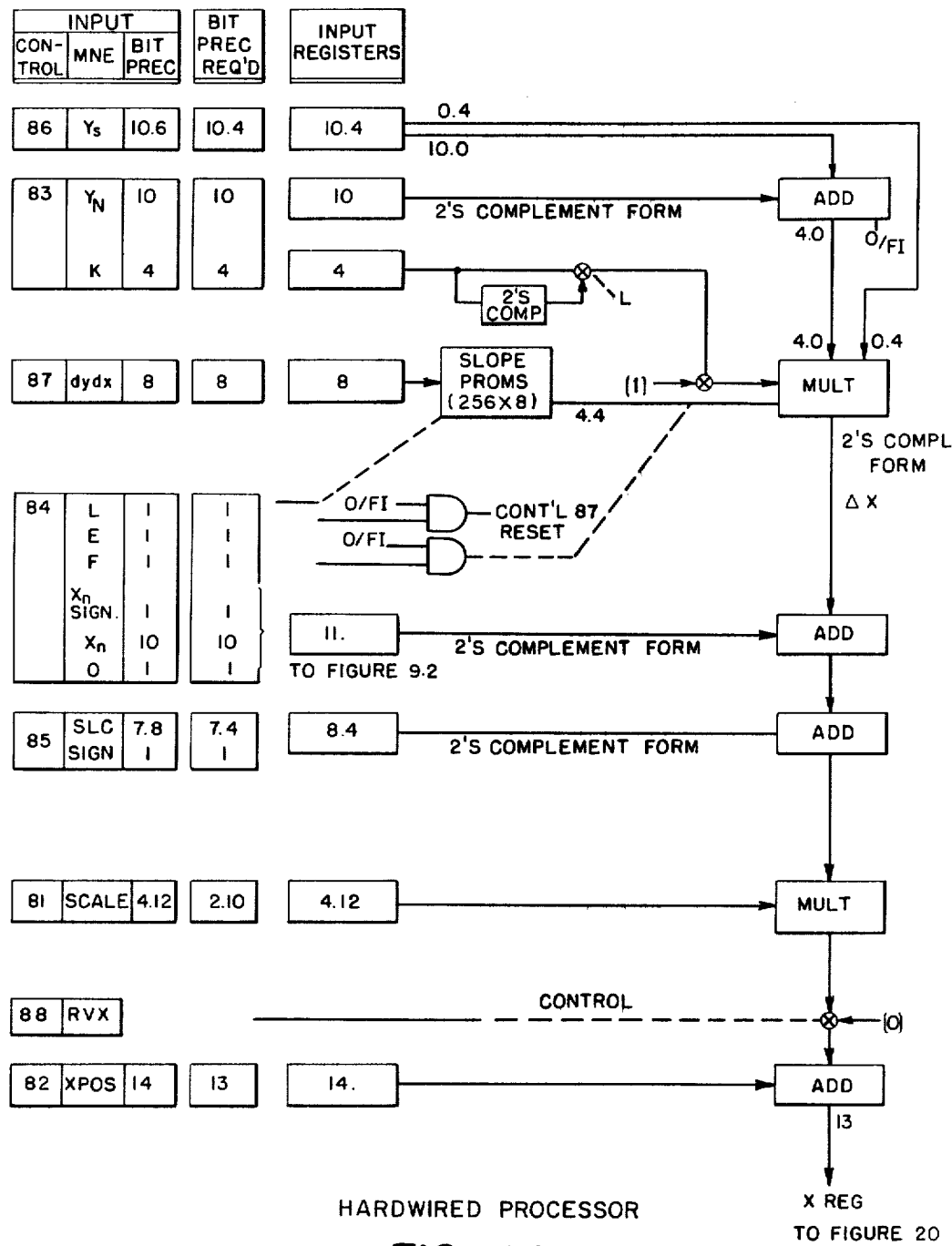
FIGS. 20A and 20B are functional block diagrams of the hardwired processor including the output data (raster line) storage buffers.

FIG. 19B summarizes the controls and the data formats. FIG. 20A is a Functional Block Diagram of the On/Off Solving section of the HWP.

7.4 Reverse Video Input: Reverse video limits are input via the XPOS input. The HWP will accept an XPOS input under control 82. If this value is an RVX point, control 88 will be input to cause the HWP to store the XPOS value in the RV buffer (see section 7.5.2).

7.5 Raster Line Data Storage Buffers: The HWP contains six data storage registers to store the data that controls the laser recorder. While the data in three of these registers is being output to the laser recorder to form one raster line, the other three are storing the result of the character outline computation.

The three registers that comprise a control set are dedicated to storing the locations where the laser recorder should turn on (the ON BUFFER), storing the locations where it should turn off (the OFF BUFFER), and storing the locations where the normal on-off conditions should be reversed (the RV BUFFER). Each buffer has a bit dedicated to each horizontal resolution element in the raster, and therefore has a minimum length of 7,954 bits.

Figure 20B:
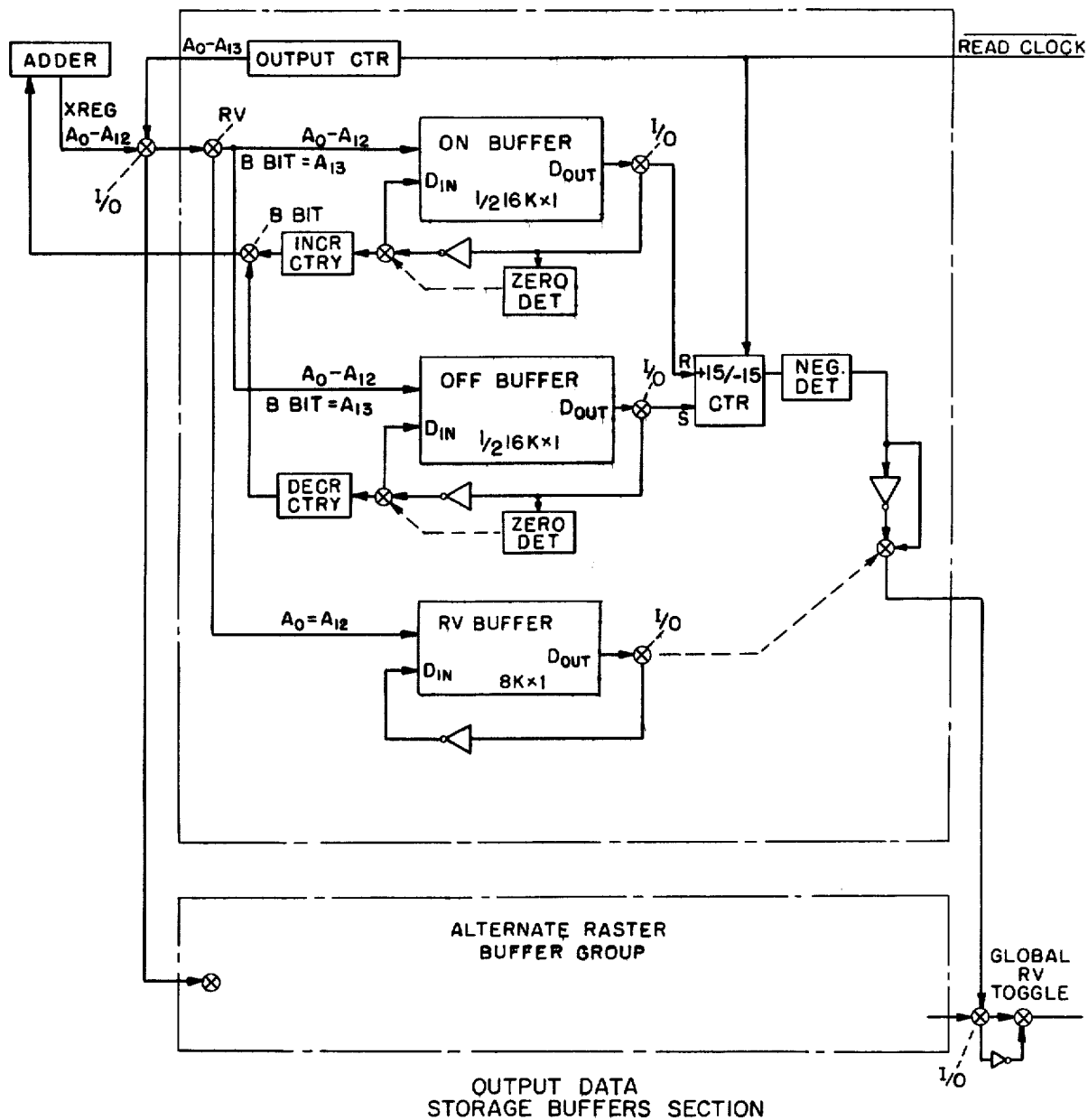

FIG. 20B is a Functional Block Diagram of the raster line data storage buffers section of the HWP.

7.5.1 ON/OF Buffer Input: The output of the XREG adder contains the address of the bit in the On or Off Buffer that should be turned on to store the on or off function. The Boundary (B) Bit state determines whether the On or the Off Buffer is to be loaded.

Loading of the buffer must recognize whether the bit being addressed has already been loaded from a prior solution. If the bit addressed is a zero, a Read-Modify-Write cycle on the RAM may be performed. If the bit addressed is already a one, the contents of XREG must be incremented (or decremented, if the Off Buffer is being loaded), and another load must be attempted. This is repeated until a valid Read-Modify-Write is performed. This process ensures that some bit is turned on for every input requirement.

7.5.2 Reverse Video Buffer Input: The output of the XREG adder contains the address of the bit in the RV Buffer that should be inverted to store the reverse video function. A Read-Modify-Write cycle on the RAM is performed for every RV input. This will invert the bit, whether its current state is a zero or a one.

7.5.3 Buffer Output: The contents of the On and the Off Buffer is clocked out through an up-down counter with a minimum range of ±15. Bits in the On Buffer that are one will decrement the counter, whereas one bits in the Off Buffer will increment the counter. A negative count detection circuit controls the output to the laser recorder, the laser beam being turned on whenever the count is less than zero. (If both the On and the Off Buffer bits at any address are identical, the count does not change). The RV Buffer is clocked out at the same rate, and will reverse the normal output from the zero detector. All buffers are reset to zero after the outputting cycle.

The clocking is controlled by the "read clock" signal from the PTU. A toggle switch is provided on the HWP card (board) to enable a set-up operator to command Global Reverse Video; i.e., a black/white reversal for the entire page.

7.6 The HWP Structure: The HWP will first be described using a simplified block diagram. Then the overall timing will be given followed by a detailed explanation of the logic design.

Figure 21:
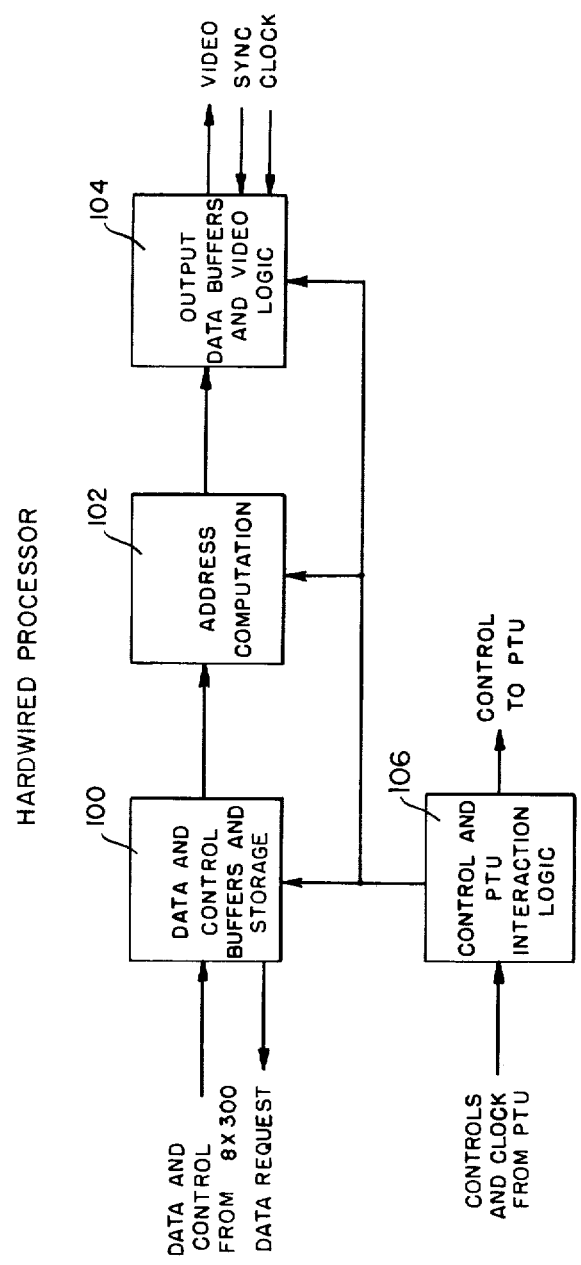
FIG. 21 is a block diagram showing the principal sections of the hardwired processor.

7.6.1 Basic Sections: FIG. 21 shows the basic sections of the HWP. Data and control words are loaded into a buffer and storage section 100 under control of a "handshake" signal from the 8×300 in the OSC. One of the control words initiates an address computation performed in the next section 102 and this same control initiates a load into that address location performed by the last section 104. Each section has its own control and sequencing logic.

The control and PTU interaction logic 106 generates the output video signal in synchronism with a read clock from the PTU. This section also utilizes synchronizing signals from the PTU to generate flags that indicate when the data buffers are full. The conditions of three flags are used to control the input of data (through the handshake signal) and to interrupt the output of data if the quantity and duration of the input data is such that the output cannot keep up. This section also receives condition signals such as "ready for load" and "read for scan" to generate outputs such as "load command", "scan enable" and "step enable".

7.6.2 Data and Control Buffers and Storage: FIG. 22 shows the first section 100 in block form. Data and control bytes come over three 8 bit busses from the 8×300. Data High and Data Low are buffered to drive a set of latches. The abbreviations used for data will be explained in next section. The notation used in FIG. 22 indicates the bit range and bit weight for each piece of data transmitted. The control byte, except for the single bit called the Handshake (HS) bit, is stored directly in an 8 Bit latch 107. When the HS bit is set to one a load clock pulse is generated and supplied to the control byte latch. The output of this latch provides a three bit word and a set of four single line control signals. The 3-bit word is decoded and used to generate 4 clock pulses for selected data latches.

The control line 87 initiates a computation and an ON/OFF buffer load. The control line 88 initiates an RV buffer load. The control line 90 enables the generation of a load command to the PTU if the "Ready for Load" condition exists. The AO control signal resets the "Ready for Scan" and "Scan and Sync Enable" output conditions. The CO control signal indicates that a data buffer has been loaded and is available for unload.

7.6.3 Output Data Buffer Address Computation: The second section 102 computes the output data (raster line) buffer address that is basically given by:

$$X_R = X_P = [X_n + \Delta X + SLC]SC,$$

where $$\Delta X = (Y_S - Y_n)(dx/dx + 16K).$$

The notation used here is slightly different than that used previously:
$X_R = $ XREG $X_P = $ XPOS
$SC = $ SCALE The signs of these quantities and the result can be handled by understanding that $X_n$, $\Delta X$, SCL and SC are two's complement numbers. All but $\Delta X$ are provided from the OSC as two's complement numbers. The quantity $\Delta X$ is computed in this section where dy/dx is generated by pair of ROMs 108 and 110, the second one providing the two's complement, as shown in FIG. 23. The K value is provided as a positive number and, when the quantity (dx/dx+16K) is a negative number, the logic formulates a full 16 bit two's complement number. The sign of this quantity is under control of the L bit (see FIG. 22).

There are other control modifications to the $X_R$ calculation. If the sign of $Y_s - Y_n$ is negative and the Flare Bit F (FIG. 22) is one, K is forced to equal one. If $Y_s - Y_n$ is negative and the E Bit is one, the $X_R$ computation is abandoned. This latter event is described as part of the control logic for this section.

Note that both the quantity $\Delta X$ and the second term of $X_R$ require multiplication. This multiplication is effected by a time-shared 16 bit multiplier 112.

The operation of the section 102 will now be explained with reference to FIG. 23. The quantity ($Y_s - Y_n$) is provided by an adder 114 on the bits (0,3) (this notation meaning bits 0, 1, 2 and 3) because $Y_n$ is always supplied as a two's complement negative number. Since $Y_n$ has no fractional digits, the adder output and the bits (−4, −1) of $Y_s$ go to tri-state buffers 116 and 118 and form the multiplicand for the first multiplication. The sign for the ($Y_s - Y_n$) computation is determined by the adder and is zero for a negative result. Note that the input data provides only bits (−4, 3), the remaining bits must be provided by the sign bit. The existence of bits (−6, −5) will be clear when the multiplier is described.

The inputs dy, dx provide 8 bit addresses to the 256 word by 8 bit ROMs 108 and 110 that generate the ratios dx/dy and $\overline{dx/dy}$ (the double overline meaning two's complement). The ROMs have tri-state outputs which are wired together and they are selected by the L bit.

The circuits after the two ROMs 108 and 110 generate the quantity (dx/dy+16K) in two's complement form. The K variable goes to a muliplexer 120 which is under control of the Flare Bit F and the sign of ($Y_s - Y_n$), SΔY. The other input of the multiplexer is the constant one, which is selected when ($Y_s - Y_n$) is negative and F is one. For a non-negative condition (L=0), the dx/dy ROM 108 is selected and the K value is added to zero and forms the weight positions (4,7) of the quantity. This quantity goes to a tristate buffer 122 and is the multiplier for the first multiplication.

If the L bit is negative, the $\overline{dy/dx}$ ROM 110 is selected. The output of the multiplexer 120 goes to an exclusive or circuit 124. For L=0, its input to the exclusive-or inverts the K value. If $\overline{dy/dx}$ is not zero, the EX-OR output is added to zero by a full adder 126 forming the two's complement number. If $\overline{dy/dx}$ is zero, the K value must be a two's complement (not just inverted). The zero condition is detected by an inverter 128 and an 8-input NOR 130 and generates a carry to the adder 126 to produce the two's complement of K.

The multiplier 112 is made up of two 8 bit multiplier chips and three, 8 bit serial shift register chips forming a shift register 132. For each shift clock a 1 bit by 16 bit product is formed. Thirty two shifts generate a 32 bit product (which is located in the shift register), but since the full product is not required, only 24 bits are retained. Since operations are performed least significant bit first, the lowest 8 bit positions are lost. The multiplicand ($Y_S - Y_n$) and the multiplier ($dx/dx + 16$ K) are loaded to have the binary point between weight positions 5 and 6 of the multiplier and shift register. The first product then retains weights ($-4$, 11) and is located in the two lower order shift register chips. The positions (12,19) are not used. The first product is ANDed to by an adder 134 and the result is added to SLC by an adder 136. This result goes to a tri-state buffer 138 to provide the multiplicand for the second product. Note that the tri-state buffers and the tri-state ROMs have output controls provided by the appropriate polarity of an M signal.

The second product provides:

$$P1 = (X_n + \Delta X + SLC)(SC)$$

The scale constant SC comes from a tri-state latch in the storage section 100 (FIG. 22) which has an output controlled by the Reverse Video control signal 88 and a pulse SP that occurs at multiplier load time. If the Reverse Video control signal 88 is present, the SC latch is held in an open circuit state and the shift register product P is forced to zero.

For the second product the binary point for the multiplicand is between weight positions 3 and 4 and the multiplier binary point is between weight positions 11 and 12. The product weights are ($-8$, 15) but only the integer values are required which reside in the upper two (MSB) shift register positions.

The product P1 is added to $X_P$ by a full adder 140 to form $X_R$, the data register address. Note that for RV control 88 present, P1 is zero and $X_P$ becomes the data register address.

7.6.4 Output Data Buffers and Video Logic:

FIG. 24 is a block diagram of the third section 104. The register address goes to a multiplexer 142 that is controlled by the most significant bit of X, the sign bit. The register address as calculated is usually a positive number whose MSB is of weight 12, which provides 8192 positions, which are more than the number of elements on a scan line. If the address calculation results in a negative number, which can happen at the beginning of the scan, the sign bit of $X_R$ ($S_{XR}$) is used to switch the multiplexer and load a one into address 32. If the sign bit is not one but bits 13 or 14 are one, the load operation is abandoned.

The output of the multiplexer 142 is parallel loaded into an up-down counter 144. The counter output goes to multiplexers 146 and 148 that select which of the two output data buffers are to be used for loading. The other buffer address is selected for unloading and this comes from a counter 150 that is operated from an output clock in the PTU.

The address multiplexer 146 or 148 is selected by the Buffer Select (BUSE) signal. When this signal is low, Buffer One is selected for load and Buffer Two for unload. Considering first the load operation, the controls to the memory chips are the Chip Enable ($\overline{CE}$) and the Write Enable $\overline{WE}$. The $\overline{CE}$ signal is gated by control logic (not shown) that selects a particular chip in the ON, OFF, or RV buffer under control of the Boundry Bit (B) for selecting either ON or OFF and the Reverse Video Control signal 88, for selecting the RV buffer. If there is a zero in the selected ON or OFF buffer location, the $\overline{WE}$ signal occurs and writes one into this location. If one is found in the ON buffer location, the $\overline{WE}$ signal is delayed until the address is incremented by a clock to the up-down input address counter 152. Note that the direction of counting is controlled by the B bit. If there is a One in the OFF buffer, the address is decremented. If the RV buffer is selected and a one is found, a zero is written, and vice versa. The input for the RV buffer is via a latch 154 and a multiplexer 156.

For the unload sequence all three buffers are enabled by the $\overline{CE}$ and $\overline{WE}$ signals. For the ON and OFF buffers zero is loaded via the BUSE signal level and for the RV buffer input, a ground level is selected by the multiplexer 156. The output level of each buffer is stored in the latch 154. Exclusive-or circuits 158 detect if the bits in the ON and OFF buffers are different and, if so, the output up-down counter 152 is enabled via a multiplexer 160 that selects the condition from the appropriate buffer. If there is a one in the OFF buffer this goes to the up-down control of the counter 152 and causes an up count. If there is a one in the RV buffer this causes a JK flip flop 162 to change state and the flip flop output is exclusive-roed with the MSB of the up-down counter. The output of this exclusive-or circuit 164 goes to a D-flip flop 166 which is cloked by a Read Clock pulse from the PTU. The output of the D-flip flop 166 is exclusive-ored with a Global RV signal and this output is buffered to provide the video output signal to switch the laser beam on and off.

8. COMPUTER PROGRAMS 8.1 General: The general architecture, detailed structure as well as the operation of the Output Data Processing System (OCS) have now been described in such a manner as to enable a person skilled in the digital typesetter art to construct and use a typesetter according to the present invention. While it is believed that a computer programmer of average skill could write the necessary program for the Z80A and the 8×300 microprocessors, the preferred embodiments of such programs are set forth in the attached Appendix for the convenience of the reader.

While there has been described what is believed to be the preferred embodiment of the invention, those skilled in the art will recognize that various changes and modifications may be made thereto without departing from the spirit of the invention, and it is intended to claim all such embodiments as fall within the true scope of the invention.

APPENDIX I       S.N. 950242

PYR2.731                                              © 1978 Eltra Corp.
LOC   OBJ CODE M STMT SOURCE STATEMENT                     ASM 5.0

```
                      1  ;                      LAST UPDATE  7/31/78
                      2  ;                      PYRAMID
                      3  ;                        VERSION 2
                      4  ;
                      5  ;                   DATA MANAGEMENT SUBSYSTEM
                      6  ;
                      7  ;                        DMS TABLES
                      8  ;
                      9
                     10        EXTERNAL HWPTST, STPGST, RESET, RESTRT
1000                 11        ORG     1000H
1000                 12  STACK DEFS    100            ;STACK FOR DMS
                     13  STCKND EQU   $
1064                 14  FTBL  DEFS    8              ;FONT RAM TABLE
                     15                               ;8 1-BYTE ENTRIES
                     16                               ;0 - RAM EMPTY
                     17                               ;1 - 254 - FONT NO.
                     18                               ;255 - RAM INACTIVE
106C                 19  LINK  DEFS    8              ;FORWARD FONT RAM LINK TABLE
                     20                               ;(FOR MULTIPLE RAM FONTS)
1074                 21  LRU   DEFS    8              ; LEAST RECENTLY USED TABLE
                     22                          ; (LARGEST NUMBER IS L.R.U. FONT RAM)
107C                 23  RLST  DEFS    300            ;RAM LINE SEGMENT TABLE
11A8  8000           24  RLSTND DEFW   8000H          ;75 4-BYTE ENTRIES
                     25                               ;1,2 = SEGMENT NO.
                     26                               ;3,4 = YLOW OF SEGMENT
                     27                               ;LAST BYTE HAS MSB=1
11AA                 28  FCALL DEFS    30             ;FONT CALL TABLE
                     29                               ;15 2-BYTE ENTRIES
                     30                          ;GLOBAL VARIABLES
                     31  ;
11C8                 32  ERC   DEFS    1              ;END RAM CONTROL
11C9                 33  LSPTR DEFS    2              ;LINE SEGMENT POINTER
11CB                 34  PLS   DEFS    2              ;PROCESSING LINE SEGMENT POIN
11CD                 35  OSPTR DEFS    2              ;OUTLINE FILE STORE POINTER
11CF                 36  PSIZE DEFS    2              ;PAGE SIZE
11D1                 37  YTOP  DEFS    2              ;CURRENT Y COORDINATE
11D3                 38  YMAX  DEFS    2              ;LARGEST Y COORDINATE
11D5                 39  TRAM  DEFS    2              ;TOP OF RAM ADDRESS
11D7                 40  BLKA  DEFS    2              ;BLOCK ADDRESS
11D9                 41  SGST  DEFS    2              ;SEGMENT START ADDRESS
11DB                 42  RCNT  DEFS    1              ;RETRY ERROR COUNT
11DC                 43  SCODE DEFS    2              ;SEGMENT CODE
11DE                 44  VCODE DEFS    2           ; VALUE OF SEGMENT CODE
11E0                 45  FCTP  DEFS    1              ;FONT CALL TABLE POINTER
11E1                 46  PTSZ  DEFS    2              ;POINT SIZE
11E3                 47  OUTL  DEFS    2              ;OUTLINE STORE POINTER
11E5                 48  FLAG1 DEFS    1
                     49  NP    EQU     0              ;NEW PAGE STATUS
                     50  RWRD  EQU     1              ;RIGHT/WRONG READING MODE
                     51  FNTERR EQU    2           ; FONT LOAD ERROR FLAG
```

```
11E6        52  FLAG2   DEFS    1
            53  RXMIT   EQU     0           ;RETRANSMIT REQUEST
            54  COD1    EQU     1           ;FIRST CODE SWITCH
            55  OVF     EQU     2           ;OVERFLOW STATUS
            56  FCSW    EQU     3           ;FONT CALL SWITCH
            57  FSW     EQU     4           ;FONT SWITCH
            58  XPOSW   EQU     5           ;XPOS SWITCH
            59  YPOSW   EQU     6           ;YPOS SWITCH
            60  PSW     EQU     7           ;POINT SIZE SWITCH
11E7        61  RESM    DEFS    1           ;OUTPUT RESOLUTION MODE
            62  NORMPF  EQU     0           ;NORMAL/PROOF
            63  HILO    EQU     1           ;HI/LO RES.
11E8        64  FONTX   DEFS    2           ; INDEX FOR INRAM AND INSEG TABLES
            65                              ; ((FONT NUMBER-1)*544)
            66                  ; INPUT STATUS BYTE BIT DEFINITIONS
11EA        67  INSTAT  DEFS    1           ;INPUT STATUS BYTE
            68  NEWPG   EQU     0           ;NEW PAGE
            69  PROOF   EQU     3           ;PROOF PAGE
            70                  ;OCS STATUS BYTE BIT DEFINITIONS
            71  RAMRDY  EQU     0           ;RAM READY BIT
            72  X3RDY   EQU     3           ;8X300 READY BIT
            73  PTUFLT  EQU     4           ;PTU FAULT
            74  RMSELM  EQU     06H         ;RAM SELECT MASK
            75
            76                  ; INPUT SWITCHES
            77  RESMSW  EQU     0           ; MACHINE RESOLUTION
            78                              ; (0=1/10 , 1=1/5)
            79  PGSZSW  EQU     1           ; PAGE SIZE SWITCH
            80                              ; (0=8.5 , 1=11)
            81  RWRSW   EQU     2           ; RIGHT/WRONG READ MODE SWITCH
            82
            83
            84  NUMRAM  EQU     8           ;NO. OF FONT RAMS
            85  ;
            86  VECTOR  EQU     14H         ;1ST BYTE OF VECTOR TABLE
            87  ;
            88
            89
            90  RAMST   EQU     8000H       ;START OF DATA RAM
            91  RAMND   EQU     0F000H      ;END OF DATA RAM
            92
11EB        93  TEMP1   DEFS    2           ;TEMP. STORAGE
11ED        94  FNTRAM  DEFS    1           ; CURRENT FONT RAM SELECTED
11EE        95  LRUVAL  DEFS    1           ; LEAST RECENTLY USED COUNTER
            96
            97
            98  ;       PIO OPERATING MODE EQUATES
            99  OMODE   EQU     0FH         ;OUTPUT MODE
           100  IMODE   EQU     4FH         ;INPUT MODE
           101  BMODE   EQU     8FH         ;BIDIRECTIONAL MODE
           102  CMODE   EQU     0CFH        ;CONTROL MODE
           103
           104
           105
           106  ;      I/O PORT ADDRESS EQUATES
           107  ;
```

```
              108  PRTFRD  EQU     0       ;FONT RAM SELECT - DATA
              109  PRTFRC  EQU     2       ;       - CONTROL
              110  PRTDRD  EQU     1       ;DATA RAM SELECT/STATUS - DATA
              111  PRTDRC  EQU     3       ;       - CONTROL
              112  PRTISD  EQU     4       ;INPUT SWITCHES - DATA
              113  PRTISC  EQU     6       ;       - CONTROL
              114  PRTOLD  EQU     5       ;OUTPUT LIGHTS - DATA
              115  PRTOLC  EQU     7       ;       - CONTROL
              116  PRTIDD  EQU     8       ;INPUT DATA - DATA
              117  PRTIDC  EQU     10      ;       - CONTROL
              118  PRTICD  EQU     9       ;INPUT CONTROL - DATA
              119  PRTICC  EQU     11      ;       - CONTROL
              120  PRTODD  EQU     12      ;OUTPUT DATA - DATA
              121  PRTODC  EQU     14      ;       - CONTROL
              122  PRTOCD  EQU     13      ;OUTPUT CONTROL - DATA
              123  PRTOCC  EQU     15      ;       - CONTROL
              124
              125
11EF          126  DYTBL   DEFS    512     ;DELTA Y TABLE
              388  *LIST ON
              389  ;
              390  ;
              391  ;
              392  ;
14F0          393          ORG     14F0H
              394                  ; INTERRUPT VECTORS
14F0  8515  R 395          DEFW    RISB
14F2  F91F  R 396          DEFW    RAMSWI  ; INTERRUPT FOR RAM SWITCHING
14F4          397          DEFS    12
              398  ;
              399  ;
              400  ;
              401  ;
              402  ;
              403  INSEG   EQU     4000H-(544*8)       ; IN SEGMENT TABLE
              404                                      ;256 1-BIT ENTRIES
              405  INRAM   EQU     INSEG+32            ; IN RAM TABLE
              406                                      ;256 2-BYTE ENTRIES
              407  CINDEX  EQU     4000H   ; CHARACTER INDEX
              408                                      ;256 2-BYTE ENTRIES
              409  ;
              410  ;
              411  ;      BRANCH TO Z IF BIT X OF BYTE Y IS SET
              412  BSET   MACRO  #X,#Y,#Z
              413         LD     HL,#Y
              414         BIT    #X,(HL)
              415         JR     NZ,#Z
              416         ENDM
              417  ;
              418  ;
              419  ;
              420  ;
              421  ;      BRANCH TO Z IF BIT X OF BYTE Y IS RESET
              422  BRES   MACRO  #X,#Y,#Z
              423         LD     HL,#Y
              424         BIT    #X,(HL)
```

```
425            JR      Z,#Z
426            ENDM
427 ;
428 ;
429 ;
430 ;
431 ;    SET BIT X IN BYTE Y
432 SETB  MACRO   #X,#Y
433            LD      HL,#Y
434            SET     #X,(HL)
435            ENDM
436 ;
437 ;
438 ;
439 ;
440 ;
441 ;    RESET BIT X IN BYTE Y
442 RESB  MACRO   #X,#Y
443            LD      HL,#Y
444            RES     #X,(HL)
445            ENDM
446 *EJECT
```

```
1500                447            ORG     1500H
                    448    DMSINIT:
                    449 ;   THIS IS WHERE EXECUTION BEGINS AFTER
                    450 ;   THE DMS PROGRAM IS LOADED. THE ROUTINE
                    451 ;   WILL PERFORM AN INITIALIZATION FOR
                    452 ;   THE DMS SOFTWARE AND TRANSFER CONTROL
                    453 ;   TO DMS.
                    454 ;
                    455
                    456
                    457 ;  PIO INITIALIZATION
                    458 ;
                    459            ; OUTPUT OPERATING MODES
1500  3E0F          460            LD      A,OMODE ;OUTPUT MODE
1502  D302          461            OUT     (PRTFRC),A
1504  D307          462            OUT     (PRTOLC),A
1506  D30E          463            OUT     (PRTODC),A
                    464
1508  3E4F          465            LD      A,IMODE ;INPUT MODE
150A  D306          466            OUT     (PRTISC),A
                    467
150C  3ECF          468            LD      A,CMODE ;CONTROL MODE
150E  D30A          469            OUT     (PRTIDC),A
1510  D303          470            OUT     (PRTDRC),A
1512  D30B          471            OUT     (PRTICC),A
1514  D30F          472            OUT     (PRTOCC),A
1516  3E18          473            LD      A,18H   ;I/O BIT DEFNS. FOR CONTROL MODE
1518  D303          474            OUT     (PRTDRC),A
151A  3E0B          475            LD      A,0BH
151C  D30B          476            OUT     (PRTICC),A
151E  3E0C          477            LD      A,0CH
1520  D30F          478            OUT     (PRTOCC),A
1522  3EFF          479            LD      A,0FFH
1524  D30A          480            OUT     (PRTIDC),A   ;SET ALL BITS TO INPUT
```

```
                        481
                        482
                        483         ; LOAD INTERRUPT VECTORS
1526  3E14              484         LD    A,VECTOR      ;LOAD I REG. WITH TOP BYTE
1528  ED47              485         LD    I,A
                        486
152A  3EF0              487         LD    A,0F0H
152C  D30B              488         OUT   (PRTICC),A
152E  3EF2              489         LD    A,0F2H
1530  D303              490         OUT   (PRTDRC),A
                        491  *E
                        492  ;      SET INTERRUPT CONTROL WORD
1532  3E07              493         LD    A,07     ;INTERRUPTS OFF
1534  D302              494         OUT   (PRTFRC),A
1536  D306              495         OUT   (PRTISC),A
1538  D307              496         OUT   (PRTOLC),A
153A  D30A              497         OUT   (PRTIDC),A
153C  D30E              498         OUT   (PRTODC),A
153E  D30F              499         OUT   (PRTOCC),A
1540  3EB7              500         LD    A,0B7H   ;INTERRUPTS ON
1542  D303              501         OUT   (PRTDRC),A
1544  D30B              502         OUT   (PRTICC),A
1546  3EF7              503         LD    A,0F7H   ;MASKS FOR INTERRUPTS
1548  D303              504         OUT   (PRTDRC),A
154A  3EFD              505         LD    A,0FDH
154C  D30B              506         OUT   (PRTICC),A
154E  3EFF              507         LD    A,0FFH
1550  D309              508         OUT   (PRTICD),A
                        509
                        510
                        511  ;      INITIALIZE RAM SELECT BITS
1552  3E04              512         LD    A,04H    ;A=RAM SELECT CODE
1554  D301              513         OUT   (PRTDRD),A
1556  97                514         SUB   A        ; SET RWRD TO 0
1557  32E511  R         515         LD    (FLAG1),A
155A  ED5E              516         IM    2        ; SET TO INTERRUPT MODE 2
155C  FB                517         EI             ; AND ENABLE INTERRUPTS
                        518
                        519
                        520
                        521
155D  316410  R         522         LD    SP,STCKND    ;INITIALIZE STACK POINTER
1560  216615  R         523         LD    HL,DMS       ; EXECUTE DMS
1563  E5                524         PUSH  HL
1564  ED4D              525         RETI               ; EXECUTE A 'RETI'
                        526  *EJECT
                        527  ;             DMS
                        528  ;             THIS IS THE MAIN LOOP FOR THE DMS SUBSYSTEM
                        529  ;
                        530  ;
                        531  DMS:
1566  CD9415  R         532         CALL  IFNTR        ;INITIALIZE FONT TABLE
1569  0E01              533         LD    C,1     ; OUTPUT MESSAGE
156B  78                534         LD    A,B
156C  D60A              535         SUB   10
156E  2004              536         JR    NZ,A0103     ; BR IF >0 RAMS
1570  0E02              537         LD    C,2
```

```
1572  0601        538          LD    B,1
                  539  A0103:
1574  CD651F  R   540          CALL  ERROR
                  541  A0101:
1577  3E01        542          LD    A,01H
1579  CD3A20  R   543          CALL  LIGHTS
157C  21E511  R   544          LD    HL,FLAG1        ; SET NEW PAGE STATUS BIT
157F  CBC6        545          SET   NP,(HL)
                  546  A0102:
1581  CD9015  R   547          CALL  WAIT    ; WAIT FOR INTERRUPT
1584  3AEA11  R   548          LD    A,(INSTAT)      ; CK IF NEW PAGE READY
1587  CB47        549          BIT   NEWPG,A
1589  28F6        550          JR    Z,A0102 ; BR IF NO
158B  CDE415  R   551          CALL  BUILD           ;BUILD DATA RAMS
158E  18E7        552          JR    A0101           ;LOOP FOREVER
                  553
                  554
                  555
                  556
                  557
                  558  WAIT:   ; PERFORM TASKS WHEN DMS IN WAIT STATE
                  559
1590  00          560          NOP
1591  00          561          NOP
1592  00          562          NOP
                  563  ;       CALL  HWPTST
1593  C9          564          RET
                  565  *EJECT
                  566          IFNTR:
                  567  ;       THIS ROUTINE INITIALIZES THE FONT TABLE (FTBL)
                  568  ;       TO MARK ALL ACTIVE FONT RAMS AS EMPTY.
                  569  ;
                  570  ;
                  571  ;       B (W) - NO. OF ACTIVE FONTS + 10
                  572  ;       C REG. DESTROYED - NO OTHERS
                  573  ;
1594  F5          574          PUSH  AF
1595  E5          575          PUSH  HL
1596  0E08        576          LD    C,8     ;C(FONT TABLE COUNTER)=8
1598  060A        577          LD    B,10    ;B(ACTIVE FONTS COUNTER)=10
159A  216410  R   578          LD    HL,FTBL
159D  7E          579  A0201:  LD    A,(HL)  ;GET ENTRY FROM FTBL
159E  D6FF        580          SUB   255     ;IS IT 255?
15A0  2802        581          JR    Z,A0202 ;BR IF YES (INACTIVE)
15A2  97          582          SUB   A       ;ELSE STORE A ZERO
15A3  77          583          LD    (HL),A
15A4  04          584  A0202:  INC   B       ;AND INCREMENT ACTIVE FONT COUNTER
15A5  23          585          INC   HL      ;INC. FTBL POINTER
15A6  0D          586          DEC   C       ;DEC. COUNTER
15A7  20F4        587          JR    NZ,A0201        ;BR IF NOT ZERO
15A9  011000      588          LD    BC,16   ; CLEAR LINK AND LRU TABLES
15AC  216C10  R   589          LD    HL,LINK
15AF  CD2917  R   590          CALL  CLEAR
15B2  E1          591          POP   HL
15B3  F1          592          POP   AF
15B4  C9          593          RET
```

```
                            594 ;
                            595 ;
                            596 ;
                            597 ;
                            598 ;
                            599 ;
                            600 *E
                            601         RISB:
                            602 ;       THIS ROUTINE READS THE INPUT STATUS BYTE.
                            603 ;       ENTRY TO THIS ROUTINE IS BY INTERRUPT
                            604 ;       WHEN THE CTR BIT (BIT 1) OF PIO 9 IS SET.
                            605 ;
15B5  F3                    606         DI
15B6  DB08                  607         IN      A,(PRTIDD)
15B8  32EA11    R  608              LD      (INSTAT),A      ; STORE IN INSTAT
15BB  CB47                  609         BIT     0,A
15BD  200B                  610         JR      NZ,NPG   ; BIT 0 = NEW PAGE
15BF  CB4F                  611         BIT     1,A
15C1  200C                  612         JR      NZ,RSTRT     ; BIT 1 = RESTART
15C3  CB57                  613         BIT     2,A
15C5  200F                  614         JR      NZ,RST   ; BIT 2 = RESET
15C7  C30000    X  615              JP      RESTRT   ; ELSE ERROR - JUMP TO RESTART
                            616 NPG:
15CA  3E41                  617         LD      A,41H    ;
15CC  E1                    618         POP     HL       ; RETURN TO INTERRUPTED ROUTINE
15CD  180E                  619         JR      RETURN
                            620 RSTRT:
15CF  3E42                  621         LD      A,42H
15D1  210000    X  622              LD      HL,RESTRT
15D4  1807                  623         JR      RETURN
                            624 RST:
15D6  3E44                  625         LD      A,44H
15D8  210000    X  626              LD      HL,RESET
15DB  1800                  627         JR      RETURN
                            628 RETURN:
15DD  CD9E1F    R  629              CALL    OCNTRL   ; ACKNOWLEDGE THE INTERRUPT
                            630 RTRN:
15E0  E5                    631         PUSH    HL
15E1  FB                    632         EI
15E2  ED4D                  633         RETI
                            634 *EJECT
                            635 ;       BUILD
                            636 ;       THIS ROUTINE BUILDS RAMS FOR A PAGE AND LOOPS UNTIL
                            637 ;       AN END OF PAGE CODE IS FOUND.
                            638 ;
                            639 ;
                            640 ;       ALL REGS. DESTROYED.
                            641 BUILD:
                            642 A0400:
15E4  3E02                  643         LD      A,02H
15E6  CD3A20    R  644              CALL    LIGHTS
                            645
15E9  CD981F    R  646              CALL    DRSTAT   ; INPUT STATUS TO A REG.
15EC  CB67                  647         BIT     PTUFLT,A    ;CHECK IF PTU FAULT ON
15EE  280A                  648         JR      Z,A0402     ;BR IF NO
15F0  0602                  649 A0401:  LD      B,2         ;ERR=2
```

```
15F2  0E02        650          LD    C,2              ;CLASS=2
15F4  CD651F  R   651          CALL  ERROR            ;ERROR
15F7  C30000  X   652          JP    RESET            ;JUMP TO RESET
15FA  CD0516  R   653  A0402:  CALL  BLOCK            ;BUILD DATA RAM BLOCK
15FD  3AC811  R   654          LD    A,(ERC)          ;CHECK IF END OF PAGE
1600  FED3        655          CP    0D3H
1602  20E0        656          JR    NZ,A0400         ;LOOP IF NOT END OF PAGE
1604  C9          657          RET                    ;ELSE EXIT
                  658  ;
                  659  ;
                  660  ;
                  661  ;
                  662  *EJECT
                  663          BLOCK:
                  664  ;       THIS ROUTINE CONTROLS THE BUILDING OF A
                  665  ;       SINGLE RAM. LINE SEGMENTS ARE INPUT
                  666  ;       UNTIL A RAM IS FULL.
                  667  ;
                  668  ;       ALL REGS. DESTROYED
                  669  ;
                  670  ;
1605  CD4016  R   671          CALL  RINIT            ;INITIALIZE FOR NEW RAM
1608  3E00        672          LD    A,0              ;INITIALIZE INRAM TABLE
160A  CDC716  R   673          CALL  FRAMI
160D  21E511  R   674          LD    HL,FLAG1
1610  CB46        675          BIT   NP,(HL)          ;CHECK FOR NEW PAGE
1612  2806        676          JR    Z,A0502          ; BR IF NO
1614  CD6716  R   677          CALL  NPAGE            ; ELSE SET UP NEW PAGE
1617  CDE31F  R   678          CALL  RAMOUT           ; AND OUTPUT THE RAM
                  679  A0502:
161A  2AC911  R   680          LD    HL,(LSPTR)       ;SET TRAM=LSPTR
161D  22D511  R   681          LD    (TRAM),HL
1620  CDD418  R   682          CALL  NBLK             ;MARK THIS AS NEW BLOCK
1623  CD3417  R   683          CALL  PLRSG            ;PROCESS LAST RAM SEGMENT
                  684                                 ;(RECALL INCOMPLETED LINE SEGS.)
1626  210000      685  A0501:  LD    HL,0             ; INPUT A LINE SEGMENT
1629  CD5E17  R   686          CALL  SEGIN
162C  3AC811  R   687          LD    A,(ERC)          ;CHECK IF END RAM CONDITON SET
162F  B7          688          OR    A
1630  C0          689          RET   NZ               ;RETURN IF YES
1631  21A811  R   690          LD    HL,RLSTND        ;ELSE CHECK IF ROOM IN RLST
1634  ED5BCB11 R  691          LD    DE,(PLS)
1638  ED52        692          SBC   HL,DE
163A  20EA        693          JR    NZ,A0501         ;BR IF YES(PLS NOT=RLSTND)
163C  CDC217  R   694          CALL  BACK             ;ELSE MAX. LINE SEG. HAS BEEN REACHED
                  695                                 ;BACK UP THE RAM
163F  C9          696          RET
                  697  *EJECT
                  698          RINIT:
                  699  ;
                  700  ;       THIS ROUTINE INITIALIZES A RAM
                  701  ;
                  702  ;       H,L DESTROYED - NO OTHERS
                  703  ;
                  704  ;
1640  210280      705          LD    HL,RAMST+2       ;INITIALIZE LSPTR
1643  22C911  R   706          LD    (LSPTR),HL
```

```
1646  2100F0      707          LD    HL,RAMND        ;INITIALIZE OSPTR
1649  22CD11   R  708          LD    (OSPTR),HL
164C  210000      709          LD    HL,0
164F  22D311   R  710          LD    (YMAX),HL       ;YMAX=0
1652  7C          711          LD    A,H     ;ERC=0
1653  32C811   R  712          LD    (ERC),A
1656  2AD111   R  713          LD    HL,(YTOP)       ;VCODE=YTOP
1659  22DE11   R  714          LD    (VCODE),HL
165C  210020      715          LD    HL,2000H        ; TEMP = START OF INPUT
165F  22EB11   R  716          LD    (TEMP1),HL      ;DATA (FOR DEBUGGING)
1662  97          717          SUB   A
1663  32EE11   R  718          LD    (LRUVAL),A      ; SET LRUVAL=0
1666  C9          719          RET
                  720  *EJECT
                  721          NPAGE:
                  722  ;       THIS ROUTINE DOES THE INITIALIZATION FOR A
                  723  ;       NEW PAGE
                  724  ;
                  725  ;       A,B,H,L DESTROYED
                  726  ;
                  727  ;
1667  CD9B1F   R  728          CALL  MACHSW  ;READ MACHINE SWITCHES
                  729                        ;(PG. SIZE,RIGHT/WRONG,HI/LO)
166A  CB4F        730          BIT   PGSZSW,A        ;TEST PAGE SIZE
166C  210218      731          LD    HL,6146
166F  2003        732          JR    NZ,A0702        ;BR IF 8-1/2 INCHES
1671  21121F      733          LD    HL,7954 ;ELSE SET FOR 11 INCHES
1674  22CF11   R  734  A0702:  LD    (PSIZE),HL      ;SAVE PAGE SIZE VALUE
1677  B7          735          OR    A       ; RESET CARRY FLAG
1678  21E511   R  736          LD    HL,FLAG1
167B  CB4E        737          BIT   RWRD,(HL)       ; CK RIGHT/WRONG MODE
167D  2801        738          JR    Z,A0707 ; BR IF RIGHT READ
167F  37          739          SCF                   ; SET CARRY IF PREVIOUSLY WRONG READ MODE
1680  CB57        740  A0707:  BIT   RWRSW,A ; CK FOR CHANGE IN READ MODE
1682  2006        741          JR    NZ,A0706        ; BR IF RIGHT READ
1684  3808        742          JR    C,A0703 ; ELSE WRONG READ
                  743                                ; BR IF NO CHANGE
1686  CBCE        744          SET   RWRD,(HL)       ; ELSE SET FOR WRONG READ
1688  1804        745          JR    A0708   ; AND CLEAR FTBL
168A  3005        746  A0706:  JR    NC,A0703        ; BR IF NO CHANGE (RIGHT READ)
168C  CB8E        747          RES   RWRD,(HL)       ; ELSE RESET FOR RIGHT READ
                  748  A0708:
168E  CD9415   R  749          CALL  IFNTR   ; CLEAR FTBL TABLE (FONTS MUST
                  750                                ; BE READ IN BECAUSE OF MODE
                  751                                ; CHANGE)
1691  CB86        752  A0703:  RES   NP,(HL) ;RESET NP STATE
1693  0600        753          LD    B,0
1695  CB47        754          BIT   RESMSW,A        ;TEST FOR HI/LOW RES.
1697  2002        755          JR    NZ,A0704        ;JUMP IF LOW
1699  CBC8        756          SET   HILO,B  ;ELSE SET FOR HIGH RES.
169B  3AEA11   R  757  A0704:  LD    A,(INSTAT)      ;LOAD SAVED STATUS BYTE
169E  CB5F        758          BIT   PROOF,A ; CHECK FOR PROOF PAGE
16A0  2802        759          JR    Z,A0705 ;BR IF NORMAL
16A2  CBC0        760          SET   NORMPF,B        ;ELSE SET FOR PROOF
                  761  A0705:
16A4  78          762          LD    A,B
```

```
16A5  32E711  R  763          LD    (RESM),A      ;SET RESM
16A8  210080     764          LD    HL,RAMST      ;SET LSPTR=TOP OF RAM
16AB  22C911  R  765          LD    (LSPTR),HL
16AE  26CC       766          LD    H,0CCH        ;HL=CODE
16B0  68         767          LD    L,B
16B1  CD2E1F  R  768          CALL  RAMS          ;STORE CODE IN DATA RAM
16B4  210000     769          LD    HL,0
16B7  22D311  R  770          LD    (YMAX),HL     ;SET YMAX=0
16BA  22DE11  R  771          LD    (VCODE),HL    ;SET VCODE=0
16BD  217C10  R  772          LD    HL,RLST       ;PLS=TOP OF RLST
16C0  22CB11  R  773          LD    (PLS),HL
16C3  23        774           INC   HL
16C4  CBFE      775           SET   7,(HL)        ;SET MSB IN 1ST WORD OF RLST
16C6  C9        776           RET
                777  *EJECT
                778           FRAMI:
                779  ;        THIS IS THE FONT RAM INITIALIZATION
                780  ;        ROUTINE.  IT WILL CLEAR THE INRAM TABLE
                781  ;        (IF ARG=0) OR THE INSEG TABLE (IF ARG NOT=0).
                782  ;
                783  ;        A REG. (R/D) - ARG
                784  ;        A,B,C,H,L REGS. DESTROYED  NO OTHERS
                785  ;
16C7  D5        786           PUSH  DE
16C8  F5        787           PUSH  AF            ;SAVE ARG
16C9  216410  R  788          LD    HL,FTBL       ;SET HL TO TOP OF FTBL
16CC  1601      789           LD    D,1           ;SET COUNTER
                790  A0801:
16CE  7E        791           LD    A,(HL)        ;IS THIS RAM ACTIVE?
16CF  D6FF      792           SUB   255
16D1  2822      793           JR    Z,A0804       ;BR IF NOT ACTIVE
16D3  42        794           LD    B,D           ;B=RAM NUMBER
16D4  CDFF16  R  795          CALL  FINDEX        ;SET FONT RAM INDEX VALUE
16D7  F1        796           POP   AF
16D8  F5        797           PUSH  AF
16D9  E5        798           PUSH  HL
16DA  B7        799           OR    A
16DB  2808      800           JR    Z,A0802       ;BR IF INRAM INITIALIZE
16DD  012000    801           LD    BC,32         ;ELSE CLEAR INSEG TABLE
16E0  21002F    802           LD    HL,INSEG
16E3  CD2117  R  803          CALL  IX1
16E6  1809      804           JR    A0803
16E8  010002    805  A0802:   LD    BC,512        ;CLEAR INRAM TABLE
16EB  21202F    806           LD    HL,INRAM
16EE  CD2117  R  807          CALL  IX1
16F1  CD2917  R  808  A0803:  CALL  CLEAR
16F4  E1        809           POP   HL
                810  A0804:
16F5  23        811           INC   HL            ;INCREMENT INDEX INTO FTBL
16F6  14        812           INC   D
16F7  3E08      813           LD    A,NUMRAM      ;INC COUNTER
16F9  BA        814           CP    D             ;AND CHECK IF DONE
16FA  30D2      815           JR    NC,A0801      ;BR IF NOT DONE
16FC  F1        816           POP   AF
16FD  D1        817           POP   DE
16FE  C9        818           RET                 ;ELSE EXIT
```

```
                    819  *E
                    820          FINDEX:
                    821   ;      THIS ROUTINE GETS THE FONT RAM INDEX VALUE
                    822   ;      TO BE ADDED TO ALL REFERENCES TO INRAM OR
                    823   ;      INSEG. THE VALUE IS STORED IN FONTX.
                    824   ;
                    825   ;      B (R) - RAM NUMBER
                    826   ;      NO REGS. DESTROYED
                    827   ;
16FF  D5            828          PUSH    DE
1700  E5            829          PUSH    HL
1701  1600          830          LD      D,0
1703  58            831          LD      E,B
1704  210F17  R     832          LD      HL,INDXTBL-2
1707  CD4818  R     833          CALL    LDDX    ; GET VALUE FROM TABLE
170A  ED53E811 R    834          LD      (FONTX),DE    ; STORE IN FONTX
170E  E1            835          POP     HL
170F  D1            836          POP     DE
1710  C9            837          RET
                    838
                    839  INDXTBL:
1711  0000          840          DEFW    0
1713  2002          841          DEFW    544
1715  4004          842          DEFW    544*2
1717  6006          843          DEFW    544*3
1719  8008          844          DEFW    544*4
171B  A00A          845          DEFW    544*5
171D  C00C          846          DEFW    544*6
171F  E00E          847          DEFW    544*7
                    848  *E
                    849          IX1:
                    850   ;      THIS ROUTINE ADDS THE INDEX TO POINT TO THE
                    851   ;      APPROPRIATE FONT TABLE
                    852
1721  D5            853          PUSH    DE
1722  ED5BE811 R    854          LD      DE,(FONTX)
1726  19            855          ADD     HL,DE
1727  D1            856          POP     DE
1728  C9            857          RET
                    858   ;
                    859   ;
                    860   ;
                    861   ;
                    862          CLEAR:
                    863   ;      THIS ROUTINE WILL CLEAR A DATA BLOCK
                    864   ;      HL(R/D) - STARTING ADDRESS OF BLOCK
                    865   ;      BC(R/D) - NO. OF BYTES TO CLEAR
                    866   ;
1729  F5            867          PUSH    AF
172A  3600          868  U0100:  LD      (HL),0
172C  23            869          INC     HL
172D  0B            870          DEC     BC
172E  78            871          LD      A,B
172F  B1            872          OR      C       ;CHECK IF COUNTER = 0
1730  20F8          873          JR      NZ,U0100    ;BR IF NO
1732  F1            874          POP     AF
1733  C9            875          RET
```

```
                876  *EJECT
                877        PLRSG:
                878    ;   THIS ROUTINE WILL PROCESS THE LAST RAM SEGMENT
                879    ;   TABLE. IT WILL RECALL ALL LINE SEGMENTS
                880    ;   NOT COMPLETED IN THE PREVIOUS RAM.
                881    ;
1734  217C10  R 882        LD    HL,RLST      ;SET PLS,PLS1=TO OF RLST
1737  22CB11  R 883        LD    (PLS),HL
173A  5E        884 A0901: LD    E,(HL)       ;GET ENTRY AT PLS1 (SEG. #)
173B  23        885        INC   HL
173C  56        886        LD    D,(HL)
173D  7A        887        LD    A,D          ;CHECK IF LAST ENTRY (MSB=1)
173E  E680      888        AND   80H
1740  C0        889        RET   NZ           ;RETURN IF YES
1741  D5        890        PUSH  DE           ;SAVE SEG. NO.
1742  23        891        INC   HL           ;GET YLOW ENTRY
1743  5E        892        LD    E,(HL)
1744  23        893        INC   HL
1745  56        894        LD    D,(HL)
1746  23        895        INC   HL
1747  E5        896        PUSH  HL           ;SAVE PLS1
1748  7A        897        LD    A,D          ;CHECK IF 0 (YLOW NEVER ISSUED)
1749  B3        898        OR    E
174A  280A      899        JR    Z,A0902      ;BR IF YES(RECALL SEGMENT)
174C  2AD111  R 900        LD    HL,(YTOP)    ;ELSE CHECK IF >= YTOP
174F  EB        901        EX    DE,HL
1750  ED52      902        SBC   HL,DE
1752  E1        903        POP   HL           ;HL=PLS1
1753  D1        904        POP   DE           ;DE=SEG. NO.
1754  38E4      905        JR    C,A0901      ;BR IF NO (DON'T RECALL)
                906 A0902:
1756  E5        907        PUSH  HL           ;SAVE PLS1
1757  EB        908        EX    DE,HL        ;HL=SEG. NO.
1758  CD5E17  R 909        CALL  SEGIN        ;RECALL SEGMENT
175B  E1        910        POP   HL           ;HL=PLS1
175C  18DC      911        JR    A0901        ;LOOP TO CHECK NEXT ENTRY
                912  *EJECT
                913        SEGIN:
                914    ;   THIS IS THE LINE SEGMENT INPUT ROUTINE. ENTER
                915    ;   WITH THE SEGMENT NUMBER TO BE INPUT AND EXIT
                916    ;   WHEN A)END PAGE FOUND B)END SEGMENT FOUND OR
                917    ;   C)RAM IS FULL.
                918    ;
                919    ;   HL(R/D) - SEGMENT NUMBER (0 INDICATES NEXT SEG.)
                920    ;   ERC (W) - =03H IF END PAGE
                921    ;             =02H IF RAM FULL
                922    ;             =0  IF RAM NOT COMPLETED
                923    ;   A,D,E,H,L REGS. DESTROYED
                924    ;
175E  97        925        SUB   A            ;SET RETRY COUNTER RCNT=0
175F  32DB11  R 926        LD    (RCNT),A
1762  CDF617  R 927 A0A01: CALL  SINIT        ;INITIALIZE FOR NEW LINE SEGMENT
1765  CDCA1F  R 928        CALL  SGET         ;INPUT L.S. NUMBER
1768  EB        929        EX    DE,HL
1769  2100E0    930        LD    HL,0E000H    ;CK IF END PAGE CODE
176C  B7        931        OR    A
```

```
1760  ED52         932            SBC    HL,DE
176F  283C         933            JR     Z,A0A07 ; BR IF YES
                   934  A0A06:
1771  2ACB11  R    935            LD     HL,(PLS)      ; ELSE STORE SEG. # AT PLS
1774  73           936            LD     (HL),E
1775  23           937            INC    HL
1776  72           938            LD     (HL),D
                   939  A0A04:
1777  CDCA1F  R    940            CALL   SGET    ; INPUT NEXT CODE
177A  22DC11  R    941            LD     (SCODE),HL    ; STORE IN SCODE
177D  CD2418  R    942            CALL   FUNC    ; EXECUTE THE FUNCTION
                   943            BRES   RXMIT,FLAG2,A0A02 ; BR IF RXMIT OFF
1780  21E611  R                   LD     HL,FLAG2
1783  CB46                        BIT    RXMIT,(HL)
1785  2809                        JR     Z,A0A02
1787  2ACB11  R    944            LD     HL,(PLS)      ; ELSE GET SEG. # AT PLS
178A  56           945            LD     D,(HL)
178B  23           946            INC    HL
178C  5E           947            LD     E,(HL)
178D  EB           948            EX     DE,HL
178E  18D2         949            JR     A0A01   ; AND RETRANSMIT
1790  21E611  R    950  A0A02:    LD     HL,FLAG2      ;RESET 1ST CODE SWITCH
1793  CB8E         951            RES    COD1,(HL)
1795  CB56         952            BIT    OVF,(HL)      ;CHECK IF OVERFLOW SET
1797  2018         953            JR     NZ,A0A08      ;BR IF YES
1799  ED5BDC11 R   954  A0A03:    LD     DE,(SCODE)    ;IS SCODE=END SEG.
179D  2100DC       955            LD     HL,0DC00H
17A0  B7           956            OR     A
17A1  ED52         957            SBC    HL,DE
17A3  280F         958            JR     Z,A0A05 ;BR IF YES
17A5  21000E       959            LD     HL,0E00H      ; CK IF END PAGE CODE
17A8  B7           960            OR     A
17A9  ED52         961            SBC    HL,DE
17AB  20CA         962            JR     NZ,A0A04      ;BR IF NO (GET NEXT CODE)
17AD  CD1618  R    963  A0A07:    CALL   EPAGE   ; TERMINATE RAM
17B0  C9           964            RET
17B1  CDC217  R    965  A0A08:    CALL   BACK    ; BACK UP TO LAST GOOD BLOCK
17B4  110400       966  A0A05:    LD     DE,4    ;PLS=PLS+4
17B7  2ACB11  R    967            LD     HL,(PLS)
17BA  19           968            ADD    HL,DE
17BB  22CB11  R    969            LD     (PLS),HL
17BE  23           970            INC    HL
17BF  CBFE         971            SET    7,(HL)  ;SET MSB AT PLS (MARKING
                   972                           ;LAST SEGMENT ENTRY)
17C1  C9           973            RET
                   974  *EJECT
                   975            BACK:
                   976  ;         THIS ROUTINE WILL BACK UP THE POINTER TO THE
                   977  ;         LAST COMPLETE LINE SEGMENT BEFORE THE NEW
                   978  ;         Y COORDINATE.
                   979  ;
                   980  ;         ALL REGS. DESTROYED
                   981  ;
                   982  ;
17C2  B7           983            OR     A       ;CHECK IF WE CAN OUTPUT ANY DATA
17C3  ED5B0711 R   984            LD     DE,(BLKA)     ;(IS BLOCK ADDRESS=TOP OF RAM
```

```
17C7  2AD511   R  985          LD    HL,(TRAM)
17CA  ED52        986          SBC   HL,DE
17CC  2800        987          JR    Z,A0B01  ;BR IF NO (ERROR)
17CE  ED53C911 R  988          LD    (LSPTR),DE  ;ELSE SET LSPTR=BLKA
17D2  2AD111   R  989          LD    HL,(YTOP)   ;YMAX=YTOP-1
17D5  2B          990          DEC   HL
17D6  22D311   R  991          LD    (YMAX),HL
17D9  1800        992          JR    A0B02
17DB  0E01        993  A0B01:  LD    C,1      ;ERROR:CLASS=1,ERR=9
17DD  0609        994          LD    B,9
17DF  CD651F   R  995          CALL  ERROR
17E2  2AD911   R  996          LD    HL,(SGST)   ;LSPTR=SGST
17E5  22C911   R  997          LD    (LSPTR),HL
17E8  3ED2        998  A0B02:  LD    A,0D2H   ;SET ERC=RAM COMPLETE
            999                                ;/NOT END OF PAGE
17EA  32C811   R 1000          LD    (ERC),A
17ED  3E48       1001          LD    A,48H    ;OUTPUT STOP TRANSMISSION CONTROL
17EF  CD9E1F   R 1002          CALL  OCNTRL
17F2  CD0F1F   R 1003          CALL  OUTRAM   ;OUTPUT THE RAM
17F5  C9         1004          RET
           1005  *EJECT
           1006        SINIT:
           1007  ;     THIS ROUTINE DOES THE INITIALIZATION FOR
           1008  ;     A NEW LINE SEGMENT INPUT.
           1009  ;     HL (R/D) - SEGMENT NUMBER
           1010  ;     A REG. DESTROYED - NO OTHERS
           1011  ;
           1012  ;
17F6  E5         1013          PUSH  HL       ;SAVE SEGMENT NUMBER
17F7  3E02       1014          LD    A,02H    ;SET COD1, RESET RXMIT,OVF
17F9  32E611   R 1015          LD    (FLAG2),A   ;FSW,PSW,XPOSW,YPOSW,FCSW
           1016                                ;***CHANGE ABOVE LOGIC IF BIT
           1017                                ;***POSITIONS ARE REVISED.
17FC  2AC911   R 1018          LD    HL,(LSPTR)  ;MARK START OF SEGMENT
17FF  220911   R 1019          LD    (SGST),HL
1802  210000     1020          LD    HL,0     ;INIT. FONT TABLE PTR. TO 0
1805  22E011   R 1021          LD    (FCTP),HL
1808  7C         1022          LD    A,H      ;SET YLOW OF THIS SEG. TO 0
1809  2ACB11   R 1023          LD    HL,(PLS)    ;(PLS+2 = 0)
180C  23         1024          INC   HL
180D  23         1025          INC   HL
180E  77         1026          LD    (HL),A
180F  23         1027          INC   HL
1810  77         1028          LD    (HL),A
1811  E1         1029          POP   HL       ;GET SEGMENT NUMBER
1812  CDA61F   R 1030          CALL  XMITRQ   ;OUTPUT SEGMENT NUMBER REQUEST
1815  C9         1031          RET
           1032  ;
           1033  ;
           1034  ;
           1035  ;
           1036  ;
           1037  *EJECT
           1038        EPAGE:
           1039  ;     THIS ROUTINE PROCESSES AN END OF PAGE CODE
           1040  ;
```

```
                    1041 ;     A REG. DESTROYED. NO OTHERS
                    1042 ;
1816  3ED3          1043       LD    A,0D3H   ;ERC=END OF PAGE
1818  32C811   R    1044       LD    (ERC),A
181B  3EC1          1045       LD    A,0C1H   ;OUTPUT END PAGE ACKNOWLEDGE
181D  CD9E1F   R    1046       CALL  OCNTRL
1820  CD0F1F   R    1047       CALL  OUTRAM   ;OUTPUT THE RAM
1823  C9            1048       RET
                    1049 ;
                    1050 ;
                    1051 ;
                    1052 ;
                    1053 ;
                    1054 *EJECT
                    1055       FUNC:
                    1056 ;     THIS ROUTINE DECODES THE 2 MSB AND
                    1057 ;     TRANSFERS CONTROL TO A FUNCTION
                    1058 ;
                    1059 ;     HL (R/D) - SCODE
                    1060 ;     DE (W)   - VCODE
                    1061 ;
1824  E5            1062       PUSH  HL
1825  7C            1063       LD    A,H      ;SET VCODE=BITS 13-0 OF SCODE
1826  E63F          1064       AND   3FH
1828  67            1065       LD    H,A
1829  22DE11   R    1066       LD    (VCODE),HL
182C  E3            1067       EX    (SP),HL  ;HL=SCODE , SAVE VCODE
182D  7C            1068       LD    A,H      ;CHECK 2 MSB FOR THE FUNCTION
182E  E6C0          1069       AND   0C0H
1830  CB07          1070       RLC   A        ;MOVE TO LSB POSITION
1832  CB07          1071       RLC   A
1834  214018   R    1072       LD    HL,FNCTBL ;GET ROUTINE ADDRESS
1837  5F            1073       LD    E,A
1838  1600          1074       LD    D,0
183A  CD4818   R    1075       CALL  LDDX
183D  E1            1076       POP   HL       ;HL=VCODE
183E  EB            1077       EX    DE,HL    ;HL=ADDRESS DE=VCODE
183F  E9            1078       JP    (HL)     ;EXECUTE THE FUNCTION
                    1079                      ;(THE FUNCTION WILL RETURN
                    1080                      ;TO THIS ROUTINES CALLER)
                    1081 ;
                    1082 ;
                    1083 ;
                    1084 ;
1840  E718     R    1085 FNCTBL: DEFW  YLOW
1842  8F18     R    1086         DEFW  YPOS
1844  1719     R    1087         DEFW  XPOS
1846  4F18     R    1088         DEFW  SUBFCN
                    1089 ;
                    1090 ;
                    1091 ;
                    1092 ;
                    1093 ;
                    1094       LDDX:
                    1095       GETS 2-BYTE VALUE FROM A TABLE
                    1096 ;
```

```
                    1097  ;      HL (R) - POINTER TO A TABLE
                    1098  ;      DE (R) - ENTRY NUMBER (1ST IS 0)
                    1099  ;      DE (W) - 2 BYTE VALUE FROM TABLE
                    1100  ;
1843   19           1101         ADD     HL,DE
1849   19           1102         ADD     HL,DE
184A   5E           1103         LD      E,(HL)
184B   23           1104         INC     HL
184C   56           1105         LD      D,(HL)
184D   2B           1106         DEC     HL
184E   C9           1107         RET
                    1108  *EJECT
                    1109  SUBFCN:
                    1110  ;      THIS ROUTINE DECODES THE SUBFUNCTION
                    1111  ;      BITS (13-10) AND TRANSFERS CONTROL TO THE
                    1112  ;      FUNCTION.
                    1113  ;
                    1114  ;      DE (R) - VCODE
                    1115  ;
184F   2ADC11  R    1116         LD      HL,(SCODE)
1852   E5           1117         PUSH    HL      ;SAVE SCODE
1853   7C           1118         LD      A,H     ;SET VCODE=BITS 9-0 OF SCODE
1854   E603         1119         AND     03H
1856   67           1120         LD      H,A
1857   22DE11  R    1121         LD      (VCODE),HL
185A   E3           1122         EX      (SP),HL ;HL=SCODE , SAVE VCODE
185B   7C           1123         LD      A,H     ;CHECK BITS 13-10
185C   E63C         1124         AND     3CH
185E   CB2F         1125         SRA     A       ;SHIFT TO LSB POSITION
1860   CB2F         1126         SRA     A
1862   FE09         1127         CP      9       ;CHECK IF >8
1864   3809         1128         JR      C,A0F01 ;BR IF NO
1866   0E01         1129         LD      C,1     ;ELSE ERROR=5, CLASS=1
1868   0605         1130         LD      B,5
186A   CD791F  R    1131         CALL    SERROR
186D   E1           1132         POP     HL
186E   C9           1133         RET             ;AND RETURN
186F   217B18  R    1134  A0F01: LD      HL,SUBTBL    ;GET ADDRESS OF SUB
1872   1600         1135         LD      D,0
1874   5F           1136         LD      E,A
                    1137                          ;FUNCTION
1875   CD4818  R    1138         CALL    LDDX
1878   E1           1139         POP     HL
1879   EB           1140         EX      DE,HL   ;DE=VCODE , HL=ADDRESS
187A   E9           1141         JP      (HL)    ; EXECUTE THE SUBFUNCTION
                    1142                          ;(IT WILL RETURN TO THE
                    1143  ;                        ROUTINE THAT CALLED FUNC)
                    1144  ;
                    1145  ;
                    1146  ;
                    1147  ;
                    1148  SUBTBL:
187B   3119    R    1149         DEFW    CHAR
187D   281C    R    1150         DEFW    FONT
187F   DC1A    R    1151         DEFW    PTSIZE
1881   7D1B    R    1152         DEFW    SETWIDTH
```

```
1883  981F    R 1153           DEFW    BLJ
1885  BB1A    R 1154           DEFW    SLANT
1887  CA1E    R 1155           DEFW    RVCONT
1889  721C    R 1156           DEFW    ESEG
188B  771C    R 1157           DEFW    ESEG1   ;(IF EPAGE CODE THEN EX-
                    1158 ;                             ECUTE ESEG. THE EPAGE ROUTINE
                    1159 ;                             WILL EXECUTE AFTER RETURNING
                    1160 ;                             TO SEGIN)
188D  CA1E    R 1161           DEFW    RVCONT  ; FOR THE RULE FUNCTION
                    1162 ;                             SAME INPUT AS FOR REVERSE VIDEO
                    1163 *EJECT
                    1164           YPOS:
                    1165 ; PROCESS YPOS CODE
                    1166 ;
                    1167 ; DE (R) - VCODE
                    1168 ;
188F  21E611  R 1169           LD      HL,FLAG2        ;IS 1ST CODE SW. ON?
1892  CB4E      1170           BIT     COD1,(HL)
1894  2008      1171           JR      NZ,A1001        ;BR IF YES
1896  0E01      1172           LD      C,1     ;ELSE ERROR=4 , CLASS=1
1898  0604      1173           LD      B,4
189A  CD791F  R 1174           CALL    SERROR
189D  C9        1175           RET
189E  B7        1176 A1001:    OR      A
189F  EB        1177           EX      DE,HL   ;COMPARE YPOS AND YTOP
18A0  ED5BD111 R 1178          LD      DE,(YTOP)       ;(YPOS IS IN VCODE)
18A4  ED52      1179           SBC     HL,DE
18A6  3805      1180           JR      C,A1002         ;BR IF YPOS<YTOP (ERROR)
18A8  C4D418  R 1181           CALL    NZ,NBLK ;IF NOT 0 THEN YPOS>YTOP
                    1182 ;                             SET UP NEW BLOCK
18AB  1813      1183           JR      A1003
18AD  0E01      1184 A1002:    LD      C,1     ;ERROR=2 , CLASS=1
18AF  0602      1185           LD      B,2
18B1  CD791F  R 1186           CALL    SERROR
18B4  2AD111  R 1187           LD      HL,(YTOP)       ;SET YPOS=YTOP
                    1188 ;                             ;(PRINT IN SAME BLOCK)
18B7  22DE11  R 1189           LD      (VCODE),HL
18BA  21E611  R 1190           LD      HL,FLAG2        ;IS RETRANS. REQ. ON?
18BD  CB46      1191           BIT     RXMIT,(HL)
18BF  C0        1192           RET     NZ      ;RETURN IF YES
18C0  2ADE11  R 1193 A1003:    LD      HL,(VCODE)      ;STORE YTOP CODE IN RAM
18C3  CBF4      1194           SET     6,H     ;FOR YTOP CODE
18C5  CD2E1F  R 1195           CALL    RAMS
18C8  210000    1196           LD      HL,00   ;STORE A 0 IN RAM
18CB  CD2E1F  R 1197           CALL    RAMS
18CE  21E611  R 1198           LD      HL,FLAG2        ;SET YPOS SW.
18D1  CBF6      1199           SET     YPOSW,(HL)
18D3  C9        1200           RET
                    1201 *EJECT
                    1202           NBLK:
                    1203 ; THIS ROUTINE INITIALIZES FOR A NEW
                    1204 ; BLOCK
                    1205 ;
                    1206 ; HL DESTROYED - NO OTHERS
                    1207 ;
18D4  2AC911  R 1208           LD      HL,(LSPTR)      ;BLKA=LSPTR
```

```
1807  220711    R 1209            LD      (BLKA),HL
180A  210000      1210            LD      HL,00    ;PTSZ=0
180D  22E111    R 1211            LD      (PTSZ),HL
18E0  2ADE11    R 1212            LD      HL,(VCODE)        ;YTOP=VCODE
18E3  22D111    R 1213            LD      (YTOP),HL
18E6  C9          1214            RET
                  1215  *EJECT
                  1216          YLOW:
                  1217  ;       THIS ROUTINE PROCESSES A YLOW CODE.
                  1218  ;
                  1219  ;       DE (R) - YLOW VALUE
                  1220  ;
18E7  21E611    R 1221            LD      HL,FLAG2          ;IS YPOS SW. SET?
18EA  CB76        1222            BIT     YPOSW,(HL)
18EC  2008        1223            JR      NZ,A1201          ;BR IF YES
18EE  0608        1224            LD      B,8      ;ELSE ERROR=8 , CLASS=1
18F0  0E01        1225            LD      C,1
18F2  CD791F    R 1226            CALL    SERROR
18F5  C9          1227            RET
18F6  B7          1228  A1201:    OR      A
18F7  DD2ACB11  R 1229            LD      IX,(PLS)          ;IS CODE AT PLS+2
                  1230                                      ;>= YLOW?
18FB  DD6E02      1231            LD      L,(IX+2)          ;HL=CURRENT YLOW
18FE  DD6603      1232            LD      H,(IX+3)
1901  ED52        1233            SBC     HL,DE
1903  3007        1234            JR      NC,A1202          ;BR IF YES
                  1235                             ;ELSE THIS IS THE LARGER YLOW
1905  DD7302      1236            LD      (IX+2),E          ;STORE AT PLS+2
1908  DD7203      1237            LD      (IX+3),D
190B  3F          1238            CCF
190C  2AD311    R 1239  A1202:    LD      HL,(YMAX)         ;IS THIS YLOW>YMAX?
190F  ED52        1240            SBC     HL,DE
1911  D0          1241            RET     NC       ;RETURN IF NO
1912  ED530311  R 1242            LD      (YMAX),DE         ;ELSE USE AS NEW YMAX
1916  C9          1243            RET
                  1244  *EJECT
                  1245          XPOS:
                  1246  ;THIS ROUTINE PROCESSES AN XPOS CODE
                  1247  ;
                  1248  ;       DE (R/D) - VCODE
                  1249  ;
1917  D5          1250            PUSH    DE       ;SET HL=VCODE
1918  E1          1251            POP     HL
1919  3AE511    R 1252            LD      A,(FLAG1)         ;WRONG READ MODE?
191C  CB4F        1253            BIT     RWRD,A
191E  2806        1254            JR      Z,A1301  ;BR IF NO
1920  B7          1255            OR      A
1921  2ACF11    R 1256            LD      HL,(PSIZE)        ;ELSE XPOS=PSIZE-XPOS
1924  ED52        1257            SBC     HL,DE
                  1258  A1301:
1926  CBFC        1259            SET     7,H      ;SET FOR XPOS CODE
1928  CD2E1F    R 1260            CALL    RAMS     ;STORE XPOS CODE
192B  21E611    R 1261            LD      HL,FLAG2          ;SET XPOS SW.
192E  CBEE        1262            SET     XPOSW,(HL)
1930  C9          1263            RET
```

```
                1264  *EJECT
                1265        CHAR:
                1266  ;     THIS ROUTINE PROCESS A CHAR. CODE
                1267  ;     IT WILL MOVE THE OUTLINE INTO RAM
                1268  ;     IF THE FONT IS PRESENT.
                1269  ;
                1270  ;     DE (R/D) - VCODE
                1271  ;
                1272  ;
                1273        BRES   FSW,FLAG2,A1401 ;BR IF FONT SW OFF
1931  21E611  R        LD     HL,FLAG2
1934  CB66              BIT    FSW,(HL)
1936  2804              JR     Z,A1401
1938  CB7E    1274     BIT    PSW,(HL)         ;TEST POINT SIZE SW
193A  2008    1275     JR     NZ,A1402         ;BR IF ON
193C  0603    1276 A1401: LD   B,3      ;ERROR=3 , CLASS=1
193E  0E01    1277     LD     C,1
1940  CD791F  R 1278   CALL   SERROR ;CALL ERROR ROUTINE
1943  C9      1279     RET            ;AND RETURN
1944  CB5E    1280 A1402: BIT  FCSW,(HL)       ;CHECK IF FONT IN A FONT RAM
1946  2803    1281     JR     Z,A1403 ;BR IF YES
                1282                  ;ELSE CREATE SPECIAL CHAR WORD
1948  EB      1283     EX     DE,HL   ;(H=0 , L=CHAR CODE)
1949  1837    1284     JR     A1405
                1285 A1403:
194B  3A0040  1286     LD     A,(CINDEX)      ; GET MAX. CHAR. NO.
194E  6F      1287     LD     L,A
194F  2600    1288     LD     H,0
1951  B7      1289     OR     A
1952  ED52    1290     SBC    HL,DE   ; COMPARE WITH CHAR. NO.
1954  380E    1291     JR     C,A1406 ; BR IF TOO BIG (ERROR)
1956  210140  1292     LD     HL,CINDEX+1     ; ELSE CK IF OUTLINE IN FONT
1959  D5      1293     PUSH   DE      ;BC=VCODE
195A  C1      1294     POP    BC
195B  CD4818  R 1295   CALL   LDDX    ;DE=OUTLINE PTR IN FONT RAM
195E  7A      1296     LD     A,D
195F  B3      1297     OR     E       ;(IF 0 THEN NOT DEFINED)
1960  53      1298     LD     D,E
1961  5F      1299     LD     E,A
1962  2008    1300     JR     NZ,A1404        ;BR IF YES
                1301 A1406:
1964  0E01    1302     LD     C,1     ;ELSE ERROR=A , CLASS=1
1966  060A    1303     LD     B,0AH
1968  CD651F  R 1304   CALL   ERROR
196B  C9      1305     RET
196C  C5      1306 A1404: PUSH BC       ;SAVE VCODE
196D  CD8619  R 1307   CALL   OLINE   ;MOVE IN OUTLINE
1970  21202F  1308     LD     HL,INRAM        ;CREATE CHAR WORD
                1309                  ;(RAM ADDRESS OF OUTLINE)
1973  D1      1310     POP    DE      ;GET OUTLINE ADDRESS FROM
                1311                  ;INRAM TABLE
1974  CD2117  R 1312   CALL   IX1
1977  CD4818  R 1313   CALL   LDDX
197A  EB      1314     EX     DE,HL   ;HL=OUTLINE ADDRESS
197B  3E7F    1315     LD     A,7FH   ;USE (ADDRESS-32K)/2
197D  A4      1316     AND    H
197E  1F      1317     RRA
197F  CB1D    1318     RR     L
```

```
1981  67             1319              LD     H,A
1982  CD2E1F   R 1320  A1405:  CALL   RAMS         ;STORE INTO DATA RAM
1985  C9             1321              RET
                     1322  *EJECT
                     1323           OLINE:
                     1324  ;        THIS ROUTINE CHECKS IF AN OUTLINE
                     1325  ;        IS IN THE DATA RAM AND/OR IN
                     1326  ;        THE SEGMENT. IF NOT IN RAM, THEN THE
                     1327  ;        OUTLINE IS COPIED FROM THE FONT RAM.
                     1328  ;        IF IN RAM BUT NOT IN THIS SEGMENT, THEN
                     1329  ;        THE OUTLINE IS COPIED FROM THE LAST SEG-
                     1330  ;        MENT CONTAINING THE OUTLINE IN THIS RAM.
                     1331  ;
                     1332  ;        DE (R/O) - POINTER WHERE OUTLINE
                     1333  ;                   IS STORED IN FONT RAM
                     1334  ;        BC (R/O) - CHARACTER CODE
                     1335  ;
1986  7A             1336              LD     A,D          ; GET LINK BITS
1987  E6C0           1337              AND    0C0H
1989  07             1338              RLCA
198A  07             1339              RLCA
198B  B7             1340              OR     A
198C  C4261A   R 1341              CALL   NZ,FLINK     ; SWITCH RAMS IF NECESSARY
198F  7A             1342              LD     A,D          ; MASK LINK BITS AND ADD 4000H
1990  E63F           1343              AND    3FH          ; SO DE=ADDRESS OF OUTLINE
1992  F640           1344              OR     40H
1994  57             1345              LD     D,A
1995  D5             1346              PUSH   DE           ;SAVE POINTER
1996  21202F         1347              LD     HL,INRAM     ;CHECK IF CHAR IN THE RAM
1999  CD2117   R 1348              CALL   IX1
199C  09             1349              ADD    HL,BC        ;(CHECK INRAM ENTRY)
199D  09             1350              ADD    HL,BC
199E  5E             1351              LD     E,(HL)
199F  23             1352              INC    HL
19A0  7E             1353              LD     A,(HL)
19A1  B3             1354              OR     E            ;(IN RAM IF NOT ZERO)
19A2  2005           1355              JR     NZ,A1501     ;BR IF IN DATA RAM
19A4  D1             1356              POP    DE           ;RESTORE OUTLINE PTR
19A5  CD0719   R 1357              CALL   NOUT         ;ELSE GET OUTLINE FROM FONT RAM
19A8  C9             1358              RET                 ;AND RETURN
19A9  79             1359  A1501:  LD     A,C          ;CHECK IF OUTLINE IN SEGMENT
                     1360                              ;(IS BIT ON IN INSEG TABLE)
19AA  CDBC19   R 1361              CALL   XINSEG       ;GET BYTE AND BIT MASK
19AD  21002F         1362              LD     HL,INSEG
19B0  CD2117   R 1363              CALL   IX1
19B3  19             1364              ADD    HL,DE        ;DE=BYTE NUMBER
19B4  7E             1365              LD     A,(HL)       ;LOAD THE BYTE
19B5  A0             1366              AND    B            ;MASK THE BIT
19B6  D1             1367              POP    DE           ;RESTORE OUTLINE PTR
19B7  C0             1368              RET    NZ           ;RETURN IF ALREADY IN SEGMENT
19B8  CD591A   R 1369              CALL   SOUT         ;ELSE GET OUTLINE FROM LAST
                     1370                              ;SEGMENT
19BB  C9             1371              RET
                     1372  *EJECT
                     1373           XINSEG:
                     1374  ;        THIS ROUTINE WILL DETERMINE AN INDEX AND BIT
```

```
                1375 ;     MASK INTO THE INSEG TABLE.
                1376 ;
                1377 ;     A (R/D) - CHAR. CODE
                1378 ;     B (W) - BIT MASK
                1379 ;     DE (W) - INDEX INTO INSEG TABLE
                1380 ;
19BC  1600      1381       LD    D,0
19BE  5F        1382       LD    E,A
19BF  CB3B      1383       SRL   E
19C1  CB3B      1384       SRL   E
19C3  CB3B      1385       SRL   E       ;DE=INDEX
19C5  D5        1386       PUSH  DE
19C6  CB23      1387       SLA   E
19C8  CB23      1388       SLA   E
19CA  CB23      1389       SLA   E
19CC  93        1390       SUB   E       ;A=BIT NUMBER
19CD  D1        1391       POP   DE
19CE  0680      1392       LD    B,80H
19D0  B7        1393 U0301: OR   A       ;SHIFT MASK BIT 'A' TIMES
                1394                     ; IN B REG.
19D1  C8        1395       RET   Z       ;EXIT WHEN DONE
19D2  CB38      1396       SRL   B
19D4  3D        1397       DEC   A
19D5  18F9      1398       JR    U0301
                1399 *EJECT
                1400       NOUT:
                1401 ;     THIS ROUTINE COPIES AN OUTLINE FROM A
                1402 ;     FONT RAM TO THE DATA RAM.
                1403 ;
                1404 ;     DE (R/D) - OUTLINE PTR. FOR THIS CHAR.
                1405 ;                IN THE FONT RAM.
                1406 ;
19D7  EB        1407       EX    DE,HL   ; HL=OUTLINE PTR
19D8  56        1408       LD    D,(HL)  ; D=# OF Y'S
19D9  23        1409       INC   HL
19DA  46        1410       LD    B,(HL)  ; BC = # BYTES FOR OUTLINE
19DB  23        1411       INC   HL
19DC  4E        1412       LD    C,(HL)
19DD  23        1413       INC   HL
19DE  D5        1414       PUSH  DE      ; SAVE # OF Y'S
19DF  CD7B1A R  1415       CALL  MOVE    ; SET UP OUTLINE MOVE
19E2  3AE611 R  1416       LD    A,(FLAG2)   ; CK FOR OVERFLOW
19E5  CB57      1417       BIT   OVF,A
19E7  2802      1418       JR    Z,A1601
19E9  D1        1419       POP   DE      ; RETURN IF OVERFLOW SET
19EA  C9        1420       RET
                1421 A1601:
19EB  C1        1422       POP   BC      ; B=# OF Y'S
19EC  C5        1423       PUSH  BC
19ED  CD381A R  1424       CALL  STMOVE  ; MOVE THE CURVE'S STARTS DATA
19F0  EB        1425       EX    DE,HL
19F1  010600    1426       LD    BC,6    ; SET MSB OF LAST Y VALUE
19F4  B7        1427       OR    A
19F5  ED42      1428       SBC   HL,BC
19F7  CBFE      1429       SET   7,(HL)
19F9  09        1430       ADD   HL,BC
```

```
19FA  EB       1431          EX    DE,HL
19FB  C1       1432          POP   BC
19FC  CB20     1433          SLA   B         ; B=NUMBER OF CURVES
19FE  2ACD11 R 1434          LD    HL,(OSPTR)
               1435 A1604:
1A01  C5       1436          PUSH  BC
1A02  23       1437          INC   HL
1A03  23       1438          INC   HL
1A04  23       1439          INC   HL
1A05  23       1440          INC   HL
1A06  46       1441          LD    B,(HL)
1A07  23       1442          INC   HL
1A08  4E       1443          LD    C,(HL)    ; BC=PTR TO VECTORS FOR THIS CURVE
1A09  2B       1444          DEC   HL
1A0A  72       1445          LD    (HL),D
1A0B  23       1446          INC   HL
1A0C  73       1447          LD    (HL),E    ; STORE DE INTO ADDRESS SLOT
1A0D  23       1448          INC   HL
1A0E  C5       1449          PUSH  BC        ; MOVE FROM HL TO DE UNTIL 0 IS MOVED
1A0F  E3       1450          EX    (SP),HL   ; SAVE PTR
               1451 A1603:
1A10  7E       1452          LD    A,(HL)
1A11  12       1453          LD    (DE),A    ; GET NEXT DXDY AND STORE
1A12  23       1454          INC   HL
1A13  13       1455          INC   DE
1A14  B7       1456          OR    A
1A15  20F9     1457          JR    NZ,A1603  ; BR IF NOT ZERO
1A17  E1       1458          POP   HL        ; HL=STARTS PTR
1A18  C1       1459          POP   BC        ; ELSE CK IF DONE
1A19  10E6     1460          DJNZ  A1604     ; BR IF NO
1A1B  F1       1461          POP   AF        ; CK IF LINK BITS=0
1A1C  B7       1462          OR    A
1A1D  C8       1463          RET   Z         ; RETURN IF LINK = 0
1A1E  3AED11 R 1464          LD    A,(FNTRAM) ; GET INITIAL FONT RAM
1A21  47       1465          LD    B,A
1A22  CD1420 R 1466          CALL  LINKRM    ; SELECT INITIAL RAM
1A25  C9       1467          RET
               1468 *E
               1469          FLINK:
               1470 ;        THIS ROUTINE SELECTS THE LINKED FONT RAM
               1471 ;        THAT CONTAINS THE CURRENT CHARACTER'S OUTLINE.
               1472 ;        A (R/D) - NUMBER OF LINKED RAMS TO OUTLINE
               1473 ;        A,B,H,L REGS. DESTROYED
               1474 ;
               1475 ;
               1476
1A26  D5       1477          PUSH  DE
1A27  1600     1478          LD    D,0
1A29  5F       1479          LD    E,A       ; GET RAM LINKED TO
               1480 U0701:
1A2A  216C10 R 1481          LD    HL,LINK
1A2D  19       1482          ADD   HL,DE
1A2E  7E       1483          LD    A,(HL)    ; A=LINKED RAM
1A2F  1D       1484          DEC   E         ; DECREMENT LINK COUNTER
1A30  20F8     1485          JR    NZ,U0701  ; IF NOT ZERO THEN
               1486                          ; GET NEXT LINKED RAM
1A32  47       1487          LD    B,A
```

```
1A33  CD1420  R 1488        CALL   LINKRM  ; ELSE SELECT THE RAM
1A36  D1        1489        POP    DE
1A37  C9        1490        RET
                1491
                1492
                1493
                1494
                1495  *E
                1496        STMOVE:
                1497  ;     THIS ROUTINE MOVES THE STARTS DATA FOR A CHARACTER
                1498  ;
                1499  ;     HL (R) - FONT OUTLINE POINTER (IS INCREMENTED)
                1500  ;     DE (R) - RAM POINTER (IS INCREMENTED)
                1501  ;     B (R/D) -  NUMBER OF Y'S
                1502  ;     A, B REGS. DESTROYED - NO OTHERS
                1503  ;
                1504  U0801:
1A38  C5        1505        PUSH   BC      ; SAVE Y COUNT
1A39  7E        1506        LD     A,(HL)  ; MOVE Y VALUE
1A3A  12        1507        LD     (DE),A
1A3B  23        1508        INC    HL
1A3C  13        1509        INC    DE
1A3D  47        1510        LD     B,A
1A3E  7E        1511        LD     A,(HL)
1A3F  12        1512        LD     (DE),A
1A40  23        1513        INC    HL
1A41  13        1514        INC    DE
1A42  4F        1515        LD     C,A
1A43  C5        1516        PUSH   BC      ; SAVE Y
1A44  010400    1517        LD     BC,4
1A47  EDB0      1518        LDIR           ; MOVE X1,A1
1A49  C1        1519        POP    BC      ; COPY Y VALUE
1A4A  78        1520        LD     A,B
1A4B  12        1521        LD     (DE),A
1A4C  13        1522        INC    DE
1A4D  79        1523        LD     A,C
1A4E  12        1524        LD     (DE),A
1A4F  13        1525        INC    DE
1A50  010400    1526        LD     BC,4    ; MOVE X2,A2
1A53  EDB0      1527        LDIR
1A55  C1        1528        POP    BC      ; RESTORE Y COUNT
1A56  10E0      1529        DJNZ   U0801   ; LOOP UNTIL FINISHED
1A58  C9        1530        RET
                1531  *EJECT
                1532        SOUT:
                1533  ;     THIS ROUTINE COPIES AN OUTLINE IN THE
                1534  ;     DATA RAM FOR THIS SEGMENT.
                1535  ;
                1536  ;     DE (R/D) - PTR. INTO FONT RAM TO OUTLINE
                1537  ;
                1538  ;
                1539  ;
1A59  D5        1540        PUSH   DE      ; SAVE PTR TO OUTLINE COUNT
1A5A  ED5BDE11 R 1541       LD     DE,(VCODE)  ; GET DATA RAM PTR
1A5E  21202F    1542        LD     HL,INRAM
1A61  CD2117  R 1543        CALL   IX1
1A64  CD4818  R 1544        CALL   LDOX
```

```
1A67   EB         1545          EX      DE,HL
1A68   E3         1546          EX      (SP),HL ; SAVE DATA RAM PTR , HL=FONT RAM PTR
1A69   0600       1547          LD      B,0     ; BC=NO. OF BYTES FOR OUTLINE
                  1548                          ; STARTS
1A6B   4E         1549          LD      C,(HL)
1A6C   C5         1550          PUSH    BC      ; BC=BC*12
1A6D   E1         1551          POP     HL
1A6E   09         1552          ADD     HL,BC
1A6F   09         1553          ADD     HL,BC
1A70   29         1554          ADD     HL,HL
1A71   29         1555          ADD     HL,HL
1A72   E5         1556          PUSH    HL
1A73   C1         1557          POP     BC
1A74   E1         1558          POP     HL      ; HL=ADDR. OF 1ST BYTE TO MOVE
1A75   CD7B1A   R 1559          CALL    MOVE    ; SET UP MOVE
1A78   EDB0       1560          LDIR            ; MOVE BC BYTES FROM (HL) TO (DE)
1A7A   C9         1561          RET
                  1562 *EJECT
                  1563          MOVE:
                  1564 ;        SETS UP A MOVE OF AN OUTLINE BY SETTING THE
                  1565 ;        OSPTR TO THE START OF THE NEW BLOCK IN THE RAM.
                  1566 ;
                  1567 ;        BC (R) - NO. OF BYTES IN THE CHAR.
                  1568 ;        HL (R) - OUTLINE ADDRESS
                  1569 ;        DE (W) - NEW OSPTR
                  1570 ;        A REG. DESTROYED.
                  1571 ;
                  1572 ;
                  1573 ;
                  1574 ;
1A7B   E5         1575          PUSH    HL      ; SAVE OUTLINE ADDR.
1A7C   C5         1576          PUSH    BC      ; SAVE NO. OF BYTES
1A7D   B7         1577          OR      A
1A7E   2ACD11   R 1578          LD      HL,(OSPTR)    ; COMPUTE NEW OSPTR
1A81   ED42       1579          SBC     HL,BC
1A83   22CD11   R 1580          LD      (OSPTR),HL
1A86   E5         1581          PUSH    HL      ; SAVE OSPTR
1A87   21202F     1582          LD      HL,INRAM      ; SET INRAM ENTRY TO
1A8A   ED5BDE11 R 1583          LD      DE,(VCODE)    ; OUTLINE POINTER
1A8E   CD2117   R 1584          CALL    IX1
1A91   19         1585          ADD     HL,DE   ; HL = INRAM ENTRY
1A92   19         1586          ADD     HL,DE
1A93   D1         1587          POP     DE      ; DE = OUTLINE POINTER
1A94   D5         1588          PUSH    DE
1A95   73         1589          LD      (HL),E
1A96   23         1590          INC     HL
1A97   72         1591          LD      (HL),D
1A98   3ADE11   R 1592          LD      A,(VCODE)     ; SET INSEG BIT
1A9B   CDBC19   R 1593          CALL    XINSEG  ; DETERMINE ENTRY AND BIT MASK
1A9E   21002F     1594          LD      HL,INSEG
1AA1   CD2117   R 1595          CALL    IX1
1AA4   19         1596          ADD     HL,DE
1AA5   7E         1597          LD      A,(HL)
1AA6   B0         1598          OR      B
1AA7   77         1599          LD      (HL),A
1AA8   E1         1600          POP     HL      ; CHECK IF OSPTR INTO L.S. FILE
```

```
1AA9  E5              1601          PUSH  HL
1AAA  ED5BC911  R     1602          LD    DE,(LSPTR)
1AAE  ED52            1603          SBC   HL,DE
1AB0  D1              1604          POP   DE        ;DE = OSPTR
1AB1  C1              1605          POP   BC        ;BC = BYTE COUNT
1AB2  E1              1606          POP   HL        ;HL = OULINE ADDRESS
1AB3  3005            1607          JR    NC,A1801  ;BR IF O.K.
                      1608          SETB  OVF,FLAG2 ;ELSE SET OVERFLOW
1AB5  21E611    R                   LD    HL,FLAG2
1AB8  CBD6                          SET   OVF,(HL)
                      1609 A1801:
1ABA  C9              1610          RET
                      1611 *EJECT
                      1612          SLANT:
                      1613 ;
                      1614 ;        THIS ROUTINE EXECUTES THE SLANT FUNCTION.
                      1615 ;
                      1616 ;        DE (R/D) - VCODE
                      1617 ;
1ABB  B7              1618          OR    A
1ABC  210400          1619          LD    HL,04     ;CHECK IF 0-4
1ABF  ED52            1620          SBC   HL,DE
1AC1  3008            1621          JR    NC,A1901  ;BR IF YES
1AC3  0E01            1622          LD    C,1       ;ELSE ERROR=5 , CLASS=1
1AC5  0605            1623          LD    B,5
1AC7  CD791F    R     1624          CALL  SERROR
1ACA  C9              1625          RET
                      1626 A1901:
1ACB  21D71A    R     1627          LD    HL,SLNTBL ;GET DATA WORD FROM TABLE
1ACE  19              1628          ADD   HL,DE
1ACF  56              1629          LD    D,(HL)
1AD0  1E00            1630          LD    E,0
1AD2  EB              1631          EX    DE,HL
1AD3  CD2E1F    R     1632          CALL  RAM5      ;AND OUTPUT IN RAM
1AD6  C9              1633          RET
                      1634 ;
                      1635 ;
                      1636 ;
                      1637 SLNTBL:
1AD7  CD              1638          DEFB  0CDH      ;SLANT OFF
1AD8  CE              1639          DEFB  0CEH      ;SLANT +7
1AD9  D0              1640          DEFB  0D0H      ;SLANT +14
1ADA  CF              1641          DEFB  0CFH      ;SLANT -7
1ADB  D1              1642          DEFB  0D1H      ;SLANT -14
                      1643 *EJECT
                      1644          PTSIZE:
                      1645 ;        THIS ROUTINE PROCESSES THE POINT
                      1646 ;        SIZE FUNCTION
                      1647 ;
                      1648 ;        DE (R/D) - VCODE
                      1649 ;
                      1650          BRES  PSW,FLAG2,A1A01 ;BR IF PSW NOT SET
1ADC  21E611    R                   LD    HL,FLAG2
1ADF  CB7E                          BIT   PSW,(HL)
1AE1  2808                          JR    Z,A1A01
1AE3  0E01            1651          LD    C,1       ;ELSE ERROR=14 , CLASS=1
```

```
1AE5  0614        1652            LD    B,14H
1AE7  CD791F  R 1653              CALL  SERROR
1AEA  C9          1654            RET
                  1655  A1A01:          ;CHECK IF P.S. WITHIN LIMITS
1AEB  CD3E1B  R 1656              CALL  INRANGE
1AEE  3011        1657            JR    NC,A1A03  ;BR IF GOOD
1AF0  0E01        1658  A1A02:    LD    C,1       ;ERROR=14 , CLASS=1
1AF2  0614        1659            LD    B,14H
1AF4  CD791F  R 1660              CALL  SERROR
                  1661            BSET  RXMIT,FLAG2,A1A06
1AF7  21E611  R                   LD    HL,FLAG2
1AFA  CB46                        BIT   RXMIT,(HL)
1AFC  2029                        JR    NZ,A1A06
                  1662                        ;BR IF RETRANS REQ. ON
1AFE  110C00      1663            LD    DE,12     ;ELSE USE P.S. = 6
1B01  D5          1664  A1A03:    PUSH  DE
1B02  B7          1665            OR    A
1B03  2AE111  R 1666              LD    HL,(PTSZ)  ;CHECK IF = PTSZ
1B06  ED52        1667            SBC   HL,DE
1B08  2809        1668            JR    Z,A1A04 ;BR IF YES
1B0A  ED53E111 R 1669             LD    (PTSZ),DE  ;ELSE STORE AS PTSZ
1B0E  3E01        1670            LD    A,1       ;AND INTIALIZE INSEG TABLE
1B10  CDC716  R 1671              CALL  FRAMI
                  1672  A1A04:          ;COMPUTE YLOW=YTOP+4/3(P.S.)*10
1B13  CD281B  R 1673              CALL  M43       ;GET P.S. X 4/3*10
1B16  2AD111  R 1674              LD    HL,(YTOP)
1B19  19          1675            ADD   HL,DE
1B1A  EB          1676            EX    DE,HL
1B1B  CDE718  R 1677              CALL  YLOW      ;ESTABLISH BOTTOM OF L.S.
1B1E  D1          1678            POP   DE
1B1F  21E611  R 1679              LD    HL,FLAG2  ;IS YPOS SW SET?
1B22  CB76        1680            BIT   YPOSW,(HL)
1B24  C44E1B  R 1681              CALL  NZ,PSET   ;IF YES THEN PROCESS P.S.
1B27  C9          1682  A1A06:    RET
                  1683  *EJECT
                  1684            M43:
                  1685  ;         RETURNS (DE) REG. MULT. BY (2/3)*10
                  1686  ;         (POINT SIZE ALREADY DOUBLED)
                  1687  ;         THIS MAY BE REPLACED BY A TABLE LOOKUP.
                  1688  ;
1B28  D5          1689            PUSH  DE
1B29  E1          1690            POP   HL
1B2A  19          1691            ADD   HL,DE
1B2B  29          1692            ADD   HL,HL
1B2C  29          1693            ADD   HL,HL
1B2D  29          1694            ADD   HL,HL
1B2E  19          1695            ADD   HL,DE
1B2F  19          1696            ADD   HL,DE
1B30  19          1697            ADD   HL,DE
1B31  19          1698            ADD   HL,DE
1B32  110000      1699            LD    DE,00
1B35  010300      1700            LD    BC,03
1B38  ED42        1701  L1:       SBC   HL,BC
1B3A  D8          1702            RET   C
1B3B  13          1703            INC   DE
1B3C  18FA        1704            JR    L1
```

```
                                1705  ;
                                1706  ;
                                1707  ;
                                1708  ;
                                1709  ;
                                1710            INRANGE:
                                1711  ;    THIS ROUTINE CHECKS IF THE POINT SIZE
                                1712  ;    IS BETWEEN 3 AND 130 POINT.
                                1713  ;    THE CARRY FLAG IS SET IF OUT OF RANGE.
                                1714  ;
1B3E   B7                       1715         OR      A
1B3F   210500                   1716         LD      HL,05
1B42   ED52                     1717         SBC     HL,DE
1B44   3F                       1718         CCF
1B45   3001                     1719         JR      NC,U0401    ;BR IF >= 3 PT.
1B47   C9                       1720         RET                 ;ELSE RETURN
                                1721
1B48   210401                   1722  U0401: LD      HL,260
1B4B   ED52                     1723         SBC     HL,DE
1B4D   C9                       1724         RET         ;RETURN WITH C SET IF >130 PT.
                                1725  *EJECT
                                1726         PSET:
                                1727  ;    THIS ROUTINE PUTS THE POINT SIZE
                                1728  ;    INTO THE DATA RAM.
                                1729  ;
                                1730  ;    DE (R/D) - POINT SIZE
                                1731  ;    A,B,C,H,L REGS. DESTROYED.
                                1732  ;
                                1733         SETB    PSW,FLAG2   ;SET PS SW
1B4E   21E611  R                         LD      HL,FLAG2
1B51   CBFE                              SET     PSW,(HL)
1B53   21E311  R 1734               LD      HL,DYTBL-12  ;GET DELTA Y FOR P.S.
1B56   CD4818  R 1735               CALL    LDDX         ;DE = DELTA Y VALUE
                                1736  ;    THE DELTA Y TABLE ENTRIES ARE DEFINED AS
                                1737  ;    4 INTEGER AND 12 FRACTIONAL BITS.  THE VALUE
                                1738  ;    TO BE PUT INTO THE DATA RAM MUST BE 5 INTEGER
                                1739  ;    AND 11 FRACT. BITS.  ALSO, THE VALUE IS SHIFTED
                                1740  ;    DEPENDING ON THE OPERATING MODE (LO/HI RES.,
                                1741  ;    NORMAL/PROOF).
1B59   3AE711  R 1742               LD      A,(RESM)     ;SHIFT DEPENDING ON RESM
1B5C   3D           1743            DEC     A
1B5D   280B         1744            JR      Z,A1B03 ;IF LO/PROOF THEN LEAVE ALONE
                                1745           ;(SAME AS MULT BY 2 AND ADJUSTING
                                1746           ; FOR 5 INT. & 11 FRACT. BITS.)
1B5F   3D           1747            DEC     A
1B60   2004         1748            JR      NZ,A1B01     ; IF NOT HI/NORM THEN
                                1749           ; DIVIDE BY 2 (TO MAKE 5 INT, 11 FRAC
1B62   CB3A         1750            SRL     D       ; ELSE DIVIDE BY 4 (ADJUST FOR 5 INT.
1B64   CB1B         1751            RR      E       ; AND DIVIDE BY 2)
                                1752  A1B01:
1B66   CB3A         1753            SRL     D       ; DIVIDE BY 2
1B68   CB1B         1754            RR      E
                                1755  A1B03:
1B6A   26C1         1756            LD      H,0C1H  ; OUTPUT DELTA Y HIGH
1B6C   6A           1757            LD      L,D
1B6D   CD2E1F  R 1758               CALL    RAMS
```

```
1B70  26C2          1759           LD    H,0C2H     ;OUTPUT DELTA Y LO
1B72  6B            1760           LD    L,E
1B73  CD2E1F  R     1761           CALL  RAM5
1B76  110000        1762           LD    DE,00      ;USE DELTA S.W.=0
1B79  CD7D1B  R     1763           CALL  SETWIDTH
1B7C  C9            1764           RET
                    1765   *EJECT
                    1766           SETWIDTH:
                    1767   ;       THIS ROUTINE PROCESSES THE SET
                    1768   ;       WIDTH FUNCTION.
                    1769   ;
                    1770   ;       DE (R/D) - DELTA SET WIDTH VALUE
                    1771   ;       ALL REGS. DESTROYED.
                    1772   ;
1B7D  2AE111  R     1773   A1C01:  LD    HL,(PTSZ)  ;SHIFT PTSZ LEFT 2
1B80  29            1774           ADD   HL,HL      ;TO ALIGN WITH THE
1B81  29            1775           ADD   HL,HL      ;DELTA SET WIDTH VALUE
1B82  CB4A          1776           BIT   1,D        ;CHECK IF DELTA S.W. IS NEG.
1B84  2804          1777           JR    Z,A1C02    ;BR IF POSITIVE
1B86  7A            1778           LD    A,D        ;ELSE EXTEND THE SIGN
1B87  F6FE          1779           OR    0FEH
1B89  57            1780           LD    D,A
1B8A  19            1781   A1C02:  ADD   HL,DE      ;ADD PTSZ+DELTA SW
1B8B  CB7C          1782           BIT   7,H        ;CHECK IF RESULT IS NEG. (ERROR)
1B8D  2814          1783           JR    Z,A1C04    ;BR IF IN RANGE
1B8F  0615          1784           LD    B,15H      ;ELSE ERROR=15
1B91  0E01          1785           LD    C,1        ;CLASS=1
1B93  CD791F  R     1786           CALL  SERROR
                    1787           BRES  RXMIT,FLAG2,A1C03
1B96  21E611  R                    LD    HL,FLAG2
1B99  CB46                         BIT   RXMIT,(HL)
1B9B  2801                         JR    Z,A1C03
1B9D  C9            1788           RET              ;RETURN IF RETRANS REQ ON
1B9E  110000        1789   A1C03:  LD    DE,00      ;ELSE USE 0 AS S.W.
1BA1  18DA          1790           JR    A1C01      ;AND LOOP BACK TO BEGINNING
1BA3  29            1791   A1C04:  ADD   HL,HL      ;SHIFT LEFT 1
1BA4  E5            1792           PUSH  HL         ;(8 INTEGER BITS, 4 FRACTONAL)
1BA5  7C            1793           LD    A,H        ;GET VALUE FOR 1ST DIGIT
1BA6  CD0D1C  R     1794           CALL  GETDSW
1BA9  7D            1795           LD    A,L        ;GET 2ND DIGIT
1BAA  CB3F          1796           SRL   A
1BAC  CB3F          1797           SRL   A
1BAE  CB3F          1798           SRL   A
1BB0  CB3F          1799           SRL   A
1BB2  EB            1800           EX    DE,HL      ;SAVE 1ST VALUE IN B&L REGS.
1BB3  41            1801           LD    B,C
1BB4  CD0D1C  R     1802           CALL  GETDSW     ;GET VALUE
1BB7  3E04          1803           LD    A,4        ;SHIFT 4 RIGHT
1BB9  CD1E1C  R     1804           CALL  SHFTRT
1BBC  19            1805           ADD   HL,DE      ;GET NEW PARTIAL VALUE
1BBD  78            1806           LD    A,B
1BBE  89            1807           ADC   A,C
1BBF  47            1808           LD    B,A
1BC0  E3            1809           EX    (SP),HL    ;HL=SETWIDTH , SAVE PARTIAL VALUE
1BC1  7D            1810           LD    A,L        ;GET FRACTIONAL DIGIT
1BC2  E60F          1811           AND   0FH
```

| | | | | | | |
|---|---|---|---|---|---|---|
| 1BC4 | CD0D1C | R 1812 | | CALL | GETDSW | ;GET VALUE INTO CDE REGS. |
| 1BC7 | 97 | 1813 | | SUB | A | |
| 1BC8 | 5A | 1814 | | LD | E,D | ;SHIFT RIGHT 8 |
| 1BC9 | 51 | 1815 | | LD | D,C | |
| 1BCA | E1 | 1816 | | POP | HL | ;HL=PARTIAL VALUE |
| 1BCB | 19 | 1817 | | ADD | HL,DE | |
| 1BCC | 88 | 1818 | | ADC | A,B | |
| 1BCD | EB | 1819 | | EX | DE,HL | |
| 1BCE | 5A | 1820 | | LD | E,D | ;SHIFT RIGHT 8 |
| 1BCF | 57 | 1821 | | LD | D,A | |
| | | 1822 | | | | ;FULL RESULT IN DE REG. |
| | | 1823 | | | | ;(4 INTEGER , 8 FRACTIONAL) |
| 1BD0 | 26C3 | 1824 | | LD | H,0C3H | ;OUTPUT HIGH VALUE |
| 1BD2 | 6A | 1825 | | LD | L,D | |
| 1BD3 | CD2E1F | R 1826 | | CALL | RAMS | |
| 1BD6 | 26C4 | 1827 | | LD | H,0C4H | ;OUTPUT LOW VALUE |
| 1BD8 | 6B | 1828 | | LD | L,E | |
| 1BD9 | CD2E1F | R 1829 | | CALL | RAMS | |
| 1BDC | C9 | 1830 | | RET | | |
| | | 1831 | *EJECT | | | |
| | | 1832 | DSWTBL: | | | ;PARTIAL SET WIDTH VALUES |
| | | 1833 | | | | ;(0/43.2 - 15/43.2) |
| 1BDD | 00 | 1834 | | DEFB | 0 | ; 0 |
| 1BDE | 00 | 1835 | | DEFB | 0 | |
| 1BDF | 00 | 1836 | | DEFB | 0 | |
| 1BE0 | 05 | 1837 | | DEFB | 05 | ;1 |
| 1BE1 | ED | 1838 | | DEFB | 0EDH | |
| 1BE2 | 09 | 1839 | | DEFB | 09H | |
| 1BE3 | 0B | 1840 | | DEFB | 0BH | ;2 |
| 1BE4 | 0A | 1841 | | DEFB | 0DAH | |
| 1BE5 | 12 | 1842 | | DEFB | 12H | |
| 1BE6 | 11 | 1843 | | DEFB | 11H | ;3 |
| 1BE7 | C7 | 1844 | | DEFB | 0C7H | |
| 1BE8 | 1C | 1845 | | DEFB | 1CH | |
| 1BE9 | 17 | 1846 | | DEFB | 17H | ; 4 |
| 1BEA | B4 | 1847 | | DEFB | 0B4H | |
| 1BEB | 25 | 1848 | | DEFB | 25H | |
| 1BEC | 1D | 1849 | | DEFB | 1DH | ; 5 |
| 1BED | A1 | 1850 | | DEFB | 0A1H | |
| 1BEE | 2F | 1851 | | DEFB | 2FH | |
| 1BEF | 23 | 1852 | | DEFB | 23H | ; 6 |
| 1BF0 | 8E | 1853 | | DEFB | 8EH | |
| 1BF1 | 38 | 1854 | | DEFB | 38H | |
| 1BF2 | 29 | 1855 | | DEFB | 29H | ; 7 |
| 1BF3 | 7B | 1856 | | DEFB | 7BH | |
| 1BF4 | 42 | 1857 | | DEFB | 42H | |
| 1BF5 | 2F | 1858 | | DEFB | 2FH | ; 8 |
| 1BF6 | 68 | 1859 | | DEFB | 68H | |
| 1BF7 | 4B | 1860 | | DEFB | 4BH | |
| 1BF8 | 35 | 1861 | | DEFB | 35H | ; 9 |
| 1BF9 | 55 | 1862 | | DEFB | 55H | |
| 1BFA | 55 | 1863 | | DEFB | 55H | |
| 1BFB | 3B | 1864 | | DEFB | 3BH | ; 10 |
| 1BFC | 42 | 1865 | | DEFB | 42H | |
| 1BFD | 5E | 1866 | | DEFB | 5EH | |
| 1BFE | 41 | 1867 | | DEFB | 41H | ; 11 |

```
1BFF  2F          1868        DEFB    2FH
1C00  68          1869        DEFB    68H
1C01  47          1870        DEFB    47H     ; 12
1C02  1C          1871        DEFB    1CH
1C03  71          1872        DEFB    71H
1C04  4D          1873        DEFB    4DH     ; 13
1C05  09          1874        DEFB    09H
1C06  7B          1875        DEFB    7BH
1C07  52          1876        DEFB    52H     ; 14
1C08  F6          1877        DEFB    0F6H
1C09  84          1878        DEFB    84H
1C0A  58          1879        DEFB    58H     ; 15
1C0B  E3          1880        DEFB    0E3H
1C0C  8E          1881        DEFB    8EH
                  1882  *EJECT
                  1883        GETDSW:
                  1884  ;     THIS ROUTINE GETS A 24 BIT VALUE
                  1885  ;     FROM THE DELTA SET WIDTH TABLE.
                  1886  ;     A (R) - TABLE ENTRY (0-15)
                  1887  ;     CDE (W) - 24 BIT VALUE
                  1888  ;     NO OTHER REGS. DESTROYED.
                  1889  ;
1C0D  E5          1890        PUSH    HL
1C0E  1600        1891        LD      D,0
1C10  5F          1892        LD      E,A
1C11  21D01B  R   1893        LD      HL,DSWTBL
1C14  19          1894        ADD     HL,DE    ;GET 24 BIT VALUE INTO CDE
1C15  19          1895        ADD     HL,DE
1C16  19          1896        ADD     HL,DE
1C17  4E          1897        LD      C,(HL)
1C18  23          1898        INC     HL
1C19  56          1899        LD      D,(HL)
1C1A  23          1900        INC     HL
1C1B  5E          1901        LD      E,(HL)
1C1C  E1          1902        POP     HL
1C1D  C9          1903        RET
                  1904  ;
                  1905  ;
                  1906  ;
                  1907        SHFTRT:
                  1908  ;     THIS ROUTINE SHIFTS THE CDE REGS.
                  1909  ;     THE NO. OF TIMES SPECIFIED IN
                  1910  ;     THE A REGISTER.
                  1911  ;
                  1912  ;     A (R/D) - NUMBER OF TIMES TO SHIFT (>0)
                  1913  ;     C,D,E (R/W) - VALUE TO BE SHIFTED
                  1914  ;
                  1915
1C1E  CB29        1916  U0601:  SRA   C
1C20  CB1A        1917          RR    D
1C22  CB1B        1918          RR    E
1C24  3D          1919          DEC   A
1C25  20F7        1920          JR    NZ,U0601
1C27  C9          1921          RET
                  1922  *EJECT
                  1923        FONT:
```

```
                    1924 ;      THIS ROUTINE PROCESS THE FONT CALL FUNCTION
                    1925 ;
                    1926 ;      DE (R/D) - VCODE
                    1927 ;      ALL REGS. DESTROYED.
                    1928 ;
                    1929          SETB    FSW,FLAG2        ;SET FONT SWITCH
1C28  21E611   R                  LD      HL,FLAG2
1C2B  CBE6                        SET     FSW,(HL)
1C2D  CB9E     1930               RES     FCSW,(HL)        ;RESET FONT CALL SWITCH
1C2F  0601     1931               LD      B,1
1C31  216410   R 1932             LD      HL,FTBL          ;CHECK IF FONT IN A RAM
1C34  7E       1933 A1D04:        LD      A,(HL)
1C35  BB       1934               CP      E
1C36  2004     1935               JR      NZ,A1D03         ;BR IF NOT A MATCH
1C38  CD0520   R 1936             CALL    RAMSEL           ;OUTPUT FONT RAM SWITCH
1C3B  C9       1937               RET                      ;AND RETURN
1C3C  23       1938 A1D03:        INC     HL
1C3D  04       1939               INC     B
1C3E  3E08     1940               LD      A,NUMRAM
1C40  B8       1941               CP      B
1C41  30F1     1942               JR      NC,A1D04         ;BR IF NOT DONE CHECKING
1C43  3AE011   R 1943 A1D01:      LD      A,(FCTP)         ;CHECK IF ROOM IN FCALL TABLE
1C46  FE1E     1944               CP      30               ;(IF FCTP <30 THEN ROOM)
1C48  3808     1945               JR      C,A1D02          ;BR IF YES
1C4A  0607     1946               LD      B,7              ;ELSE ERROR=7 , CLASS=1
1C4C  0E01     1947               LD      C,1
1C4E  CD651F   R 1948             CALL    ERROR
1C51  C9       1949               RET
1C52  D5       1950 A1D02:        PUSH    DE               ;SAVE FONT NUMBER
1C53  1600     1951               LD      D,0
1C55  5F       1952               LD      E,A
1C56  21AA11   R 1953             LD      HL,FCALL         ;SAVE LSPTR AT FCALL+FCTP
1C59  19       1954               ADD     HL,DE
1C5A  ED5BC911 R 1955             LD      DE,(LSPTR)
1C5E  73       1956               LD      (HL),E
1C5F  23       1957               INC     HL
1C60  72       1958               LD      (HL),D
                    1959                                   ;INCREMENT FCTP
1C61  3C       1960               INC     A
1C62  3C       1961               INC     A
1C63  32E011   R 1962             LD      (FCTP),A
1C66  E1       1963               POP     HL               ;STORE UNPROCESSED FONT CALL CODE
1C67  26D5     1964               LD      H,0D5H
1C69  CD2E1F   R 1965             CALL    RAMS
                    1966          SETB    FCSW,FLAG2       ;SET FCSW
1C6C  21E611   R                  LD      HL,FLAG2
1C6F  CBDE                        SET     FCSW,(HL)
1C71  C9       1967               RET
                    1968 *EJECT
                    1969 ESEG:
                    1970 ;      THIS ROUTINE PROCESSES AN END
                    1971 ;      SEGMENT CODE.
                    1972 ;
                    1973 ;      ALL REGS. DESTROYED.
                    1974 ;
1C72  3EC2     1975               LD      A,0C2H           ;OUTPUT AN END SEG. ACK.
1C74  CD9E1F   R 1976             CALL    OCNTRL
```

```
                1977  ESEG1:
                1978         BRES    YPOSW,FLAG2,A1E01    ;BR IF ERROR
1C77  21E611  R              LD      HL,FLAG2
1C7A  CB76                   BIT     YPOSW,(HL)
1C7C  2808                   JR      Z,A1E01
1C7E  ED5B0111 R 1979        LD      DE,(YTOP)      ;USE YTOP TO FORCE YLOW
1C82  CDE718  R 1980         CALL    YLOW           ;IF NOT DEFINED
1C85  CD9A1C  R 1981         CALL    FRCALL    ;PROCESS ANY REMAINING FONT CALLS
1C88  C9        1982         RET
1C89  0601      1983 A1E01:  LD      B,1       ;ERROR=1 , CLASS=1
1C8B  0E01      1984         LD      C,1
1C8D  CD791F  R 1985         CALL    SERROR
1C90  CB46      1986         BIT     RXMIT,(HL)    ;IS RETRANS. REQ. ON?
1C92  C0        1987         RET     NZ            ;RETURN IF YES
1C93  2AD911  R 1988         LD      HL,(SGST)     ;ELSE SKIP LINE SEGMENT
1C96  22C911  R 1989         LD      (LSPTR),HL    ;BY SETTING LSPTR=SGST
1C99  C9        1990         RET
                1991  *EJECT
                1992         FRCALL:
                1993  ;      THIS ROUTINE PROCESSES ALL FONT CALLS
                1994  ;      NOT YET PERFORMED.
                1995  ;
                1996         RESB    FCSW,FLAG2    ;RESET FCSW
1C9A  21E611  R              LD      HL,FLAG2
1C9D  CB9E                   RES     FCSW,(HL)
1C9F  2AC911  R 1997         LD      HL,(LSPTR)    ;LSPTRH=LSPTR
1CA2  E5        1998         PUSH    HL            ;SAVE LSPTRH
1CA3  01FEFF    1999         LD      BC,0FFFEH     ;INITIALIZE FCALL TABLE INDEX
                2000                               ;(RPTR1)
1CA6  03        2001 A1F01:  INC     BC            ;INCREMENT RPTR1 TO NEXT ENTRY
1CA7  03        2002         INC     BC
1CA8  3AE011  R 2003         LD      A,(FCTP)      ;CK IF MORE ENTRIES
1CAB  91        2004         SUB     C
1CAC  2818      2005         JR      Z,A1F02 ;BR IF NO
1CAE  CD3E1D  R 2006         CALL    FNTNO         ;ELSE GET FONT NUMBER FROM FCALL
1CB1  7B        2007         LD      A,E           ;CHECK IF ZERO
1CB2  B7        2008         OR      A
1CB3  28F1      2009         JR      Z,A1F01 ;BR IF YES (FONT CALL PERFORMED)
                2010                               ;ELSE LOAD THE FONT
1CB5  D5        2011         PUSH    DE            ;SAVE FONT NUMBER
1CB6  CD521D  R 2012         CALL    FLOAD
1CB9  E1        2013         POP     HL            ;L=FONT NUMBER
1CBA  D1        2014         POP     DE            ;DE=LSPTRH
1CBB  D5        2015         PUSH    DE
1CBC  CDCB1C  R 2016         CALL    RPROC    ;GO PROCESS CHAR. IN THIS FONT
                2017         BRES    OVF,FLAG2,A1F01 ;BR IF NO OVERFLOW
1CBF  21E611  R              LD      HL,FLAG2
1CC2  CB56                   BIT     OVF,(HL)
1CC4  28E0                   JR      Z,A1F01
1CC6  E1        2018 A1F02:  POP     HL            ;RESTORE LSPTR
1CC7  22C911  R 2019         LD      (LSPTR),HL
1CCA  C9        2020         RET
                2021  *EJECT
                2022         RPROC:
                2023  ;      THIS ROUTINE PROCESSES ALL CHARACTERS
                2024  ;      OF THIS FONT NUMBER.
```

```
                2025  ;
                2026  ;
                2027  ;       L (R/D) - FONT NUMBER
                2028  ;       BC (R) - INDEX INTO FCALL (RPTR1)
                2029  ;       DE (R/D) - LSPTRH - LSPTR BEFORE RECALLING FONTS
                2030  ;
1CCB  C5        2031          PUSH    BC         ;SAVE RPTR1
1CCC  E5        2032  A2A01:  PUSH    HL         ;SVE FONT NO.
1CCD  D5        2033          PUSH    DE         ;SAVE LSPTRH
1CCE  21000C    2034          LD      HL,0C00H   ;REMOVE FONT CALL WORD
1CD1  CD2E1F R  2035          CALL    RAMS       ;RAM (REPLACE WITH NULL CODE)
1CD4  21AA11 R  2036          LD      HL,FCALL
1CD7  09        2037          ADD     HL,BC
1CD8  3600      2038          LD      (HL),0
1CDA  23        2039          INC     HL
1CDB  3600      2040          LD      (HL),0
1CDD  D1        2041          POP     DE         ;DE=LSPTRH
1CDE  C5        2042          PUSH    BC         ;SAVE RPTR1
1CDF  CDF81C R  2043          CALL    PROC       ;PROCESS TO NEXT FONT CALL OR OVF
1CE2  C1        2044          POP     BC
1CE3  E1        2045          POP     HL
1CE4  3AE611 R  2046          LD      A,(FLAG2)  ;CHECK FOR OVF
1CE7  CB57      2047          BIT     OVF,A
1CE9  200B      2048          JR      NZ,A2A02   ;BR IF OVF
1CEB  D5        2049          PUSH    DE
1CEC  CD271D R  2050          CALL    CKMRE      ;SEE IF SAME FONT CALLED AGAIN
1CEF  D1        2051          POP     DE
1CF0  3AE011 R  2052          LD      A,(FCTP)   ;AT END OF FCALL TABLE?
1CF3  91        2053          SUB     C          ;(RPTR2=FCTP)
1CF4  20D6      2054          JR      NZ,A2A01   ;BR IF NO
1CF6  C1        2055  A2A02:  POP     BC         ;RESTORE RPTR1
1CF7  C9        2056          RET                ;AND EXIT
                2057  *EJECT
                2058          PROC:
                2059  ;       THIS ROUTINE PROCESSES ALL CHARACTERS
                2060  ;       IN THE NEW FONT.
                2061  ;
                2062  ;       DE (R) - LSPTRH - LSPTR BEFORE RECALLING FONTS
                2063  ;       ALL OTHER REGS. DESTROYED.
                2064  ;
1CF8  D5        2065          PUSH    DE
                2066          BSET    OVF,FLAG2,A2B04 ;BR IF OVF
1CF9  21E611 R              LD      HL,FLAG2
1CFC  CB56                 BIT     OVF,(HL)
1CFE  2025                 JR      NZ,A2B04
1D00  2AC911 R  2067  A2B01: LD      HL,(LSPTR)  ;GET CODE AT LSPTR
1D03  56        2068          LD      D,(HL)
1D04  23        2069          INC     HL
1D05  5E        2070          LD      E,(HL)
1D06  7A        2071          LD      A,D        ;IS 1ST BYTE = 0?
1D07  B7        2072          OR      A
1D08  280A      2073          JR      Z,A2B02 ;BR IF YES(CHAR NOT PROCESSED)
1D0A  E6C0      2074          AND     0C0H       ;ELSE CHECK IF PROCESSED CHAR.
1D0C  2817      2075          JR      Z,A2B04 ;BR IF YES(TOP 2 BITS OFF)
1D0E  23        2076          INC     HL         ;ELSE INCREMENT LSPTR
1D0F  22C911 R  2077          LD      (LSPTR),HL
```

```
1D12  1807        2078           JR    A2B03    ;AND CONTINUE
1D14  ED53DE11 R  2079  A2B02:   LD    (VCODE),DE    ;PROCESS THIS CHAR.
1D18  CD3119   R  2080           CALL  CHAR
1D1B  B7          2081  A2B03:   OR    A
1D1C  2AC911   R  2082           LD    HL,(LSPTR)    ;CHECK IF AT END OF SEGMENT
1D1F  D1          2083           POP   DE
1D20  D5          2084           PUSH  DE
1D21  ED52        2085           SBC   HL,DE    ;(LSPTR=LSPTRH)
1D23  20D8        2086           JR    NZ,A2B01    ;LOOP IF NO
1D25  D1          2087  A2B04:   POP   DE
1D26  C9          2088           RET
                  2089  *EJECT
                  2090           CKMRE:
                  2091  ;        THIS ROUTINE SCANS FCALL FOR THE
                  2092  ;        SAME FONT NUMBER.
                  2093  ;
                  2094  ;        BC (R/W) - INDEX INTO FCALL (RPTR2)
                  2095  ;        L (R) - CURRENT FONT NO.
                  2096  ;        A,D,E REGS. DESTROYED - NO OTHERS
                  2097  ;
1D27  E5          2098           PUSH  HL    ;SAVE FONT NO.
1D28  03          2099  A2C01:   INC   BC    ;INCREMENT RPTR2
1D29  03          2100           INC   BC
1D2A  3AE011   R  2101           LD    A,(FCTP)    ;CHECK IF AT END OF TABLE
1D2D  91          2102           SUB   C    ;(RPTR2=FCTP)
1D2E  280C        2103           JR    Z,A2C02 ;BR IF YES
1D30  CD3E1D   R  2104           CALL  FNTNO    ;ELSE GET FONT # AT RPTR2
1D33  7B          2105           LD    A,E    ;CHECK IF ZERO
1D34  B7          2106           OR    A
1D35  28F1        2107           JR    Z,A2C01 ;BR IF YES
1D37  E1          2108           POP   HL    ;CHECK IF SAME FONT NUMBER
1D38  E5          2109           PUSH  HL
1D39  95          2110           SUB   L
1D3A  20EC        2111           JR    NZ,A2C01    ;BR IF NO
1D3C  E1          2112  A2C02:   POP   HL    ;RETURN WITH BC POINTING TO
                  2113                        ;FCALL ENTRY WITH SAME FONT OR
1D3D  C9          2114           RET          ;END OF TABLE
                  2115  *EJECT
                  2116           FNTNO:
                  2117  ;        THIS ROUTINE RETRIEVES THE CODE
                  2118  ;        POINTED TO BY THE CURRENT FCALL ENTRY.
                  2119  ;
                  2120  ;        BC (R) - INDEX INTO FCALL
                  2121  ;        DE (W) - FONT CODE
                  2122  ;
                  2123  ;        A,H,L REGS. DESTROYED
                  2124  ;
1D3E  21AA11   R  2125           LD    HL,FCALL    ;GET 2 BYTE FCALL ENTRY
1D41  09          2126           ADD   HL,BC
1D42  5E          2127           LD    E,(HL)
1D43  23          2128           INC   HL
1D44  56          2129           LD    D,(HL)
1D45  ED53C911 R  2130           LD    (LSPTR),DE    ;STORE INTO LSPTR
1D49  7A          2131           LD    A,D    ;CHECK IF ZERO
1D4A  B3          2132           OR    E
1D4B  2804        2133           JR    Z,A2D01 ;BR IF YES
```

```
1D4D  EB        2134            EX    DE,HL   ;ELSE GET FONT CODE
1D4E  56        2135            LD    D,(HL)  ;D=CODE
1D4F  23        2136            INC   HL
1D50  5E        2137            LD    E,(HL)  ;E=FONT NUMBER
                2138  A2D01:
1D51  C9        2139            RET
                2140  *E
                2141          FLOAD:
                2142  ;       THIS ROUTINE LOADS A FONT FROM THE
                2143  ;       SYSTEM DISK.
                2144  ;       A (R/D) - FONT NUMBER
                2145  ;
                2146  ;       A,D,E,H,L DESTROYED.
                2147  ;
1D52  C5        2148            PUSH  BC      ; SAVE BC
1D53  F5        2149            PUSH  AF
1D54  F5        2150            PUSH  AF
1D55  CD561E  R 2151            CALL  GETRAM  ; SELECT A FONT RAM
1D58  F1        2152            POP   AF
1D59  D5        2153            PUSH  DE      ; SAVE RAM NUMBER
1D5A  F5        2154            PUSH  AF
1D5B  216310  R 2155            LD    HL,FTBL-1   ; LD FONT # INTO FTBL TABLE
1D5E  19        2156            ADD   HL,DE
1D5F  77        2157            LD    (HL),A
1D60  43        2158            LD    B,E
1D61  CD0520  R 2159            CALL  RAMSEL  ; OUTPUT A FONT RAM SELECT
1D64  F1        2160            POP   AF      ; GET FONT NUMBER
                2161  A2506:
1D65  2602      2162            LD    H,02H
1D67  6F        2163            LD    L,A
1D68  CDA61F  R 2164            CALL  XMITRQ  ; SEND FONT TRANSMIT REQUEST
1D6B  210040    2165            LD    HL,4000H    ; SET OUTL=TOP OF FONT RAM
1D6E  22E311  R 2166            LD    (OUTL),HL
1D71  210040    2167            LD    HL,CINDEX   ; CLEAR CINDEX
1D74  010102    2168            LD    BC,513
1D77  CD2917  R 2169            CALL  CLEAR
1D7A  CDCA1F  R 2170            CALL  SGET    ; INPUT FONT SIZE TO HL REG.
1D7D  0600      2171            LD    B,0     ; 0: 1ST RAM
1D7F  97        2172            SUB   A
1D80  320D11  R 2173            LD    (RCNT),A    ; CLEAR REPEAT COUNTER
1D83  3AE511  R 2174            LD    A,(FLAG1)   ; RESET FNTERR FLAG
1D86  CB97      2175            RES   FNTERR,A
1D88  32E511  R 2176            LD    (FLAG1),A
                2177  A2507:
1D8B  C5        2178            PUSH  BC
1D8C  CDB31E  R 2179            CALL  IFONT   ; INPUT THE FONT
1D8F  7B        2180            LD    A,E     ; CK THE CHECKSUM
1D90  BA        2181            CP    D
1D91  2805      2182            JR    Z,A2508 ; BR IF OK
1D93  21E511  R 2183            LD    HL,FLAG1    ; ELSE SET FNTERR FLAG
1D96  CBD6      2184            SET   FNTERR,(HL)
                2185  A2508:
1D98  21E611  R 2186            LD    HL,FLAG2    ; CK READ MODE
1D9B  CB4E      2187            BIT   RWRD,(HL)
1D9D  C1        2188            POP   BC
1D9E  C4831E  R 2189            CALL  NZ,UPDATX   ; UPDATE X'S IF WRONG READ
```

| | | | | | | |
|---|---|---|---|---|---|---|
| 1DA1 | CDCA1F | R | 2190 | | CALL | SGET ; INPUT FONT SIZE TO HL |
| 1DA4 | 7C | | 2191 | | LD | A,H |
| 1DA5 | B5 | | 2192 | | OR | L |
| 1DA6 | 2824 | | 2193 | | JR | Z,A2509 ; BR IF EOF |
| 1DA8 | E5 | | 2194 | | PUSH | HL ; SAVE FONT SIZE |
| 1DA9 | CD561E | R | 2195 | | CALL | GETRAM ; SELECT A FONT RAM |
| 1DAC | 216310 | R | 2196 | | LD | HL,FTBL-1 ; SET FTBL = 254 |
| 1DAF | 19 | | 2197 | | ADD | HL,DE |
| 1DB0 | 36FE | | 2198 | | LD | (HL),254 |
| 1DB2 | 97 | | 2199 | | SUB | A ; SET LRU=0 |
| 1DB3 | CD2420 | R | 2200 | | CALL | LRU0 |
| 1DB6 | D5 | | 2201 | | PUSH | DE |
| 1DB7 | C1 | | 2202 | | POP | BC ; BC=NEW FONT |
| 1DB8 | E1 | | 2203 | | POP | HL |
| 1DB9 | D1 | | 2204 | | POP | DE |
| 1DBA | E5 | | 2205 | | PUSH | HL |
| 1DBB | 216B10 | R | 2206 | | LD | HL,LINK-1 ; SET LINK TO LAST RAM |
| 1DBE | 19 | | 2207 | | ADD | HL,DE |
| 1DBF | 71 | | 2208 | | LD | (HL),C |
| 1DC0 | C5 | | 2209 | | PUSH | BC |
| 1DC1 | D1 | | 2210 | | POP | DE ; DE=NEW RAM |
| 1DC2 | 43 | | 2211 | | LD | B,E ; OUTPUT FONT RAM SELECTED |
| 1DC3 | CD1420 | R | 2212 | | CALL | LINKRM |
| 1DC6 | E1 | | 2213 | | POP | HL |
| 1DC7 | D5 | | 2214 | | PUSH | DE |
| 1DC8 | 0601 | | 2215 | | LD | B,1 ; 1:NOT 1ST RAM |
| 1DCA | 188F | | 2216 | | JR | A2507 |
| | | | 2217 | A2509: | | |
| 1DCC | 216B10 | R | 2218 | | LD | HL,LINK-1 ; SET LINK=0 |
| 1DCF | D1 | | 2219 | | POP | DE |
| 1DD0 | 19 | | 2220 | | ADD | HL,DE |
| 1DD1 | 3600 | | 2221 | | LD | (HL),0 |
| 1DD3 | CDC716 | R | 2222 | | CALL | FRAMI |
| 1DD6 | 3EC4 | | 2223 | | LD | A,0C4H ; OUTPUT END FONT ACK |
| 1DD8 | CD9E1F | R | 2224 | | CALL | OCNTRL |
| 1DDB | 3AED11 | R | 2225 | | LD | A,(FNTRAM) ; SWITCH TO INITIAL FONT RAM |
| 1DDE | 47 | | 2226 | | LD | B,A |
| 1DDF | CD1420 | R | 2227 | | CALL | LINKRM |
| | | | 2228 | | BRES | FNTERR,FLAG1,A250A ; BR IF NO ERRORS |
| 1DE2 | 21E511 | R | | | LD | HL,FLAG1 |
| 1DE5 | CB56 | | | | BIT | FNTERR,(HL) |
| 1DE7 | 2817 | | | | JR | Z,A250A |
| 1DE9 | CD971E | R | 2229 | | CALL | FERROR ; ELSE CK IF SHOULD RETRANSMIT |
| | | | 2230 | | BRES | RXMIT,FLAG2,A250A ; BR IF RXMIT OFF |
| 1DEC | 21E611 | R | | | LD | HL,FLAG2 |
| 1DEF | CB46 | | | | BIT | RXMIT,(HL) |
| 1DF1 | 280D | | | | JR | Z,A250A |
| 1DF3 | 3AED11 | R | 2231 | | LD | A,(FNTRAM) ; CLEAR FONT TABLES |
| 1DF6 | 1600 | | 2232 | | LD | D,0 |
| 1DF8 | 5F | | 2233 | | LD | E,A |
| 1DF9 | D5 | | 2234 | | PUSH | DE |
| 1DFA | CD831E | R | 2235 | | CALL | CLRLNK |
| 1DFD | C3651D | R | 2236 | | JP | A2506 |
| | | | 2237 | A250A: | | |
| 1E00 | F1 | | 2238 | | POP | AF |
| 1E01 | C1 | | 2239 | | POP | BC |
| 1E02 | C9 | | 2240 | | RET | |

```
                    2241  *E
                    2242        UPDATX:
                    2243    ;   THIS ROUTINE UPDATES THE XN VALUES FOR THE FONT
                    2244    ;   RAM WHEN IN WRONG READ MODE. THE X VALUES ARE
                    2245    ;   2'S COMPLEMENTED AND THE L&B BITS ARE COMPLEMENTED.
                    2246    ;
                    2247    ;   B (R/D) - 0:INITIAL RAM    1:NOT INITIAL RAM
                    2248    ;   ALL REGS. DESTROYED.
                    2249    ;
1E03  210040        2250        LD      HL,4000H        ; HL=FONT RAM PTR
1E06  78            2251        LD      A,B             ; CK IF INITIAL RAM
1E07  B7            2252        OR      A
1E08  2006          2253        JR      NZ,A2801        ; BR IF NO
1E0A  5E            2254        LD      E,(HL)          ; ELSE GET CHAR. COUNT
1E0B  1600          2255        LD      D,0
1E0D  23            2256        INC     HL              ; HL=4001H + 2*CHAR. COUNT
1E0E  19            2257        ADD     HL,DE
1E0F  19            2258        ADD     HL,DE
                    2259  A2801:
1E10  7E            2260        LD      A,(HL)          ; A=# OF Y PAIRS
1E11  B7            2261        OR      A
1E12  47            2262        LD      B,A
1E13  C8            2263        RET     Z               ; RETURN IF 0 (DONE)
1E14  110500        2264        LD      DE,5
1E17  19            2265        ADD     HL,DE           ; MOVE PTR TO 1ST X VALUE
                    2266  A2802:
1E18  CD221E  R     2267        CALL    COMPLX          ; COMPLEMENT 2 X VALUES FOR THE Y PAI
1E1B  05            2268        DEC     B               ; DEC Y COUNT
1E1C  28F2          2269        JR      Z,A2801         ; BR IF DONE WITH THIS OUTLINE
1E1E  23            2270        INC     HL              ; MOVE PTR TO NEXT X VALUE
1E1F  23            2271        INC     HL
1E20  18F6          2272        JR      A2802           ; AND COMPL. THE NEXT 2 X'S
                    2273  *E
                    2274        COMPLX:
                    2275    ;   THIS ROUTINE 2'S COMPLEMENTS THE X VALUE AND
                    2276    ;   COMPLEMENTS THE L&B BITS FOR A PAIR OF X'S
                    2277    ;
                    2278    ;   HL (R) - PTR TO 1ST X VALUE (IS UPDATED)
                    2279    ;   A,C,D,E REGS. DESTROYED - NO OTHERS
                    2280    ;
1E22  CD251E  R     2281        CALL    A2901
                    2282  A2901:
1E25  56            2283        LD      D,(HL)          ; GET X VALUE
1E26  23            2284        INC     HL
1E27  5E            2285        LD      E,(HL)
1E28  7B            2286        LD      A,E             ; SAVE 4 LSB'S
1E29  E60F          2287        AND     0FH
1E2B  F5            2288        PUSH    AF
1E2C  7C            2289        LD      A,H             ; SAVE MSB
1E2D  E680          2290        AND     80H
1E2F  F5            2291        PUSH    AF
1E30  3E04          2292        LD      A,4             ; SHIFT RIGHT 4
1E32  0E00          2293        LD      C,0
1E34  CD1E1C  R     2294        CALL    SHFTRT
1E37  7B            2295        LD      A,E             ; 2'S COMPL X VALUE
1E38  2F            2296        CPL
1E39  5F            2297        LD      E,A
```

```
1E3A  7A       2298            LD    A,D
1E3B  2F       2299            CPL
1E3C  57       2300            LD    D,A
1E3D  13       2301            INC   DE
1E3E  EB       2302            EX    DE,HL    ; DE=PTR , HL=X
1E3F  29       2303            ADD   HL,HL    ; SHIFT LEFT 4
1E40  29       2304            ADD   HL,HL
1E41  29       2305            ADD   HL,HL
1E42  29       2306            ADD   HL,HL
1E43  CBBC     2307            RES   7,H      ; RESET MSB
1E45  F1       2308            POP   AF
1E46  B4       2309            OR    H        ; RESTORE MSB
1E47  67       2310            LD    H,A
1E48  F1       2311            POP   AF       ; RESTORE 4 LSB'S
1E49  B5       2312            OR    L
1E4A  EE03     2313            XOR   3        ; COMPL L&B BITS (0&1)
1E4C  6F       2314            LD    L,A
1E4D  EB       2315            EX    DE,HL    ; DE=X , HL=PTR
1E4E  73       2316            LD    (HL),E   ; PUT BACK UPDATED X
1E4F  2B       2317            DEC   HL
1E50  72       2318            LD    (HL),D
1E51  110400   2319            LD    DE,4     ; PTR=PTR+4
1E54  19       2320            ADD   HL,DE
1E55  C9       2321            RET
               2322    *E
               2323            GETRAM:
               2324    ;       THIS ROUTINE SELECTS A FONT RAM FOR THE
               2325    ;       CURRENT FONT TO OCCUPY AND UPDATES THE
               2326    ;       FTBL AND LINK TABLES.
               2327    ;
               2328    ;       A(R/D) - FONT NUMBER
               2329    ;       DE (W) - INDEX INTO FONT TABLES FOR RAM SELECTED
               2330    ;
               2331    ;       A,H,L REGS. DESTROYED
               2332    ;
1E56  C5       2333            PUSH  BC
1E57  0608     2334            LD    B,8
1E59  216310 R 2335            LD    HL,FTBL-1  ; SEARCH FTBL TABLE
               2336    A2601:
1E5C  23       2337            INC   HL
1E5D  7E       2338            LD    A,(HL)
1E5E  B7       2339            OR    A
1E5F  2815     2340            JR    Z,A2604  ; USE RAM IF ZERO
1E61  10F9     2341            DJNZ  A2601
1E63  010008   2342            LD    BC,0800H ; ALL RAMS FULL
1E66  216310 R 2343            LD    HL,FTBL-1 ; GET RAM WITH HIGHEST LRU VA
               2344    A2602:
1E69  23       2345            INC   HL
1E6A  7E       2346            LD    A,(HL)
1E6B  B7       2347            OR    A
1E6C  2805     2348            JR    Z,A2603  ; IGNORE IF 0
1E6E  B9       2349            CP    C
1E6F  3802     2350            JR    C,A2603  ; BR IF NOT HIGHEST
1E71  50       2351            LD    D,B      ; ELSE SAVE 9-RAM#
1E72  4F       2352            LD    C,A      ; AND SAVE NEW HIGHEST LRU VALUE
               2353    A2603:
```

```
1E73  10F4    2354            DJNZ    A2602   ; LOOP UNTIL ALL 8 CHECKED
1E75  42      2355            LD      B,D     ; THEN USE RAM WITH HIGHEST LRU
              2356   A2604:
1E76  3E09    2357            LD      A,9
1E78  90      2358            SUB     B
1E79  1600    2359            LD      D,0     ; DE=RAM # TO USE
1E7B  5F      2360            LD      E,A
1E7C  D5      2361            PUSH    DE
              2362   *A2605:
1E7D  CD831E R 2363           CALL    CLRLNK  ; CLEAR FONT TABLES FOR LINKED RAMS
              2364   A2606:
1E80  D1      2365            POP     DE
1E81  C1      2366            POP     BC
1E82  C9      2367            RET
              2368   *E
              2369   CLRLNK:          ; THIS ROUTINE CLEARS THE FTBL AND LINK TABLE
              2370                    ; FOR THE FONT RAMS LINKED TO THE FONT
              2371                    ; IN FONT RAM 'E'.
              2372   U0B01:
1E83  216810 R 2373           LD      HL,LINK-1   ; CK LINK VALUE
1E86  19      2374            ADD     HL,DE
1E87  7E      2375            LD      A,(HL)
1E88  B7      2376            OR      A
1E89  C8      2377            RET     Z       ; RETURN IF ZERO
1E8A  3600    2378            LD      (HL),0  ; ELSE CLEAR THE LINKED RAMS
1E8C  216310 R 2379           LD      HL,FTBL-1
1E8F  1600    2380            LD      D,0
1E91  5F      2381            LD      E,A
1E92  19      2382            ADD     HL,DE
1E93  3600    2383            LD      (HL),0
1E95  18EC    2384            JR      U0B01
              2385
              2386
              2387
              2388   FERROR:
              2389            ; THIS ROUTINE CHECKS IF THE FONT HAS BEEN
              2390            ; TRANSMITTED 3 TIMES AND IF NOT THEN
              2391            ; SETS THE RXMIT FLAG.
              2392   ;
              2393            SETB    RXMIT,FLAG2
1E97  21E611 R                 LD      HL,FLAG2
1E9A  CBC6                     SET     RXMIT,(HL)
1E9C  3ADB11 R 2394           LD      A,(RCNT)   ; CK RETRY COUNTER
1E9F  3C      2395            INC     A
1EA0  32DB11 R 2396           LD      (RCNT),A
1EA3  FE03    2397            CP      3
1EA5  D8      2398            RET     C
1EA6  0616    2399            LD      B,16H   ; IF ALREADY TRIED 3 TIMES
1EA8  0E01    2400            LD      C,1     ; OUTPUT ERROR MESSAGE
1EAA  CD651F R 2401           CALL    ERROR
              2402            RESB    RXMIT,FLAG2  ; AND USE FONT ANYWAY
1EAD  21E611 R                 LD      HL,FLAG2
1EB0  CB86                     RES     RXMIT,(HL)
1EB2  C9      2403            RET
              2404   *E
              2405   IFONT:
              2406   ;        THIS ROUTINE READS IN A FONT FROM
```

```
                    2407 ;       PROJECT Y INTO A FONT RAM
                    2408 ;
                    2409 ;       HL (R/D) - # OF BYTES TO INPUT
                    2410 ;       A,B,C REGS. DESTROYED - NO OTHERS
                    2411 ;
1EB3  E5            2412         PUSH    HL
1EB4  C1            2413         POP     BC              ;BC=COUNTER
1EB5  1600          2414         LD      D,0
1EB7  210040        2415         LD      HL,4000H        ; SET PTR TO TOP OF RAM
                    2416 A2701:
1EBA  CDD31F  R 2417                CALL    GDATA         ; GET 1 BYTE
1EBD  5F            2418         LD      E,A
1EBE  77            2419         LD      (HL),A          ;STORE IT
1EBF  23            2420         INC     HL
1EC0  0B            2421         DEC     BC              ; DEC COUNTER
1EC1  78            2422         LD      A,B
1EC2  B1            2423         OR      C
1EC3  C8            2424         RET     Z               ; RETURN IF DONE
1EC4  7A            2425         LD      A,D             ; ADD BYTE TO CHECKSUM
1EC5  07            2426         RLCA                    ; ROTATE THE CHECKSUM
1EC6  83            2427         ADD     A,E             ; ADD THE NEW DATA BYTE
1EC7  57            2428         LD      D,A
1EC8  18F0          2429         JR      A2701           ; GET NEXT BYTE
                    2430 *E
                    2431         RVCONT:
                    2432 ;       THIS ROUTINE PROCESSES THE LOCAL
                    2433 ;       REVERSE VIDEO FUNCTION
                    2434 ;
                    2435                                 ;BR IF XPOS SW RESET (ERROR)
                    2436         BRES    XPOSW,FLAG2,A2E01
1ECA  21E611  R            LD      HL,FLAG2
1ECD  CB6E                 BIT     XPOSW,(HL)
1ECF  2804                 JR      Z,A2E01
1ED1  CB76          2437   BIT     YPOSW,(HL)
1ED3  2008          2438   JR      NZ,A2E02        ;BR IF YPOSW SET
1ED5  0E01          2439 A2E01: LD  C,1         ;ERROR=6 , CLASS=1
1ED7  0606          2440         LD      B,6
1ED9  CD791F  R 2441         CALL    SERROR
1EDC  C9            2442         RET
                    2443
1EDD  CDCA1F  R 2444 A2E02: CALL  SGET        ;GET YEND CODE
1EE0  EB            2445         EX      DE,HL
1EE1  26C8          2446         LD      H,0C8H          ;OUTPUT RVY HIGH
1EE3  6A            2447         LD      L,D
1EE4  CD2E1F  R 2448         CALL    RAMS
1EE7  26C9          2449         LD      H,0C9H          ;OUTPUT RVY LOW
1EE9  6B            2450         LD      L,E
1EEA  CD2E1F  R 2451         CALL    RAMS
1EED  CDE718  R 2452         CALL    YLOW            ;TREAT YEND AS YLOW
1EF0  CDCA1F  R 2453         CALL    SGET            ;GET XEND
1EF3  EB            2454         EX      DE,HL
1EF4  3AE511  R 2455         LD      A,(FLAG1)       ; CK IF WRONG READ MODE
1EF7  CB4F          2456         BIT     RWRD,A
1EF9  2806          2457         JR      Z,A2E03 ; BR IF NO
1EFB  B7            2458         OR      A
1EFC  21CF11  R 2459         LD      HL,PSIZE        ; ELSE PAGE COMPL. THE XPOS
1EFF  ED52          2460         SBC     HL,DE
```

```
                    2461  A2E03:
1F01  EB            2462         EX    DE,HL
1F02  26CA          2463         LD    H,0CAH    ;OUTPUT RVX HIGH
1F04  6A            2464         LD    L,D
1F05  CD2E1F  R     2465         CALL  RAMS
1F08  26CB          2466         LD    H,0CBH    ;OUTPUT RVX LOW
1F0A  6B            2467         LD    L,E
1F0B  CD2E1F  R     2468         CALL  RAMS
1F0E  C9            2469         RET
                    2470  *E
                    2471         OUTRAM:
                    2472  ;      THIS ROUTINE STORES AN END RAM
                    2473  ;      CONTROL CODE AND OUTPUTS THE RAM.
                    2474  ;
1F0F  3AC811  R     2475         LD    A,(ERC)   ;STORE ERC IN RAM
1F12  57            2476         LD    D,A
1F13  1E00          2477         LD    E,0
1F15  21C911  R     2478         LD    HL,LSPTR
1F18  CD521F  R     2479         CALL  STORE
1F1B  210080        2480         LD    HL,RAMST         ;SET YLMT=YMAX
                    2481                             ;(YLMT IS 1ST 2 BYTES OF DATA RAM)
1F1E  ED5BD311 R    2482         LD    DE,(YMAX)
1F22  72            2483         LD    (HL),D
1F23  23            2484         INC   HL
1F24  73            2485         LD    (HL),E
1F25  3E04          2486         LD    A,04H
1F27  CD3A20  R     2487         CALL  LIGHTS
1F2A  CDE31F  R     2488         CALL  RAMOUT    ;SET RAM TO OUTPUT
1F2D  C9            2489         RET
                    2490  *EJECT
                    2491         RAMS:
                    2492  ;      THIS ROUTINE STORES A 16 BIT CODE
                    2493  ;      IN THE RAM AT LSPTR.
                    2494  ;
                    2495  ;      A,H,L REGS. DESTROYED.
                    2496  ;
                    2497  ;      HL (R/D) - CODE TO STORE
                    2498  ;
                    2499  ;
                    2500  ;
1F2E  C5            2501         PUSH  BC
1F2F  D5            2502         PUSH  DE
1F30  E5            2503         PUSH  HL
1F31  B7            2504         OR    A
1F32  2AC911  R     2505         LD    HL,(LSPTR)     ;IS LSPTR+4 >
1F35  23            2506         INC   HL             ;OSPTR?
1F36  23            2507         INC   HL
1F37  23            2508         INC   HL
1F38  23            2509         INC   HL
1F39  ED4BCD11 R    2510         LD    BC,(OSPTR)
1F3D  ED42          2511         SBC   HL,BC
1F3F  D1            2512         POP   DE
1F40  3807          2513         JR    C,A2101   ;BR IF NO
                    2514         SETB  OVF,FLAG2      ;ELSE SET OVERFLOW
1F42  21E611  R                  LD    HL,FLAG2
1F45  CBD6                       SET   OVF,(HL)
1F47  1806          2515         JR    A2102          ;AND RETURN
```

```
                    2516
1F49  21C911  R 2517  A2101:  LD    HL,LSPTR       ;DE=CODE, HL=LSPTR
1F4C  CD521F  R 2518          CALL  STORE          ;STORE THE CODE
1F4F  D1        2519  A2102:  POP   DE
1F50  C1        2520          POP   BC
1F51  C9        2521          RET
                    2522 *EJECT
                    2523          STORE:
                    2524 ;   THIS ROUTINE STORES A 16 BIT CODE
                    2525 ;   AT THE LOCATION INDICATED BY THE POINTER
                    2526 ;   SUPPLIED. THE POINTER IS THEN INCREMENTED
                    2527 ;   BY 2.
                    2528 ;
                    2529 ;   DE (R) - CODE
                    2530 ;   HL (R/D) - POINTER ADDRESS
                    2531 ;
                    2532 ;   A,H,L REGS. DESTROYED - NO OTHERS
1F52  C5        2533          PUSH  BC
1F53  E5        2534          PUSH  HL
1F54  C1        2535          POP   BC             ;BC=POINTER
1F55  0A        2536          LD    A,(BC)
1F56  6F        2537          LD    L,A            ;HL=ADDRESS TO STORE CODE
1F57  03        2538          INC   BC
1F58  0A        2539          LD    A,(BC)
1F59  67        2540          LD    H,A
1F5A  72        2541          LD    (HL),D         ;STORE DE AT HL
1F5B  23        2542          INC   HL
1F5C  73        2543          LD    (HL),E
1F5D  23        2544          INC   HL
1F5E  7C        2545          LD    A,H            ;STORE INCREMENTED ADDRESS IN PTR
1F5F  02        2546          LD    (BC),A
1F60  0B        2547          DEC   BC
1F61  7D        2548          LD    A,L
1F62  02        2549          LD    (BC),A
1F63  C1        2550          POP   BC
1F64  C9        2551          RET
                    2552 *EJECT
                    2553          ERROR:
                    2554 ;   THIS ROUTINE OUTPUTS AN ERROR MESSAGE
                    2555 ;   IF CLASS 2 ERROR THEN CONTROL IS
                    2556 ;   GIVEN TO THE RESET POINT.
                    2557 ;
                    2558 ;   C (R/D) - CLASS
                    2559 ;   B (R/D) - ERROR
                    2560 ;
1F65  78        2561          LD    A,B            ; OUTPUT ERROR LIGHTS
1F66  CBFF      2562          SET   7,A
1F68  CD3A20  R 2563          CALL  LIGHTS
1F6B  78        2564          LD    A,B
1F6C  0D        2565          DEC   C
1F6D  2002      2566          JR    NZ,A2301       ; BR IF CLASS=1
1F6F  CBEF      2567          SET   5,A            ; SET ERROR CLASS BIT
                    2568  A2301:
1F71  CD9E1F  R 2569          CALL  OCNTRL         ; OUTPUT THE CONTROL BYTE
1F74  0D        2570          DEC   C              ;CHECK ERROR CLASS
1F75  C0        2571          RET   NZ             ;RETURN IF CLASS 1
1F76  C30000  X 2572          JP    RESET          ;ELSE EXIT TO RESET POINT
```

```
                    2573        *EJECT
                    2574                SERROR:
                    2575        ;       THIS ROUTINE CALLS FOR A RETRANSMIT
                    2576        ;       REQUEST. IF THE ERROR OCCURS > 3 TIMES
                    2577        ;       THEN THE ERROR ROUTINE IS CALLED.
                    2578        ;
                    2579        ;       B (R) - ERROR NUMBER
                    2580        ;       C (R) - CLASS
                    2581        ;       A,H,L, REGS DESTROYED.
                    2582        ;
                    2583        ;
1F79  3ADB11  R     2584                LD      A,(RCNT)        ;INC RETRY COUNT
1F7C  3C            2585                INC     A
1F7D  32DB11  R     2586                LD      (RCNT),A
1F80  FE03          2587                CP      3               ;IS RCNT>=3?
1F82  3809          2588                JR      C,A2401         ;BR IF NO
1F84  CD651F  R     2589                CALL    ERROR           ;ELSE OUTPUT MESSAGE
                    2590                RESB    RXMIT,FLAG2
1F87  21E611  R                         LD      HL,FLAG2
1F8A  CB86                              RES     RXMIT,(HL)
1F8C  C9            2591                RET
                    2592        A2401:  SETB    RXMIT,FLAG2     ;SET RXMIT REQ.
1F8D  21E611  R                         LD      HL,FLAG2
1F90  CBC6                              SET     RXMIT,(HL)
1F92  3E82          2593                LD      A,82H           ;OUTPUT STOP XMIT
1F94  CD9E1F  R     2594                CALL    OCNTRL
1F97  C9            2595                RET
                    2596        *EJECT
                    2597        BLJ     EQU     $
                    2598        ;
                    2599        ;
                    2600        ;
                    2601        ;
                    2602        ;       THESE ARE THE MACHINE DEPENDENT
                    2603        ;       INPUT/OUTPUT ROUTINES CALLED BY
                    2604        ;       THE DMS SUBSYSTEM.
                    2605        ;
                    2606        ;
                    2607        ;
                    2608                DRSTAT:
                    2609        ;       THIS ROUTINE WILL INPUT THE DATA RAM STATUS
                    2610        ;       BYTE.
                    2611        ;       A (W) - DATA RAM STATUS BYTE
1F98  DB01          2612                IN      A,(PRTDRD)
1F9A  C9            2613                RET
                    2614        ;
                    2615        ;
                    2616        ;
                    2617        ;
                    2618        ;
                    2619                MACHSW:
                    2620        ;       THIS ROUTINE READS THE MACHINE SWITCHES AND SETS
                    2621        ;       UP A STATUS BYTE AS FOLLOWS:
                    2622        ;              BIT 0: 1=LOW RES. , 0=HIGH RES.
                    2623        ;              BIT 1: 1=8-1/2 INCHES, 0=11 INCHES
                    2624        ;              BIT 2: 1=RIGHT READ, 0=WRONG READ
                    2625        ;
```

```
1F9B  DB04       2626           IN     A,(PRTISD)
1F9D  C9         2627           RET
                 2628  *E
                 2629           OCNTRL:
                 2630  ;        THIS ROUTINE OUTPUTS A CONTROL BYTE TO
                 2631  ;        PROJECT Y SIGNIFYING AN ERROR MESSAGE,
                 2632  ;        CONTROL RESPONSE, CONTROL REQUEST, OR
                 2633  ;        DATA TRANSMIT ACKNOWLEDGE
                 2634  ;
                 2635  ;        A (R/D) - OUTPUT CODE
                 2636  ;
1F9E  C5         2637           PUSH   BC
1F9F  0603       2638           LD     B,3      ; SET STR AND CTR BITS
1FA1  CDB31F  R  2639           CALL   SDATA    ; OUTPUT THE BYTE
1FA4  C1         2640           POP    BC
1FA5  C9         2641           RET
                 2642
                 2643
                 2644
                 2645
                 2646
                 2647           XMITRQ:
                 2648  ;        THIS ROUTINE OUTPUTS A DATA TRANSMIT REQUEST
                 2649  ;        TO PROJECT Y OF ONE OF THE FOLLOWING TYPES:
                 2650  ;        TRANSMIT PROGRAM, LINE SEGMENT, OR FONT.
                 2651  ;
                 2652  ;        HL (R) - 2 BYTE TRANSMIT CODE
                 2653  ;        A REG. DESTROYED - NO OTHERS
                 2654  ;
1FA6  C5         2655           PUSH   BC
1FA7  0601       2656           LD     B,1      ; TO SET STR AND RESET CTR BITS
1FA9  7C         2657           LD     A,H
1FAA  CDB31F  R  2658           CALL   SDATA    ; OUTPUT 1ST BYTE
1FAD  7D         2659           LD     A,L
1FAE  CDB31F  R  2660           CALL   SDATA    ; OUTPUT 2ND BYTE
1FB1  C1         2661           POP    BC
1FB2  C9         2662           RET
                 2663  *E
                 2664           SDATA:
                 2665  ;        THIS ROUTINE SENDS A DATA BYTE TO PROJECT Y
                 2666  ;
                 2667  ;        A (R/D) - DATA BYTE
                 2668  ;        B (R)   - CONTROL BITS TO SET (1=STR, 3=STR&CTR)
                 2669  ;
1FB3  F5         2670           PUSH   AF
                 2671  U0901:
1FB4  DB0D       2672           IN     A,(PRTOCD)  ; WAIT FOR RDYN=1
1FB6  CB57       2673           BIT    2,A
1FB8  28FA       2674           JR     Z,U0901
1FBA  F1         2675           POP    AF          ; OUTPUT DATA BYTE
1FBB  D30C       2676           OUT    (PRTODD),A
1FBD  78         2677           LD     A,B         ; SET CONTROL BITS
1FBE  D30D       2678           OUT    (PRTOCD),A
                 2679  U0902:
1FC0  DB0D       2680           IN     A,(PRTOCD)  ; WAIT FOR RDYN=0
1FC2  CB57       2681           BIT    2,A
1FC4  20FA       2682           JR     NZ,U0902
```

```
1FC6  97          2683            SUB     A           ; RESET STR
1FC7  D30D        2684            OUT     (PRTOCD),A
1FC9  C9          2685            RET
                  2686  *E
                  2687            SGET:
                  2688  ;         THIS ROUTINE INPUTS A 16 BIT CODE FROM
                  2689  ;         PROJECT Y.
                  2690  ;
                  2691  ;         HL (W) - 16 BIT CODE
                  2692  ;
1FCA  CD031F  R   2693            CALL    GDATA
1FCD  67          2694            LD      H,A
1FCE  CD031F  R   2695            CALL    GDATA
1FD1  6F          2696            LD      L,A
1FD2  C9          2697            RET
                  2698
                  2699
                  2700
                  2701
                  2702            GDATA:
                  2703  ;         THIS ROUTINE INPUTS 1 BYTE FROM PROJECT Y
                  2704  ;         A (W) - DATA BYTE
                  2705  ;
1FD3  97          2706            SUB     A           ;RESET RDYN
1FD4  D309        2707            OUT     (PRTICD),A  ; DATA REQUEST
                  2708  B0A02:
1FD6  DB09        2709            IN      A,(PRTICD)  ; WAIT FOR STR=1
1FD8  CB47        2710            BIT     0,A         ; (DATA READY SIGNAL)
1FDA  28FA        2711            JR      Z,B0A02     ; LOOP UNTIL SET
1FDC  3E04        2712            LD      A,04H       ; SET RDY BIT
1FDE  D309        2713            OUT     (PRTICD),A
                  2714  B0A03:
1FE0  DB08        2715            IN      A,(PRTIDD)  ; INPUT THE DATA BYTE
1FE2  C9          2716            RET
                  2717  *E
                  2718            RAMOUT:
                  2719  ;         THIS ROUTINE SETS THE RAM TO OUTPUT MODE.
                  2720  ;         IT FIRST OUTPUTS A DATA RAM READY SIGNAL.
                  2721  ;         WHEN THE 8X300 RESPONDS THEN THE DATA
                  2722  ;         RAMS ARE SWITCHED. THE DATA RAM  READY BIT
                  2723  ;         IS THEN SWITCHED.
                  2724  ;
1FE3  DB01        2725            IN      A,(PRTDRD)
1FE5  CBC7        2726            SET     RAMRDY,A    ; OUTPUT RAM READY
1FE7  D301        2727            OUT     (PRTDRD),A
1FE9  FB          2728            EI                  ; ENABLE INTERRUPTS
                  2729  B0C01:
1FEA  CD9015  R   2730            CALL    WAIT        ; WAIT FOR INTERRUPT FROM
                  2731                                ; 8X300.
1FED  DB01        2732            IN      A,(PRTDRD)  ; CHECK IF PTU FAULT
1FEF  CB67        2733            BIT     PTUFLT,A
1FF1  C2F015  R   2734            JP      NZ,A0401    ; BR IF YES
1FF4  CB47        2735            BIT     RAMRDY,A    ; CHECK IF DATA RAMS WERE SWI
1FF6  20F2        2736            JR      NZ,B0C01    ; BR IF NO
1FF8  C9          2737            RET                 ; ELSE RETURN
                  2738
                  2739
```

```
                2740
                2741
                2742
                2743  RAMSWI: ; INTERRUPT ENTRY POINT WHEN 8X300 IS
                2744        ; READY TO SWITCH THE DATA RAMS.
                2745  ; ** N O T E : ******************************
                2746  ;          THE RAM SWITCHING ROUTINE IS
                2747  ;          TIME DEPENDENT. THEREFORE, DO NOT
                2748  ;          ALTER THIS ROUTINE WITHOUT CONSULTING
                2749  ;          THE SYSTEM TIMING DIAGRAM.
                2750  ; **********************************************
                2751
1FF9  F3        2752          DI
1FFA  F5        2753          PUSH    AF
1FFB  DB01      2754          IN      A,(PRTDRD)
1FFD  2F        2755          CPL             ; SWITCH THE DATA RAM BITS
1FFE  CB87      2756          RES     RAMRDY,A
2000  D301      2757          OUT     (PRTDRD),A
2002  F1        2758          POP     AF
2003  ED4D      2759          RETI
                2760  *E
                2761          RAMSEL:
                2762  ;       THIS ROUTINE OUTPUTS A FONT RAM SELECT CODE.
                2763  ;
                2764  ;       B (R/D) - FONT RAM NUMBER
                2765  ;       A,B REGS. DESTROYED
                2766  ;
2005  78        2767          LD      A,B
2006  32ED11  R 2768          LD      (FNTRAM),A      ; SAVE RAM NUMBER
2009  D5        2769          PUSH    DE
200A  1600      2770          LD      D,0
200C  58        2771          LD      E,B
200D  CD1B20  R 2772          CALL    STRLRU  ; STORE NEXT LRU VALUE INTO TABLE
2010  D1        2773          POP     DE
                2774  ;
2011  CDFF16  R 2775          CALL    FINDEX          ; SELECT AN INDEX
                2776  LINKRM:         ; ENTRY POINT FOR SWITCHING TO A LINKED RAM
2014  78        2777          LD      A,B
2015  3C        2778          INC     A
2016  3C        2779          INC     A
2017  3C        2780          INC     A
2018  D300      2781          OUT     (PRTFRD),A      ; OUTPUT THE FONT RAM SW
201A  C9        2782          RET
                2783  *E
                2784          STRLRU:
                2785  ;       THIS ROUTINE STORES THE NEXT LOWER VALUE IN LRUVAL
                2786  ;       INTO THE LRU TABLE.
                2787  ;
                2788  ;       DE(R) - INDEX INTO LRU TABLE
                2789  ;
201B  3AEE11  R 2790          LD      A,(LRUVAL)
201E  3D        2791          DEC     A
201F  32EE11  R 2792          LD      (LRUVAL),A      ; DEC VALUE
2022  2806      2793          JR      Z,U0A01 ; BR IF ZERO
                2794  LRU0:
2024  217310  R 2795          LD      HL,LRU-1        ; ELSE STORE IN LRU TABLE
2027  19        2796          ADD     HL,DE
```

```
2028  77          2797          LD    (HL),A
2029  C9          2798          RET            ; AND RETURN
                  2799  U0A01:
202A  C5          2800          PUSH  BC       ; IF 0 THEN SET ALL LRU ENTRIES TO 25
202B  217410  R  2801          LD    HL,LRU
202E  0608        2802          LD    B,8
                  2803  U0A03:
2030  7E          2804          LD    A,(HL)
2031  B7          2805          OR    A
2032  2802        2806          JR    Z,U0A02
2034  36FF        2807          LD    (HL),255
                  2808  U0A02:
2036  10F8        2809          DJNZ  U0A03
2038  C1          2810          POP   BC
2039  C9          2811          RET
                  2812  *E
                  2813         LIGHTS:
                  2814  ;      THIS ROUTINE OUTPUTS A LIGHT PATTERN TO
                  2815  ;      THE DISPLAY LIGHTS.
                  2816  ;      LIGHT # 0  -  WAITING FOR NEW PAGE
                  2817  ;              1  -  BUILDING DATA RAM
                  2818  ;              2  -  WAITING FOR OCS READY
                  2819  ;              3  -  FONT LOAD MODE
                  2820  ;              4  -  PROGRAM STORE MODE
                  2821  ;              5  -  PROGRAM LOAD MODE
                  2822  ;              6  -  MEMORY ERROR
                  2823  ;              7  -  ERROR (BITS 0-5 CONTAIN ERROR)
                  2824  ;
                  2825  ;      A (R) - LIGHT PATTERN
                  2826  ;
203A  C5          2827          PUSH  BC
203B  47          2828          LD    B,A
203C  DB05        2829          IN    A,(PRTOLD)
203E  E640        2830          AND   40H
2040  B0          2831          OR    B
2041  D305        2832          OUT   (PRTOLD),A
2043  C1          2833          POP   BC
2044  C9          2834          RET
                  2835
                  2836
                  2837  ; * * *  END OF I/O ROUTINES  * * *
                  2838
                  2839
                  2840
                  2841          END
```

APPENDIX II

PROG OCS    MICROCONTROLLER CROSS ASSEMBLER VER 1.1

```
1              PROG   OCS
2          ******************
3          *
4          *      CONDITIONAL ASSEMBLY
5          *
6          *      LST=0  WILL LIST ONLY THE TEST PROG
7          *
8          *      LST=1  WILL LIST ONLY THE OUTLINE CONVERTER PROG
9          *
10         *      LST=2  WILL LIST BOTH
11         *
12         ******************
13  000002 LST    EQU    2
14         ***
15         *
16         *
17                LIST   S,O
18                ENDIF
19         *
20         *
21         *
22         *
23         *
24         *
25         * THIS IS THE MAIN PROGRAM FOR THE OUTLINE
26         * CONVERTER SUBSYSTEM.
27         *
28         * GENERAL REGISTER ALLOCATION IS AS FOLLOWS
29         * UNLESS REDEFINED IN A SPECIAL ROUTINE.
30         *
31         *      /UX    GENERAL
32         *      R1     * BIT SAVE FOR 32 BIT FUNCTIONS
33         *      R2     GENERAL
34         *      R3     LINE SEG INPUT CODE
35         *      R4     INPUT CODE DATA FIELD
36         *      R5     SUBROUTINE PARAM 1
37         *      R6     SUBROUTINE PARAM 2
38         *      R11    SUBROUTINE LINK
39         *
40         * REFER TO SECTION R FOR FLOWCHART
41         *
42         *
43         * WRITTEN* 1/19/78
44         * AUTHOR: LOUIS C. VELLA
45         *
46         ******************************************
47         *
48         * ROUTINE DESCRIPTION FORMAT IS AS FOLLOWS
49         *
50         *      ROUTINE NAME
51         *           BRIEF DESCRIPTION OF ROUTINE FUNCTION
52         *
53         *      ENTRY PARAMETERS
54         *           REG CONTENTS, W/S CONTENTS, IV CONTENTS
55         *           REQUIRED ON ENTRY
56         *
57         *      REG DESTROYED
58         *           REG MODIFIED BY ROUTINE
59         *
60         *      I/O PORT MODIFIED
61         *           IV BYTES ALTERED (AN * INDICATES IV SELECTED ON EXIT)
62         *
63         *      W/S MODIFIED
64         *           W/S ALTERED (AN * INDICATES W/S SELECTED ON EXIT)
65         *
66         *      ROUTINE CALLS
67         *           OTHER ROUTINES CALLED
68         *
69         *      EXIT
70         *           ROUTINE EXIT POINTS
71         *
72         *
73         ******************************************
74
75         *
76         * FOLLOWING ARE THE LEFT BANK IV BYTE DEFINITIONS
77         *
78         *
79         * HARDWIRED PROCESSOR OUTPUT PORTS
80         *
81  001 7 0  DHGH   LIV    1,7,8      HIGH ORDER 8 OUTPUT BITS
82  002 7 0  DLOW   LIV    2,7,8      LOW ORDER 8 OUTPUT BITS
83  003 7 0  HWCT   LIV    3,7,8      OUTPUT CONTROL
84         *
85         * CONTROL OUTPUT SUBDEFINITION OF HWCT
86         *
87  003 0 1  HWHS   LIV    HWCT,0,1   HAND SHAKE BIT
88         *
89         *
90         *
91         *
92         * SPECIAL PURPOSE RESET & STATUS  OUTPUT PORT
93         *
94         *
95  004 7 0  HWPS   LIV    4,7,8
96  004 2 3  CONTRL LIV    HWPS,2,3   RESET GROUP
97  004 0 1  MSTRST LIV    HWPS,0     MASTER RESET
```

```
 98      004 1 1    RSTCLK LIV    HWPS,1        RESET CLOCK
 99      004 2 1    ENDSCN LIV    HWPS,2        FLD SCAN
100      004 7 5    GFREE  LIV    HWPS,7,5      FREE BITS
101
102                 *
103                 * SPECIAL PURPOSE STATUS INPUT PORT
104                 *
104      005 7 0    INPRT  LIV    5,7,8
105      005 7 1    PTUI   LIV    INPRT,7       PTU STATUS
106      005 6 1    DRDY   LIV    INPRT,6       DATA RAM RDY
107      005 5 6    IFREE  LIV    INPRT,5,6     FREE BITS
108
109
110                 * LIGHT GROUP
111                 *
112                 *
113      006 7 0    LIGHTS LIV    6,7,8
114      006 0 1    LG0    LIV    LIGHTS,0
115      006 1 1    LG1    LIV    LIGHTS,1
116      006 2 1    LG2    LIV    LIGHTS,2
117      006 3 1    LG3    LIV    LIGHTS,3
118      006 4 1    LG4    LIV    LIGHTS,4
119      006 5 1    LG5    LIV    LIGHTS,5
120      006 6 1    LG6    LIV    LIGHTS,6
121      006 7 1    LG7    LIV    LIGHTS,7
122
123                 *
124                 * DATA MEMORY PORTS
125
126                 * MEMORY ADDRESS PORTS
127      007 7 0    ADDH   LIV    7,7,8         HIGH ORDER 8 BITS
128      010 7 0    ADDL   LIV    8,7,8         LOW ORDER 8 BITS
129                 *
130                 * MEMORY CONTROL PORT
131                 *
132      011 7 0    MCONT  LIV    9,7,8
133      011 2 3    MGRP   LIV    MCONT,2,3
134      011 4 2    ST300  LIV    MCONT,4,2     STATUS GROUP
135      011 3 1    PTUO   LIV    ST300,3       PTU OUTPUT STATUS
136      011 4 1    PDYBX  LIV    ST300,4       8X300 RDY
137      011 7 3    MFREE  LIV    MCONT,7,3
138
139                 * MEMORY DATA PORT
140                 *
141      012 7 0    MDATA  LIV    10,7,8
142
143                 *
144                 * REFRESH COUNTER INPUT
145                 *
146      013 7 0    RFSH   LIV    11,7,8
147
148                 *
149                 * SWITCH GROUP
150                 *
151                 *
152      014 7 0    SWITCH LIV    12,7,8        SWITCHES
153      014 0 1    SW0    LIV    SWITCH,0
154      014 1 1    SW1    LIV    SWITCH,1
155      014 2 1    SW2    LIV    SWITCH,2
156      014 3 1    SW3    LIV    SWITCH,3
157      014 4 1    SW4    LIV    SWITCH,4
158      014 5 1    SW5    LIV    SWITCH,5
159      014 6 1    SW6    LIV    SWITCH,6
160      014 7 1    SW7    LIV    SWITCH,7
161
162
163                 * FOLLOWING ARE WORKING STORAGE AREA RESERVED
164                 * ON THE RIGHT BANK. NOTE ONLY PAGE 0 USED.
165                 *
166                 * GENERAL STATUS BYTE
167                 *
168      200 7 0    GSTA1  RIV    200H,7,8
169      200 0 1    G0     RIV    GSTA1,0       FREE BIT
170      200 1 1    LCRV   RIV    GSTA1,1       LAST CURVE OF
171                 *                           CHAR FOUND
172      200 2 1    FSG    RIV    GSTA1,2       FIRST SEGMENT FOUND
173                 *                           MARKER
174      200 3 1    LSA    RIV    GSTA1,3       LAST SEGMENT STILL
175                 *                           ACTIVE INDICATOR
176      200 4 1    G4     RIV    GSTA1,4       FREE BIT
177                 * RESET AT CPROC TO 0
178      200 5 1    EXTP   RIV    GSTA1,5       CURVE WITHIN
179                 *                           EXTRAPOLATION AREA.
180      200 6 1    CACT   RIV    GSTA1,6       THIS CURVE STILL
181                 *                           ACTIVE INDICATOR.
182      200 7 1    STEPV  RIV    GSTA1,7       STEEP SLOPE ACTIVE
183
184                 * GENERAL STATUS BYTE
185                 * TOP FIVE BITS FREE
186                 *
187      201 7 0    GSTA2  RIV    201H,7,8
188      201 7 2    RESH   RIV    GSTA2,7,2     OUTPUT RESOLUTION
189                 *                           (SEE SPEC FOR DETAIL).
190      201 5 1    RESN   RIV    GSTA2,5       OUTPUT COUNT FOR
191                 *                           HIGH RES
192
193                 * 24 BIT VS VALUE
```

```
194              * 10 BITS INTEGER: 14 BITS FRACTIONAL
195              *
196    202 7 0   YS1     RIV    202H,7,8      MSB 8 BITS
197    203 7 0   YS2     RIV    203H,7,8
198    204 7 0   YS3     RIV    204H,7,8      LSB 8 BITS
199              *
200              *
201              * 16 BIT START OF SEGMENT ADDRESS
202              *
203    205 7 0   SEGSH   RIV    205H,7,8
204    206 7 0   SEGSL   RIV    206H,7,8
205              *
206              *
207              * 16 BIT UPDATE FILE POINTER (OUTAP)
208              * POINTS TO YN OF CURVE
209              *
210    207 7 0   OUTAH   RIV    207H,7,8
211    210 7 0   OUTAL   RIV    210H,7,8
212              *
213              *
214              * 16 BIT INTEGER PART OF YS
215              *
216    211 7 0   YSDL    RIV    211H,7,8
217    212 7 0   YSDH    RIV    212H,7,8
218              *
219              *
220              * 16 BIT ADDRESS OF 1ST ACTIE LINE SEGMENT IN
221              * DATA RAM
222              *
223    213 7 0   FALCH   RIV    213H,7,8
224    214 7 0   FALCL   RIV    214H,7,8
225              *
226              *
227              * 16 BIT LINE SEG FILE POINTER SAVE AREA
228              *
229    215 7 0   PTRH    RIV    215H,7,8
230    216 7 0   PTRL    RIV    216H,7,8
231              *
232              *
233              * 16 BIT OUTPUT LIMIT OF DATA RAM (YLMT)
234              *
235    217 7 0   YLMTH   RIV    217H,7,8
236    220 7 0   YLMTL   RIV    220H,7,8
237              *
238              *
239              * 16 BIT OUTPUT RASTER NUMBER
240              * IN TWO COMPLEMENT
241              *
242    221 7 0   YSLNH   RIV    221H,7,8
243    222 7 0   YSLNL   RIV    222H,7,8
244              *
245              * 16 BIT POINTER. POINTS TO YN OF NEXT CURVE
246              *
247    223 7 0   HOLD1   RIV    223H,7,8
248    224 7 0   HOLD2   RIV    224H,7,8
249              *
250              *
251              * K VALUE FOR CURVE
252              *
253    225 7 0   K       RIV    225H,7,8
254              *
255              * 8 BIT DXDY OUTPUT BYTE
256              *
257    226 7 0   DXDYOT  RIV    226H,7,8
258              *
259              *
260              * 8 BIT GENERAL WORK BYTE
261              *
262    227 7 0   WORK1   RIV    227H,7,8
263              *
264              * 2ND 8 BIT GENERAL WORK BYTE
265              *
266    230 7 0   WORK2   RIV    230H,7,8
267              *
268              * 16 BIT PCNT, POINT IN EM SQUARE TO START
269              *
270    231 7 0   PCNTH   RIV    231H,7,8
271    232 7 0   PCNTL   RIV    232H,7,8
272              ORG    0
273    ***********************************************************
274              * INITIALIZE 8X300
275              *
276              * NOT NEEDED IF PAGE ON W/S REMOVED
277    ***********************************************************
278    177 7 3   PSR     RIV    177H,7,3      SELECT PAGE 0
279  00000 6 17177       SEL    PSR           OF WORKING RAM
280  00001 6 37300       XMIT   0,PSR
281              *
282              * INITIALIZE ANY I/O PORTS
283              *
284  00002 6 07003       SEL    HWCT          HARD WIRED PROC CONT
285  00003 6 27000       XMIT   0,HWCT
286  00004 6 17011       SEL    MCONT
287       011 4 5   MAS  LIV    MCONT,4,5
288  00005 6 24534       XMIT   11100B,MAS    INIT MEM X STATUS
```

```
***********************************************************************
* HARDWIRED PROCESSOR INITIALIZE
*
* PROCEDURE:
*     1. SET ALL 3 RESET LINES ON.
*     2. PULSE MASTER RESET FOR 250 NSEC.
*     3. PULSE CLK LINE 8192 TIMES FOR 1 USEC (ON/OFF).
*
*     4. PULSE END SCAN LINE FOR 1 NSEC.
*     5. DO STEPS 1 TO 4 A SECOND TIME.
*
* THE ABOVE WILL CAUSE THE HWP TO CLEAR OUT ALL ITS
* BUFFERS.
***********************************************************************
*
********** MACRO DEFINITIONS **********
*
*  LOGICAL OP :  OP1, OP2 = OPERANDS
*                I= INTERMEDIATE REG
*                R= DESTINATION OF RESULT
*                AUX, I, R, CHANGED
*
OP     MACRO   OP1,OP2,I,R
       MOVE    OP2,AUX
       XOR     OP1,I           FORM OP1 XOR OP2
       AND     OP1,AUX         FORM OP1 AND OP2
       XOR     I,R             R= (OP1 XOR OP2) XOR (OP1 AND OP2)
       ENDM
*
*  NOP
*
NOP    MACRO
       MOVE    AUX,AUX
       ENDM
*
*
* INITIALIZE HARDWIRED PROCESSOR
*
RCNT           EQU     3
RSTHWP XMIT    -2,RCNT         SET LOOP COUNT
       SEL     HWPS
       XMIT    7,CONTRL        SET ALL LINES UP
       XMIT    0,MSTRST        PULSE MASTER
       XMIT    1,MSTRST        RESET-250 NSEC.
       XMIT    1,AUX
       XMIT    0,R2            SET COUNT 8192 CLKS
*
       ORG     18,256          PAGE TO DELAY
*
NXTBUF XMIT    -32,R1
BUFCLK XMIT    0,RSTCLK
       ADD     R2,R2           DEC 256 COUNT
       NZT     R2,SET
       ADD     R1,R1           DEC 32 COUNT
       XMIT    1,RSTCLK        RESET CLK
       NZT     R1,DELAY        NOT END OF BUFFER
       ADD     RCNT,RCNT
       NOP
       XMIT    0,ENDSCN        SWITCH BUFFERS
       XMIT    1,ENDSCN
       NZT     RCNT,NXTBUF     CK IF BOTH DONE
       JMP     PTUR            GO RESET PTU
SET    NOP
       XMIT    1,RSTCLK
       NOP
DELAY  NOP
       JMP     BUFCLK
* RESET PTU, OUTPUT END PAGE
PTUR   SEL     HWCT
       XMIT    240H,AUX
       MOVE    AUX,HWCT
PUTW   NZT     HWHS,PUTW       WAIT FOR PAGE EJECT
*
***********************************************************************
*
*      START
*              PERFORM CPU TEST ONCE AND THEN CHECK IF
*              IN RUN OR TEST MODE
*
***********************************************************************
       CALL    TEST8
* GO DO OTHER TESTS IF ON
       CALL    TEST
***********************************************************************
*      OCSE
*              MAIN OUTLINE CONVERTER ROUTINE
*              ENTERED AT START OF RAM
*
*      ENTRY
*
*
*      REG DESTROYED
*              AUX
```

```
388    *
389    *    I/O PORTS MODIFIED
390    *         ADDH,ADDL,LIGHTS*
391    *
392    *    W/S MODIFIED
393    *         FALCH,FALCL*
394    *
395    *    ROUTINES CALLED
396    *         NONE
397    *
398    *    EXIT
399    *         TO WAIT FOR DATA RAM
400    ***************************************************************
401    *
402    *    START OF OCS OPERATING SYSTEM PROGRAM
403    *
404    *
405    *    INITIALIZE BASIC STATUS AND POINTERS
406    *
407    *
408    *
409  00047  6 17213   OCSE   SEL    FALCH
410         000047   PACK   EQU    OCSE
411  00050  6 00200          XMIT   200H,AUX    INITIALIZE 1ST ACTIVE
412  00051  0 00037          MOVE   AUX,FALCH   SEG POINTER TO
413  00052  6 17214          SEL    FALCL       32,77
414  00053  6 37002          XMIT   2,FALCL
415
416    *                                        INITIALIZE MEMORY
417  00054  6 07007          SEL    ADDH        ADDRESS PORT TO
418  00055  0 00027          MOVE   AUX,ADDH    32K
419  00056  6 07010          SEL    ADDL
420  00057  6 27000          XMIT   0,ADDL
421
422    *    SET RAM WAIT LIGHT
423    *
424  00060  6 07016          SEL    LIGHTS
425         006 7 3   RUNL   LIV    LIGHTS,7,3
426  00061  6 27301          XMIT   1,RUNL
427  00062  6 20100          XMIT   0,LGU       TURN OFF ERROR
429
430    ***************************************************************
431    *    OCST
432    *         OCS MAIN EXEC LOOP
433    *         WAIT FOR DATA RAM READY AND
434    *         THEN GO PROCESS
435    *
436    *    ENTRY
437    *         -
438    *
439    *    REG DESTROYED
440    *         AUX,R1
441    *
442    *    I/O PORTS MODIFIED
443    *         RDY8X
444    *
445    *    W/S MODIFIED
446    *         NONE
447    *
448    *    ROUTINE CALLS
449    *         NONE
450    *
451    *    EXIT
452    *         READ IN YLPT
453    *
454    ***************************************************************
455    *
456  00063  6 07005   OCSST  SEL    DRDY
457    *
458           ORG    4,32
459  00064  5 26126   OCSWT  NZT    DRDY,GO2
460  00065  7 00064          JMP    OCSWT
461  00066  5 26130   GO2    NZT    DRDY,GO
462  00067  7 00064          JMP    OCSWT
463    *
464    *******
465    *
466    * NOTE *****
467    *
468    * THIS ROUTINE IS TIME DEPENDENT
469    * FOR HARDWARE TO FUNCTION. CHANGES
470    * SHOULD NOT BE MADE FROM ADD
471    * OCS1+1 TO OCS2+1. IF THEY ARE
472    * REQUIRED, SEE TIME DIG. FOR
473    * DETAILS.
474    *
475    *********
476    *
477    * DO NOT PERMIT RAM SW IF REFSH TO OCCUR
478    *
479         177730   RFL1   EQU    -40          TWO'S COMP. LMT
480    *
481  00070  6 37013   GO     SEL    REFSH
482    *
483           ORG    4,256
484    *
```

```
485   0071  6 00330    OCS1   XMIT    RFL1,AUX
486   0072  1 27001           ADD     RFFSH,R1
487
488                   * IF CNT NOT=TO RFL1
489                   * DO RAM SWITCH
490                   *
491                   *
492   0073  5 01071           NZT     R1,OCS1
493   0074  6 07011   OCS2    SEL     RDYBX              SET 8X300 RDY
494   0075  6 24101           XMIT    1,RDYBX
495   0076  6 07005           SEL     DRDY
496   0077  7 00130           ORG     3,32
497   0100  5 26110   LOOP    NZT     DRDY,LOOP          WAIT FOR Z80 RAM SWITCH
498   0101  6 07011           SEL     RDYPX
499   0102  6 24100           XMIT    0,RDYBX            RESET 8X300 RDY
500
501                   * START RAM PROCESSING
503                   ************************************************************
504                   *
505                   *     YLMT
506                   *              START OF NEW DATA RAM
507                   *              READ IN YLMT FOR THIS RAM AND STORE
508                   *
509                   *     ENTRY
510                   *              ADDH,ADDL - POINTS TO LOC OF YLMT
511                   *
512                   *     REG DESTROYED
513                   *              R11
514                   *
515                   *     I/O PORTS MODIFIED
516                   *              LIGHTS,(ADDL*)
517                   *
518                   *     W/S MODIFIED
519                   *              FALCH,FALCL,GSTA1*
520                   *
521                   *     ROUTINES CALL
522                   *              MREAD
523                   *     EXIT
524                   *              GET
525                   *
526                   ************************************************************
527   0103  6 11012   YLMT    CALL    MREAD
      0104  7 01733
528   0105  6 17217           SEL     YLMTH
529   0106  0 27037           MOVE    MDATA,YLMTH
530   0107  6 11013           CALL    MREAD
      0110  7 01733
531
532                   * CK FOR NEW PAGE CONTROL
533                   *
534   0111  6 00314           XMIT    314H,AUX
535   0112  3 37100           XOR     YLMTH,AUX
536   0113  5 00116           NZT     AUX,*+3
537   0114  0 27004           MOVE    MDATA,R4
538   0115  7 00732           JMP     NPG
539
540                   * CK IF YLMT=0, IF YES TREAT AS
541                   * END OF PAGE
542                   *
543   0116  0 27000           MOVE    MDATA,AUX
544   0117  1 37000           ADD     YLMTH,AUX
545   0120  1 10000           ADD     OVF,AUX
546   0121  5 00124           NZT     AUX,*+3
547   0122  6 07003           SEL     HWCT
548   0123  7 50750           JMP     EPG2
549   0124  6 17220           SEL     YLMTL
550   0125  0 27037           MOVE    MDATA,YLMTL
551
552                   * START OF RAM PROCESSING
553                   * SET MEMORY ADD TO 1ST ACTIVE LINE SEG LOCATION
554
555                   *
556                   * SET FUNC PROC ON
557                   *
558   0126  6 37006   RESET   SEL     LIGHTS
559   0127  6 27302           XMIT    2,RUNL
560   0130  6 07007           SEL     ADDH
561   0131  6 17213           SEL     FALCH
562   0132  0 37027           MOVE    FALCH,ADDH
563   0133  6 07010           SEL     ADDL
564   0134  6 17214           SEL     FALCL
565   0135  0 37027           MOVE    FALCL,ADDL
566
567                   * RESET STATUSES , FIRST SEG
568                   * FOUND, LAST SEG ACT,
569                   *
570   0136  6 17200           SEL     GSTA1
571         200 3 2   G1      AIV     GSTA1,3,2
572   0137  6 33201           XMIT    1,G1
574                   ************************************************************
575                   *
576                   *     GET
577                   *              READ NEXT 16 BIT CODE IN DATA RAM.
578                   *              DECODE AND TRANSFER TO ROUTINE
579                   *              CODE IN R3/R4/MDATA=R3.
```

```
                    ENTRY
                        ADDH,ADDL - POINTS TO NEXT CODE

REG DESTROYED
                        R3,R4,R11

I/O PORTS MODIFIED
                        NONE(MDATA*)

W/S MODIFIED
                        NONE

ROUTINES CALL
                        MREAD

EXIT
                        CHAR
                        YPOS
                        XPOS
                        SUBF
*****************************************************************
00140  6 11004   GET  CALL   MREAD
00141  7 01733
00142  0 27003        MOVF   MDATA,R3
00143  6 11005        CALL   MREAD
00144  7 01733
00145  0 27004        MOVF   MDATA,R4

00146  0 03027        MOVF   R3,MDATA        DECODE TOP TWO BITS
       012 1 2   TYPE LIV    MDATA,1,2

ORG    6,32            PAGE TO FUNC TABLE 00147  4 21210        XEC    FUNC(TYPE)      TRANS CONTROL 00150  7 00755   FUNC JMP    CHAR
00151  7 00220        JMP    YPOS
00152  7 00271        JMP    XPOS
00153  7 00154        JMP    SUBF
*****************************************************************
                    RETURN
                        RETURN POINT AFTER CODE PROCESSED

ENTRY
                        ADDH,ADDL - POINT TO NEXT CODE IN RAM TO PROCESS

REG DESTROYED
                        NONE

I/O PORTS MODIFIED
                        NONE

W/S MODIFIED
                        NONE

ROUTINE CALLS
                        NONE

EXIT
                        TO GET
*****************************************************************
       000140   RETURN EQU   GET
*****************************************************************
                    SUBF
                        DECODE ON BITS 2-7 OF MDATA AND
                        TRANSFER TO SUBFUNCTION

ENTRY
                        MDATA SELECTED WITH CODE

REG DESTROYED
                        AUX

I/O PORTS MODIFIED
                        NONE(MDATA*)

W/S MODIFIED
                        NONE

ROUTINE CALLS
                        NONE

EXIT
                        VIA SUBT TABLE
*****************************************************************
                      ORG    34,256          PAGE SUBT TABLE
```

```
675              012 7 5    CODE    LIV     MDATA,7,5
676    00154    0 0275.0    SURF    MOVE    CODE,AUX
677    00155    4 00156             XEC     SUBT(AUX)
678                         *
679    00156    7 00140    SUBT     JMP     RETURN
680    00157    7 00216             JMP     SAVEH
681    00160    7 00354             JMP     OFLTY
682    00161    7 00216             JMP     SAVEH
683    00162    7 00474             JMP     SCLL
684    00163    7 00140             JMP     RETURN         PLJ ROUTINE
685    00164    7 00216             JMP     SAVEH
686    00165    7 00506             JMP     LNKL
687    00166    7 00216             JMP     SAVEH
688    00167    7 00576             JMP     RVYL
689    00170    7 00216             JMP     SAVEH
690    00171    7 00620             JMP     RVXL
691    00172    7 00702             JMP     NPG
692    00173    7 00513             JMP     SLOFF
693    00174    7 00516             JMP     SLANT          PLUS 7
694    00175    7 00516             JMP     SLANT          MINUS 7
695    00176    7 00516             JMP     SLANT          PLUS 14
696    00177    7 00516             JMP     SLANT          MINUS 14
697    00200    7 00716             JMP     EDAT
698    00201    7 00720             JMP     FPG
699    00202    7 00313             JMP     YACC
700    00203    7 00140             JMP     RETURN         FONT CODE - SHOULD NOT OCCUR
701    00204    7 00216             JMP     SAVEH
702    00205    7 00576             JMP     RVYL
703    00206    7 00216             JMP     SAVEH
704    00207    7 00640             JMP     LRULE
705
706                         * THE FOLLOWING WILL IGNORE ANY INVALID INPUT CODES
707                         * NOTE ONLY 5 BITS OF THE SUBFUNCTION ARE BEING
708                         * CHECKED. IF ADDITIONAL FUNCTIONS ARE NEEDED
709                         * ALTER IV DEF OF 'CODE' AND EXTEND THIS TABLE.
710                         *
711    00210    7 00140             JMP     RETURN
712    00211    7 00140             JMP     RETURN
713    00212    7 00140             JMP     RETURN
714    00213    7 00140             JMP     RETURN
715    00214    7 00140             JMP     RETURN
716    00215    7 00140             JMP     RETURN
717                         *
718                         *
719                         *
720                         *
721                         *
722                         *
723                         ****************************************************************
724                         *      SAVEH
725                         *              THIS ROUTINE IS USED BY 32 BIT FUNCTION CODES.
726                         *              IT SAVES THE FIRST 8 BIT FIELD OF THE FUNCTION
727                         *              CODE IN REG ONE.
728                         *
729                         *      ENTRY
730                         *              REG 4=8 BIT DATA FIELD TO SAVE
731                         *
732                         *      REG DESTROYED
733                         *              REG 1
734                         *
735                         *      I/O PORTS MODIFIED
736                         *              NONE
737                         *
738                         *      W/S MODIFIED
739                         *              NONE
740                         *
741                         *      ROUTINE CALLS
742                         *              NONE
743                         *
744                         *      EXIT
745                         *              RETURN
746                         *
747                         ****************************************************************
748
749    00216    0 04001    SAVEH    MOVE    R4,R1
750    00217    7 00140             JMP     RETURN
751
752                         ****************************************************************
753                         *
754                         *      YPOS
755                         *              DEFINES NEW LINE SEGMENT START
756                         *              CHECK IF SEGMENT IN SETTING AREA
757                         *              NO-OUTPUT RASTER
758                         *              YES-GO ACTIVATE LINE SEGMENT
759                         *
760                         *      ENTRY
761                         *              R3/R4=YPOS VALUE
762                         *              ADDH/ADDL=ADDRESS OF YPOS CODE +2
763                         *              YSLNH           YSLNL=CURRENT SET LEVEL
764                         *
765                         *      REG DESTROYED
766                         *              R4,5,6,11,AUX,OVF
767                         *
768                         *      I/O PORTS MODIFIED
769                         *              MDATA*,ADDH,ADDL
770                         *
771                         *      W/S MODIFIED
772                         *              NONE
```

```
773                    *
774                    *     ROUTINE CALLS
775                    *          IPTR,CKLNK,RASOUT,MWRTE,YACC
776                    *
777                    *     EXIT   VIA
778                    *              YACC-R4=0
779                    *              RASOUT-R4=0
780                    *
781                    ************************************************************
782                    *
783                    * BACK UP PTR TO START OF YPOS
784                    *
785   0220  6 06376    YPOS   XMIT    -2,R6
786   0221  6 11506           CALL    IPTR
      0222  7 01775
787   00223 6 17222           SEL     YSLNL
788   0224  0 37000           MOVE    YSLNL,AUX          LOWER BITS
789   00225 1 04004           ADD     R4,R4              FOR OVERFLOW
790   00226 0 10000           MOVE    OVF,AUX
791   00227 6 17221           SEL     YSLNH              COMPUTE
792   0230  1 37000           ADD     YSLNH,AUX          UPPER BITS
793   0231  6 17012           SEL     MDATA
794         012 7 6    MYPOS  LIV     MDATA,7,6          FOR SIGN
795   00232 1 27000           ADD     MYPOS,AUX
796   00233 0 90027           MOVE    AUX,MDATA
797                    *
798                    * TEST SIGN RESULT
799                    * ZERO OR NEG - ACTIVATE LINE SEG
800                    * POS - END RASTER
801                  * * DIFFERENCE IN R4/MDATA
802                    *
803                    *
804   00234 7 00240           ORG     10,32              PAGE TO YPOS1
805                    *
806         012 0 1    MSIGN  LIV     MDATA,0
807   00240 5 20110           NZT     MSIGN,YPOS1        NEG
808   00241 5 27004           NZT     MDATA,YPOS2        POS
809   00242 5 04244           NZT     R4,YPOS2           POS
810   00243 7 00250           JMP     YPOS1
811                    *
812                    * CALL RASOUT TO OUTPUT RASTER
813                    *
814                    *
815                    *
816                    * GO SEE IF LINK NEEDED
817                    *
818   00244 6 04003    YPOS2  XMIT               3,R4
819   00245 7 01655           JMP     CKLNK
820   00246 6 04000    YPOSL  XMIT               0,R4
821   00247 7 01607           JMP     RASOUT             GO OUTPUT RASTER
822                    *                                 ZERO
823                    * ACTIVATE LINE SEGMENT
824                    * BACK UP PTR TO START OF SEGMENT
825                    *
826                    * PT/R6=ADD OF YPOS
827                    *
828                    * SAVE COUNT IN WORK1 & WORK2
829   00250 6 17231    YPOS1  SEL     PCNTH
830   00251 0 00037           MOVE    AUX,PCNTH
831   00252 6 17232           SEL     PCNTL
832   00253 0 04037           MOVE    R4,PCNTL
833   00254 6 00324           XMIT    324H,AUX
834   00255 0 70027           MOVE    AUX,MDATA
835   00256 6 07007           SEL     ADDH
836   00257 0 05027           MOVE    R5,ADDH
837   00260 6 07010           SEL     ADDL
838   00261 0 06027           MOVE    R6,ADDL
839                    *
840                    * PUT IN YACC CONTROL
841                    *
842   00262 6 11607           CALL    MWRTE              RAM
      00263 7 01731
843   00264 6 27000           XMIT    0,MDATA
844   00265 6 11010           CALL    MWRTE
      00266 7 01731
845                    *
846                    * SET YACC ARG IN R4
847                    *
848   0267  6 04000           XMIT    0,R4               SIMULATES YACC DECODE
849   00270 7 00303           JMP     YACC               GO EXECUTE
850                    ************************************************************
851                    *
852                    *      XPOS
853                    *              NEW X COORDINATE
854                    *              OUTPUT TO HWP
855                    *
856                    *      ENTRY
857                    *              PT/R4=XPOS VALUE
858                    *
859                    *      REGISTORS DESTROYED
860                    *              AUX
861                    *
862                    *      I/O PORTS MODIFIED
863                    *              DHGH,DLOW,HWCT*
864                    *
865                    *      W/S MODIFIED
```

```
866                    *              NONE
867                    *
868                    *          ROUTINES CALLED
869                    *              NONE
870                    *          EXIT
871                    *              RETURN
872                    *
873                    *
874                    ****************************************************************
                                                          SET UP CONTROL
875    00271  6 07003  XPOS   SEL   HWHS
876    00272  5 20132  XPOS1  NZT   HWHS,XPOS1   CK HWP HAND SHAKE BIT
877    00273  6 07001         SEL   DHGH         MOVE XPOS
878    00274  0 03027         MOVE  P3,DHGH      VALUE TO OUTPUT
879    00275  6 07002         SEL   DLOW         REGISTERS
880    00276  0 04027         MOVE  P4,DLOW
881    00277  6 07003         SEL   HWCT
882    00300  6 00202         XMIT  202H,AUX     LOAD 11000010
883    00301  0 00027         MOVE  AUX,HWCT
884    00302  7 00140         JMP   RETURN
885
886                    ****************************************************************
887                    *
888                    *      YACC
889                    *              NEW LINE SEGMENT START-SET ACTIVE
890                    *              THIS CODE IS FOLLOWED BY THE 24 BIT YS IN DRU
891                    *              FOR THIS SEGMENT.
892                    *
893                    *      ENTRY
894                    *              R4-MSB 8 BITS OF YS
895                    *              ADDL          ADDH-POINTS TO NEXT 8 BITS OF YS
896                    *
897                    *      REG DESTROYED
898                    *              AUX,P1,3,4,5,6,11
899                    *
900                    *      I/O PORTS MODIFIED
901                    *              PDATA,DHGH,DLOW,HWCT*
902                    *
903                    *      W/S MODIFIED
904                    *              FALCH,FALCL,SEGSH,SEGSL
905                    *              YS1,YS2,YS3,YSDL,YSDH*,LSA,FSG
906                    *
907                    *      ROUTINES CALLED
908                    *              IPTR,CKLNK,MREAD,SLOFF
909                    *
910                    *      EXIT
911                    *              VIA SLOFF
912                    *
913                    *
914                    ****************************************************************
915    00303  6 06376  YACC   XMIT  -2,P6        GET START ADD
916    00304  6 11011         CALL  IPTR         IN REG 5 & 6
       00305  7 01775
917    00306  6 17206         SEL   GSTA1        CK IF THIS FIRST
918    00307  0 04003         MOVE  R4,R3
919                    *
920                           CRG   9,32         PAGE TO YACC1
921                    *
922    00310  5 32116         NZT   FSG,YACC1    LINE SEG IN RAM
923                    *
924                    *      FIRST SEG OF RAM, MARK LOCATION SET STATE
925    00311  6 32101         XMIT  1,FSG
926    00312  6 17213         SEL   FALCH        SAVE ADD OF 1ST LINE
927    00313  0 05037         MOVE  P5,FALCH     SEG IN WORK AREA
928    00314  6 17214         SEL   FALCL
929    00315  0 06037         MOVE  P6,FALCH
930                    *
931                    * GO SEE IF LAST SEG CAN BE DELETED
932                    *
933    00316  6 04030  YACC1  XMIT  0,R4
934    00317  7 01655         JMP   CKLNK        RETURN-YACCR
935                    *
936                    *
937    00320  6 17205  YACCR  SEL   SEGSH        SAVE ADD OF START
938    00321  0 05037         MOVE  R5,SEGSH     LOC OF SEG IN
939    00322  6 17206         SEL   SEGSL        WORK AREA
940    00323  0 06037         MOVE  R6,SEGSL
941                    *
942                    * GET NEXT 8 BITS OF YACC
943                    *
944    00324  6 11012         CALL  MREAD
       00325  7 01733
945    00326  6 17203         SEL   YS2
946    00327  0 27037         MOVE  MDATA,YS2
947    00330  0 27001         MOVE  MDATA,R1     HOLD FOR OUTPUT
948                    *
949                    *      GET  NEXT 8 BITS OF YACC
950                    *
951    00331  6 11012         CALL  MREAD
       00332  7 01733
952    00333  6 17204         SEL   YS3
953    00334  0 27037         MOVE  MDATA,YS3
954                    * SAVE TOP 8 BITS
955    00335  6 17202         SEL   YS1
956    00336  0 03037         MOVE  R3,YS1
957                    *
958                    *      RESET LAST SEG ACT FLAG
959                    *
```

```
960    00337  6 17230        SEL     GSTA1
961    00340  6 33100        XMIT    0,LSA
962
963                    * DECIMAL ALIGN YS TO YN FORMAT - INTEGER PART ONLY
964                    *
965    00341  6 00003        XMIT    3,AUX           SHIFT RT TOP TWO BITS
966    00342  2 01601        AND     R1(6),R1        SET REM TO ZERO
967    00343  6 00374        XMIT    374H,AUX        GET LOW 6 BITS OF
968    00344  2 03600        AND     R3(6),AUX       R3
969    00345  6 17211        SEL     YSDL            ADD TO LAST TWO BITS
970    00346  1 01037        ADD     R1,YSDL         AND STORE
971    00347  6 00003        XMIT    3,AUX
972    00350  6 17212        SEL     YSDH
973    00351  2 03603        AND     R3(6),R3
974    00352  0 03037        MOVE    R3,YSDH
975    00353  7 00513        JMP     SLOFF           GO TURN SLANT OFF
*********************************************************************
977
978                    *
979                    *   DELTY
980                    *       UPDATE THE YS (YACC IN DRU) FOR THIS LINE SEGMENT
981                    *       FOR NEXT RASTER PROCESSING (POINT SIZE).
982                    *
983                    *   ENTRY
984                    *       R1/R4=DELTYVALUE
985                    *       SEGSH/SEGSL=ADD OF YACC FOR THIS LINE SEGMENT
986                    *       YS1/YS2/YS3=CURRENT LINE SEG SET LEVEL IN DRU
987                    *       PCNT1      PCNT2=EM SQUARE START
988                    *
989                    *   REG DESTROYED
990                    *       ALL
991                    *
992                    *   I/O PORTS MODIFIED
993                    *       MDATA (ADDL*)
994                    *
995                    *   W/S MODIFIED
996                    *       YS1,YS2,YS3 (SEGSL*),PCNTL,PCNTH
997                    *
998                    *   ROUTINES CALLED
999                    *       PWRTF,IPTR
1000                   *
1001                   *   EXIT
1002                   *       RETURN
1003                   *
*********************************************************************
1004
1005                   *
1006                   *   ALIGN DEC WITH YSACC
1007                   *                           PUT TOP 3 BITS OF R1
1008   00354  6 00003  DELTY   XMIT    3,AUX       INTO R5-ZERO TOP 5 BITS
1009   00355  2 01505          AND     R1(5),R5
1010   00356  6 00370          XMIT    370H,AUX    SHIFT LEFT R13,ZERO
1011   00357  2 01501          AND     R1(5),R1    BOTTOM 3 BITS
1012   00360  6 00007          XMIT    7,AUX       GET TOP 3 BITS OF R4
1013   00361  2 04500          AND     R4(5),AUX   SHIFT RT TO BOTTOM,ZERO TOP
1014   00362  1 01006          ADD     R1,R6       ADD TO R1
1015   00363  6 00370          XMIT    370H,AUX    SHIFT R4 LEFT 3,ZERO
1016   00364  2 04504          AND     R4(5),R4    BOTTOM BITS
                       *
1017                   *   DELTA Y NOW IN R5,R6,R4
1018                   *
1019                   *   ADD TO YSACC (YS1,2,3)
1020                   *
1021
1022   00365  6 17204  NADD    SEL     YS3
1023   00366  0 04000          MOVE    R4,AUX          ADD LOW 8 BITS
1024   00367  1 37003          ADD     YS3,R3
1025   00370  6 17203          SEL     YS2
1026   00371  0 06000          MOVE    R6,AUX
1027   00372  1 10000          ADD     OVF,AUX
1028   00373  1 37002          ADD     YS2,R2
1029   00374  6 17202          SEL     YS1             ADD TOP 8 BITS
1030   00375  0 05000          MOVE    R5,AUX
1031   00376  1 10000          ADD     OVF,AUX
1032   00377  1 37001          ADD     YS1,R1
1033                   *
1034                   *   RESULT NOW IN R1,R2,R3
1035                   *
1036                   *   CHECK IF SUM COUNTER = 0
1037                   *
1038   00400  6 17231          SEL     PCNTH           ADD COUNTER HALFS AND
1039   00401  0 37000          MOVE    PCNTH,AUX       CK FOR ZERO
1040   00402  6 17232          SEL     PCNTL
1041   00403  1 37000          ADD     PCNTL,AUX
1042   00404  1 10000          ADD     OVF,AUX
1043   00405  5 00007          NZT     AUX,DELT1
1044   00406  7 00424          JMP     DELT2           GO WRITE & OUTPUT
1045                   *
1046                   *   SAVE UPDATE YSL IN W/S
1047                   *
1048   00407  6 17202  DELT1   SEL     YS1
1049   00410  0 01037          MOVE    R1,YS1
1050   00411  6 17203          SEL     YS2
1051   00412  0 02037          MOVE    R2,YS2
1052   00413  6 17204          SEL     YS3
1053   00414  0 03037          MOVE    R3,YS3
1054                   *
1055                   *   DEC SUM COUNTER (# IN TWO'S COMP)
1056                   *
```

```
1057   00415  6 00311           XMIT    1,AUX
1058   00416  6 17232           SEL     PCNTL
1059   00417  1 37037           ADD     PCNTL,PCNTL
1060   00420  0 10027           MOVE    OVF,AUX
1061   00421  6 17231           SEL     PCNTH
1062   00422  1 37037           ADD     PCNTH,PCNTH
1063   00423  7 00365           JMP     NADD
1064
1065                     *
1066                     *
1067                     * HOLD CURRENT MEMORY ADD IN R1 & R4
1068                     * PUT IN SEGSTART ADD
1069                     *
1070   00424  6 07012   DELT2    SEL     MDATA
1071   00425  0 01027           MOVE    R1,MDATA
1072   00426  6 07007           SEL     ADDH
1073   00427  6 17235           SEL     SEGSH
1074   00430  1 27011           MOVE    ADDH,R1
1075   00431  0 37027           MOVE    SEGSH,ADDH
1076   00432  6 07010           SEL     ADDL
1077   00433  6 17236           SEL     SEGSL
1078   00434  0 27014           MOVE    ADDL,R4
1079   00435  0 37027           MOVE    SEGSL,ADDL
1080
1081                     * TO WRITE NEXT YS INTO LINE SEGMENT
1082                     *
1083   00436  6 06001           XMIT    1,R6         SKIP OVER YACC
1084   00437  6 11014           CALL    IPTR         CONTROL CODE
       00440  7 01775
1085   00441  0 05027           MOVE    R5,ADDH
1086   00442  6 07010           SEL     ADDL
1087   00443  0 06027           MOVE    R6,ADDL
1088
1089                     * WRITE OUT 3 BYTE YSACC
1090                     *
1091   00444  6 11015           CALL    MWRTE
       00445  7 01731
1092   00446  0 02027           MOVE    R2,MDATA
1093   00447  6 11016           CALL    MWRTE
       00450  7 01731
1094   00451  0 03027           MOVE    R3,MDATA
1095   00452  6 11017           CALL    MWRTE
       00453  7 01731
1096
1097                     * RESTORE PTR VALUE (R1 & R4)
1098                     *
1099   00454  6 07007           SEL     ADDH
1100   00455  0 01027           MOVE    R1,ADDH
1101   00456  6 07010           SEL     ADDL
1102   00457  0 04027           MOVE    R4,ADDL
1103
1104                     *   OUTPUT NEW YS VALUE
1105                     *
1106   00460  6 07203           SEL     HWHS
1107   00461  5 20121   DLTS    NZT     HWHS,DLTW
1108   00462  6 17202           SEL     YS1
1109   00463  6 07001           SEL     DHGH
1110   00464  0 37027           MOVE    YS1,DHGH
1111   00465  6 17203           SEL     YS2
1112   00466  6 07002           SEL     DLOW
1113   00467  0 37027           MOVE    YS2,DLOW
1114   00470  6 00236           XMIT    236H,AUX
1115   00471  6 07003           SEL     HWCT
1116   00472  0 00027           MOVE    AUX,HWCT
1117   00473  7 00140           JMP     RETURN
1119   ************************************************************
1120
1121                     *    SCLL
1122                     *       SET WIDTH ROUTINE
1123                     *       JUST OUTPUT SCALE VALUE TO HWP
1124                     *
1125                     *    ENTRY
1126                     *       R1/R4=SCALE VALUE TO OUTPUT
1127                     *
1128                     *    REG DESTROYED
1129                     *       AUX
1130                     *
1131                     *    I/O PORTS MODIFIED
1132                     *       DHGH,DLOW,HWCT*
1133                     *
1134                     *    W/S MODIFIED
1135                     *       NONE
1136                     *
1137                     *    ROUTINES CALLED
1138                     *       NONE
1139                     *
1140                     *    EXIT
1141                     *       RETURN
1142                     *
1143   ************************************************************
1144   00474  6 07203   SCLL    SEL     HWHS
1145   00475  5 20135   SCLL1   NZT     HWHS,SCLL1   WAIT TILL HWP RDY
1146   00476  6 07001           SEL     DHGH         PUT IN DATA BYTES
1147   00477  0 01027           MOVE    R1,DHGH
1148   00500  6 07002           SEL     DLOW
```

```
1149  00501  0 04027       MOVE   R4,DLOW
1150  00502  6 07003       SEL    HWCT          SET CCNT
1151  00503  6 00201       XMIT   201H,AUX      LOAD 1'000001
1152  00504  0 00027       MOVE   AUX,HWCT
1153  00505  7 00140       JMP    RETURN
************************************************************
*
*       LINKL
*              LINK TO NEXT ACTIVE LINE SEGMENT
*
*       ENTRY
*              R1/R4=NEXT LINE SEGMENT START
*
*       REG DESTROYED
*              NONE
*
*       I/O PORTS MODIFIED
*              ADDH,ADDL*
*
*       W/S MODIFIED
*              NONE
*
*       ROUTINE CALLS
*              NONE
*
*       EXIT
*              RETURN
*
************************************************************
1179  00506  6 07007  LNKL SEL    ADDH
1180  00507  0 01027       MOVE   R1,ADDH
1181  00510  6 07010       SEL    ADDL
1182  00511  0 04027       MOVE   R4,ADDL
1183  00512  7 00140       JMP    RETURN
************************************************************
*
*       SLOFF
*              TURN OFF SLANT
*
*       ENTRY
*              NONE
*       REG DESTROYED
*              P1/P2
*
*       I/O PORTS MODIFIED
*              NONE
*
*       W/S MODIFIED
*              NONE
*
*       ROUTINE CALLS
*              SLOUT
*
*       EXIT
*              VIA SLOUT
*
************************************************************
1208  00513  6 11905 SLOFF XMIT   0,P1
1209  00514  6 42          XMIT   ,P2
1210  00515  7 00564       JMP    SLOUT
************************************************************
*
*       SLANT
*              COMPUTE SLANT CONSTANT FOR LINE SEGMENT
*
*       ENTRY
*              MDATA=SLANT CODE & SELECTED
*              YS1/YS2/YS3=CURRENT LINE SEGMENT SET LEVEL
*       REG DESTROYED
*              AUX,R1,R2,R3,R4
*
*       I/O PORTS MODIFIED
*              NONE
*
*       W/S MODIFIED
*              NONE
*
*       ROUTINE CALLS
*              SLOUT
*
*       EXIT
*              VIA SLOUT
************************************************************
* TWO'S COMP YS1,YS2,YS3
* RESULT IN R1,2,3
*
1238  00516  6 00377 SLANT XMIT   -1,AUX
1239  00517  6 17202       SEL    YS1
1240  00520  3 37011       XOR    YS1,R1
1241  00521  6 17203       SEL    YS2
1242  00522  3 37012       XOR    YS2,R2
1243  00523  6 17204       SEL    YS3
1244  00524  3 37013       XOR    YS3,R3
1245  00525  6 00001       XMIT   1,AUX
1246  00526  1 03003       ADD    R7,R7
1247  00527  0 17000       MOVE   OVF,AUX
```

```
1248   00530  1 02502          ADD     R2,R2
1249   00531  0 10030          MOVE    OVF,AUX
1250   00532  1 01001          ADD     R1,R1
1251
1252                     *  ADD TO CONS 344
1253                     *
1254   00533  6 00126           XMIT    126H,AUX        344 SHIFTED R2 TO
1255   00534  1 01001           ADD     R1,R1           ALIGN INT TO YS
1256
1257                     *  ALIGN DEC POINT SO
1258                     *  R1=INT & R2=FRACTIONAL AND DIV. BY 4 OR 8.
1259                     *
1260                     *  IF SLANT IS 14 - R1 & R2 ARE ALIGNED SINCE A RT SHIFT
1261                     *  OF 2 IS SAME AS LEFT SHIFT OF DEC POINT.
1262                     *
1263                     *  IF SLANT IS 7, SHIFT R1 & R2 RT 1 AND PROP SIGN BIT
1264                     *
1265          012 6 1    SLDEG  LIV     MDATA,6         14 OR 7 DEG
1266                     *
1267   00535  7 00540           ORG     4,32
1268                     *
1269   00540  5 26102           NZT     SLDEG,DIV8
1270   00541  7 00553           JMP     CKSGN           14, GO TEST DIRECTION
1271                     *
1272                     *  7 DEG - SHIFT R1 & R2 RT 1
1273                     *
1274   00542  6 00200    DIV8   XMIT    200H,AUX        SAVE SIGN IN MSB OF
1275   00543  2 01003           AND     R1,R3           R3
1276   00544  2 01104           AND     R1(1),R4        SAVE LSB OF R1 IN MSB OF R4
1277   00545  6 00177           XMIT    177H,AUX
1278   00546  2 02130           AND     R2(1),AUX
1279   00547  1 04002           ADD     R4,R2           SHT RT R2 1
1280   00550  6 00177           XMIT    177H,AUX        PUT IN LSB OF R1
1281   00551  2 01130           AND     R1(1),AUX       SHT RT R1 1
1282   00552  1 03001           ADD     R3,R1           ADD IN SIGN BIT
1283                     *
1284                     *  CHECK DIRECTION OF SLANT
1285                     *  IF NEG, COMP R1,R2
1286                     *
1287          012 7 1    SLDIR  LIV     MDATA,7
1288                            ORG     4,32
1289   00553  5 27115    CKSGN  NZT     SLDIR,SCOMP
1290   00554  7 00564           JMP     SLOUT
1291   00555  6 00377    SCOMP  XMIT    -1,AUX
1292   00556  3 01001           XOR     R1,R1
1293   00557  3 02002           XOR     R2,R2
1294   00560  6 00001           XMIT    1,AUX
1295   00561  1 02002           ADD     R2,R2
1296   00562  0 10000           MOVE    OVF,AUX
1297   00563  1 01001           ADD     R1,R1
1298
1299         *****************************************************************
1300         *
1301         *    SLOUT
1302         *
1303         *         OUTPUT SLANT CONSTANT
1304         *
1305         *    ENTRY
1306         *         R1/R2=SLANT CONSTANT
1307         *
1308         *    REG DESTROYED
1309         *         AUX
1310         *
1311         *    I/O PORTS MODIFIED
1312         *         DHGH,DLOW,HWCT*
1313         *
1314         *    W/S MODIFIED
1315         *         NONE
1316         *
1317         *    ROUTINE CALLS
1318         *         NONE
1319         *
1320         *    EXIT
1321         *         RETURN
1322         *
1323         *****************************************************************
1323   00564  6 07003    SLOUT  SEL     HWHS
1324   00565  5 20125    SW     NZT     HWHS,SW
1325   00566  6 07001           SEL     DHGH
1326   00567  0 01027           MOVE    R1,DHGH
1327   00570  6 07002           SEL     DLOW
1328   00571  0 02027           MOVE    R2,DLOW
1329   00572  6 07003           SEL     HWHS
1330   00573  6 00205           XMIT    205H,AUX
1331   00574  0 00027           MOVE    AUX,HWCT
1332   00575  7 00140           JMP     RETURN
1333         *****************************************************************
1334
1335
1336         *
1337         *    RVYL
1338         *         GET YEND OF RV AND CK IF STILL IN SET AREA
1339         *         IF YES PROCESS
1340         *         IF NO SKIP OVER XEND VALUE
1341         *
1342         *    ENTRY
1343         *         R1/R4=YEND
1344         *         MDATA SELECTED
1345         *         YSLNH        YSLNH=CURRENT RASTOR # IN PRU (NEG)
```

```
1346            *       REG DESTROYED
1347            *               AUX,R1,R4,R5,R6,R11
1348            *
1349            *       I/O PORTS MODIFIED
1350            *               ADDH/ADDL* (ONLY IF NOT ACTIVE)
1351            *               DHGH/DLOW/HWCT* (IF ACTIVE)
1352            *
1353            *       W/S MODIFIED
1354            *               LSA (ONLY IF ACTIVE)
1355            *
1356            *       ROUTINE CALL
1357            *               IPTR (ONLY IF NOT ACTIVE)
1358            *
1359            *       EXIT
1360            *               RETURN
1361            *
1362            ************************************************************
1363            *
1364            * CK IF RV INTO SET AREA
1365            *
1366   00576 6 17222   RVYL    SEL     YSLNL
1367   00577 0 37000           MOVE    YSLNL,AUX
1368   00600 1 04014           ADD     R4,R4
1369   00601 6 17221           SEL     YSLNH
1370   00602 0 37000           MOVE    YSLNH,AUX
1371   00603 1 10005           ADD     OVF,AUX
1372   00604 1 01027           ADD     R1,MDATA
1373            *
1374                            CRG     6,32
1375            *
1376   00605 5 20111   NZT     MSIGN,RVYLB
1377
1378            * RIV ACT PROC
1379            *
1380   00606 6 17200   RVYLA   SEL     GSTA1
1381   00607 6 33101           XMIT    1,LSA           SET L.S. ACT
1382   00610 7 00140           JMP     RETURN
1383
1384            *
1385            * RIV NOT ACT SKIP OVER X VALUE
1386            *
1387   00611 6 06004   RVYLB   XMIT            4,R6
1388   00612 6 11020           CALL    IPTR
       00613 7 01775
1389   00614 0 55027           MOVE    R5,ADDH
1390   00615 6 07010           SEL     ADDL
1391   00616 0 06027           MOVE    R6,ADDL
1392   00617 7 00140           JMP     RETURN
1393            ************************************************************
1394
1395            *       RVXL
1396            *               OUTPUT LAST XPOS AS A RV X FIELD
1397            *               OUTPUT THIS VALUE (XEND) AS XPOS
1398            *
1399            *       ENTRY
1400            *               R1/R4=XEND
1401            *
1402            *       REG DESTROYED
1403            *               AUX
1404            *
1405            *       I/O PORTS MODIFIED
1406            *               DHGH,DLOW,HWCT*
1407            *
1408            *       W/S MODIFIED
1409            *               NONE
1410            *
1411            *       ROUTINE CALL
1412            *               NONE
1413            *
1414            *       EXIT
1415            *               RETURN
1416            *
1417            ************************************************************
1418   00620 6 17003   RVXL    SEL     HWHS
1419   00621 5 20121   RVXL1   NZT     HWHS,RVXL1
1420   00622 6 00210           XMIT    210H,AUX
1421   00623 0 00027           MOVE    AUX,HWCT
1422   00624 5 20124   RVXL2   NZT     HWHS,RVXL2      OUTPUT RVX CONT
1423   00625 6 07001           SEL     DHGH            OUTPUT END LIMIT
1424   00626 0 01027           MOVE    R1,DHGH
1425   00627 6 07002           SEL     DLOW
1426   00630 0 04027           MOVE    R4,DLOW
1427   00631 6 07003           SEL     HWCT
1428   00632 6 02102           XMIT    202H,R1         OUTPUT XPOS CONT
1429   00633 0 01027           MOVE    R1,HWCT
1430   00634 5 20134   RVXL3   NZT     HWHS,RVXL3
1431                           NOP
1432   00636 0 00027           MOVE    AUX,HWCT        OUTPUT RV CONT
1433   00637 7 00140           JMP     RETURN
1434
1435            ************************************************************
1436            *       LRULE
1437            *               OUTPUT LAST XPOS INTO ON BUFFER
1438            *               OUTPUT THIS VALUE AS XPOS INTO OFF BUFFER
1439            *
1440            *       ENTRY
1441            *               R1/R4 = XPOS-OFF
```

```
1442        *
1443        *    REG DESTROYED
1444        *         AUX,P6,P1
1445        *
1446        *    I/O PORTS MODIFIED
1447        *
1448        *
1449        *
1450        *    W/S MODIFIED
1451        *
1452        *
1453        *    ROUTINE CALLS
1454        *         NONE
1455        *
1456        *    EXIT
1457        *         RETURN
1458        *
1459        *****************************************************************
1460  00640  6 07003   LRULE  SEL   HWCT
1461  00641  5 20101   LRW1   NZT   HWHS,LRW1
1462  00642  6 07001          SEL   DHGH
1463  00643  6 27000          XMIT  0,DHGH           SET XN=0
1464  00644  6 07002          SFL   DLOW             SELECT ON PUFFER
1465  00645  6 27000          XMIT  0,DLOW
1466  00646  6 00204          XMIT  204H,AUX
1467  00647  6 07003          SFL   HWCT             OUTPUT XN
1468  00650  0 00027          MOVE  AUX,HWCT
1469  00651  5 20111   LRW2   NZT   HWHS,LRW2        OUTPUT SOLVE
1470  00652  6 06207          XMIT  207H,R6          WITH DXDY=0
1471  00653  0 06027          MOVE  R6,HWCT
1472        *
1473        *    OUTPUT R1/R4 AS XPOS
1474        *
1475  00654  5 20114   LRW3   NZT   HWHS,LRW3
1476  00655  6 07001          SEL   DHGH
1477  00656  0 01027          MOVE  R1,DHGH
1478  00657  6 07002          SEL   DLOW
1479  00660  0 04027          MOVE  R4,DLOW
1480  00661  6 01202          XMIT  202H,R1
1481  00662  6 07003          SEL   HWCT
1482  00663  0 01027          MOVE  R1,HWCT          OUTPUT AS XPOS
1483  00664  5 20124   LRW4   NZT   HWHS,LRW4
1484  00665  6 07001          SEL   DHGH             SET XN=0
1485  00666  6 27000          XMIT  0,DHGH           SELECT OFF RUFFER
1486  00667  6 07002          SEL   DLOW
1487  00670  6 01002          XMIT  2,R1
1488  00671  0 01027          MOVE  R1,DLOW
1489  00672  6 07003          SEL   HWCT
1490  00673  0 00027          MOVE  AUX,HWCT         OUTPUT XN
1491  00674  5 20134   LRW5   NZT   HWHS,LRW5
1492  00675  6 07012          SEL   DLOW             SET DXDY=0
1493  00676  6 27000          XMIT  0,DLOW
1494  00677  6 07003          SEL   HWCT
1495  00700  0 06027          MOVE  R6,HWCT          SOLVE
1496  00701  7 00140          JMP   RETURN
1497        *****************************************************************
1498
1499        *    NPG
1500        *         NEW PAGE CONTROL OUTPUT
1501        *         INIT NEW PAGE RELATED VARIBLES
1502        *
1503        *    ENTRY
1504        *         R4=RESOLUTION CONTROL
1505        *         ADDL/ADDH-POINT TO CODE AFTER NEW PAGE
1506        *
1507        *    REG DESTROYED
1508        *         AUX
1509        *
1510        *    I/O PORTS MODIFIED
1511        *         HWCT (ADDL*)
1512        *
1513        *    W/S MODIFIED
1514        *         YSLNH,YSLNL,RESM,RESW
1515        *
1516        *    ROUTINE CALLS
1517        *         NONE
1518        *
1519        *    EXIT
1520        *         OCSE
1521        *
1522        *****************************************************************
1523  00702  6 17221   NPG    SEL   YSLNH            SFT SFT LEVEL=0
1524  00703  6 37000          XMIT  0,YSLNH
1525  00704  6 17222          SEL   YSLNL
1526  00705  6 37000          XMIT  0,YSLNL
1527        *
1528        * SAVE MODE DATA INTO GSTA2
1529        *
1530  00706  6 17201          SFL   RESM
1531        *
1532  00707  0 04237          MOVE  R4,RESM
1533  00710  6 35100          XMIT  0,RESW           RESET RE SW CNTR
1534        *
1535        * OUTPUT NEW PAGE LOAD
1536        *
1537  00711  6 07003          SFL   HWHS
1538  00712  5 20112   NPG1   NZT   HWHS,NPG1
```

```
1539   00713  6 00220           XMIT    220H,AUX
1540   00714  3 00027           MOVE    AUX,HWCT
1541   00715  7 00047           JMP     OCSE
1542
1543                    ***********************************************************
1544                    **      EDAT
1545                    *           END DATA RAM
1546                    *
1547                    *       ENTRY
1548                    *           NONE
1549                    *
1550                    *       REG DESTROYED
1551                    *           R4
1552                    *
1553                    *       I/O PORTS MODIFIED
1554                    *           NONE
1555                    *
1556                    *       W/S MODIFIED
1557                    *           NONE
1558                    *
1559                    *       ROUTINE CALL
1560                    *           EDATA
1561                    *
1562                    *       EXIT
1563                    *           VIA EDATA
1564                    *
1565                    ***********************************************************
1566   00716  6 04001   EDAT    XMIT    1,R4       SET SUBROUTINE LINK
1567   00717  7 00721           JMP     EDATA
1568
1569                    ***********************************************************
1570                    *       EPG
1571                    *           END PAGE CONTROL
1572                    *
1573                    *       ENTRY
1574                    *           NONE
1575                    *
1576                    *       REG DESTROYED
1577                    *           R4
1578                    *
1579                    *       I/O PORTS MODIFIED
1580                    *           NONE
1581                    *
1582                    *       W/S MODIFIED
1583                    *           NONE
1584                    *
1585                    *       ROUTINE CALL
1586                    *           EDATA
1587                    *
1588                    *       EXIT
1589                    *           VIA EDATA
1590                    *
1591                    ***********************************************************
1592   00720  6 04002   EPG     XMIT    2,R4
1593                    *
1594
1595                    *
1596                    ***********************************************************
1597                    *
1598                    *       EDATA
1599                    *           END OF RAM PROCESS
1600                    *           IF OUTPUT LIMIT REACHED STOP PROCESS
1601                    *           ELSE CONTINUE UNTIL REACHED
1602                    *
1603                    *       ENTRY
1604                    *           R4=1 FOR END DATA
1605                    *           R4=2 FOR END PAGE
1606                    *           YLMTL/YLMTH=OUTPUT LIMIT
1607                    *
1608                    *       REG DESTROYED
1609                    *           AUX,R1,R2,R4,R5,R6,R11
1610                    *
1611                    *       I/O PORTS MODIFIED
1612                    *           LIGHTS,MDATA,HWCT
1613                    *
1614                    *       W/S MODIFIED
1615                    *           NONE
1616                    *
1617                    *       ROUTINE CALL
1618                    *           IPTR,CKLNK,RASOUT
1619                    *
1620                    *       EXIT
1621                    *           OCSE
1622                    *
1623                    ***********************************************************
1624   00721  6 06376   EDATA   XMIT    -2,R6
1625   00722  6 11021           CALL    IPTR       BACK UP PTR BY 2
       00723  7 01775
1626   00724  7 01655           JMP     CKLNK      GO CK FOR LINK REQ
1627                    *
1628                    * NOW OUTPUT RASTER
1629                    *
1630   00725  7 01607   EDATA1  JMP     RASOUT
1631                    *                          RETURN FROM RASOUT
1632                    *           R1 & R2=NEW SET
1633                    *
1634                    * NOTE-R4=1 FOR END DATA
1635                    *          =2 FOR END PAGE
1636                    *
```

```
1637                        *       CK IF YLMT REACHED      YLMT-YSL
1638                        *
1639    00726  6 17220   EDATL  SEL     YLMTL           IF 0 OR +=NOT COMP
1640    00727  0 37000          MOVE    YLMTL,AUX       IF NEG=COMP
1641    00730  1 02002          ADD     R2,R2
1642    00731  6 17217          SEL     YLMTH
1643    00732  0 37000          MOVE    YLMTH,AUX
1644    00733  1 10000          ADD     OVF,AUX
1645    00734  6 07012          SEL     MDATA           STORE RESULT IN MDATA
1646    00735  1 01027          ADD     R1,MDATA        FOR SIGN TEST
1647                        *
1648    00736  7 00740          ORG     8,32            PAGE TO EDATA3
1649    00740  5 20107          NZT     MSIGN,EDATA3    JMP-LIMIT REACHED
1650
1651                        * NOT END
1652    00741  6 17200          SEL     GSTA1
1653    00742  5 32106          NZT     FSG,EDATA4      JMP IF MORE IN RAM TO PROC
1654    00743  6 07006          SEL     LIGHTS
1655    00744  6 21100          XMIT    0,L61
1656    00745  7 00725          JMP     EDATA1          'ELSE' PUT OUT BLNK RASTER
1657                        *
1658                        * MORE SEG ACTIVE
1659                        *
1660    00746  7 00126   EDATA4 JMP     RESET           START AT TOP OF RAM
1661
1662                        * OUTPUT LIMIT REACHED
1663                        *
1664                            ORG     7,256           PAGE ETRAN EXIT
1665                        *
1666    00747  4 04352   EDATA3 XEC     ETRN(R4)        P4=1 FOR END DATA/RETURN
1667                        *                           =2 FOR END PAGE
1668                        *                           CAN NOT BE =1
1669    00750  5 20110   EPG2   NZT     HWHS,EPG2
1670    00751  6 00240          XMIT    240H,AUX
1671    00752  0 00027   ETRN   MOVE    AUX,HWCT
1672    00753  7 00047          JMP     OCSE            GO GET NEXT DATA RAM
1673    00754  6 07003          SEL     HWHS
1675                        *
1676                        ********************************************************************
1677                        *       CHAR
1678                        *               CK IF CHAR OUTLINES ACTIVE AT THIS SET LEVEL
1679                        *               PROC ALL OUTLINES THAT ARE NOT DELETED AND
1680                        *               ACTIVE. UPDATE OUTLINE FILE TO REFLECT LAST
1681                        *               PROCESSING POINT. DELETE OUTLINES AS THEY
1682                        *               ARE USED UP. DELETE CHAR AFTER ALL OUTLINES
1683                        *               ARE DELETED. FEED CURVE DATA TO HWP WHEN
1684                        *               OUTLINE IS TO BE SOLVED.
1685                        *
1686                        *       ENTRY
1687                        *               R3/R4 CONTAIN WORD ADDRESS (0 TO 16K) OF LOCATION
1688                        *               OF OUTLINE.
1689                        * UNLESS OTHERWISE NOTED REG ASSIGNMENT WHILE
1690                        * PROCESSING A CHAR IS AS FOLLOWS:
1691                        *       R1/R2-YN+CONTROL BITS
1692                        *       R3/R4-XN+CONTROL BITS
1693                        *       R5-UPDATE DY
1694                        *       R6-UPDATE DX
1695                        *       DXDYOT-OUTPUT DXDY
1696                        *       K-KVALUE
1697                        *
1698                        *
1699                        *
1700                        *       REG DESTROYED
1701                        *               ALL
1702                        *
1703                        *       I/O PORTS MODIFIED
1704                        *               REFER TO CHAR SUBROUTINE
1705                        *
1706                        *       W/S MODIFIED
1707                        *               REFER TO CHAR SUBROUTINES
1708                        *
1709                        *       EXIT
1710                        *
1711
1712
1713                        *
1714                        ********************************************************************
1715                        *
1716                        *
1717                        * COMPUTE OUTLINE ABS ADD
1718                        * ADDX2+32K - RESULT IN R5&6
1719                        *
1720                        *
1721                        * SET OUTLINE LIGHT
1722
1723    00755  0 04000   CHAR   MOVE    R4,AUX
1724    00756  1 04006          ADD     R4,R6
1725    00757  6 00200          XMIT    200H,AUX
1726    00760  1 10000          ADD     OVF,AUX
1727    00761  1 03000          ADD     R3,AUX
1728    00762  1 03005          ADD     R3,R5
1729                        *
1730                        * SAVE CURRENT MEMORY AND PORTS IN WORKING STORAGE
1731                        * PUT IN OUTLINE CURVE ADD
1732                        *
```

```
1733  00763  6 07007          SEL    ADDH
1734  00764  6 17215          SEL    PTRH
1735  00765  0 27037          MOVE   ADDH,PTRH
1736  00766  0 05027          MOVE   R5,ADDH
1737  00767  6 07010          SEL    ADDL
1738  00770  6 17216          SEL    PTRL
1739  00771  0 27037          MOVE   ADDL,PTRL
1740  00772  0 06027          MOVE   R6,ADDL
1741
1742                  * RESET CURVE ACT AND LAST CURVE FOUND STATES
1743                  *
1744  00773  6 17200          SEL    GSTA1
1745  00774  6 36100          XMIT   0,CACT
1746  00775  6 31100          XMIT   0,LCRV
1747  00776  7 01042          JMP    STCAD
1748
1749                  ****************************************************
1750
1751                  *
1752                  *       NXTCU
1753                  *              READ NEXT CURVE YN/XN
1754                  *              CK IF DELETED, IF NOT GO CK IF ACTIVE
1755                  *
1756                  *       ENTRY
1757                  *              ADDH/ADDL POINT TO YN OF NEXT CURVE
1758                  *
1759                  *       REG DESTROYED
1760                  *              R1,2,3,4,5,6
1761                  *
1762                  *       I/O PORTS MODIFIED
1763                  *              ADDH,ADDL
1764                  *
1765                  *       W/S MODIFIED
1766                  *              GSTA1,OUTAH,OUTAL
1767                  *       ROUTINE CALLS
1768                  *              MREAD,CPROC,OUT1
1769                  *
1770                  *       EXIT
1771                  *              VIA CDEL TO RETURN
1772                  *
1773                  ****************************************************
1774
1775                  *
1776
1777  00777  6 11022  NXTCV  CALL    MREAD
      01000  7 01733
1778
1779                  * THIS IS A TEMP FIX FOR FONT
1780                  * DATA CAN BE REMOVED LATER
1781                  * IT CORRECTS YN SO K VALUE IS 0
1782                  *
1783  01001  6 00303          XMIT   303H,AUX
1784  01002  2 27027          AND    MDATA,MDATA
1785                  *
1786                  * CK IF THIS IS LAST CURVE
1787  01003  6 17200          SEL    GSTA1
1788                  *
1789                          ORG    4,32              PAGE TO CH1
1790                  *
1791  01004  5 20106          NZT    MSIGN,CH1         BIT 7 OF MDATA
1792  01005  7 01007          JMP    CH2               NO
1793                  *
1794  01006  6 31101  CH1    XMIT   1,LCRV            SET STATE- LAST CURVE FOUND
1795                  *
1796                  *
1797                          ORG    11,32             PAGE TO OUT1
1798         012 1 1   MDEL   LIV    MDATA,1,1         BIT 1 OF MDATA,CK IF CURVE DELETED
1799  01007  5 21123   CH2    NZT    MDEL,OUT1         YES JMP
1800
1801                  * GET OUTLINE START POINTS
1802                  *
1803  01010  0 27001          MOVE   MDATA,R1          GET YN VALUE
1804  01011  6 11023          CALL   MREAD
      01012  7 01733
1805  01013  0 27002          MOVE   MDATA,R2
1806                  *
1807                  * READ IN XN
1808                  *
1809  01014  6 11024          CALL   MREAD
      01015  7 01733
1810  01016  0 27003          MOVE   MDATA,R3
1811  01017  6 11025          CALL   MREAD
      01020  7 01733
1812  01021  0 27004          MOVE   MDATA,R4
1813
1814                  * GO CK IF OUTLINE TO BE PROCESSED
1815
1816                  *
1817  01022  7 01077          JMP    CPROC
1818
1819                  ****************************************************
1820
1821                  *      OUT1
1822                  *              CURVE IS DELETED
1823                  *              SKIP OVER XN AND ADD TO START OF NEXT CURVE
1824                  *
1825                  *      ENTRY
1826                  *              ADDH,ADDL - POINTS TO 2ND HALF OF YN
```

```
1827          *
1828          *     REG DESTROYED
1829          *           R5,R6
1830          *
1831          *     I/O PORTS MODIFIED
1832          *           ADDH,ADDL*
1833          *
1834          *     W/S MODIFIED
1835          *           NONE
1836          *
1837          *     ROUTINE CALLS
1838          *           NONE
1839          *
1840          *     EXIT
1841          *           VIA CH4
1842          *
1843          ************************************************************
1844          *
1845  01023 6 06005    OUT1   XMIT   5,R6
1846  01024 6 11026           CALL   IPTR
      01025 7 01775
1847  01026 5 05027           MOVE   R5,ADDH
1848  01027 6 07010           SEL    ADDL
1849  01030 5 06027           MOVE   R6,ADDL
1850          *
1852          ************************************************************
1853          *     CH4
1854          *           ENTERED AFTER PREVIOUS CURVE WAS PROCESSED
1855          *           OR TERMINATED.
1856          *           IF ALSO THE LAST CURVE OF CHAR, TRY TO DELETE
1857          *           CHAR, ELSE SET UP FOR NEXT CURVE.
1858          *     ENTRY
1859          *           LAST CURVE STATE SET IF SO
1860          *           ADDH,ADDL - POINTS TO NEXT YN OF NEXT CURVE.
1861          *
1862          *     REG DESTROYED
1863          *           NONE
1864          *
1865          *     I/O PORTS MODIFIED
1866          *           NONE (ADDL*)
1867          *
1868          *     W/S MODIFIED
1869          *           OUTAH,OUTAL*
1870          *
1871          *     ROUTINE CALLS
1872          *           NXTCV,CDEL
1873          *
1874          *     EXIT
1875          *           NXTCV IF MORE CURVES
1876          *           CDEL IF LAST CURVE
1877          *
1878          ************************************************************
1879          *
1880  01031 7 01040           ORG    11,32         PAGE TO CDEL
1881  01040 6 17200    CH4    SEL    GSTA1
1882  01041 5 31111           NZT    LCRV,CDEL     GO DELETE
1883          *
1884          * SET UP OUTAD TO NEXT CURVE STATE
1885          * MEMORY ADD PORT CONTAINS ADDRESS
1886          *
1887  01042 6 07007    STCAD  SEL    ADDH
1888  01043 6 17207           SEL    OUTAH
1889  01044 0 27037           MOVE   ADDH,OUTAH
1890  01045 6 07010           SEL    ADDL
1891  01046 6 17210           SEL    OUTAL
1892  01047 0 27037           MOVE   ADDL,OUTAL
1893  01050 7 00777           JMP    NXTCV
1895          ************************************************************
1896          *     CDEL
1897          *           CALLED WHEN LAST CURVE OF CHAR WAS PROCESSED
1898          *           OR WHEN AN OUTLINE WAS NOT YET ACTIVE. IF THE
1899          *           FORMER AND ALL OUTLINES ARE DELETED, DELETE
1900          *           CHAR.
1901          *
1902          *     ENTRY
1903          *           PTRH,L - POINTS TO CHAR+2
1904          *           CACT SET IF ALL OUTLINES NOT DELETED
1905          *
1906          *     REG DESTROYED
1907          *           R5,6,AUX
1908          *
1909          *     I/O PORTS MODIFIED
1910          *           ADDH,ADDL,MDATA,LIGHTS
1911          *
1912          *     W/S MODIFIED
1913          *           NONE
1914          *
1915          *     ROUTINE CALLS
1916          *           IPTR,MWRTE
1917          *
1918          *     EXIT
1919          *           RETURN
1920          *
1921          ************************************************************
1922          *
1923  01051 6 07007    CDEL   SEL    ADDH
```

```
1924  01052  6 17215           SEL    PTRH
1925  01053  0 37027           MOVE   PTRH,ADDH
1926  01054  6 07010           SEL    ADDL
1927  01055  6 17216           SEL    PTRL
1928  01056  0 37027           MOVE   PTRL,ADDL
1929  01057  6 17200           SEL    GSTA1
1930
1931                     *
1932                            ORG    16,32          PAGE TO RETL
1933                     * CK IF CHAR IS TO BE DELETED
1934                     *
1935  01060  5 36136           NZT    CACT,RETL
1936                     *
1937  01061  6 06376           XMIT   -2,R6          BACK UP TO CHAR
1938  01062  6 11027           CALL   IPTR           IN LINE SEGMENT
      01063  7 01775
1939  01064  0 05027           MOVE   R5,ADDH
1940  01065  6 07010           SEL    ADDL
1941  01066  0 06027           MOVE   R6,ADDL
1942  01067  6 07012           SEL    MDATA
1943  01070  6 00300           XMIT   300H,AUX
1944  01071  0 00027           MOVE   AUX,MDATA
1945  01072  6 11030           CALL   MWRTE
      01073  7 01731
1946  01074  6 11031           CALL   MWRTE
      01075  7 01731
1947  01076  7 00140    RETL   JMP    RETURN
1948              ******************************************************************
1949                     *
1950                     *     CPROC
1951                     *            CK IF CURVE IN SET LEVEL (YS=YN)
1952                     *
1953                     *     ENTRY
1954                     *            R1/2=YN
1955                     *            R3/4=XN
1956                     *            MDATA SELECTED
1957                     *
1958                     *     REG DESTROYED
1959                     *            AUX,R5,R6
1960                     *
1961                     *     I/O PORTS MODIFIED
1962                     *            MDATA*
1963                     *
1964                     *     W/S MODIFIED
1965                     *            GSTA1,K
1966                     *
1967                     *     ROUTINES CALLED
1968                     *            CDEL,PROC
1969                     *
1970                     *     EXIT
1971                     *            TO CDEL OR TO PROC
1972                     *
1973              ******************************************************************
1974                     *
1975                     *
1976  01077  6 17200    CPROC  SEL    GSTA1
1977         2 40 7 5           PIV    GSTA1,7,5      SET L.S. ACT & CURVE ACT
1978  01100  6 37522           XMIT   10010B,63      RESET G4,EXTP,STEEP SLOPE
1979                     *
1980                     * COMPUTE YS-YN (YN IN TWO'S COMP.-RESULT IN R6 & MDATA
1981  01101  0 02020           MOVE   R2,AUX
1982  01102  6 17211           SEL    YSDL
1983  01103  1 37036           ADD    YSDL,R6
1984  01104  0 10507           MOVE   OVF,AUX
1985  01105  1 01000           ADD    R1,AUX
1986  01106  6 17212           SEL    YSDH
1987  01107  1 37027           ADD    YSDH,MDATA
1988                     *
1989                            ORG    11,32          PAGE TO JPROC
1990                     * CK SIGN-(BIT 5) ON=POS, OFF=NEG.
1991                     *
1992         012 5 1     OVFB   LIV    MDATA,5
1993  01110  5 25121           NZT    OVFB,JPROC
1994                     *
1995                     * NOT INTO CURVE-CK IF IN EXT POLATION RANGE
1996                     * IF R6 & MDATA=1, YES
1997                     *
1998  01111  6 00001           XMIT   1,AUX
1999  01112  1 06020           ADD    R6,AUX
2000  01113  0 10000           MOVE   OVF,AUX
2001  01114  1 27027           ADD    MDATA,MDATA
2002  01115  5 25117           NZT    OVFB,EXTPO
2003
2004                     * NOT IN EXTP AREA/EXIT
2005                     *
2006  01116  7 01051           JMP    CDEL
2007
2008                     * IN EXTP AREA/SET STATE
2009                     *
2010  01117  6 17200    EXTPO  SEL    GSTA1
2011  01120  6 35101           XMIT   1,EXTP
2012                     *
2013                     * GO PROC SLOPE/RETURN CH 4   -R1/2 =YN
2014                     *                                              R3/4=XN
2015                     *
2016  01121  6 17225    JPROC  SEL    K
```

```
2017  01122  6 37030         XMIT   0,K
2018                    *
2019                    * EXEC PROC ROUTINE
2020                    *
2021                    ***********************************************************
2022                    *
2023                    *    PROC
2024                    *          ENTERED WHEN CURVE ACTIVE.
2025                    *          READ NEXT SLOPE VALUE.
2026                    *          IF LAST, MARK END OF CHAR.
2027                    *          IF CONTROL GO TO CONTROL DECODE,
2028                    *          ELSE GO TEST IF FAST THIS POINT.
2029                    *
2030                    *    ENTRY
2031                    *          R1/R2-YN
2032                    *          R3/R4-XN
2033                    *          ADDH,ADDL-POINTS TO SLOPE AND FOR CURVE
2034                    *
2035                    *    REG DESTROYED
2036                    *          AUX,R5,R6
2037                    *
2038                    *    I/O PORTS MODIFIED
2039                    *          ADDH,ADDL,MDATA
2040                    *
2041                    *    W/S MODIFIED
2042                    *          HOLD1,HOLD2,DXDYCT
2043                    *
2044                    *    ROUTINE CALLS
2045                    *          PROCR,PROCX
2046                    *
2047                    *    EXIT
2048                    * PROCR IF CURVE COMPLETED
2049                    * PROCX IF NOT
2050                    *
2051                    *
2052                    ***********************************************************
2053  01123  6 11 32    PROC   CALL   MREAD      GET SLOPE ADDRESS
      01124  7 01733
2054  01125  6 17227           SEL    WORK1             SAVE ADD
2055  01126    27037            MOVE   MDATA,WORK1
2056  01127  6 11 55            CALL   MREAD
      01130  7 01733
2057  01131    270 6             MOVE   MDATA,R6
2058  01132    370 5             MOVE   WORK1,R5    GET ADD IN R5
2059  01133  6  7  7             SEL    ADDH        SAVE MEMORY ADD PORT
2060  01134  6 17224            SEL    HOLD1
2061  01135    27037             MOVE   ADDH,HOLD1  PUT IN SLOPE ADDRESS
2062  01136    3507              MOVE   R5,ADDH
2063  01137  6 07010             SEL    ADDL
2064  01140  6 17224             SEL    HOLD2
2065  01141    27037             MOVE   ADDL,HOLD2
2066  01142    36027             MOVE   R6,ADDL
2067                    *
2068                    * READ IN NEXT SLOPE
2069                    *
2070  01143  6 11 34    RSLOP  CALL   MREAD
      01144  7 01733
2071                    *
2072                           ORG    19,32
2073  01145  5 27030           NZT    MDATA,PROCX   PAGE TO PROCX
                                                    GO PROC SLOPE
2074                    *
2075                    * END OF CURVE CONTROL
2076                    *
2077                    * MOVE ADD OF YNLOC(OUTAD) TO MEMORY ADD PORT
2078                    *
2079  01146  6 07007           SEL    ADDH
2080  01147  6 17207           SEL    OUTAH
2081  01150  0 37027            MOVE   OUTAH,ADDH
2082  01151  6  7 10            SEL    ADDL
2083  01152  6 17210            SEL    OUTAL
2084  01153  0 37027            MOVE   OUTAL,ADDL
2085  01154  6  7 12            SEL    MDATA
2086                    *
2087                    * SET DELETE BIT IN YNH(P1)
2088  01155  6  01 01           XMIT   100H,AUX
2089  01156  1 01027            ADD    R1,MDATA
2090  01157  6 11035            CALL   MWRTC
      01160  7 01231
2091                    ***********************************************************
2092                    *    PROCR
2093                    *          ENTERED WHEN LAST CURVE HAS BEEN WORKED ON
2094                    *          AND READY TO PROCEED TO NEXT CURVE.
2095                    *
2096                    *
2097                    *    ENTRY
2098                    *          HOLD1,2 - POINTS TO START OF NEXT CURVE
2099                    *
2100                    *    REG DESTROYED
2101                    *          NONE
2102                    *
2103                    *    I/O PORTS MODIFIED
2104                    *          ADDH,ADDL*
2105                    *
2106                    *    W/S MODIFIED
2107                    *          NONE (HOLD2*)
2108                    *
2109                    *    ROUTINE CALLS
2110                    *          CH4
```

```
                    *       EXIT
                    *               VIA CH4
                    *
********************************************************************
                    *
                    * RESTORE MEMORY
                    * ADD PORT POINTS TO NEXT CURVE START
                    *
   01161  6 070 7   PROCR   SEL     ADDH
   01162  7 17223           SEL     HOLD1
   01163  0 37027           MOVE    HOLD1,ADDH
   01164  6 0701            SEL     ADDL
   01165  6 17224           SEL     HOLD2
   01166  0 37027           MOVE    HOLD2,ADDL
   01167  7 01540           JMP     CH4

********************************************************************
                    *       PROCX
                    *               CK IF LAST SLOPE READ WAS CONTROL.
                    *               IF NOT GO TO TEST FOR ROUTINE POINT
                    *               IF YES GO TO DECODE CONTROL.
                    *
                    *       ENTRY
                    *               R1/R2=YN
                    *               R3/R4=XN
                    *               MDATA=LAST SLOPE READ & SELECTED
                    *
                    *       REG DESTROYED
                    *               R5/R6
                    *
                    *       I/O PORTS MODIFIED
                    *               NONE
                    *
                    *       W/S MODIFIED
                    *               DXDYOT,(GSTA1*)
                    *
                    *       ROUTINE CALLS
                    *               CONT,PROCS
                    *
                    *       EXIT
                    *               CONT - IF CONTROL CODE
                    *               PROCS - IF SLOPE
                    *
********************************************************************
                    *
                    * SAVE DXDY IN WORK AREA
                    *
           012 3 4  MEY     LIV     MDATA,3,4
           012 7 4  MDX     LIV     MDATA,7,4
   01170  0 27405   PROCX   MOVE    MEY,R5
   01171  0 27406           MOVE    MDX,R6
   01172  6 17226           SEL     DXDYOT
   01173  0 27027           MOVE    MDATA,DXDYOT
                    *
                    * CHECK IF THIS IS A CONTROL CODE-DY=0
   01174  5 05177           NZT     R5,PROCS
                    * GO DECODE CONTROL + EXEC
   01175  6 17220           SEL     GSTA1
   01176  7 01500           JMP     CONT

********************************************************************
                    *       PROCS
                    *               CALLED AFTER NEXT SLOPE VALUE READ
                    *               OK IF PAST THIS POINT
                    *
                    *       ENTRY
                    *               R1/R2=YN
                    *               R3/R4=XN
                    *               R5=DY
                    *               R6=DX
                    *               MDATA SELECTED
                    *
                    *       REG DESTROYED
                    *               AUX,R11
                    *
                    *       I/O PORTS MODIFIED
                    *               IDATA*
                    *
                    *       W/S MODIFIED
                    *               WORK1*
                    *
                    *       ROUTINE CALLS
                    *               SOLVX,UPDAT
                    *
                    *       EXIT
                    *               VIA SOLVX,UPDAT
                    *
********************************************************************
                    * COMPUTE YN+DY
                    *
   01177  6 00377   PROCS   XMIT    -1,AUX          TWO'S COMP DY(R5)
   01200  3 05011           XOR     R5,R11          RESULT IN AUX
```

```
2205   01201  6  00001          XMIT   1,AUX
2206   01202  1  11000          ADD    R11,AUX
2207   01203  1  02011          ADD    R2,R11         ADD T0 YN
2208   01204  6  00377          XMIT   -1,AUX
2209   01205  1  10001          ADD    OVF,AUX
2210   01206  1  01027          ADD    R1,MDATA       RESULT IN R11 & MDATA
2211
2212                        *  CK IF G THAN OR 4 YS
2213                        *
2214   01207  6  17211          SEL    YSDL           ADD LOW BITS FOR
2215   01210  3  11001          MOVE   R11,AUX        CARRY
2216   01211  1  37001          ADD    YSDL,AUX
2217   01212  6  17212          SEL    YSDH
2218   01213  3  37001          MOVE   YSDH,AUX
2219   01214  1  10001          ADD    OVF,AUX        ADD CARRY FROM LAST
2220   01215  6  17227          SEL    WORK1
2221   01216  1  27037          ADD    MDATA,WORK1    CK BIT 5 OF RESULT
2222   01217  7  01227      WFS  PIV   WORK1,5
2223
2224                            ORG    4,32            PAGE TABLE
2225                        *
2226   01217  4  35120          XEC    LT(WR5)        LINK TO ROUTINE
2227   01220  7  01222      LT   JMP   SOLVX          OUTPUT DATA
2228   01221  7  01357          JMP    UPDAT          UPDATE CURVE
2229
2230   *********************************************************************
2231                        *
2232                        *   SOLVX
2233                        *          ENTERED WHEN CURVE DATA IS TO BE SOLVED
2234                        *          IF STANDARD COMPUTE, EXIT TO SOLVE
2235                        *          IF SPECIAL STEEP SLOPE CONTROL ON, ADJUST
2236                        *          YS AND REOUTPUT BEFORE SOLVING.
2237                        *   ENTRY
2238                        *          R1/R2=YN
2239                        *          R2/R3=XN
2240                        *          DXDYDT=DXDY
2241                        *          K=K VALUE
2242                        *          STEPV ON IF NEEDED
2243                        *          WORK2=STEEP SLOPE CONTROL VALUE
2244                        *   REG DESTROYED
2245                        *          AUX,R5,R6,R11
2246                        *
2247                        *   I/O PORTS MODIFIED
2248                        *          DHGH,DLOW,HWCT
2249                        *
2250                        *   W/S MODIFIED
2251                        *          NONE
2252                        *
2253                        *   ROUTINE CALLS
2254                        *          SOLVE
2255                        *
2256                        *   EXIT
2257                        *          VIA SOLVE
2258                        *
2259   *********************************************************************
2260                        *
2261   01222  6  17260   SOLVX  SEL    GSTA1
2262                            ORG    4,32
2263   01223  5  37125          NZT    STEPV,*+2       SKIP IF ON
2264   01224  7  01314          JMP    SOLVE           GO SOLVE
2265                        *
2266                        *   CONTROL ON-CK HWF RDY
2267                        *
2268   01225  6  17013          SEL    HWHS
2269   01226  5  20126   SOLW1  NZT    HWHS,SOLW1
2270   01227  6  17235          SEL    WORK2           GET STEEP CONTROL
2271   01230  3  37211          MOVE   STEPC,R11       INTO R11
2272                        *
2273                        *   ADJUST YS AND OUTPUT
2274                        *
2275   01231  6  17212          SEL    YS1             OUTPUT TOP BITS OF
2276   01232  6  07001          SEL    DHGH            YS1
2277   01233  3  37006          MOVE   YS1,R6
2278   01234  4  11262          XEC    SHF(R11),3      MOVE R6(X),R6
2279   01235  4  11265          XEC    MSK1(R11),3     XMIT X,AUX
2280   01236  2  06027          AND    R6,DHGH
2281   01237  6  07002          SEL    DLOW            OUTPUT BOTTOM BITS OF YS1
2282   01240  3  06027          MOVE   R6,DLOW
2283   01241  6  17213          SEL    YS2             OUTPUT TOP BITS OF YS2
2284   01242  3  37006          MOVE   YS2,R6
2285   01243  4  11262          XEC    SHF(R11),3      MOVE R6(X),R6
2286   01244  4  11270          XEC    MOV(R11),3      MOVE R6,DLOW(X)
2287                        *
2288                        *   OUTPUT NEW YS
2289                        *
2290   01245  6  10206          XMIT   206H,AUX
2291   01246  6  07003          SEL    HWCT
2292   01247  3  00027          MOVE   AUX,HWCT
2293                        *
2294                        *   ADJUST YN (R1+R2)
2295                        *
2296                        *   SAVE ORIGINAL IN R5/R6
2297                        *
2298   01250  3  01005          MOVE   R1,R5
2299   01251  3  02006          MOVE   R2,R6
2300   01252  4  11265          XEC    MSK1(R11),3     XMIT X,AUX
2301   01253  4  11276          XEC    AND1(R11),3     AND R2(X)R2
```

```
2304  01254  4 11273         XEC   MSK2(R11),3    XMIT X,AUX TOP BITS
2305  01255  4 11276         XEC   AND1(R11),3    AND R1(X),AUX
2306  01256  1 02002         ADD   R2,R2
2307  01257  4 11265         XEC   MSK1(R11),3    XMIT Y,AUX
2308  01260  4 11301         XEC   AND3(R11),3    ADD P1(X),R1
2309  01261  7 01304         JMP   SOLVE
2310
2311
2312         ****************************************************************
2313         * THE FOLLOWING TABLES PROVIDE THE PROPER BIT
2314         * ADJUSTMENT INSTRUCTIONS TO BE USED FOR
2315         * STEEP SLOPE CONTROL WHEN ALTERING THE YN AND
2316         * YS VALUES.
2317         *
2318         ****************************************************************
2319
2320         *
2321  01262  0 06106   SHF   MOVE  R6(1),R6       DIV 2
2322  01263  0 06216         MOVE  R6(2),R6       DIV 4
2323  01264  0 06336         MOVE  R6(3),R6       DIV 8
2324
2325
2326         *
2327  01265  6 00177   MSK1  XMIT  177H,AUX       SET UP MASK
2328  01266  6 00077         XMIT  77H,AUX
2329  01267  6 00037         XMIT  37H,AUX
2330
2331
2332         *
2333         0 02 7 7   LEN7  LIV   DLOW,7,7
2334         0 02 7 6   LEN6  LIV   DLOW,7,6
2335         0 02 7 5   LEN5  LIV   DLOW,7,5
2336  01270  0 06727   MCV   MOVE  R6,LEN7        MOVE OUT # OF BITS
2337  01271  0 06627         MOVE  R6,LEN6
2338  01272  0 06527         MOVE  R6,LEN5
2339
2340
2341
2342  01273  6 00200   MSK2  XMIT  200H,AUX
2343  01274  6 00300         XMIT  300H,AUX
2344  01275  6 00340         XMIT  340H,AUX
2345
2346
2347         *
2348  01276  2 01100   AND1  AND   P1(1),AUX
2349  01277  2 01200         AND   P1(2),AUX
2350  01300  2 01300         AND   P1(3),AUX
2351
2352
2353
2354  01301  2 01101   AND3  AND   P1(1),R1
2355  01302  2 01201         AND   P1(2),R1
2356  01303  2 01301         AND   P1(3),R1
2357
2358         ****************************************************************
2359         *
2360         *     SOLVE
2361         *           OUTPUT XN,YN,DXDY,K, RFOUT YS IF STEEP SLOPE
2362         *
2363         *     ENTRY
2364         *           R1/R2=YN
2365         *           R3/R4=XN
2366         *           DXDYOUT=DXDY
2367         *           K=KVALUE
2368         *           R5/R6=TRUE YN VALUE
2369         *     REG DESTROYED
2370         *           P1/R2 IF STEEP SLOPE
2371         *
2372         *     I/O PORTS MODIFIED
2373         *           DHGH,DLOW,HWCT
2374         *
2375         *     W/S MODIFIED
2376         *           NONE
2377         *     ROUTINE CALLS
2378         *           PROCR
2379         *
2380         *     EXIT
2381         *           VIA PROCR
2382         *
2383         ****************************************************************
2384         *
2385  01304  6 07003   SOLVE SEL   HWCT           WAIT HWP READY
2386  01305  5 20105   SLWT  NZT   HWHS,SLWT
2387         *
2388         *     OUTPUT YN/K
2389  01306  6 07002         SEL   DLOW
2390  01307  0 02027         MOVE  R2,DLOW
2391  01310  6 07001         SEL   DHGH
2392  01311  0 01027         MOVE  P1,DHGH
2393  01312  6 17225         SEL   K
2394  01313  0 37000         MOVE  K,AUX
2395         0 01 5 4   KOUT  LIV   DHGH,5,4
2396  01314  0 00425         MOVE  AUX,KOUT
2397  01315  6 07003         SEL   HWCT
2398  01316  6 00203         XMIT  203H,AUX
2399  01317  0 00327         MOVE  AUX,HWCT
2400
2401         *     OUTPUT XN
```

```
2402
2403   01320  5 20120    SV1    NZT    HWHS,SV1
2404   01321  6 07002           SEL    DLOW
2405   01322  0 24127           MOVE   R4,DLOW
2406   01323  6 07001           SEL    DHGH
2407   01324  0 03027           MOVE   R3,DLOW
2408   01325  6 07003           SEL    HWCT
2409   01326  6 0C204           XMIT   204H,AUX
2410   01327  0 00027           MOVE   AUX,HWCT
2411
2412                     *      OUTPUT DXDY
2413   01330  5 20130    SV2    NZT    HWHS,SV2
2414                     *
2415   01331  6 07002           SEL    DLOW
2416   01332  6 17226           SEL    DXDYCT
2417   01333  0 37027           MOVE   DXDYCT,DLOW
2418   01334  6 00207           XMIT   207H,AUX
2419   01335  6 07003           SEL    HWCT
2420   01336  0 00027           MOVE   AUX,HWCT
2421
2422                     * CK IF STEEP SLOPE ON
2423                     * IF YES
2424                     * OUTPUT TRUE YS
2425                     *
2426                     *
2427   01337  6 17200           SEL    GSTA1
2428                            ORG    4,32
2429   01340  5 37102           NZT    STEPV,*+2
2430   01341  7 01161           JMP    PROCR
2431                     *
2432                     *      RESTOE PROPER YN & YS
2433                     *
2434   01342  0 15001           MOVE   R5,R1
2435   01343  0 16002           MOVE   R6,R2
2436   01344  6 17202           SEL    YS1
2437   01345  5 27005    SOLW2  NZT    HWCT,SOLW2
2438   01346  6 07001           SEL    DHGH
2439   01347  0 37027           MOVE   YS1,DHGH
2440   01350  6 07002           SEL    DLOW
2441   01351  6 17203           SEL    YS2
2442   01352  0 37027           MOVE   YS2,DLOW
2443   01353  6 07003           SEL    HWCT
2444   01354  6 00206           XMIT   206H,AUX
2445   01355  0 00027           MOVE   AUX,HWCT
2446                     * EXIT TO TEST NEXT CURVE
2447                     *
2448   01356  7 01161           JMP    PROCR
2449                     *
2450
2451                     *****************************************************
2452                     *      UPDATE
2453                     *
2454                     *      WHEN SET LEVEL PAST CURRENT POINT ON
2455                     *      CURVE, UPDATE CURVE HEADER TO REFLECT
2456                     *      POSITION.
2457                     *
2458                     *      ENTRY
2459                     *        R1/R2-YN
2460                     *        R3/R4-XN
2461                     *        R5-DY
2462                     *        D6-DX
2463                     *        R11/MDATA-YN+DY
2464                     *        K=KVALUE
2465                     *        OUTAL,OUTAH-POINTS TO YN OF CURVE
2466                     *        ADDH,ADDL-POINTS TO NEXT SLOPE TO USE
2467                     *
2468                     *      REG DESTROYED
2469                     *        AUX,R1,R2,R3,R4,R6,R11
2470                     *
2471                     *      I/O PORTS MODIFIED
2472                     *        ADDH,ADDL,MDATA
2473                     *
2474                     *      W/S MODIFIED
2475                     *        K,WORK1,WORK2
2476                     *
2477                     *      ROUTINES CALLED
2478                     *        MWRTE
2479                     *
2480                     *      EXIT
2481                     *        VIA GSLOP
2482                     *
2483                     *****************************************************
2484                     * PUT NEW YN (R11+MDATA) IN R1/R2
2485   01357  0 11002    UPDIT  MOVE   R11,R2
2486   01360  0 27001           MOVE   MDATA,R1
2487   01361  6 17225           SEL    K              GET K
2488   01362  6 00001           XMIT   1,AUX          CK DIR OF XN
2489   01363  2 04011           AND    R4,R11
2490                     *
2491                            ORG    4,256          PAGE
2492                     *
2493   01364  5 11366           NZT    R11,COMP
2494   01365  7 01374           JMP    XNUP
2495                     *
2496                     * COMPLEMENT DX BEFORE UPDATE OF XN
2497                     *
```

```
2498  01366  6 00377    COMP   XMIT   -1,AUX
2499  01367  3 06036           XOR    P6,P6
2500  01370  3 37037           XOR    K,K
2501  01371  6 00001           XMIT   1,AUX
2502  01372  1 36036           ADD    P6,P6
2503  01373  1 37037           ADD    K,K
2504                    *
2505                    * ADD DX TO XN
2506                    *
2507                    *
2508                           ORG    4,256
2509                    *
2510  01374  5 36376    XNUP   NZT    R6,*+2        DO NOT UPDATE IF DX=0
2511  01375  7 01407           JMP    ADDK          SINCE IT WILL CAUSE -1 ADD TO R3
2512  01376  6 00360           XMIT   360H,AUX
2513  01377  2 06436           AND    R6(4),AUX
2514  01400  1 04004           ADD    R4,R4
2515  01401  0 10000           MOVE   OVF,AUX
2516  01402  1 33003           ADD    R3,R3
2517                    *
2518                           ORG    4,256         PAGE
2519                    *
2520  01403  5 11005           NZT    R11,ADD1
2521  01404  7 01407           JMP    ADDK
2522                    *      IF DIR ON ADD -1
2523  01405  6 00377    ADD1   XMIT   -1,AUX
2524  01406  1 33003           ADD    R3,R3
2525                    *
2526                    * ADD K VALUE
2527                    *
2528  01407  0 37000    ADDK   MOVE   K,AUX
2529  01410  1 33003           ADD    R3,R3
2530  01411  6 37000           XMIT   0,K
2531                    *
2532                    *
2533                    *
2534                    *
2535                    *
2536                    * PUT ADD OF YN ON MEMORY PORT
2537                    * SAVE CURRENT CONTENTS AS NEXT SLOPE ADD
2538                    *
2539                    *
2540  01412  6 07010           SEL    ADDL
2541  01413  6 17227           SEL    WORK1
2542  01414  0 27137           MOVE   ADDL,WORK1
2543  01415  6 17210           SEL    OUTAL
2544  01416  0 37027           MOVE   OUTAL,ADDL
2545  01417  6 37007           SEL    ADDH
2546  01420  6 17230           SEL    WORK2
2547  01421  0 27037           MOVE   ADDH,WORK2
2548  01422  6 17227           SEL    OUTAH
2549  01423  0 37027           MOVE   OUTAH,ADDH
2550                    *
2551                    * WRITE UPDATE FILE
2552                    *      R1/R2=YN
2553                    *      R3/R4=XN
2554                    *      WORK2,WORK1=SLOPE ADD
2555                    *
2556  01424  6 37012           SEL    MDATA
2557  01425  0 01027           MOVE   R1,MDATA
2558  01426  6 11036           CALL   MWRTE
      01427  7 01731
2559  01430  0 02027           MOVE   R2,MDATA
2560  01431  6 11037           CALL   MWRTE
      01432  7 01731
2561  01433  0 03027           MOVE   R3,MDATA
2562  01434  6 11040           CALL   MWRTE
      01435  7 01731
2563  01436  0 04027           MOVE   R4,MDATA
2564  01437  6 11041           CALL   MWRTE
      01440  7 01731
2565  01441  6 17230           SEL    WORK2
2566  01442  0 37027           MOVE   WORK2,MDATA
2567  01443  6 11042           CALL   MWRTE
      01444  7 01731
2568  01445  6 17227           SEL    WORK1
2569  01446  0 37027           MOVE   WORK1,MDATA
2570  01447  6 11043           CALL   MWRTE
      01450  7 01731
2571                    *
2572                    * RESTORE SLOPE PTR IN ADD PORT
2573                    *
2574  01451  6 07010           SEL    ADDL
2575  01452  0 37027           MOVE   WORK1,ADDL
2576  01453  6 17230           SEL    WORK2
2577  01454  6 07007           SEL    ADDH
2578  01455  0 37027           MOVE   WORK2,ADDH
2579  01456  7 01143           JMP    GSLOP
2580  *****************************************************************
2581                    *
2582                    *
2583                    *      CONT
2584                    *             DECODE SLOPE CONTROL BYTE AND TRANSFER
2585                    *             TO ROUTINE.
2586                    *
2587                    *      ENTRY
2588                    *             R1/R2=YN
```

```
2589                    *           R3/R4-XN
2590                    *           R5-DY
2591                    *           R6-DX
2592                    *           MDATA=CONTROL CODE
2593                    *           GSTA1 SELECTED
2594                    *
2595                    *    REG DESTROYED
2596                    *           NONE
2597                    *
2598                    *    I/O PORTS MODIFIED
2599                    *           NONE
2600                    *
2601                    *    W/S MODIFIED
2602                    *           NONE
2603                    *
2604                    *    ROUTINES CALLED
2605                    *           SEE SCONT TABLE
2606                    *
2607                    *    EXIT
2608                    *           VIA SCONT TABLE
2609                    *
2610         ****************************************************************
2611         *
2612         *
2613  01457  7 01500          ORG    18,32           PAGE TABLE
2614  01500  4 27421   CONT   XEC    SCONT(MDX)
2615  01501  7 01143   SCONT  JMP    SIG             -IGNORE CODE
2616  01502  7 01521          JMP    CDIR            CHANGE DIRECTION
2617  01503  7 01524          JMP    PCRV            POINT CURVE
2618  01504  7 01527          JMP    LVERT           LONG VERTICALS
2619  01505  7 01551          JMP    STEEP
2620  01506  7 01551          JMP    STEEP
2621  01507  7 01551          JMP    STEEP
2622  01510  7 01143          JMP    SIG
2623  01511  7 01143          JMP    SIG
2624  01512  7 01143          JMP    SIG
2625  01513  7 01143          JMP    SIG
2626  01514  7 01143          JMP    SIG
2627  01515  7 01143          JMP    SIG
2628  01516  7 01570          JMP    HORZ1           LONG HORIZONTAL
2629  01517  7 01603          JMP    HORZ2
2630  01520  7 01536          JMP    SHAL            SHALLOW SLOPE
2631
2632         *
2633         ****************************************************************
2634         *    SIG
2635         *           UNDEFINED CONTROL CODE
2636         *           EXIT TO READ NEXT SLOPE
2637         *
2638         *    ENTRY
2639         *           ADDH,ADDL-POINTS TO NEXT SLOPE
2640         *
2641         *    REG DESTROYED
2642         *           NONE
2643         *
2644         *    I/O PORTS MODIFIED
2645         *           NONE
2646         *
2647         *    W/S MODIFIED
2648         *           NONE
2649         *
2650         *    ROUTINES CALLED
2651         *           GSLOP
2652         *
2653         *    EXIT
2654         *           VIA GSLOP
2655         *
2656         ****************************************************************
2657        =01143   SIG    EQU    GSLOP
2658         *
2659         ****************************************************************
2660         *    CDIR
2661         *
2662         *           CHANGE DIRECTION OF CURVE BY COMPLEMENTING
2663         *           DIRECTION BIT IN XN
2664         *
2665         *    ENTRY
2666         *           R3/R4-XN
2667         *           ADDH,ADDL-POINTS TO NEXT SLOPE
2668         *
2669         *    REG DESTROYED
2670         *           R4
2671         *
2672         *    I/O PORTS MODIFIED
2673         *           NONE
2674         *
2675         *    W/S MODIFIED
2676         *           NONE
2677         *
2678         *    ROUTINES CALLED
2679         *           GSLOP
2680         *
2681         *    EXIT
2682         *           VIA GSLOP
2683         *
2684         ****************************************************************
2685  01521  6 00001   CDIR   XMIT   1,AUX
2686  01522  3 04004          XOR    R4,R4
2687  01523  7 01143          JMP    GSLOP
2688         *
```

```
2690  ***********************************************************
2691     *    PCRV
2692     *         POINT CURVE, IF EXTRAPOLATION ON, GO SOLVE
2693     *         ELSE GO TO NEXT SLOPE
2694     *
2695     *    ENTRY
2696     *         ADDL,ADDH-POINTS TO NEXT SLOPE
2697     *         EXTP SET IF IN EXTRAPOLATION, GSTA1 SELECTED
2698     *
2699     *    REG DESTROYED
2700     *         NONE
2701     *    I/O PORTS MODIFIED
2702     *         NONE
2703     *
2704     *    W/S MODIFIED
2705     *         NONE
2706     *
2707     *    ROUTINES CALLED
2708     *         GSLOP,SOLVE
2709     *
2710     *    EXIT
2711     *         VIA GSLOP,SOLVE
2712     *
2713  ***********************************************************
2714     *
2715     *  CK IF EXTRAPOLATION ON
2716     *
2717     *
2718              ORG    4,32         PAGE
2719     *
2720  01524 4 35125  PCRV   XEC    PCRVL(EXTP)
2721  01525 7 01143  PCRVL  JMP    GSLOP        NO EXT
2722  01526 7 01304         JMP    SOLVE        EXTP ON SOLVE
2723     *
2725  ***********************************************************
2726     *    LVERT
2727     *         LONG VERTICAL CONTROL, SET SPECIAL
2728     *         CONTROL INDICATOR
2729     *
2730     *    ENTRY
2731     *         ADDH,ADDL-POINTS TO NEXT SLOPE
2732     *
2733     *    REG DESTROYED
2734     *         R5,R6
2735     *
2736     *    I/O PORTS MODIFIED
2737     *         NONE
2738     *
2739     *    W/S MODIFIED
2740     *         DXDYOT
2741     *
2742     *    ROUTINES CALLED
2743     *         MREAD
2744     *
2745     *    EXIT
2746     *         TO PROC3
2747     *
2748  ***********************************************************
2749     *
2750  01527 6 11044  LVERT  CALL   MREAD        GET AMOUNT
      01530 7 01733
2751  01531 6 26010         XMIT   0,R6         SET DX=0
2752  01532 0 27015         MOVE   MDATA,R5     SET DY=VALUE
2753  01533 6 17226         SEL    DXDYOT       SET OUTPUT DXDY=0
2754  01534 6 37000         XMIT   0,DXDYOT
2755  01535 7 01177         JMP    PROC3        GO CK IF IN RANGE
2756     *
2758  ***********************************************************
2759     *    SHALLOW SLOPE ROUTINE
2760     *         SET PROPER CONTROL AND EXIT
2761     *
2762     *    ENTRY
2763     *         ADDH,ADDL=POINTS TO NEXT SLOPE
2764     *
2765     *    REG DESTROYED
2766     *         R5,R6
2767     *
2768     *    I/O PORTS MODIFIED
2769     *         NONE
2770     *
2771     *    W/S MODIFIED
2772     *         DXDYOT(*)
2773     *
2774     *    ROUTINES CALLED
2775     *         MREAD
2776     *
2777     *    EXIT
2778     *         TO PROC3
2779     *
2780  ***********************************************************
2781  01536 6 11045  SHAL   CALL   MREAD        GET AMOUNT
      01537 7 01733
2782  01540 6 17225         SEL    K
2783  01541 0 23405         MOVE   MDY,R5       PUT DY INTO K
2784  01542 0 25037         MOVE   R5,K
2785  01543 6 25001         XMIT   1,R5         SET DY=1
```

```
2786   01544  0 27436           MOVE   MDX,R6
2787   01545  6 17226           SEL    DXDYOT
2788   01546  0 27037           MOVE   MDATA,DXDYOT
2789          226 3 4    DYOT   RIV    DXDYCT,3,4      SET OUTPUT DY=1
2790   01547  6 5340 1          XMIT   1,DYCT
2791   1550   7 01177           JMP    PROC3
2792
2793   **************************************************************
2794   *      STEEP
2795   *             STEEP SLOPE CONTROL
2796   *             IF IN EXTRAPOLATION RANGE, GO SOLVE
2797   *             IF NOT,SET STEEP SLOPE CONDITION, SET THE
2798   *             OUTPUT DXDY VALUE, SAVE THE STEEP SLOPE
2799   *             AMOUNT, ADJUST THE UPDATE DY VALUE.
2800   *
2801   *      ENTRY
2802   *             GSTA1 SELECTED
2803   *
2804   *      REG DESTROYED
2805   *             R5,R6
2806   *
2807   *      I/O PORTS MODIFIED
2808   *             NONE
2809   *
2810   *      W/S MODIFIED
2811   *             WORK2*,DXDYOT
2812   *
2813   *      ROUTINES CALLED
2814   *             SOLVE,PROCS
2815   *
2816   *      EXIT
2817   *             VIA SOLVE
2818   *             OR PROC3
2819
2820   **************************************************************
2821   *
2822   *      IF IN EXTP MODE,GO SOLVE
2823           ORG    4,32
2824   01551  5 35113   STEEP   NZT    EXTP,STEP2
2825   01552  7 01554           JMP    STEP1
2826   1553   7 01304   STEP2   JMP    SOLVE
2827   01554  6 37101   STEP1   XMIT   1,STEPV         SET STEEP CONTROL
2828   01555  6 17226           SEL    DXDYOT
2829   01556  6 00361           XMIT   361H,AUX        SET OUTPUT DXDY 1/15
2830   01557  0 03037           MOVE   AUX,DXDYOT
2831   *
2832   *      SET UP PROPER DX/DY
2833   *
2834           230 7 2   STEPC   RIV    WORK2,7,2      TWO LOW ORDER BITS DEFINE IT
2835   01560  6 17230           SEL    WORK2
2836   01561  0 27037           MOVE   MDATA,WORK2
2837           ORG    7,32
2838   01562  4 37225           XEC    STEPY(STEPC),3
2839   01563  6 05071           XMIT   1,R5
2840   01564  7 01177           JMP    PROC3          GO CK IF IN RANGE
2841   01565  6 06036   STEPY   XMIT   30,R6
2842   01566  6 06074           XMIT   60,R6
2843   01567  6 06170           XMIT   120,R6
2844
2845   **************************************************************
2846   *      HORZ1
2847   *             HORIZONTAL CONTROL OF <256. ADD AMOUNT
2848   *             IN NEXT CONTROL TO XN. SET DX &DY=0 +1
2849   *             AND GO TEST IF IN RANGE.
2850   *
2851   *      ENTRY
2852   *             ADDH,ADDL=NEXT SLOPE VALUE
2853   *             R1/R2=YN
2854   *\\R3/R4=XN
2855
2856   *      REG DESTROYED
2857   *             AUX,R3,R4,R5,R6
2858   *
2859   *      I/O PORTS MODIFIED
2860   *             NONE
2861   *
2862   *      W/S MODIFIED
2863   *             DXDYOT
2864   *
2865   *      ROUTINE CALLS
2866   *             MREAD,PROC3
2867   *
2868   *      EXIT
2869   *             VIA PROC3
2870
2871   **************************************************************
2872   01570  6 11046   HORZ1   CALL   MREAD          GET AMOUNT
2873   1571   7 01733
2874   01572  0 27420           MOVE   MDX,AUX        ADD VALUE TO XN
2875   01573  1 04004           ADD    R4,R4
2876   01574  0 10020           MOVE   OVF,AUX
2877   01575  1 23400           ADD    MDY,AUX
2878   01576  1 03003           ADD    R3,R3
2879   01577  6 05001           XMIT   1,R5
2880   01600  6 17226           SEL    DXDYOT
2881   01601  6 37120           XMIT   20H,DXDYOT
2882   01602  7 01177           JMP    PROC3
```

```
************************************************************
*
*     HORZ2
*            HORIZONTAL CONTROL>255. ADD 256 TO XN
*            AND TREAT REST LIKE HORZ1.
*
*     ENTRY
*            R3/R4=XN
*
*     REG DESTROYED
*            AUX,R3
*
*     I/O PORTS MODIFIED
*            NONE
*
*     W/S MODIFIED
*            NONE
*
*     ROUTINE CALLS
*            HORZ1
*
*     EXIT
*            VIA HORZ1
*
************************************************************
01603  6 00020   HORZ2  XMIT   20H,AUX         ADJUST XN
01604  1 03003          ADD    R3,R3
01605  7 01570          JMP    HORZ1
************************************************************
*     RASOUT
*            OUTPUT RASTER ROUTINE
*            LOOP AND TILL HWP RDY FOR NEXT RASTER OUTPUT
*            IF PTU FAULT ON EXIT
*            AFTER RASTER OUT, UPDATE TOTAL RASTER OUTPUT
*            COUNT. EXIT ON R4 VALUE.
*
*     ENTRY
*            R4=CALLER # (SEE EXIT TABLE)
*            YSLNH,YSLNL=LAST RASTER # OUTPUT
*
*     REG DESTROYED
*            AUX,R1,R2
*
*     I/O PORTS MODIFIED
*            HWCT
*
*     W/S MODIFIED
*            YSLNH,YSLNL,RESW
*
*     ROUTINES CALLED
*            ONE
*
*     EXIT
*            TO CALLER
*            R4=0,YPOS
*            R4=1,2,EDATA
*
************************************************************
                ORG    8,32            PAGE 10
*
01606  7 01650   INRL   JMP    ERR
*
* SET HWP WAIT
*
01607  6 07006   RASOUT SEL    LIGHTS
01610  6 25101          XMIT   1,LGS
01611  6 07005   RAS    SEL    PTUI            CK FOR PTU FAULT
01612  5 27106          ZT     PTUI,ERRL
* CHECK IF HWP READY
01613  6 07007          SEL    HWCT
01614  5 20111          NZT    HWHS,RAS
* OUTPUT RASTER CONTROL
01615  6 00300          XMIT   300H,AUX
01616   0027           MOVE   AUX,HWCT
*
* TURN OFF HWP WAIT
*
01617  6 07006          SEL    LIGHTS
01620  6 25100          XMIT   0,LGS
*
* UPDATE YSL
*
01621  6 17201          SEL    RESW            JMP TO PROPER
*
                ORG    7,32            PAGE
*
01622  4 37224          XEC    RESJ(RESW)
01623  7 01630          JMP    INCX
01624  6 00377   RESJ   XMIT   -1,AUX
01625  6 00376          XMIT   -2,AUX
01626  7 01643          JMP    HRES
01627  6 00377   INC1   XMIT   -1,AUX
*
* NOTE - YSL IS MAINTAINED AS A NEG NUMBER.
*        IT IS REPRESENTED IN TWO'S COMP.
```

```
2981
2982
2983            * ADJUST YSL BY AUX
2984            *
2985   01630  6 17222   INCX   SEL     YSLNL
2986   01631  1 37037          ADD     YSLNL,YSLNL
2987   01632  6 30377          XMIT    -1,AUX
2988   01633  1 13600          ADD     OVF,AUX
2989   01634  0 37002          MOVE    YSLNL,R2
2990   01635  6 17221          SEL     YSLNH
2991   01636  1 37037          ADD     YSLNH,YSLNH
2992   01637  0 37001          MOVE    YSLNH,R1
2993
2994            * EXIT ON R4 CONTENTS
2995            *
2996            *
2997                    ORG     4,256
2998            *
2999   01640  5 4242    RASE   NZT     R4,*+2
3000   01641  7 0126           JMP     RESET       GO TO TOP OF RAM
3001   01642  7 0726           JMP     EDATL
3002
3003            * HIGH RES MODE
3004            *
3005            *
3006                    ORG     5,32
3007   01643  5 35106   HRES   NZT     RESW,RAS1
3008   01644  6 35101          XMIT    1,RESW
3009   01645  7 01640          JMP     RASE
3010   01646  6 35100   RAS1   XMIT    0,RESW
3011   01647  7 1627           JMP     INC1
3012   ********************************************************************
3013
3014            *      ERR
3015            *           PTU FAULT CONDITION
3016            *           TRANSMIT STATUS AND WAIT FOR RESET
3017            *
3018            *      ENTRY
3019            *           -
3020            *
3021            *      REG DESTROYED
3022            *           AUX
3023            *
3024            *      I/O PORTS MODIFIED
3025            *           LIGHTS
3026            *
3027            *      W/S MODIFIED
3028            *           NONE
3029            *
3030            *      ROUTINE CALLS
3031            *           NONE
3032            *
3033            *      EXIT
3034            *           TO RESET
3035            *
3036   ********************************************************************
3037            *
3038   01650  6 07011   ERR    SEL     PTUO        OUTPUT ERR TO ZRO
3039   01651  6 23101          XMIT    1,PTUO
3040            *
3041            * TURN ON PTU FAULT LIGHT
3042            *
3043   01652  6 17006          SEL     LIGHTS
3044   01653  6 20101          XMIT    1,LG0
3045   01654  7 01654   ERRW   JMP     ERRW        WAIT FOR RESET
3046   ********************************************************************
3047            *      CKLNK
3048            *           CHECK IF PREVIOUS LINE SEGMENT HAS BEEN
3049            *           COMPLETELY PROCESSED. IF IT HAS, PUT IN A LINK
3050            *           AT THE START OF PREVIOUS SEGMENT TO THE START
3051            *           OF THIS SEGMENT.
3052            *
3053            *      ENTRY
3054            *           R5/R6=START ADD OF THIS SEGMENT
3055            *           SEGH,L=START ADD OF LAST SEGMENT
3056            *           GSTA1-LAST SEG ACTIVE BIT SET IF L.S. STILL ACT
3057            *           R4=CALLER#
3058            *
3059            *      REG DESTROYED
3060            *           R1/R2,AUX,P11
3061            *
3062            *      I/O PORTS MODIFIED
3063            *           MDATA
3064            *
3065            *      W/S MODIFIED
3066            *           WORK1,WORK2
3067            *
3068            *      ROUTINES CALLED
3069            *           MWRTF
3070            *
3071            *      EXIT
3072            *           TO CALLER
3073            *           VIA R4
3074            *
3075   ********************************************************************
3076   01655  6 17200   CKLNK  SEL     GSTA1       IF LAST SEG WAS
3077            *
```

```
3079                                ORG      8,256
3080                        *
3081    01656  5 33120       NZT      LSA,CKLNKE    ACTIVE EXIT
3082    01657  7 01665       JMP      CK1
3083                        *
3084                        * RETURN TO CALLER
3085                        *
3086    01660  4 04261  CKLNKE  XEC                  CKTB(F4)
3087    01661  7 00320  CKTB    JMP   YACCR
3088    01662  7 00725          JMP   EDATA1
3089    01663  7 00725          JMP   EDATA1
3090    01664  7 00246          JMP   YPOSL
3091                        *
3092                        * SAVE CURRENT POINTER IN R1 & 2
3093                        * PUT IN ADDRESS START OF LAST SEG
3094                        *
3095    01665  6 17205  CK1     SEL   SEGSH
3096    01666  6 27017          SEL   ADDH
3097    01667  0 27001          MOVE  ADDH,R1
3098    01670  0 37027          MOVE  SEGSH,ADDH
3099    01671  6 17206          SEL   SEGSL
3100    01672  6 07010          SEL   ADDL
3101    01673  0 27002          MOVE  ADDL,R2
3102    01674  0 37027          MOVE  SEGSL,ADDL
3103                        * SAVE R5/R6 BY WRITE
3104    01675  6 17230          SEL   WORK2
3105    01676  0 06037          MOVE  R6,WORK2
3106    01677  6 17227          SEL   WORK1
3107    01700  0 05037          MOVE  R5,WORK1
3108                        *
3109                        * WRITE LINE FORMAT
3110                        *
3111    01701  6 00306          XMIT  306H,AUX
3112    01702  6 07012          SEL   MDATA
3113    01703  0 00027          MOVE  AUX,MDATA
3114    01704  6 11047          CALL  MWRTE
        01705  7 01731
3115    01706  0 37027          MOVE  WORK1,MDATA
3116    01707  6 11050          CALL  MWRTE
        01710  7 01731
3117    01711  6 00307          XMIT  307H,AUX
3118    01712  0 00027          MOVE  AUX,MDATA
3119    01713  6 11051          CALL  MWRTE
        01714  7 01731
3120    01715  6 17230          SEL   WORK2
3121    01716  0 37027          MOVE  WORK2,MDATA
3122    01717  6 11052          CALL  MWRTE
        01720  7 01731
3123    01721  6 07007          SEL   ADDH       RESTORE PTR
3124    01722  0 01027          MOVE  R1,ADDH
3125    01723  6 07010          SEL   ADDL
3126    01724  0 02027          MOVE  R2,ADDL
3127                        * RESTORE R5 & R6
3128    01725  0 37006          MOVE  WORK2,R6
3129    01726  6 17227          SEL   WORK1
3130    01727  0 37005          MOVE  WORK1,R5
3131    01730  7 01660          JMP   CKLNKE
3132                        *
3133                        *
3134                        ****************************************************************
3135
3136                        ****************************************************************
3137                        * MEMORY READ/WRITE
3138                        * CALLING SEG
3139                        *
3140                        *
3141                        *    2. SET MDATA FOR WRITE
3142                        *    3. SET ADDH & ADDL
3143                        *    4. CALL MREAD/MWRTE
3144                        *
3145                        *
3146                        *    RESULTS       DATA IS READ INTO OR
3147                        *                  FROM THE MEMORY ADD
3148                        *                  IN ADDH & ADDL. AFTER
3149                        *                  OPERATION, ADDRESS IS
3150                        *                  INC BY ONE. DATA IS
3151                        *                  STORED IN MDATA ON
3152                        *                  READ.
3153                        *
3154                        *
3155                        * REGISTERS USED
3156                        *    R5,R6,AUX,OVF
3157                        *
3158                        *    MDATA SELECTED
3159                        *
3160                        *    SUBCALLS NONE
3161                        *
3162    01731               PROC  MACC
3163                        *
3164                        ****************************************************************
3165                        *
3166                        * NOTE
3167                        *
3168                        * THIS ROUTINE IS TIME DEPENDENT AND
3169                        * ANY CHANGE COULD EFFECT MEMORY ACCESS.
3170                        * CHANGES SHOULD NOT BE MADE FROM
```

```
3171            * ADDRESS MWAIT+1 TO THE END OF THE
3172            * WRITE RESET OR THE READ RESET.
3173            * SEE TIME PROGRAM IF CHANGES ARE
3174            * REQUIRED.
3175            *
3176            **********************************************************************
3177            *
3178            * REFRESH WINDOW LIMITS - 2S COMP
3179            *
3180    177711  REFH    EQU     -55             UPPER LIMIT +1
3181    177730  REFL    EQU     -40             LOWER LIMIT
3182            *
3183            *
3184            * MEMORY WRITE ENTRY
3185            *
3186                    ENTRY   MWRTE
3187            *
3188    01731 6 05001            XMIT    0,R5
3189    01732 7 01734            JMP     RFHCK           GO CHECK REFRESH
3190            *
3191                    ORG     6,256
3192            *
3193            *
3194            *
3195            *       MEMORY READ ENTRY
3196            *
3197                    ENTRY   MREAD
3198            *
3199    01733 6 05001            XMIT    1,R5
3200            *
3201            * CK FOR REFRESH WINDOW
3202            * BEFORE DOING MEMORY ACCESS
3203            *
3204    01734 6 07013  RFHCK   SEL     RFFSH
3205            *
3206                    ORG     12,256          PAGE TO INRG
3207            *
3208    01735 6 00330  MWAIT   XMIT    REFL,AUX        GET LOWER LIMIT
3209    01736 1 27006           ADD     RFFSH,R6        ADD CURRENT COUNTER
3210    01737 6 00200           XMIT    200H,AUX        TEST CNT LESS THAN LMT
3211    01740 2 06000           AND     R6,AUX          CK SIGN
3212    01741 5 00347           NZT     AUX,INRG
3213                                                    JMP IF IN RANGE
3214            * CK UPPER LIMIT
3215            *
3216    01742 6 00311           XMIT    REFH,AUX        ADD CURRENT COUNTER
3217    01743 1 27006           ADD     RFFSH,R6        TEST CNT LESS THAN LMT
3218    01744 6 00200           XMIT    200H,AUX
3219    01745 2 06000           AND     R6,AUX
3220            **********************************************************************
3221            *
3222            * NOTE: THIS SHOULD BE
3223            *       NZT,AUX,MWAIT
3224            *       AFTER MEM PROB RESOLVED
3225            **********************************************************************
3226    01746 7 01735           JMP     MWAIT
3227            *
3228            * DO MEMORY OPERATION
3229            *
3230    01747 6 07011  TARG    SEL     *CONT
3231    01750 4 05351          XEC     OPT(R5)
3232    01751 7 01771  OPT     JMP     OPW             WRITE
3233    01752 7 01753          JMP     OPR             READ
3234            * OUTPUT READ CONTROL
3235            *
3236    01753 6 22301  OPR     XMIT    1,MGRP
3237                            NOP
3238                            NOP
3239                            NOP
3240                    NEXT    NOP
3241    01760 6 22307          XMIT    7,MGRP          RESET
3242            *
3243            * INC MEMORY ADD
3244    01761 6 07010  MEM1    SEL     ADDL
3245    01762 6 00001          XMIT    1,AUX
3246    01763 1 27027          ADD     ADDL,ADDL
3247    01764 6 07007          SEL     ADDH
3248    01765 0 10005          MOVE    OVF,AUX
3249    01766 1 27027          ADD     ADDH,ADDH
3250    01767 6 07012          SEL     MDATA
3251    01770 7 03000          RTN
3252            *
3253            * WRITE MEMORY ENTRY
3254            *
3255    01771 6 22303  OPW     XMIT    3,MGRP          SET MREQ
3256                            NOP
3257    01773 6 22302          XMIT    2,MGRP          SET WRITE
3258    01774 7 01757          JMP     NEXT
3259                            END     MACC
3260            **********************************************************************
3261
3262            * MEMORY POINTER ADDER
3263            * CALLING PROCEDURE
3264            *       1. SET ADDH & ADDL
3265            *       2. SET R6=# TO ADJ BY
3266            *          (POS OR 2 COMP NEG)
3267            *       3. CALL IPTR
```

```
3268                   *  ACTION THE ADDRESS IN ADDH &
3269                   *           ADDL IS INC IN R6.
3270                   *           THE RESULTS ARE RETURNED
3271                   *           IN R5 & R6.
3272                   *
3273                   *
3274                   *  REGISTERS USED
3275                   *               AUX
3276                   *               OVF
3277                   *               R5
3278                   *               R6
3279                   *  IV BUS
3280                   *               ADDH SELECTED
3281                   *
3282                   *  SUBCALLS
3283                   *               NONE
3284                   ************************************************************
3285    01775               PROC    IPTR
3286    01775  6 07014      SEL     ADDL
3287    01776  0 06300      MOVE    R6,AUX
3288    01777  1 27006      ADD     ADDL,R5         ADD TO LOW HALF
3289    02000  6 07017      SEL     ADDH
3290    02001  6 05200      XMIT    200H,R5
3291    02002  2 05000      AND     R5,AUX
3292                   *
3293                        ORG     6,256
3294                   *
3295    02003  5 00007      NZT     AUX,NEG
3296    02004  1 10005  IPTR2  ADD  OVF,AUX
3297    02005  1 27005      ADD     ADDH,R5
3298    02006  7 13000      RTN
3299    02007  6 00377  NEG  XMIT   -1,AUX
3300    02010  7 02004      JMP     IPTR2
3301                        END     IPTR
3302                   *
3303                        LIST    S,O,M
3311                        ENDIF
3312
3313
3314
3315
3316                   *    PROC    TEST
3317
3318
3319
3320                   *
3321                   *    TEST LOOP ENTERED BY
3322                   *    MAIN PROGRAM WHEN TEST
3323                   *    MODE IS SELECTED. THIS
3324                   *    LOOP CONTROLS WHICH TEST
3325                   *    SEQUENCES ARE TO BE EXECUTED
3326                   *    BASED ON THE STATE OF SWITCHES
3327                   *    1,2,3
3328                   *
3329                   *    SWITCH 3 = TEST CPU BOARD (TSTBX)
3330                   *    SWITCH 2 = TEST RAM (MTEST)
3331                   *    SWITCH 2+3 = SELECTIVE BAR
3332                   *    SWITCH 1 = AUTO BAR
3333                   *
3334                   *
3335           177775  NUM    LOW  -5H          VALID NUMBER OF [TESTS+1*(-1)]
3336           014 2 3 SW13   LIV  14H,2,3
3337                   *
3338    02011  6 07014 TLOOP  SEL  SW13         READ SWITCHES 1,2,3
3339    02012  6 00007        XMIT 07H,AUX      INVERT
3340    02013  3 22301        XOR  SW13,A1
3341    02014  0 01002        MOVE A1,R2        SAVE
3342    02015  6 00377        XMIT NUM,AUX      GET-VALID NUMBER + 1
3343    02016  1 02002        ADD  R2,R2        SEE IF VALUE OF SWITCHES
3344    02017  0 10003        MOVE OVF,R3       VALID. IF SO, NO OVERFLOW
3345    02020  5 03022        NZT  R3,NOTV      OTHERWISE - N.G. JUMP BACK
3346                   *
3347    02021  4 01022        XEC  NOTV(R1)     XEC TEST BY DECODING SWITCHES
3348    02022  7 00047 NOTV   JMP  BACK         =0, NOT VALID
3349    02023  7 02366        JMP  TSTBX        =1, DO TSTBX
3350    02024  7 02627        JMP  MTEST        =2, DO MTEST
3351    02025  7 02134        JMP  BARTS        =3, DO SELECTIVE BAR
3352    02026  7 02254        JMP  BRATO        =4, DO AUTO BAR
3353
3354
3355
3356
3357
3358
3359
3360
3361                   *    MEMORY TEST (32-64K)
3362                   *    WRITES 0-255 IN MEMORY, STARTING
3363                   *    AT 32K AND CONTINUING TO 64K.
3364                   *    THE VALUES ARE THEN READ BACK AND
3365                   *    CHECKED. THEN 1-255, 0 ARE WRITTEN
3366                   *    AND READ BACK AND THE PROCESS
3367                   *    CONTINUES UNTIL EACH BYTE HAS BEEN
3368                   *    TESTED FOR 0,1,2...255.
3369                   *
3370
3371                   *    IF A FAULT IS ENCOUNTERED
3372                   *    LIGHT 1 IS TURNED ON.
```

```
3373                     *     IF THE FAULT WAS AT THE FIRST
3374                     *     TESTED LOCATION,LIGHT 2 IS ALSO TURNED
3375                     *     ON.
3376                     *     LIGHT 8 ON INDICATES THAT A PATTERN
3377                     *     IS BEING WRITTEN. LIGHT 7 ON INDICATES
3378                     *     VERIFY MODE.
3379                     *
3380
3381   02027  6 01000  MTEST  XMIT   0,R1           INITIALIZE TEST SEQ. START (LCN1)
3382   02030  6 07006         SEL    LIGHTS         TURN OFF ALL LIGHTS
3383   02031  0 01027         MOVE   R1,LIGHTS
3384   *
3385   02032  6 03200  MSET   XMIT   200H,R3        SET ADDRESS = 32K
3386   02033  6 07007         SEL    ADDH           ADDH=200, ADDL=000
3387   02034  0 03027         MOVE   R3,ADDH
3388   *
3389   02035  6 07010         SEL    ADDL
3390   02036  6 27000         XMIT   0,ADDL
3391   *
3392   02037  0 01002         MOVE   R1,R2          PCNT=LCNT, GET START VALUE
3393   *
3394   02040  6 07006         SEL    LIGHTS
3395   02041  6 27101         XMIT   1H,LG0         TURN ON LIGHT 3 (WRITE MODE)
3396   *
3397   02042  6 07012  MRITL  SEL    MDATA          MOVE VALUE TO IV 12
3398   02043  0 02027         MOVE   R2,MDATA
3399   02044  6 11053         CALL   MWRTE          WRITE VALUE
       02045  7 01731
3400   *
3401   02046  6 04001         XMIT   1H,AUX         INCREMENT VALUE (PCNT)
3402   02047  1 12002         ADD    R2,R2
3403   *
3404   02050  6 07007         SEL    ADDH           GET HIGH ADDRS AND SEE
3405   02051  0 27003         MOVE   ADDH,R3        IF ZERO. IF SO 64K
3406   02052  5 03042         NZT    R3,MRITL       REACHED - END WRITE
3407   *
3408   02053  6 07006         SEL    LIGHTS         END WRITE MODE - TURN
3409   02054  6 27100         XMIT   0H,LG7         OFF LIGHT8
3410   *
3411                    ******** READ BACK AND VERIFY
3412                    *
3413   02055  6 26101  VERIFY XMIT   1H,LG6         TURN ON LIGHT7 (READ MODE)
3414   02056  6 07007         SEL    ADDH           SET ADDRESS TO READ
3415   02057  6 03200         XMIT   200H,R3        TO 32K
3416   02060  0 03027         MOVE   R3,ADDH        ADDH=200
3417   02061  6 07010         SEL    ADDL           ADDL=000
3418   02062  6 27000         XMIT   0,ADDL
3419   *
3420   02063  0 01002         MOVE   R1,R2          GET START VALUE
3421   02064  6 11054  MRDLP  CALL   MREAD          READ VALUE FROM ADDRS
       02065  7 01733
3422   02066  0 27005         MOVE   MDATA,AUX      TO MDATA WITH
3423   02067  3 02005         XOR    R2,AUX         COMPARE WITH
3424   02070  5 00072         NZT    AUX,MERR       EXPECTED VALUE, NOT EQUAL=ERR
3425   02071  7 02114         JMP    UPPCN          EQUAL - UP VALUE FOR NEXT
3426   *
3427                    ******** DECLARE ERROR
3428   02072  6 07006  MERR   SEL    LIGHTS
3429   02073  6 20101         XMIT   1H,LG0         TURN ON LIGHT 1 TO SHOW ERR
3430   *
3431   02074  6 07010         SEL    ADDL           SEE IF ERROR WAS AT
3432   02075  0 27004         MOVE   ADDL,AUX       32K.
3433   02076  5 00104         NZT    AUX,MNOT1      ADDL=00, ADDH=200
3434   02077  6 07007         SEL    ADDH
3435   02100  6 03200         XMIT   200H,AUX
3436   02101  7 27005         XOR    ADDH,AUX
3437   02102  5 00104         NZT    AUX,MNOT1
3438   02103  6 07006         SEL    LIGHTS         IF ERROR AT 32K, TURN
3439   02104  6 21101         XMIT   1H,LG1         ON LIGHT2
3440   02105  7 02110         JMP    MCKHL
3441   *
3442   02106  6 07006  MNOT1  SEL    LIGHTS         NOT AT 32K, TURN
3443   02107  6 21100         XMIT   0H,LG1         OFF LIGHT 2
3444   *
3445   02110  6 07014  MCKHL  SEL    SWITCH         SEE IF SWITCH 8
3446   02111  0 27103         MOVE   SW7,R3         ON, IF YES LOOP
3447   02112  5 03114         NZT    R3,UPPCN       SWITCH ON=ZERO
3448   02113  7 02110         JMP    MCKHL          ON-LOOP
3449                    ******** CONTINUE READ BACK
3450                    *
3451   02114  6 00001  UPPCN  XMIT   1H,AUX         INCREMENT EXPECTED
3452   02115  1 02002         ADD    R2,R2          VALUE
3453   *
3454   02116  6 07007         SEL    ADDH           SEE IF DONE WITH
3455   02117  0 27004         MOVE   ADDH,AUX       64K (ADDH=0)
3456   02120  5 00064         NZT    AUX,MRDLP      NO- CONTINUE
3457   *
3458   02121  6 07006         SEL    LIGHTS         YES-TURN OFF LIGHT 7
3459   02122  6 26100         XMIT   0H,LG6
3460   *
3461                    ******** CHANGE START VALUE AND TEST
3462                    *
3463   02123  6 00001         XMIT   1H,AUX         ADD 1 TO START VALUE
3464   02124  1 01001         ADD    R1,R1          FOR SEQUENCE
3465                    *                           SEE IF 256 HAS BEEN
```

```
3466  02125  5 01032        NZT    R1,MSET       REACHED, IF SO DONE
3467                    *                        IF NOT - MSET
3468  02126  6 07014        SEL    SWITCH        DONE-SEE IF MEMORY
3469  02127  0 22312        MOVE   SW13,R2       TEST STILL DESIRED
3470  02130  6 00005        XMIT   5H,AUX        SW2 STILL ON
3471  02131  3 02002        XOR    R2,R2
3472  02132  5 02011        NZT    R2,TLOOP      NO- GO TEST LOOP
3473  02133  7 02032        JMP    MSET          YES- START MTEST
3475                    *
3476                    *
3477                    *
3478                    *    SELECTIVE BAR TEST
3479                    *
3480                    *    THE BAR WIDTH IS DETERMINED
3481                    *    BY THE STATE OF SWITCHES 5,6.
3482                    *    THE WIDTH=128,256,512 OR 1024
3483                    *    IF SW5+6=0, 1, 2, OR 3
3484                    *
3485                    *    SW7 DETERMINES IF MULTI LOAD
3486                    *    IS TO BE TESTED. IF SO THE
3487                    *    NUMBER OF MULTIS ISSUED AT
3488                    *    EACH INTERVAL WILL BE EQUAL
3489                    *    TO THE BAR WIDTH DIVIDED BY 2.
3490                    *
3491                    *    SW4 IS USED TO INDICATE IF REVERSE
3492                    *    VIDEO IS DESIRED
3493                    *
3494                    *    SW8 IS MONITORED AFTER EVERY
3495                    *    RASTER. IF ON THE PROGRAM LOOPS
3496                    *    TO ALLOW CHANGING OF THE SWITCHES.
3497                    *
3498                    *    AFTER EACH RASTER SWITCHES 1-3 ARE
3499                    *    INPUT TO DETERMINE IF THE TEST
3500                    *    IS TO CONTINUE.
3501                    *
3502                    *
3503                    *
3504                    *
3505                    *
3506                    *
3507          014 5 2    SW56   LIV   14H,5,2        SWITCHES 5+6
3508                    *   WORK AREA
3509          177 7 3    PAGE   RIV   177H,7,3       PAGE SELECT FOR RAM
3510          200 7 8    PGHI   RIV   200H,7,8       2 BYTE PAGE DEPTH
3511          201 7 8    PGLO   RIV   201H,7,8       0-12292
3512          202 7 8    BARHI  RIV   202H,7,8       2 BYTE BAR WIDTH
3513          203 7 8    BARLO  RIV   203H,7,8       0-1024
3514          204 7 8    MULHI  RIV   204H,7,8       2 BYTE MULTI COUNT
3515          205 7 8    MULLO  RIV   205H,7,8       0-512
3516                    *
3517          000060    PGCNH  EQU   60H             2 BYTE CONSTANT FOR
3518          000004    PGCNL  EQU   4H              PAGE DEPTH=12292
3519                    *
3520                    *
3521                    *
3522  02134  6 17177    BARTS  SEL   PAGE           SET UP TO USE PAGE
3523  02135  6 37300           XMIT  0,PAGE         ZERO OF RAM
3524                    *
3525  02136  6 17200    INPAG  SEL   PGHI           INITIALIZE TO START NEW
3526  02137  6 37000           XMIT  0,PGHI         PAGE-SET PAGE
3527  02140  6 17201           SEL   PGLO           DEPTH TO ZERO
3528  02141  6 37000           XMIT  0,PGLO
3529                    *
3530  02142  6 07003           SEL   HWCT
3531  02143  5 20103    WAIT1  NZT   HWHS,WAIT1     WAIT FOR READY
3532  02144  6 01220           XMIT  220H,R1        ISSUE NEW PAGE
3533  02145  0 01027           MOVE  R1,HWCT        LOAD TO HWP
3534                    *
3535  02146  5 20106    WAIT2  NZT   HWHS,WAIT2     WAIT HWP
3536  02147  6 07001           SEL   DHGH           SET UP FOR ZERO
3537  02150  6 27000           XMIT  0,DHGH         SCALE CONST
3538  02151  6 07002           SEL   DLOW           DATA HIGH + LOW=0
3539  02152  6 27000           XMIT  0,DLOW
3540  02153  6 07003           SEL   HWCT
3541  02154  6 01201           XMIT  201H,R1        SCALE CONST. COMMAND
3542  02155  0 01027           MOVE  R1,HWCT
3543                    *
3544  02156  6 07014    PTSC   SEL   SWITCH         SEE IF HALT REQUESTED
3545  02157  5 27121    SWBHL  NZT   SW7,NOHLT      SWITCH 8 ON = 0,
3546  02160  7 02157           JMP   SWBHL          YES-LOOP, WAIT FOR OFF
3547                    *
3548  02161  0 23100    NOHLT  MOVE  SW3,AUX        SAVE SW4 AS RV FLAG
3549  02162  0 26104           MOVE  SW6,R4         SAVE SW7 AS MULT LOAD FLAG
3550  02163  1 04102           ADC   R4(1),R2       BIT 6=MULTI,BIT 7=R.V.
3551                    *
3552  02164  6 05000           XMIT  0,R5           SET UP TO DECODE
3553  02165  6 06000           XMIT  0,R6           BAR WIDTH
3554  02166  6 00003           XMIT  3,AUX          INPUT SWITCHES 5,6
3555  02167  3 25201           XOR   SW56,R1        ON=0,SO INVERT
3556                    *
3557  02170  4 01172           XEC   BARDC(R1)      USE SWITCHES TO GET WIDTH
3558  02171  7 02176           JMP   BARST
3559                    *
3560  02172  6 06200    BARDC  XMIT  200H,R6        SW5+6=0=128
3561  02173  6 05001           XMIT  1H,R5          SW5+6=1=256
3562  02174  6 05002           XMIT  2H,R5          SW5+6=2=512
```

```
3563  02175  6 05004           XMIT   4H,R5           SW5+6=3=1024
3564                    *
3565  02176  6 17202   BARST    SEL    BARHI           SAVE SELECTED BAR
3566  02177  0 05037            MOVE   R5,BARHI        WIDTH IN RAM AS
3567  02200  6 17203            SEL    BARLO           2 BYTES
3568  02201  0 04037            MOVE   R4,BARLO
3569                    *
3570  02202  6 03010            XMIT   0,R3            INITIALIZE MULTI LOAD
3571  02203  6 04200            XMIT   0,R4            COUNT AS HALF OF
3572  02204  4 01206            XEC    MULTB(R1)       BAR WIDTH
3573  02205  7 02212            JMP    MULST
3574                    *
3575  02206  6 04100   MULTB    XMIT   100H,R4         MULTI=64
3576  02207  6 04200            XMIT   200H,R4             =128
3577  02210  6 03001            XMIT   1,R3                =256
3578  02211  6 03002            XMIT   2,R3                =512
3579                    *
3580  02212  6 17204   MULST    SEL    MULHI           SAVE IN RAM AS
3581  02213  0 03037            MOVE   R3,MULHI        2 BYTES, ALSO SAVE
3582  02214  6 17205            SEL    MULLO           IN REG 3+4
3583  02215  0 04037            MOVE   R4,MULLO
3584                    *
3585  02216  6 11055            CALL   PSTOT           GO OUTPUT RASTER
      02217  7 02653
3586                    *
3587  02220  6 07014            SEL    SWITCH          IS TEST STILL SELECTED
3588  02221  6 00004            XMIT   4H,AUX          SW 2+3 ON, 1 OFF
3589  02222  3 22300            XOR    SW13,AUX
3590  02223  5 00247            NZT    AUX,ENBAR       NO-END BAR TEST
3591                    *
3592  02224  6 17201            SEL    PGLO            YES-GET PAGE DEPTH
3593  02225  6 00501            XMIT   1,AUX           AND INCREMENT
3594  02226  1 37001            ADD    PGLO,R1         SAVE IN REG1
3595  02227  0 01037            MOVE   R1,PGLO         WRITE BACK
3596  02230  6 17200            SEL    PGHI
3597  02231  0 10037            MOVE   OVF,AUX         GET OVF AND ADD
3598  02232  1 37000            ADD    PGHI,AUX        INTO UPPER BYTE
3599  02233  0 00037            MOVE   AUX,PGHI        SAVE IN AUX, WRITE BACK
3600                    *
3601  02234  6 02060            XMIT   PGCNH,R2        CHECK FOR FULL PAGE
3602  02235  3 12002            XOR    R2,R2           (DEPTH=12292)
3603  02236  5 02156            NZT    R2,PTSB         TEST HIGH BYTE-NO JUMP
3604  02237  6 00004            XMIT   PGCNL,AUX
3605  02240  3 01011            XOR    R1,R1           TEST LOW BYTE
3606  02241  5 01156            NZT    R1,PTSB         NOT=,JUPP
3607                    *
3608  02242  6 07003            SEL    HWCT            END OF PAGE
3609  02243  5 20103   WAIT3    NZT    HWHS,WAIT3      WAIT FOR HWP
3610  02244  6 01240            XMIT   240H,R1         THEN OUTPUT END
3611  02245  0 01027            MOVE   R1,HWCT         PAGE COMMAND
3612  02246  7 02136            JMP    INPAG           JUMP TO START NEW PAGE
3613                    *
3614                    *
3615  02247  6 07003   ENBAR    SEL    HWCT            END TEST-
3616  02250  5 20110   WAIT4    NZT    HWHS,WAIT4      FORCE OUT LAST
3617  02251  6 01240            XMIT   240H,R1         PAGE
3618  02252  0 01027            MOVE   R1,HWCT
3619  02253  7 02011            JMP    TLOOP           GO TO TEST LOOP
3620                    *
3621                    *
3624                    *   AUTOMATIC BAR TEST
3625                    *
3626                    *   PRODUCES A PAGE OF OUTPUT
3627                    *   CONSISTING OF 4 SECTIONS OF
3628                    *   VARYING WIDTH BARS. THE FIRST
3629                    *   SECTION CONTAINS BARS OF WIDTH
3630                    *   128. THE SECOND SECTION HAS
3631                    *   WIDTH 256, THE THIRD=512, AND
3632                    *   THE FOURTH=1024.
3633                    *
3634                    *   IN ADDITION, EACH SECTION IS
3635                    *   DIVIDED INTO 2 PARTS. THE FIRST
3636                    *   BEING STANDARD OUTPUT, THE SECOND
3637                    *   BEING R.V. OF THE FIRST.
3638                    *
3639                    *   AFTER EACH RASTER, SWITCHES
3640                    *   1-3 ARE INPUT TO DETERMINE IF
3641                    *   THE TEST IS TO BE CONTINUED
3642                    *
3643         000006    PCKH     EQU    6H              HIGH AND LOW BYTES OF
3644         000000    PCKL     EQU    0H              1/8 PAGE CONST (1536)
3645
3646  02254  6 17177   BRATO    SEL    PAGE            SELECT PAGE 0 OF
3647  02255  6 37300            XMIT   0,PAGE          RAM FOR WORK AREA
3648                    *
3649  02256  6 07003            SEL    HWCT
3650  02257  5 20117   SETWO    NZT    HWHS,SETWO      WAIT HWP
3651  02260  6 27001            SFL    DHGH            SET DATA HIGH
3652  02261  6 27000            XMIT   0,DHGH          AND DATA LOW=0
3653  02262  6 07002            SEL    DLOW
3654  02263  6 27000            XMIT   0,DLOW          TO SET SCALE CONST=0
3655  02264  6 07003            SEL    HWCT
3656  02265  6 01201            XMIT   201H,R1         OUTPUT SCALE COMMAND
3657  02266  0 01027            MOVE   R1,HWCT
3658                    *
3659  02267  6 03000   CLCTR    XMIT   0,R3            CLEAR 1/8TH COUNTER
```

```
366
3661    02270   6 17202          SEL     BARHI           INITIALIZE BAR WIDTH
3662    02271   6 37000          XMIT    0,BARHI         TO 128 (2 BYTES)
3663    02272   6 17203          SEL     BARLO
3664    02273   6 30200          XMIT    200H,AUX
3665    02274   0 00037          MOVE    AUX,BARLO
3666    *
3667    02275   6 07003          SEL     HWCT
3668    02276   5 20136   WPCL   NZT     HWHS,WPCL       WAIT HWP
3669    02277   6 30220          XMIT    220H,AUX        ISSUE NEW PAGE
367     02300   0 00027          MOVE    AUX,HWCT        LOAD COMMAND
3671    *
3672    02301   6 02020   RV0    XMIT    0,R2            CLEAR R.V. AND MULTI FLAGS
3673    *
3674    02302   6 17200   PGD0   SEL     PGHI            INITIALIZE PAGE
3675    02303   6 37000          XMIT    0,PGHI          DEPTH = 0
3676    02304   6 17201          SEL     PGLO            (2 BYTES)
3677    02305   6 37000          XMIT    0,PGLO
3678    *
3679    02306   6 11056   OUTRS  CALL    RSTOT           OUTPUT A RASTER
        02307   7 02653
368     *
3681    02310   6 07014          SEL     SWITCH          SEE IF TEST STILL SELECTED
3682    02311   6 00003          XMIT    3H,AUX          SW 2, 3=OFF, SW1=ON
3683    02312   3 22300          XOR     SW13,AUX
3684    02313   5 00361          NZT     AUX,ABREN       NO-END TEST
3685    *
3686    02314   6 17201          SEL     PGLO            INCREMENT PAGE DEPTH
3687    02315   6 00001          XMIT    1,AUX
3688    02316   1 37001          ADD     PGLO,R1         ADD 1 TO LOW
3689    02317   0 01037          MOVE    R1,PGLO         SAVE LOW IN R1
369     02320   6 17200          SEL     PGHI
3691    02321   0 10030          MOVE    OVF,AUX         ADD IN OVF TO HI
3692    02322   1 37300          ADD     PGHI,AUX        SAVE HI IN AUX
3693    02323   0 00037          MOVE    AUX,PGHI
3694    *
3695    02324   6 04006          XMIT    PG8H,R4         SEE IF PAGE DEPTH=1/8
3696    02325   3 04004          XOR     R4,R4           OF A PAGE (COMPARE
3697    02326   5 04306          NZT     R4,OUTRS        HI AND LO WITH
3698    02327   6 30000          XMIT    PG8L,AUX        1536)
3699    02330   3 01001          XOR     R1,R1
370     02331   5 01306          NZT     R1,OUTRS        NOT EQUAL CONTINUE
3701    *
3702    02332   6 00001          XMIT    1,AUX           1/8 PAGE DONE-
3703    02333   1 03003          ADD     R3,R3           INCREMENT 1/8 COUNTER
3704    02334   6 00010          XMIT    8,AUX           SEE IF FULL PAGE DONE
3705    02335   3 03000          XOR     R3,AUX          CTR=8
3706    02336   5 00344          NZT     AUX,BTODD       NO
3707    *
3708    02337   6 07003          SEL     HWCT            YES-
3709    02340   5 20140   BAPG   NZT     HWHS,BAPG       WAIT ON HWP
371     02341   6 00240          XMIT    240H,AUX        OUTPUT END PAGE
3711    02342   0 00027          MOVE    AUX,HWCT
3712    02343   7 02267          JMP     CLCTR           CONTINUE NEXT PAGE
3713    *
3714    02344   6 00001   BTODD  XMIT    1,AUX           SEE IF 1/8 COUNTER IS
3715    02345   2 03000          AND     R3,AUX          FOR ODD 1/8TH
3716    02346   5 00357          NZT     AUX,980DD       YES
3717    02347   6 17203          SEL     BARLO           NO-EVEN-GET
3718    02350   0 37000          MOVE    BARLO,AUX       CURRENT BAR WIDTH
3719    02351   1 37037          ADD     BARLO,BARLO     AND DOUBLE FOR NEXT
372     02352   0 10030          MOVE    OVF,AUX         1/8TH
3721    02353   6 17202          SEL     BARHI           (ADD TO ITSELF AND
3722    02354   1 37003          ADD     BARHI,AUX       STORE BACK)
3723    02355   1 37037          ADD     BARHI,BARHI
3724    02356   7 02301          JMP     RV0             GO CLEAR R.V. FLAG
3725    *
3726    02357   0 00062   9XODD  MOVE    AUX,R2          ODD-SET FOR R.V. FOR
3727    02360   7 02302          JMP     PGD0            NEXT 1/8.
3728    *
3729    02361   6 07003   ABREN  SEL     HWCT            END OF TEST-
373     02362   5 20122   BAPG2  NZT     HWHS,BAPG2      WAIT HWP
3731    02363   6 00240          XMIT    240H,AUX        PUT OUT LAST PAGE
3732    02364   0 00027          MOVE    AUX,HWCT
3733    *
3734    02365   7 02011          JMP     TLOOP           RETURN TO TEST LOOP
3735                      *       SELF TEST PROG FOR RX300
3736                      *
3737                      *       CONSISTS OF FOUR TESTS -
3738                      *       1) REGISTER TEST
3739                      *       2) LEFT IV TEST
374                       *       3) RIGHT RAM TEST
3741                      *       4) GENERAL INSTRUCTION TEST
3742                      *
3743                      *       THE LIGHTS ARE USED AS
3744                      *       FAIL INDICATORS. THEY
3745                      *       ARE INITIALLY TURNED ON,
3746                      *       AND AFTER COMPLETING ALL
3747                      *       TESTS, THE LIGHTS CORRESPONDING
3748                      *       TO TESTS WHICH WERE
3749                      *       SUCCESSFUL ARE TURNED OFF.
375                       *
3751                      *       LIGHT5= REG TEST
3752                      *       LIGHT4= LEFT IV TEST
3753                      *       LIGHT3= RAM TEST (1024 BYTES)
3754                      *       LIGHT2= INST. TEST
3755
```

```
3756
3757
3758
3759
3760
3761
3762
3763                              *   INITIALIZE INDICATORS
3764                              *   AND CALL TESTS.
3765                              *   ENTRY  TEST
3766   02366  6 07006   TST-X  SEL    LIGHTS              INITIALIZE LIGHTS BY
3767                              *
3768   02367  6 0127           XMIT   207H,R1             TURN ON LIGHTS EXCEPT 2-5
3769   02370  0 01127          MOVE   R1,LIGHTS
3770
3771                              *   PERFORM REGISTER TEST
3772                              *
3773   02371  6 00125   TSTRG  XMIT   125H,AUX            INITIALIZE VALUE
3774   02372  0 00001          MOVE   AUX,R1              MOVE VALUE THROUGH
3775   02373  0 01002          MOVE   R1,R2               REGS 1-6 AND R11
3776   02374  0 02003          MOVE   R2,R3
3777   02375  0 03004          MOVE   R3,R4
3778   02376  0 04005          MOVE   R4,R5
3779   02377  0 05006          MOVE   R5,R6
3780   02400  0 06011          MOVE   R6,R11
3781   02401  0 11100          MOVE   R11(1),AUX          GET ONES COMPLEMENT OF
3782                              *                       VALUE IN AUX (252).
3783   02402  0 00001          MOVE   AUX,R1
3784   02403  0 01002          MOVE   R1,R2               MOVE THROUGH THE
3785   02404  0 02003          MOVE   R2,R3               GENERAL REGISTERS.
3786   02405  0 03004          MOVE   R3,R4
3787   02406  0 04005          MOVE   R4,R5
3788   02407  0 05006          MOVE   R5,R6
3789   02410  0 06011          MOVE   R6,R11
3790   02411  0 11100          MOVE   R11(1),AUX          COMPLEMENT AGAIN (125)
3791                              *
3792   02412  0 00001          MOVE   AUX,R1              MOVE THROUGH THE
3793   02413  0 01002          MOVE   R1,R2               REGISTERS
3794   02414  0 02003          MOVE   R2,R3
3795   02415  0 03004          MOVE   R3,R4
3796   02416  0 04005          MOVE   R4,R5
3797   02417  0 05006          MOVE   R5,R6
3798   02420  0 06011          MOVE   R6,R11
3799                              *
3800   02421  6 00125          XMIT   125H,AUX            SEE IF R11 EQUALS
3801   02422  3 11006          XOR    R11,R6              VALUE
3802                              ORG    4,256
3803   02423  5 06025          NZT    R6,RGER             IF NOT - REG ERROR
3804   02424  7 02426          JMP    REGOT               IF SO, R6= 0
3805
3806   02425  6 06010   RGER   XMIT   10H,R6              ERROR - SET R6=10
3807                              *
3808                              *
3809   02426  6 11057   REGOT  CALL   IVTST               CALL IV TEST
       02427  7 02455
3810
3811   02430  6 11060          CALL   RAMTS               TEST RAM
       02431  7 02533
3812
3813   02432  6 11061          CALL   INTST               PERFORM INSTRUCTION TEST
       02433  7 02571
3814
3815
3816   02434  6 07006          SEL    LIGHTS
3817                              *   OR IN FAULTS (R6)
3818                              *   OR     R6,LIGHTS,R3,LIGHTS
3819   02435  0 27000   *      MOVE   LIGHTS,AUX
3820   02436  3 06003   *      XOR    R6,R3               FORM  P1 XOR OP2
3821   02437  2 06000   *      AND    R6,AUX              FORM OP1 AND OP2
3822   02440  3 13027   *      XOR    R3,LIGHTS           P= (OP1 XOR OP2) XOR (OP1 AND OP2)
3823                              *
3824   02441  5 06043          NZT    R6,TRXER            SEE IF ANY FAULTS FOUND
3825   02442  7 02446          JMP    TSW14               NO-TEST SWITCHES 1-4
3826   02443  6 07014   TRXER  SEL    SWITCH              YES-IS HALT SWITCH ON
3827   02444  5 27106          NZT    SW7,TSW14           HALT ON=SW 7=ZERO
3828   02445  7 02443          JMP    TRXER               YES-LOOP,WAIT
3829
3830   02446  6 07014   TSW14  SEL    SWITCH              OTHERWISE INPUT SWITCHES
3831   02447  6 00006          XMIT   6H,AUX              AND SEE IF
3832   02450  3 22301          XOR    SW13,R1             SW7 STILL ON
3833   02451  5 01053          NZT    R1,TLUP1            NO-GO TO TEST LOOP
3834   02452  7 02371          JMP    TSTRG               YES-DO AGAIN
3835   02453  7 02411   TLUP1  JMP    TLOOP               TEST LOOP
3836
3837   02454  7 03000          RTN
3838                              END    TEST
3839
3837                              *                       LEFT IV TEST
3838   02455                   PROC   IVTST
3839                              *
3840                              *
3841                              *   LEFT BANK ASSIGNMENTS
3842          0 1 7 0    LFT1   LIV    1,7,8               IVS TO BE TESTED
3843          0 2 7 0    LFT2   LIV    2,7,8
3844          0 3 7 0    LFT3   LIV    3,7,8
3845          0 4 7 0    LFT4   LIV    4,7,8
```

```
3846        067 7 0       LFT7   LIV   7,7,8
3847        010 7 0       LFT10  LIV   10H,7,8
3848        011 7 0       LFT11  LIV   11H,7,8
3849        012 7 0       LFT12  LIV   12H,7,8
3850    *
3851    *
3852  02455  0 11002             MOVE  R11,R2       SAVE RETURN INDEX
3853  02456  6 04000             XMIT  0H,R4        CLEAR IV SELECT PTR
3854  02457  0 04005             MOVE  R4,R5        CLEAR ERROR ACCUM
3855    *
3856  02460  6 07011             SEL   LFT11        SELECT AND TEST
3857  02461  6 11062             CALL  RDWRT        LEFT IV 11
      2462  7 02633
3858    *
3859  02463  6 01340             XMIT  340H,R1      THEN SET BITS 0,1,2 OF
3860  02464  0 01027             MOVE  R1,LFT11     IV 11 TO ALLOW TESTING
3861    *                                           OF IV 12
3862                             ORG   15,256
3863  02465  4 04067    IVSEL    XEC   IVTAB(R4)    USE R4 AS PTR TO
3864  02466  7 02475             JMP   IVRDW        NEXT IV TO SELECT
3865    *
3866  02467  6 07001    IVTAB    SEL   LFT1         SELECT TABLE FOR
3867  02470  6 07002             SEL   LFT2         LEFT BANK 1,2,4,
3868  02471  6 07004             SEL   LFT4         7,10,12.
3869  02472  6 07007             SEL   LFT7
3870  02473  6 07010             SEL   LFT10
3871  02474  6 07012             SEL   LFT12
3872    *
3873  02475  6 11063    IVRDW    CALL  RDWRT        TEST THE SELECTED IV
      2476  7 02633
3874  02477  6 00001             XMIT  1H,AUX       INCR. IV SELECT PTR
3875  02500  1 04004             ADD   R4,R4
3876  02501  6 00006             XMIT  6H,AUX       SEE IF ALL TESTED
3877  02502  3 04000             XOR   R4,AUX
3878    *
3879  02503  5 00065             NZT   AUX,IVSEL    NO - SEL AND TEST ANOTHER
3880    *
3881    *
3882  02504  6 07003             SEL   LFT3         SELECT LEFT IV 3
3883  02505  6 01125             XMIT  125H,R1      GET TEST VALUE
3884  02506  0 01027             MOVE  R1,LFT3      OUTPUT TO IV
3885  02507  0 27001             MOVE  LFT3,R1      INPUT VALUE
3886  02510  6 00177             XMIT  177H,AUX     CAN ONLY TEST BITS 1-7
3887  02511  2 16001             AND   R1,R1
3888  02512  6 00125             XMIT  125H,AUX     SEE IF BITS 1-7
3889  02513  3 01000             XOR   R1,AUX       ARE VALID
3890  02514  5 00127             NZT   AUX,IVEPR    NO-ERROR
3891  02515  6 01052             XMIT  52H,R1       NOW TEST COMPLEMENT
3892  02516  0 01027             MOVE  R1,LFT3      OUTPUT TO IV3
3893  02517  0 27001             MOVE  LFT3,R1      INPUT VALUE
3894  02520  6 00177             XMIT  177H,AUX     SET TO MASK OUT TOP BIT
3895  02521  2 01001             AND   R1,R1
3896  02522  6 00052             XMIT  52H,AUX      SEE IF BITS 1 - 7 VALID
3897  02523  3 01000             XOR   R1,AUX       ZERO= GOOD
3898  02524  5 00127             NZT   AUX,IVERR    NO-ERROR
3899  02525  5 05127             NZT   R5,IVERR     YES-ANY OTHER ERRORS
3900  02526  7 02531             JMP   IVOUT        NO-GO TO RETURN
3901    *
3902  02527  6 00020    IVERR    XMIT  20H,AUX      ERROR- SET BIT 3 OF
3903  02530  1 06006             ADD   R6,R6        REG 6
3904    *
3905  02531  0 02011    IVOUT    MOVE  R2,R11       RESTORE RETURN INDEX
3906  02532  7 03000             RTN                RETURN
3907    *
3908                             END   IVTST
3909    *
3910    *                                           RIGHT RAM TEST
3911    *
3912  02533                      PROC  RAMTS
3913    *
3914    *                        RIGHT BANK ASSIGNMENTS
3915        177 7 0       PAGE   RIV   177H,7,8     PAGE SELECT
3916        200 7 0       RIGHT  RIV   200H,7,8     RAM TEST
3917    *
3918    *
3919  02533  6 04000             XMIT  0H,R4        CLEAR PAGE SELECT
3920  02534  0 04005             MOVE  R4,R5        AND ERROR ACCUM.
3921    *
3922  02535  6 17177    PGSEL    SEL   PAGE         SET RIGHT IV 177 TO
3923  02536  0 04037             MOVE  R4,PAGE      PAGE NUM
3924    *
3925  02537  6 03200             XMIT  200H,R3      INIT BYTE NUM TO 200
3926    *                                           FOR EACH PAGE
3927  02540  0 03017    BYTSL    MOVE  R3,IVR       SELECT BYTE
3928    *
3929  02541  6 01125             XMIT  125H,R1      GET TEST VALUE
3930  02542  0 01037             MOVE  R1,RIGHT     OUTPUT TO RAM
3931  02543  0 37001             MOVE  RIGHT,R1     INPUT TO R1
3932    *
3933  02544  6 00125             XMIT  125H,AUX     COMPARE WITH TEST
3934  02545  3 01001             XOR   R1,R1        VALUE
3935    *
3936                             ORG   16,256
3937  02546  5 01166             NZT   R1,RAMER     NOT SAME - ERROR
3938  02547  6 01252             XMIT  252H,R1      SAME - GET NEXT VALUE
3939  02550  0 01037             MOVE  R1,RIGHT     WRITE TO RAM
3940  02551  0 37001             MOVE  RIGHT,R1     INPUT TO R1
```

```
3941
3942   02552  6 00252          XMIT   252H,AUX      SEE IF SAME AS TEST
3943   02553  3 01001          XOR    R1,R1         VALUE
3944                    *
3945   02554  5 01166          NZT    R1,RAMER      NO-ERROR
3946                    *
3947   02555  6 00001  UPRAM   XMIT   1H,AUX        INCR PAM BYTE
3948   02556  1 03003          ADD    R3,R3         200 - 377 VALID
3949                    *
3950   02557  5 03149          PZT    R3,BYTSL      NOT 0 - O.K., SEL BYTE
3951                    *
3952   02560  6 00001  UPPAG   XMIT   1H,AUX        OFF PAGE,INCR. PAGE
3953   02561  1 04004          ADD    R4,R4         SELECT VALUE
3954   02562  6 00010          XMIT   8,AUX         SEE IF TEST DONE
3955   02563  3 04000          XOR    R4,AUX        FOR ALL PAGES
3956                    *
3957   02564  5 00135          NZT    AUX,PGSEL     NO - SEL NEXT PAGE
3958                    *
3959                    *
3960   02565  7 03100  RAMEX   RTN                  NO-RETURN
3961                    *
3962   02566  6 00040  RAMER   XMIT   40H,AUX       ERROR SET BIT
3963   02567  1 06006          ADD    R6,R6         2 OF REG 6
3964   02570  7 02565          JMP    RAMEX         RETURN
3965
3966                           END    RAMTS
3968                    *
3969   02571           PROC    INTST
3970                    *                           GENERAL INST. TEST
3971          001 7 0  LFT1    LIV    1,7,8         LEFT IV 1
3972          001 7 3  LF3     LIV    1,7,7         USED IN INSTRUCTION
3973          001 4 5  LF5     LIV    1,4,5         TEST
3974                    *
3975   02571  6 03000          XMIT   0,R3
3976   02572  7 02573          JMP    NEXT1
3977   02573  6 07001  NEXT1   SEL    LFT1
3978   02574  0 03002          MOVE   R3,R2         R2=0
3979   02575  6 00001          XMIT   1,AUX
3980   02576  3 02002          XOR    R2,R2         R2=1
3981   02577  4 03200          XEC    NEXT2(R3)     R2=2
3982   02600  1 02002  NEXT2   ADD    R2,R2         R2=3
3983   02601  6 04537          XMIT   111118,LF5
3984   02602  6 27300          XMIT   0008,LB3      IV 1=11111000
3985   02603  1 02002          ADD    R2,R2         R2=4
3986   02604  7 02607          JMP    NEXT3
3987   02605  0 02402  NEXT4   MOVE   P2(4),R2      R200000100
3988   02606  7 02611          JMP    NEXT5
3989   02607  0 02412  NEXT3   MOVE   P2(4),R2      R2=01000000
3990   02610  7 02605          JMP    NEXT4
3991                    *
3992   02611  3 02002  NEXT5   XOR    R2,R2         R2=101
3993   02612  1 02002          ADD    R2,R2         R2=110
3994   02613  3 02002          XOR    R2,R2         R2=111
3995   02614  2 02006          AND    R2,AUX        AUX=1
3996   02615  5 00217          NZT    AUX,NEXT6     YES
3997   02616  7 02630          JMP    OUTER         ERR
3998                    *
3999   02617  0 27000  NEXT6   MOVE   LFT1,AUX      AUX=11111000
4000   02620  2 02003          AND    R2,R3
4001   02621  5 03230          NZT    R3,OUTER      0=O.K.,OTHERWISE ERR
4002                    *
4003   02622  3 02002          XOR    R2,R2         R2=11111111
4004   02623  6 00001          XMIT   1H,AUX        AUX=1
4005   02624  1 02000          ADD    R2,AUX        AUX=0,OVF=1
4006   02625  0 10002          MOVE   OVF,R2        R2=1
4007   02626  5 00230          NZT    AUX,OUTER     AUX=0=O.K.
4008   02627  5 02232          SZT    R2,OKEX       R2=1=O.K.
4009                    *
4010   02630  6 00100  OUTER   XMIT   100H,AUX      SET BIT 1 OF REG
4011   02631  1 06006          ADD    R6,R6         6 TO SHOW ERROR
4012                    *
4013   02632  7 03500  OKEX    RTN                  RETURN
4014                    *
4015                           END    INTST
4016
4017                                                SUB. TO TEST LEFT IV
4018   02633           PROC    RDWRT                BYTES BY WRITING AND
4019                    *                           READING BACK TEST VALUES
4020                    *
4021          001 7 0  LFT1    LIV    1,7,8         LEFT IV
4022                    *
4023                    *
4024   02633  6 01125          XMIT   125H,R1
4025   02634  0 01027          MOVE   R1,LFT1
4026   02635  0 27001          MOVE   LFT1,R1       WRITE TEST VALUE
4027   02636  6 00125          XMIT   125H,AUX      READ BACK
4028   02637  3 01001          XOR    R1,R1         SEE IF SAME AS
4029                           ORG    10,256        TEST VALUE
4030   02640  5 01250          NZT    R1,RDERR      NO-ERROR
4031                    *
4032   02641  6 01252          XMIT   252H,R1       YES-TEST ONES COMPL
4033   02642  0 01027          MOVE   R1,LFT1       WRITE TO IV
4034   02643  0 27001          MOVE   LFT1,R1       READ BACK
4035   02644  6 00252          XMIT   252H,AUX      SAME AS TEST
4036   02645  3 01001          XOR    R1,R1         VALUE-
4037   02646  5 01250          NZT    R1,RDERR      NO-ERROR
```

```
4138
4139   02647  7 03000      RPEX    RTN                         RETURN
4140  *
4141   02650  6 10001      RDERR   XMIT    1H,AUX              ERROR-INCR. ERROR
4142   02651  1 05005              ADD     R5,R5               ACCUMULATOR
4143   02652  7 02647              JMP     RPEX                RETURN
4144  *
4145                               END     RDWPT
4146  *
4148   02653              PROC     RSTOT
4149
4150                     *         OUTPUT RASTER ROUTINE
4151
4152                     *         ENTER WITH REG 3+4=MULTI LOAD
4153                     *                   REG  2=MULT, R.V. FLAGS
4154
4155                     *         REGISTERS 5+6 ARE USED TO HOLD
4156                     *         XPOS SUM.
4157                     *
4158         000356      NLINL     EQU     356H                BOTTOM 8 BITS OF -7954
4159         060340      NLINH     EQU     340H                TOP 8 BITS OF -7954
4160                     *
4161                     *
4162         202 7 0     BARHI     RIV     202H,7,8            BAR WIDTH
4163         203 7 0     BARLO     RIV     203H,7,8
4164         204 7 0     MULHI     RIV     204H,7,8            MULTI COUNT
4165         205 7 0     MULLO     RIV     205H,7,8
4166         206 7 0     PONFF     RIV     206H,7,8            BUFFER ON/OFF
4167                     *
4168   02653  6 05000              XMIT    0,R5                INITIALIZE XPOS TO ZERO
4169   02654  6 06000              XMIT    0,R6
4170                     *
4171   02655  6 17206              SEL     PONFF               INITIALIZE BUFFER ON/OFF
4172   02656  6 37000              XMIT    0,PONFF             TO ON
4173                     *
4174   02657  6 07003    XPOUT     SEL     HWCT
4175   02660  5 20117              NZT     HWHS,XPOUT          WAIT ON HWP
4176   02661  6 07001              SEL     DHGH                OUTPUT XPOS IN
4177   02662  0 05027              MOVE    R5,DHGH             DATA HIGH AND DATA
4178   02663  6 07002              SEL     DLOW                LOW
4179   02664  0 06027              MOVE    R6,DLOW
4180   02665  6 07003              SEL     HWCT
4181   02666  6 00202              XMIT    202H,AUX            XPOS COMMAND TO HWP
4182   02667  0 00027              MOVE    AUX,HWCT
4183                     *
4184   02670  5 20130    OUT       NZT     HWHS,POUT           WAIT ON HWP
4185   02671  6 17206              SEL     PONFF               GET BUFFER ON/OFF FLAG
4186   02672  0 37000              MOVE    PONFF,AUX           AND OUTPUT IN DATA LOW
4187   02673  6 07002              SEL     DLOW
4188   02674  0 00627              MOVE    AUX,DLOW
4189   02675  6 07003              SEL     HWCT
4190   02676  6 00204              XMIT    204H,AUX            BUFFER COMMAND TO HWP
4191   02677  0 00027              MOVE    AUX,HWCT
4192                     *
4193   02700  6 07003    SOLVO     SEL     HWCT
4194   02701  5 20131    SOVLP     NZT     HWHS,SOVLP          WAIT ON HWP
4195   02702  6 00207              XMIT    207H,AUX            OUTPUT SOLVE COMMAND
4196   02703  0 00027              MOVE    AUX,HWCT
4197                     *
4198   02704  6 00001              XMIT    1,AUX               SEE IF R.V. SELECTED
4199   02705  2 02003              AND     R2,AUX              (TEST FOR BIT 7 OF R2)
4100   02706  5 20710              NZT     AUX,RVON            YES-JUMP
4101   02707  7 02713              JMP     RVOFF               NO-GO TO RVOFF
4102                     *
4103   02710  5 20110    RVON      NZT     HWHS,RVON           R.V. SELECTED-
4104   02711  6 00210              XMIT    210H,AUX            SEND R.V. COMMAND
4105   02712  0 00027              MOVE    AUX,HWCT            TO H.W.P
4106                     *
4107   02713  6 00200    RVOFF     XMIT    200H,AUX            SEE IF MULTI LOAD
4108   02714  2 02000              AND     R2,AUX              (TEST BIT 0 OF R2)
4109   02715  5 00317              NZT     AUX,MULON           YES
4110   02716  7 02733              JMP     MULOF               NO
4111                     *
4112   02717  6 00377    MULON     XMIT    377H,AUX            MULTI LOAD-DECREMENT 2 BYTE
4113   02720  1 04004              ADD     R4,R4               COUNT (R3 + R4) AND
4114   02721  0 10001              MOVE    OVF,R1              STORE AS COUNT
4115   02722  1 03000              ADD     R3,AUX
4116   02723  1 01003              ADD     R1,R3
4117                     *
4118   02724  0 03000              MOVE    R3,AUX              SEE IF COUNT = 0
4119   02725  1 04000              ADD     R4,AUX              (R3+R4 = 0)
4120   02726  5 00300              NZT     AUX,SOLVO           NO-DO ANOTHER SOLVE
4121                     *
4122   02727  6 17204              SEL     MULHI               YES-GET MULTILOAD
4123   02730  0 37003              MOVE    MULHI,R3            COUNT FROM RAM AND
4124   02731  6 17205              SEL     MULLO               PUT IN R3 + R4
4125   02732  0 37004              MOVE    MULLO,R4
4126                     *
4127   02733  6 17203    MULOF     SEL     BARLO               UPDATE XPOS (XPOS=POS+BAR)
4128   02734  0 37000              MOVE    BARLO,AUX           GET BOTTOM BYTE OF BAR WWIDTH
4129   02735  1 06006              ADD     R6,R6               ADD TO LOWER SUM
4130   02736  1 10000              MOVE    OVF,AUX             GET OVERFLOW
4131   02737  6 17202              SEL     BARHI
4132   02740  1 37000              ADD     BARHI,AUX           ADD TO TOP OF BAR WIDTH
4133   02741  1 05005              ADD     R5,R5               ADD TO TOP SUM
4134
```

```
4135   02742  6 17206        SEL    PONFF          GET BUFFER ON/OFF FLAG
4136   02743  6 00002        XMIT   2H,AUX         AND COMPLEMENT
4137   02744  3 37037        XOR    PONFF,PONFF
4138                      *
4139   02745  6 00356        XMIT   NLINL,AUX      CHECK FOR END OF RASTER-
4140   02746  1 06501        ADD    P4,AUX         (SEE IF XPOS IS EQ. OR
4141   02747  6 00347        XMIT   NLINH,AUX      G.T. 7954) NLINL=BOT BYTE
4142   02750  1 10000        ADD    OVF,AUX        OF -7954
4143   02751  1 06500        ADD    R5,AUX         NLINH=TOP BYTE OF -7954
4144   02752  5 10354        NZT    OVF,RSTEN      OVF=ON=END RASTER
4145                      *
4146   02753  7 02657        JMP    XPOUT          OTHERWISE OUTPUT NEW XPOS
4147                      *
4148   02754  6 07003 RSTEN  SEL    HWCT           END RASTER
4149   02755  5 20115 RSOUT  NZT    HWHS,RSOUT
4150   02756  6 00300        XMIT   300H,AUX       OUTPUT THE OUTPUT RASTER
4151   02757  0 00027        MOVE   AUX,HWCT       COMMAND TO HWP
4152                      *
4153   02760  7 03000        RTN
4154                      *
4155                         END    RSTOT
4156
4157                      *
4158                         LIST   S,0
4159                      * END OF PROG
4160                      *
4161                         END    OCS
RETURN TABLE
        03000  4 11001
        03001  7 00045
        03002  7 00047
        3003   7 00105
        3004   7 00111
        3005   7 00142
        03006  7 00145
        03007  7 00223
        3010   7 00264
        3011   7 00267
        3012   7 00306
        03013  7 00326
        03014  7 00333
        03015  7 00441
        3016   7 00446
        3017   7 00451
        3020   7 00454
        03021  7 00614
        03022  7 00724
        3023   7 01001
        03024  7 01013
        3025   7 01016
        3026   7 01021
        03027  7 01026
        3030   7 01064
        3031   7 01074
        3032   7 01076
        3033   7 01125
        3034   7 01131
        3035   7 01145
        3036   7 01161
        03037  7 01430
        03040  7 01433
        3041   7 01436
        03042  7 01441
        03043  7 01445
        03044  7 01451
        03045  7 01531
        3046   7 01540
        3047   7 01572
        3050   7 01706
        3051   7 01711
        03052  7 01715
        03053  7 01721
        3054   7 02046
        3055   7 02166
        03056  7 02220
        03057  7 02313
        03060  7 02430
        3061   7 02432
        03062  7 02434
        03063  7 02463
        03064  7 02477

TOTAL ASSEMBLY ERRORS =    0
```

We claim:

1. A typesetter for the automatic generation of characters comprising, in combination:
   (a) input means for providing first digital data specifying the identity, form, size and placement of characters to be typeset;
   (b) font storage means for storing and providing second digital data defining the contour of each character of at least one font with respect to a normalized encoding set of first and second coordinates;
   (c) electronic data processing means, connected to said input means and said font storage means, for receiving said first and second digital data and producing third digital data defining the boundaries of a plurality of characters, specified by said first digital data, at the points of intersection with a raster line, and,
   (d) character imaging means, connected to said electronic data processing means, receiving said third digital data for writing said characters on an imaging surface.

2. The typesetter recited in claim 1, further comprising:
   (e) raster line storage means, connected to said data processing means, for storing said third digital data for at least a portion of said raster line extending the width of at least several characters; and
   (f) character imaging means, connected to said line storage means, for writing characters on a print medium, said character imaging means including:
      (1) means, responsive to said third digital data for creating an image on said print medium for said raster line; and
      (2) means for moving said print medium in a direction transverse to the direction of raster line image.

3. The typesetter recited in claim 2, wherein said raster line extends substantially the width of said print medium and said line storage means stores said third digital data for the entire raster line.

4. The typesetter recited in claim 2, wherein said line storage means comprises at least one line buffer formed of a plurality of memory elements, each memory element storing a single binary digit corresponding to a respective, unique raster point along said raster line.

5. The typesetter recited in claim 2, wherein said image creating means includes means for forming images of first and second optical characteristics representing light and dark character portions, respectively, on said raster line; and wherein said line storage means includes means for modifying said third digital data, thereby to reverse said first and second optical characteristics on at least a portion of said raster line.

6. The typesetter recited in claim 2, wherein said means for creating an image on said imaging surface includes a scanning device having means for generating a scanning beam and means for moving said scanning beam across said print medium in a scan line, said means for generating said scanning beam including means, responsive to said line storage means, for switching said scanning beam on and off, said scan line forming said raster line on said print medium.

7. The typesetter recited in claim 6, wherein said line storage means includes two line buffers, the binary digits in said first line buffer representing positions on said scan line at which said scanning beam is switched on and the binary digits in said second line buffer representing said positions on said scan line in which said scanning beam is switched off.

8. The typesetter recited in claim 7, wherein said line storage means further includes a third line buffer, the binary digits in said third line buffer representing the positions on said scan line at which the beam on/off switching is reversed.

9. The typesetter recited in claim 1, wherein said raster line extends horizontally parallel to lines of type.

10. The typesetter recited in claim 1, wherein said first digital data provided by said input means further includes page variant commands for the characters to be typeset.

11. The typesetter recited in claim 10, wherein said page variant commands include a wrong reading command for effecting a left-right mirror image on the page.

12. The typesetter recited in claim 10, wherein said page variant commands include a reverse video command for effecting a color reversal for at least a portion of a page.

13. The typesetter recited in claim 1, wherein said first digital data provided by said input means further includes a reverse video command for effecting a color reversal for a rectilinear section of a page.

14. The typesetter recited in claim 1, wherein said second digital data includes:
   (1) digital numbers defining the first and second coordinates of the start point of a character outline; and
   (2) digital numbers defining a plurality of straight line vectors extending successively along a character outline from said start point, each vector having a first digital number representing the first coordinate distance and the second digital number representing the second coordinate distance from one end of the vector to the other.

15. The typesetter recited in claim 14, wherein said first and second digital numbers are each 4-bit binary numbers,
   whereby each vector is defined by one data byte.

16. The typesetter recited in claim 14, wherein at least one of said start points is represented as a digital number defining the vertical distance from the upper edge of the nominal extended em square to the start point, and another digital number defining the horizontal distance from the character left side bearing to the start point.

17. The typesetter recited in claim 14, wherein at least some of said characters are further represented by a digital number defining a control code specifying an end of an outline.

18. The typesetter recited in claim 14, wherein at least some of said characters are further represented by a digital number defining a control code which modifies a stored vector by specifying the addition of a prescribed value to one of said first and second digital numbers of the vector without addition to the other of said first and second digital numbers.

19. The typesetter recited in claim 14, wherein at least some of said characters are further represented by a digital number defining a control code specifying that the beginning of a vector is displaced from the end of its previous vector along one of said first and second coordinates by a given value.

20. The typesetter recited in claim 14, wherein at least some of said characters are further represented by a digital number defining a control code which specifies that at least one subsequent vector occurs in a different quadrant.

21. The typesetter recited in claim 14, wherein said digital numbers are set forth in a prescribed order such that, by their order, said digital numbers are associated with their respective outlines.

22. The typesetter recited in claim 14, wherein said digital numbers defining the first and second coordinates of a start point precede said digital numbers defining the vectors extending from that start point.

23. The typesetter recited in claim 14, wherein the digital numbers defining said plurality of vectors are arranged such that the vectors of an entire string are successively defined before defining the vectors of another string.

24. The typesetter recited in claim 23, wherein said second digital data includes further digital numbers, associated with the digital numbers defining the coordinates of a start point, which constitute the starting address of the digital numbers defining the vectors of a string, whereby a single vector string may be addressed from a plurality of start points within a font.

25. The typesetter recited in claim 24, wherein said digital numbers defining the coordinates of a start point further specify the quadrant of at least the first vector of the associated, addressed vector string.

26. The typesetter recited in claim 1, wherein said data processing means includes:
(1) a random access memory for storing fourth digital data;
(2) data management means, comprising a first microprocessor, for receiving and storing said first and second digital data and producing and storing said fourth digital data in said random access memory; and
(3) outline converter means, comprising a second microprocessor, for receiving said fourth digital data from said random access memory and computing therefrom said third digital data defining the character boundaries intersecting a raster line.

27. The typesetter recited in claim 26, wherein said data management means stores in said random access memory a file of line segments and a file of character outlines for each of said line segments.

28. The typesetter recited in claim 27, wherein said line segments are successively addressed in one direction in said random access memory and said outlines for said line segments are successively addressed in the opposite direction in said random access memory.

29. The typesetter recited in claim 26, wherein said outline converter means computes said third digital data in accordance with the formula:

$$X_R = X_P + (X_N + \Delta X + B)A$$

where $X_R$ = the X distance from one edge of the page to be typeset to the point on the particular character outline which is intersected by the current raster line;
$X_P$ = the X distance from said one edge of said page to the left side bearing of the character associated with said particular character outline;
$X_N$ = the X position of the start point, with respect to the left side bearing of said associated character, of said particular character outline;
$\Delta X$ = the X distance from said outline start point to the point of intersection of said particular character outline by the current raster line; and
A and B are sizing and positioning parameters, respectively.

30. The typesetter recited in claim 29, wherein $X_A$ and $\Delta X$ may assume both positive and negative values.

31. The typesetter recited in claim 29, wherein the characters intersected by the raster lines may be scaled, and wherein said outline converter means computes said third digital data in accordance with the formula:

$$X_R = X_P + (X_N + \Delta X + B)SC$$

where
SC is a scale factor based on a desired set width.

32. The typesetter recited in claim 29, wherein the characters intersected by the raster lines may be slanted, and wherein said outline converter means computes said third digital data in accordance with the formula:

$$X_R = X_P + (X_N + \Delta X + SLC)A$$

where
SLC = the X direction change in the X position of the point of intersection of the particular character outline caused by the slanting of the characters.

33. The typesetter recited in claim 32, wherein $SLC = (A - Y_S)(\tan B)$,
where
A = the Y position of a central neutral axis about which the slant is made;
$Y_S$ = the Y position of the current raster line with respect to an edge of the associated character em; and
B = the slant angle.

34. The typesetter recited in claim 29, wherein $\Delta X$ is given by the expression:

$$\Delta X = (Y_S - Y_N)(dx/dy + C),$$

where
$Y_S$ = the Y position of the current raster line with respect to an edge of the associated characher em;
$Y_N$ = the Y position of the start point of said particular character outline with respect to said edge of the associated character em;
$dx/dy$ = the incremental X and Y distances of a straight line vector from $Y_N$ along said particular character outline; and
C is a positioning parameter.

35. The typesetter recited in claim 34, wherein $\Delta X$ is given by the expression:

$$\Delta X = (Y_S - Y_N)(dx/dy + JK),$$

where
J is a first constant equal to the number of raster units in either the X or Y direction expressable by the digital number representing the value dx/dy; and
K is a second constant equal to an integer.

36. The typesetter recited in claim 35, wherein $J = 16$.

37. A system for the automatic generation of characters comprising:
an input means for specifying the identity, size and placement of the characters to be generated; a font storage means defining the contour of each of said characters with respect to a normalized encoding set of first and second coordinates; and data processing means, connected to the input means and the font storage means, for receiving the data from said input means and font storage means and identifying the locations of the intersections of the boundaries of a plurality of said specified characters with a raster line.

38. The system of claim 37 wherein said second coordinate distances are defined in data resolution units, said data processing means identifying the raster intersection in said first coordinate direction corresponding to each successive raster line in the second coordinate direction for scaling said characters to a predetermined size from said normalized encoded set on successive raster lines, each raster line being separated by a raster line unit, each said data resolution unit of said normalized encoded set being related to each said raster line by the expression:

$$Ys = (Ysl - Yhi)K/\text{point size};$$

where Yhi is a zero datum level in raster units, Ysl is the raster line level, K is a constant related to the character size in point size units, and Ys is the corresponding data resolution unit level.

39. The system of claim 38 wherein the zero datum level in raster units corresponds to the upper edge of the normalized EM square for each encoded character.

40. The system of claim 38 wherein the zero datum level in raster units, corresponds to a start point for each encoded character and wherein the encoded data includes digital numbers defining the first and second coordinate of the start point of the character outline and digital numbers defining a plurality of straight line vectors extending successively along the character outline from the start point, each vector having a digital number representing the first coordinate distance and the second digital number representing the second coordinate distance from one end of the vector to the other.

41. The system of claim 38 wherein said intersection in said first coordinate direction is given by the expression:

$$XREG = XPOS \pm [\pm XN \pm (Ys - YN)(dx/dy)(k)]$$

where XREG is the intersection in the first coordinate direction in raster resolution units, XPOS is the distance in the first coordinate direction from a zero datum level and is in raster resolution units, XN and YN are the starting locations of a vector VN whose slope is dy/dx and are in data resolution units and K is the scaling factor.

42. A system for the automatic generation of characters comprising an input means for providing first digital data specifying the identity, size and placement of the characters to be generated; a font storage means defining the contour of each of said characters with respect to a normalized encoding set of first and second coordinates and for storing and providing second digital data defining each character to be generated; data processing means, connected to said input means and said font storage means, for receiving said first and second digital data and producing third digital data identifying the boundaries of a plurality of said specified characters intersecting a raster line; and a raster line storage means connected to said data processing means for storing said third digital data for at least a portion of said raster line extending the width of at least said plurality of characters and comprising memory elements, with each of said memory elements corresponding to a respective raster point along the raster line.

43. The system of claim 42, wherein said line storage means includes at least two line stores, each of two line stores formed of a plurality of memory elements, with each of said memory elements corresponding to the respective unique raster point along said raster line, the memory elements in a first of said line stores representing the positions on the scan line of which the scanning beam is switched on and the contents of memory elements in the second line store representing the positions on the scan line in which the scanning beam is switched off.

44. The system of claim 43 wherein the line store further includes a third line store, the third line store having a plurality of memory elements, the state of the memory elements in said third line store representing the positions on the scan line of which the beam on and off switching is reversed.

* * * * *